US008365213B1

(12) United States Patent
Orlowski

(10) Patent No.: US 8,365,213 B1
(45) Date of Patent: Jan. 29, 2013

(54) SYSTEM AND METHOD FOR MEASURING TELEVISION ADVERTISING AND PROGRAM VIEWING AT A SECOND-BY-SECOND LEVEL AND FOR MEASURING EFFECTIVENESS OF TARGETED ADVERTISING

(76) Inventor: Robert Orlowski, Centennial, CO (US)

( * ) Notice: Subject to any disclaimer, the term of this patent is extended or adjusted under 35 U.S.C. 154(b) by 139 days.

(21) Appl. No.: 13/052,026

(22) Filed: Mar. 18, 2011

(51) Int. Cl.
*H04N 60/33* (2006.01)

(52) U.S. Cl. ................... 725/13; 725/9; 725/14; 725/15

(58) Field of Classification Search ........... 725/9, 13–15
See application file for complete search history.

(56) References Cited

U.S. PATENT DOCUMENTS

| | | | | |
|---|---|---|---|---|
| 7,383,243 | B2 * | 6/2008 | Conkwright et al. | 725/2 |
| 7,590,993 | B1 | 9/2009 | Hendricks | |
| 2005/0235307 | A1 * | 10/2005 | Relan et al. | 725/14 |
| 2006/0015891 | A1 * | 1/2006 | Lazzaro et al. | 725/9 |
| 2006/0168609 | A1 | 7/2006 | Chen | |
| 2006/0223495 | A1 * | 10/2006 | Cassett et al. | 455/405 |
| 2007/0074258 | A1 * | 3/2007 | Wood et al. | 725/105 |
| 2010/0145791 | A1 | 6/2010 | Canning | |
| 2012/0079518 | A1 * | 3/2012 | Wan et al. | 725/14 |

OTHER PUBLICATIONS

RENTRAK Corporation Television TV Essentials Web source: http://www.rentrak.com/section/media/tv/linear.html Feb. 1, 2011.
Wayne Friedman Rentrak's 'Stickiness' Mines TV Value on Granular Level MediaPost, Jan. 27, 2010 p. 1 of attached file Web source: http://www.tvb.org/media/file/.

* cited by examiner

*Primary Examiner* — Brian Pendleton
*Assistant Examiner* — Nnenna Ekpo

(57) ABSTRACT

A computer-implemented method of processing set-top box channel tuning data resulting in channel viewing activity at a second-by-second level which is then correlated with video asset schedule data, program attribute data, and optionally, targeted content delivery data and demographic data, to measure (a) actual television viewing seconds, (b) viewing audience of an advertisement or program during each second that it aired, (c) aggregate viewing audience for each second that an advertisement or program aired, (d) ad seconds viewed controlling for factors such as time of day, product, program, (e) response of various demographic groups to advertisements, and (f) effectiveness of targeted content against non-targeted content as measured in actual viewing seconds; all while maintaining viewer anonymity. The metrics produced are useful to service providers, advertisers, and content producers. Another embodiment teaches using electronic device usage data to produce similar metrics for internet protocol television and mobile device viewing.

16 Claims, 91 Drawing Sheets

```
PERFORM Process-chan-tuning-file
   UNTIL no more records


Process-chan-tuning-file.

READ CHANNEL-TUNE-FILE
If no more records
  Exit
else
  Look thru the rows in STB-CHANNEL-VIEWING-DETAIL
    for a match on the key.
  Key fields include:
    Market
    Service Group
    Hub
    Headend
    Channel call sign
    Channel source id
    Set-top box id
    Tuner index
  If key of row matches
    Loop thru VIEWED-CHANNEL-FLAG 3090 sub-array
       from TUNE-IN-SECOND-OF-DAY
       to TUNE-OUT-SECOND-OF-DAY
       marking each second as viewed.
  Else
    If no match on the key
       Do Create new row in STB-CHANNEL-VIEWING-DETAIL
       Loop thru VIEWED-CHANNEL-FLAG 3090 sub-array
          from TUNE-IN-SECOND-OF-DAY
          to TUNE-OUT-SECOND-OF-DAY
          marking each second as viewed.
    End-if
  End-if
End-read-loop

Create new row in STB-CHANNEL-VIEWING-DETAIL
Note: FIG 20 fields are being populated from corresponding FIG 19 fields.
```

FIG. 9-B Continued

The Viewing Analytics Engine 142 populates each of the fields as follows:

MARKET 3010 is populated from MARKET 1610 in input file 134.

SERVICE-GROUP 3020 is populated from SERVICE-GROUP 1620 in input file 134.

HUB 3030 is populated from HUB 1630 in input file 134.

HEADEND 3040 is populated from HEADEND 1640 in input file 134.

CHANNEL-CALL-SIGN 3050 is populated from CHANNEL-CALL-SIGN 1670 in input file 134.

CHANNEL-SOURCE-ID 3060 is populated from CHANNEL-SOURCE-ID 1680 in input file 134.

SET-TOP-BOX-ID 3070 is populated from SET-TOP-BOX-ID 1650 in input file 134.

TUNER-INDEX 3080 is populated from TUNER-INDEX 1660 in input file 134.

Note: For additional details, on loading standardized channel tune data into the STB-CHANNEL-VIEWING-DETAIL Data Structure (table) in the memory of the computer with the result that the VIEWED-CHANNEL-FLAG 3090 is populated see the source code.

Explanation: The system will read each record in the channel tuning file. It will then look to see whether the key of that channel tune record has already been loaded to the STB-CHANNEL-VIEWING-DETAIL array. If it has, then mark each second from the tune-in second of the day to the tune-out second of the day as having been viewed. If the key is not in the table, then add a row to the table with that key and then mark each second from the tune-in second of the day to the tune-out second of the day as having been viewed.

Note: The attached program listing refers to 'video asset schedule data' as 'ad delivery instance'. Because this part of the specification corresponds to the program, I have followed the naming conventions used in the program.

```
PERFORM Process-AD-DELIVERY-INSTANCE-FILE
    UNTIL no more records


Process-AD-DELIVERY-INSTANCE-FILE.

READ AD-DELIVERY-INSTANCE-FILE
If no more records
    Exit
else
   Add 1 to the VR-SUB subscript
    MOVE DI-MARKET  2015 TO
        VR-MARKET (VR-SUB) 3210
    MOVE DI-SERVICE-GROUP 2025 TO
        VR-SERVICE-GROUP (VR-SUB) 3220
    MOVE DI-HUB 2035 TO
        VR-HUB (VR-SUB) 3230
    MOVE DI-HEADEND  2045 TO
        VR-HEADEND (VR-SUB) 3240
    MOVE DI-CHANNEL-CALL-SIGN 2055 TO
        VR-CHANNEL-CALL-SIGN (VR-SUB) 3250
    MOVE DI-CHANNEL-SOURCE-ID 2065 TO
        VR-CHANNEL-SOURCE-ID (VR-SUB) 3260

    MOVE DI-AD-DURATION-IN-SECONDS  2075 TO
        VR-AD-DURATION-IN-SECONDS (VR-SUB) 3270
    MOVE DI-AD-PLAY-DATE 2085 TO
        VR-AD-PLAY-DATE (VR-SUB) 3280
    MOVE DI-AD-PLAY-TIME-BEG 2095 TO
        VR-AD-PLAY-TIME-BEG (VR-SUB) 3290
```

FIG. 10-B – continued

```
MOVE DI-AD-PLAY-BEG-SEC-OF-DAY 2105 TO
    VR-AD-PLAY-BEG-SEC-OF-DAY (VR-SUB) 3300
  MOVE DI-AD-PLAY-TIME-END 2115 TO
    VR-AD-PLAY-TIME-END (VR-SUB) 3310
  MOVE DI-AD-PLAY-END-SEC-OF-DAY 2125 TO
    VR-AD-PLAY-END-SEC-OF-DAY (VR-SUB) 3320

  MOVE DI-TARGETED-AD-FLAG 2135 TO
    VR-TARGETED-AD-FLAG (VR-SUB) 3330

  MOVE DI-TARGETED-SET-TOP-BOX-COUNT 2145 TO
    VR-TARGETED-SET-TOP-BOX-COUNT (VR-SUB) 3340

  MOVE DI-VIDEO-ASSET-ID 2155 TO
    VR-VIDEO-ASSET-ID (VR-SUB) 3620
  MOVE DI-PRODUCT-TYPE 2165 TO
    VR-PRODUCT-TYPE (VR-SUB) 3630

  MOVE DI-VIDEO-ASSET-NAME 2175 TO
    VR-VIDEO-ASSET-NAME (VR-SUB) 3640
  MOVE DI-PRODUCER-NAME 2185 TO
    VR-PRODUCER-NAME (VR-SUB) 3650
  MOVE DI-AGENCY-NAME 2195 TO
    VR-AGENCY-NAME (VR-SUB) 3660
  MOVE DI-SCRIPT-WRITER 2205 TO
    VR-SCRIPT-WRITER (VR-SUB) 3670
  MOVE DI-FEATURED-ACTOR 2215 TO
    VR-FEATURED-ACTOR (VR-SUB) 3680
  MOVE DI-ACTOR-CELEBRITY-STATUS 2225 TO
    VR-ACTOR-CELEBRITY-STATUS (VR-SUB) 3690

  MOVE DI-FEATURED-VOICE 2235 TO
    VR-FEATURED-VOICE (VR-SUB) 3700
  MOVE DI-PRODUCT-CATEGORY 2245 TO
    VR-PRODUCT-CATEGORY (VR-SUB) 3710
  MOVE DI-LANGUAGE 2255 TO
    VR-LANGUAGE (VR-SUB) 3720
```

FIG. 10-B – continued

```
    MOVE DI-INFORMATIONAL-CONTENT-CODE 2265 TO
        VR-INFORMATIONAL-CONTENT-CODE (VR-SUB) 3730
    MOVE DI-DELIVERY-FORMAT  2275 TO
        VR-DELIVERY-FORMAT (VR-SUB) 3740
    MOVE DI-AUDIO-TRACK-CODE 2285 TO
        VR-AUDIO-TRACK-CODE (VR-SUB) 3750
    MOVE DI-AUDIENCE-SUITABILITY-RATING  2295 TO
        VR-AUDIENCE-SUITABILITY-RATING (VR-SUB) 3760
    MOVE DI-EPISODE-IDENTIFIER 2305 TO
        VR-EPISODE-IDENTIFIER (VR-SUB) 3770
    MOVE DI-ASSET-DELIVERY-INSTANCE-ID 2315 TO
        VR-ASSET-DELIVERY-INSTANCE-ID (VR-SUB) 3780
    MOVE DI-PROGRAM-ATTRIBUTE-1  2325 TO
        VR-PROGRAM-ATTRIBUTE-1 (VR-SUB) 3790
    MOVE DI-PROGRAM-ATTRIBUTE-2  2335 TO
        VR-PROGRAM-ATTRIBUTE-2 (VR-SUB) 3800
    MOVE DI-TIME-OF-DAY-CODE 2345 TO
        VR-TIME-OF-DAY-CODE (VR-SUB) 3810
    MOVE DI-DEMOGRAPHIC-GROUP  2355 TO
        VR-DEMOGRAPHIC-GROUP (VR-SUB) 3820
    MOVE DI-INFERRED-RACE  2365 TO
        VR-INFERRED-RACE (VR-SUB) 3830
    MOVE DI-INFERRED-GENDER  2375 TO
        VR-INFERRED-GENDER (VR-SUB) 3840
    MOVE DI-INFERRED-AGE-GROUP 2385 TO
        VR-INFERRED-AGE-GROUP (VR-SUB) 3850
    MOVE DI-INFERRED-INCOME-BRACKET  2395 TO
        VR-INFERRED-INCOME-BRACKET (VR-SUB) 3860
    MOVE DI-INFERRED-MARITAL-STATUS  2405 TO
        VR-INFERRED-MARITAL-STATUS (VR-SUB) 3870
    MOVE DI-SET-TOP-BOX-ZIP-CODE 2415 TO
        VR-SET-TOP-BOX-ZIP-CODE (VR-SUB) 3880
    MOVE DI-SUBSCRIBER-TYPE  2425 TO
        VR-SUBSCRIBER-TYPE (VR-SUB)  3890
    MOVE DI-SUBSCRIBER-PACKAGE-LEVEL 2435 TO
        VR-SUBSCRIBER-PACKAGE-LEVEL (VR-SUB) 3900
    MOVE DI-SMA-CODE 2445 TO
        VR-SMA-CODE (VR-SUB) 3910
End-if
```

Note: Some variable names are as they appear in the accompanying source code.

```
READ TARGETED-AD-DELIVERY-FILE
     AT END
       MOVE "Y" TO TARGETED-AD-DELIVERY-EOF-FLAG
     NOT AT END
       Perform FIND-TA-STB-IN-VIEW-RESLT
          varying vr-sub
          From 1 by 1
          UNTIL VR-MARKET (vr-sub) = SPACE
          OR     VR-SUB      > VR-SUB-ROWS-LOADED
   END-READ.



FIND-TA-STB-IN-VIEW-RESLT.
  If  TA-MARKET 2810          = VR-MARKET (vr-sub) 3210
  And TA-SERVICE-GROUP 2820   = VR-SERVICE-GROUP (vr-sub) 3220
  And TA-HUB 2830             = VR-HUB (vr-sub) 3230
  And TA-HEADEND 2840         = VR-HEADEND (vr-sub) 3240
  And TA-CHANNEL-CALL-SIGN 2850 = VR-CHANNEL-CALL-SIGN (vr-sub) 3250
  And TA-CHANNEL-SOURCE-ID 2860 = VR-CHANNEL-SOURCE-ID (vr-sub) 3260
  And TA-AD-PLAY-DATE 2880    = VR-AD-PLAY-DATE (vr-sub) 3280
  And TA-AD-PLAY-BEG-SEC-OF-DAY 2900 =
                     VR-AD-PLAY-BEG-SEC-OF-DAY (vr-sub) 3300
  And VR-TARGETED-AD-FLAG (vr-sub)      = "Y"
  And TA-VIDEO-ASSET-ID 2940    = VR-VIDEO-ASSET-ID(vr-sub) 3620
  And TA-ASSET-DELIVERY-INSTANCE-ID 2950 =
                     VR-ASSET-DELIVERY-INSTANCE-ID(vr-sub) 3780
    Perform Look-up-viewing-info
  END-IF.
```

FIG. 11-B - continued

```
Look-up-viewing-info.
  Move 1 to STB-VD-SUB
  MOVE "N"    TO FOUND-MATCHING-VIEWDTLFLG
  Perform FIND-TAID-IN-STB-VIEW-DTL
     varying STB-VD-SUB
     From 1 by 1 until
     OR FOUND-MATCHING-VIEWDTLFLG = "Y"


FIND-TAID-IN-STB-VIEW-DTL.
   If  MARKET (STB-VD-SUB)  3010      = TA-MARKET 2810
   And SERVICE-GROUP (STB-VD-SUB) 3020 = TA-SERVICE-GROUP 2820
   And HUB (STB-VD-SUB)  3030         = TA-HUB 2830
   AND HEADEND (STB-VD-SUB) 3040       = TA-HEADEND 2840
   AND CHANNEL-CALL-SIGN (STB-VD-SUB)3050  = TA-CHANNEL-CALL-SIGN 2850
   AND CHANNEL-SOURCE-ID (STB-VD-SUB) 3060 = TA-CHANNEL-SOURCE-ID 2860
   AND SET-TOP-BOX-ID (STB-VD-SUB) 3070 = TA-SET-TOP-BOX-ID 2870
   AND TUNER-INDEX (STB-VD-SUB) 3080    = TA-TUNER-INDEX 2874
   AND
   VIEWED-CHANNEL-FLAG (STB-VD-SUB, TA-AD-PLAY-BEG-SEC-OF-DAY) 3090 = 1
      PERFORM COUNT-STB-SECONDS-VIEWED
      MOVE "Y"  TO FOUND-MATCHING-VIEWDTLFLG
   END-IF.

COUNT-STB-SECONDS-VIEWED.
   perform varying SECONDS-SUB
      from TA-AD-PLAY-BEG-SEC-OF-DAY 2900 by 1
      until SECONDS-SUB > TA-AD-PLAY-END-SEC-OF-DAY 2930
      If VIEWED-CHANNEL-FLAG (STB-VD-SUB, SECONDS-SUB) 3090 = 1
       add VIEWED-CHANNEL-FLAG (STB-VD-SUB, SECONDS-SUB) 3090 to
           ad-seconds-VIEWED-counter
       move 5 to VIEWED-CHANNEL-FLAG (STB-VD-SUB, SECONDS-SUB) 3090
      end-if
   Add the viewing seconds to each of the relevant cases
   Add the viewing counts to each of the relevant cases
```

```
PERFORM VARYING VR-SUB1 FROM 1 BY 1 (VIEWING-RESULT loop)
  UNTIL VR-SUB1 > VR-SUB-ROWS-LOADED
  If VR-TARGETED-AD-FLAG (VR-SUB1) = "Y"
    perform varying SEC-SUB1 (Seconds looop)
      from VR-AD-PLAY-BEG-SEC-OF-DAY (VR-SUB1) 3300 by 1
      until SEC-SUB1 > VR-AD-PLAY-END-SEC-OF-DAY(VR-SUB1) 3320
      perform varying stb-vd-sub1 from 1 by 1 (VIEWING-DETAIL loop)
        until stb-vd-sub1 > STB-VD-SUB-ROWS-LOADED
        if  VR-MARKET(VR-SUB1) 3210        = MARKET(stb-vd-sub1) 3010
        and VR-SERVICE-GROUP(VR-SUB1) 3220 =
            SERVICE-GROUP(stb-vd-sub1)3020
        and VR-HUB(VR-SUB1) 3230           = HUB(stb-vd-sub1) 3030
        and VR-HEADEND(VR-SUB1) 3240       = HEADEND(stb-vd-sub1) 3040
          IF VR-CHANNEL-CALL-SIGN(VR-SUB1) 3250 =
            CHANNEL-CALL-SIGN(stb-vd-sub1) 3050
          and VR-CHANNEL-SOURCE-ID(VR-SUB1) 3260 =
             CHANNEL-SOURCE-ID(stb-vd-sub1) 3060
          AND VIEWED-CHANNEL-FLAG (stb-vd-sub1, SEC-SUB1) 3090 =
             targeted ones
            add 1 to viewed-this-asset-count
            add 1 to agg-viewed-this-asset-count
          end-if
          if VIEWED-CHANNEL-FLAG (stb-vd-sub1, SEC-SUB1) 3090 =
            non-targeted
          or VIEWED-CHANNEL-FLAG (stb-vd-sub1, SEC-SUB1) 3090 =
            targeted ones
            add 1 to viewed-any-asset-count
            add 1 to agg-viewed-any-asset-count
          end-if
        end-if
      end-perform


      MOVE VR-MARKET(VR-SUB1) 3210              TO
         BSAV-MARKET 5610
      MOVE VR-SERVICE-GROUP(VR-SUB1) 3220       TO
         BSAV-SERVICE-GROUP 5620
```

FIG. 12-B continued

MOVE VR-HUB(VR-SUB1) 3230 TO
BSAV-HUB 5630
MOVE VR-HEADEND(VR-SUB1) 3240 TO
BSAV-HEADEND 5640
MOVE VR-CHANNEL-CALL-SIGN(VR-SUB1)3250 TO
BSAV-CHANNEL-CALL-SIGN 5650
MOVE VR-CHANNEL-SOURCE-ID(VR-SUB1) 3260 TO
BSAV-CHANNEL-SOURCE-ID 5660
MOVE VR-VIDEO-ASSET-ID(VR-SUB1) 3620 TO
BSAV-VIDEO-ASSET-ID 5670
MOVE VR-ASSET-DELIVERY-INSTANCE-ID(VR-SUB1) 3780 TO
BSAV-ASSET-DELIV-INST-ID 5680
MOVE VR-TARGETED-AD-FLAG (VR-SUB1) 3330 TO
BSAV-TARGETED-AD-FLAG 5690
MOVE VR-VIDEO-ASSET-NAME (VR-SUB1) 3640 TO
BSAV-VIDEO-ASSET-NAME 5700
MOVE VR-AD-DURATION-IN-SECONDS (VR-SUB1) 3270 TO
BSAV-AD-DURATION-IN-SECONDS 5710
Move SEC-SUB1 to
BSAV-asset-second 5720
MOVE VR-AD-PLAY-DATE (VR-SUB1) 3280 TO
BSAV-AD-PLAY-DATE 5730
MOVE VR-AD-PLAY-TIME-BEG (VR-SUB1) 3290 TO
BSAV-AD-PLAY-TIME-BEG 5740
MOVE VR-AD-PLAY-BEG-SEC-OF-DAY (VR-SUB1) 3300 TO
BSAV-AD-PLAY-BEG-SEC-OF-DAY 5750
MOVE VR-AD-PLAY-TIME-END (VR-SUB1) 3310 TO
BSAV-AD-PLAY-TIME-END 5760
MOVE VR-AD-PLAY-END-SEC-OF-DAY (VR-SUB1) 3320 TO
BSAV-AD-PLAY-END-SEC-OF-DAY 5770
MOVE viewed-this-asset-count TO
BSAV-viewed-this-asset-count 5780

FIG. 12-B continued

```
    MOVE viewed-any-asset-count            TO
       BSAV-viewed-any-asset-count 5790

    If viewed-any-asset-count > 0
      COMPUTE PCT-VIEWING-THIS-ASSET =
        viewed-this-asset-count / viewed-any-asset-count * 100
    else
      move zero to PCT-VIEWING-THIS-ASSET
    end-if

    MOVE PCT-VIEWING-THIS-ASSET         TO
       BSAV-PCT-VIEWING-THIS-ASSET 5810
    MOVE agg-viewed-this-asset-count    TO
       BSAV-agg-vw-this-asset-count 5800
    WRITE BY-SEC-Tar-ASSET-VIEW-REC
      FROM BY-SEC-ASSET-VIEW-DATA-WS
  end-perform
 End-if
end-perform.
```

FIG. 14-A
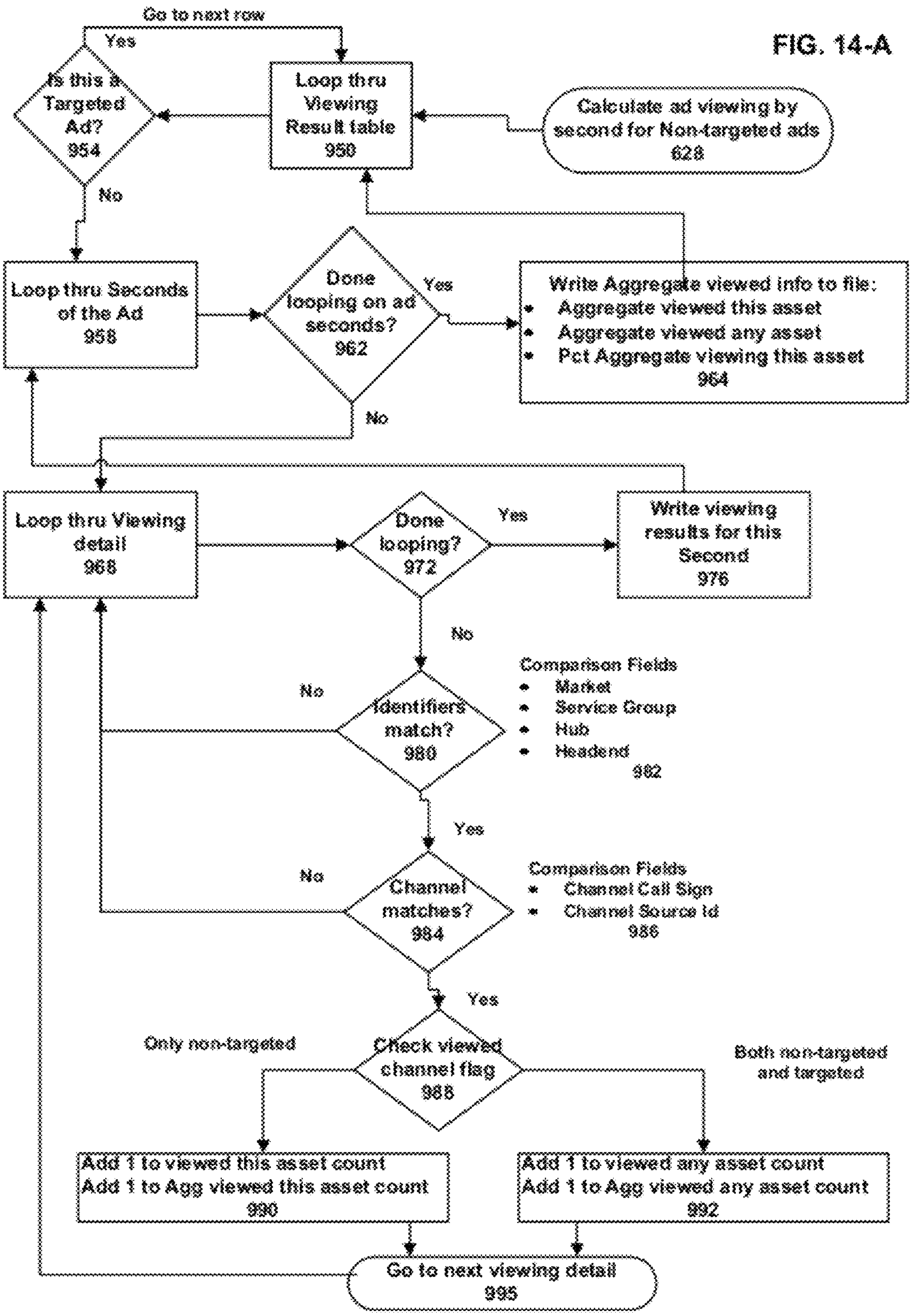

FIG. 14-B

```
PERFORM VARYING VR-SUB1 FROM 1 BY 1 (VIEWING-RESULT loop)
  UNTIL VR-SUB1 > VR-SUB-ROWS-LOADED
  If VR-TARGETED-AD-FLAG (VR-SUB1) = "N"
    perform varying SEC-SUB1 (Seconds looop)
      from VR-AD-PLAY-BEG-SEC-OF-DAY (VR-SUB1) 3300 by 1
      until SEC-SUB1 > VR-AD-PLAY-END-SEC-OF-DAY(VR-SUB1) 3320
      perform varying stb-vd-sub1 from 1 by 1 (VIEWING-DETAIL loop)
        until stb-vd-sub1 > STB-VD-SUB-ROWS-LOADED
        if  VR-MARKET(VR-SUB1) 3210       = MARKET(stb-vd-sub1) 3010
        and VR-SERVICE-GROUP(VR-SUB1) 3220 =
            SERVICE-GROUP(stb-vd-sub1)3020
        and VR-HUB(VR-SUB1) 3230          = HUB(stb-vd-sub1) 3030
        and VR-HEADEND(VR-SUB1) 3240      = HEADEND(stb-vd-sub1) 3040
          IF VR-CHANNEL-CALL-SIGN(VR-SUB1) 3250 =
            CHANNEL-CALL-SIGN(stb-vd-sub1) 3050
          and VR-CHANNEL-SOURCE-ID(VR-SUB1) 3260 =
             CHANNEL-SOURCE-ID(stb-vd-sub1) 3060
          AND VIEWED-CHANNEL-FLAG (stb-vd-sub1, SEC-SUB1) 3090 =
             non-targeted
            add 1 to viewed-this-asset-count
            add 1 to agg-viewed-this-asset-count
          end-if
          if VIEWED-CHANNEL-FLAG (stb-vd-sub1, SEC-SUB1) 3090 =
            non-targeted
          or VIEWED-CHANNEL-FLAG (stb-vd-sub1, SEC-SUB1) 3090 =
            targeted ones
            add 1 to viewed-any-asset-count
            add 1 to agg-viewed-any-asset-count
          end-if
        end-if
      end-perform

      MOVE VR-MARKET(VR-SUB1) 3210              TO
         BSAV-MARKET 6010
      MOVE VR-SERVICE-GROUP(VR-SUB1) 3220        TO
         BSAV-SERVICE-GROUP 6020
```

FIG. 14-B continued

```
MOVE VR-HUB(VR-SUB1) 3230 TO
   BSAV-HUB 6030
MOVE VR-HEADEND(VR-SUB1) 3240 TO
   BSAV-HEADEND 6040
MOVE VR-CHANNEL-CALL-SIGN(VR-SUB1)3250 TO
   BSAV-CHANNEL-CALL-SIGN 6050
MOVE VR-CHANNEL-SOURCE-ID(VR-SUB1) 3260 TO
   BSAV-CHANNEL-SOURCE-ID 6060
MOVE VR-VIDEO-ASSET-ID(VR-SUB1) 3620 TO
   BSAV-VIDEO-ASSET-ID 6070
MOVE VR-ASSET-DELIVERY-INSTANCE-ID(VR-SUB1) 3780 TO
   BSAV-ASSET-DELIV-INST-ID 6080
MOVE VR-TARGETED-AD-FLAG (VR-SUB1) 3330 TO
   BSAV-TARGETED-AD-FLAG 6090
MOVE VR-VIDEO-ASSET-NAME (VR-SUB1) 3640 TO
   BSAV-VIDEO-ASSET-NAME 6100
MOVE VR-AD-DURATION-IN-SECONDS (VR-SUB1) 3270 TO
   BSAV-AD-DURATION-IN-SECONDS 6110
Move SEC-SUB1 to
   BSAV-asset-second 6120
MOVE VR-AD-PLAY-DATE (VR-SUB1) 3280 TO
   BSAV-AD-PLAY-DATE 6130
MOVE VR-AD-PLAY-TIME-BEG (VR-SUB1) 3290 TO
   BSAV-AD-PLAY-TIME-BEG 6140
MOVE VR-AD-PLAY-BEG-SEC-OF-DAY (VR-SUB1) 3300 TO
   BSAV-AD-PLAY-BEG-SEC-OF-DAY 6150
MOVE VR-AD-PLAY-TIME-END (VR-SUB1) 3310 TO
   BSAV-AD-PLAY-TIME-END 6160
MOVE VR-AD-PLAY-END-SEC-OF-DAY (VR-SUB1) 3320 TO
   BSAV-AD-PLAY-END-SEC-OF-DAY 6170
MOVE viewed-this-asset-count TO
   BSAV-viewed-this-asset-count 6180
MOVE viewed-any-asset-count TO
   BSAV-viewed-any-asset-count 6190
```

FIG. 14-B continued

```
      If viewed-any-asset-count > 0
         COMPUTE PCT-VIEWING-THIS-ASSET =
            viewed-this-asset-count / viewed-any-asset-count * 100
      else
         move zero to PCT-VIEWING-THIS-ASSET
      end-if

      MOVE PCT-VIEWING-THIS-ASSET          TO
         BSAV-PCT-VIEWING-THIS-ASSET 6210
      MOVE agg-viewed-this-asset-count     TO
         BSAV-agg-vw-this-asset-count 6200
      WRITE BY-SEC-Tar-ASSET-VIEW-REC
        FROM BY-SEC-ASSET-VIEW-DATA-WS
    end-perform
  End-if
end-perform.
```

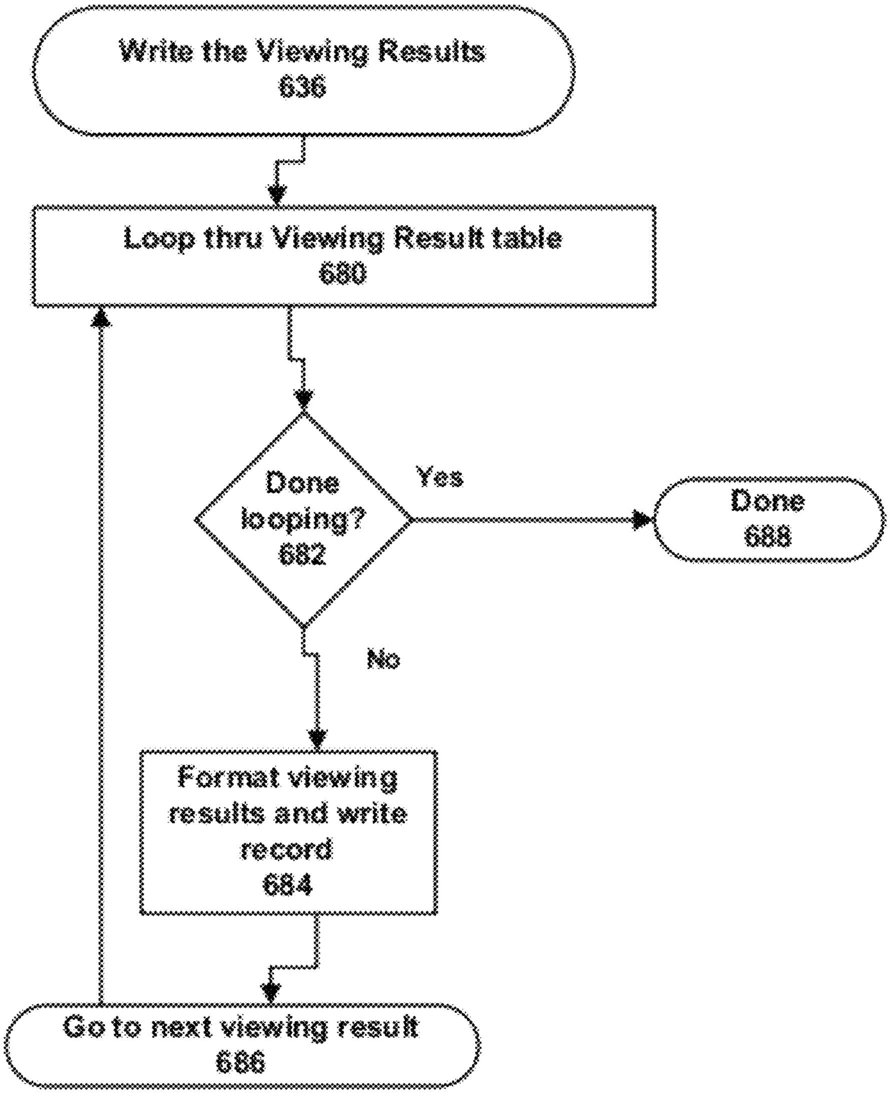
FIG. 15-A

FIG. 15-B

```
Perform R100-WRITE-viewing-result-FILE
   VARYING vr-sub FROM 1 BY 1
   Until vr-sub > VR-SUB-ROWS-LOADED

R100-WRITE-viewing-result-FILE.
    MOVE VR-MARKET (VR-SUB) 3210 TO
       VO-MARKET 4210
    MOVE VR-SERVICE-GROUP (VR-SUB) 3220 TO
       VO-SERVICE-GROUP 4220
    MOVE VR-HUB(VR-SUB) 3230 TO
       VO-HUB 4230
    MOVE VR-HEADEND(VR-SUB) 3240 TO
       VO-HEADEND 4240
    MOVE VR-CHANNEL-CALL-SIGN (VR-SUB) 3250 TO
       VO-CHANNEL-CALL-SIGN 4250
    MOVE VR-CHANNEL-SOURCE-ID (VR-SUB) 3260 TO
       VO-CHANNEL-SOURCE-ID 4260
    MOVE VR-AD-DURATION-IN-SECONDS(VR-SUB) 3270 TO
       VO-AD-DURATION-IN-SECONDS 4270
    MOVE VR-AD-PLAY-DATE(VR-SUB) 3280 TO
       VO-AD-PLAY-DATE 4280
    MOVE VR-AD-PLAY-TIME-BEG (VR-SUB) 3290 TO
       VO-AD-PLAY-TIME-BEG 4290
    MOVE VR-AD-PLAY-BEG-SEC-OF-DAY(VR-SUB) 3300 TO
       VO-AD-PLAY-BEG-SEC-OF-DAY 4300
    MOVE VR-AD-PLAY-TIME-END (VR-SUB) 3310 TO
       VO-AD-PLAY-TIME-END 4310
    MOVE VR-AD-PLAY-END-SEC-OF-DAY(VR-SUB) 3320 TO
       VO-AD-PLAY-END-SEC-OF-DAY 4320
    MOVE VR-TARGETED-AD-FLAG (VR-SUB) 3330 TO
       VO-TARGETED-AD-FLAG 4330
    MOVE VR-TARGETED-SET-TOP-BOX-COUNT (VR-SUB) 3340 TO
       VO-TARGETED-SET-TOP-BOX-COUNT 4340
    MOVE VR-TARGT-C1-VIEW-BEG-END-SECS (VR-SUB) 3350 TO
       VO-TARGT-C1-VIEW-BEG-END-SECS 4350
    MOVE VR-TARGT-C1-VIEW-BEG-END-COUNT (VR-SUB) 3360 TO
       VO-TARGT-C1-VIEW-BEG-END-COUNT 4360
    MOVE VR-TARGT-C2-VIEW-BEG-MID-SECS (VR-SUB) 3370 TO
       VO-TARGT-C2-VIEW-BEG-MID-SECS 4370
```

FIG. 15-B continued

```
MOVE VR-TARGT-C2-VIEW-BEG-MID-COUNT (VR-SUB) 3380 TO
    VO-TARGT-C2-VIEW-BEG-MID-COUNT 4380
MOVE VR-TARGT-C3-VIEW-BEG-END-SECS (VR-SUB) 3390 TO
    VO-TARGT-C3-VIEW-BEG-END-SECS 4390
MOVE VR-TARGT-C3-VIEW-BEG-END-COUNT (VR-SUB) 3400 TO
    VO-TARGT-C3-VIEW-BEG-END-COUNT 4400
MOVE VR-TARGT-C4-VIEW-PARTIAL-SECS (VR-SUB) 3410 TO
    VO-TARGT-C4-VIEW-PARTIAL-SECS 4410
MOVE VR-TARGT-C4-VIEW-PARTIAL-COUNT (VR-SUB) 3420 TO
    VO-TARGT-C4-VIEW-PARTIAL-COUNT 4420
MOVE VR-NOTGT-C1-VIEW-BEG-END-SECS (VR-SUB) 3430 TO
    VO-NOTGT-C1-VIEW-BEG-END-SECS 4430
MOVE VR-NOTGT-C1-VIEW-BEG-END-COUNT (VR-SUB) 3440 TO
    VO-NOTGT-C1-VIEW-BEG-END-COUNT 4440
MOVE VR-NOTGT-C2-VIEW-BEG-MID-SECS (VR-SUB) 3450 TO
    VO-NOTGT-C2-VIEW-BEG-MID-SECS 4450
MOVE VR-NOTGT-C2-VIEW-BEG-MID-COUNT (VR-SUB) 3460 TO
    VO-NOTGT-C2-VIEW-BEG-MID-COUNT 4460
MOVE VR-NOTGT-C3-VIEW-MID-END-SECS (VR-SUB) 3470 TO
    VO-NOTGT-C3-VIEW-MID-END-SECS 4470
MOVE VR-NOTGT-C3-VIEW-MID-END-COUNT (VR-SUB) 3480 TO
    VO-NOTGT-C3-VIEW-MID-END-COUNT 4480
MOVE VR-NOTGT-C4-VIEW-MID-MID-SECS (VR-SUB) 3490 TO
    VO-NOTGT-C4-VIEW-MID-MID-SECS 4490
MOVE VR-NOTGT-C4-VIEW-MID-MID-COUNT (VR-SUB) 3500 TO
    VO-NOTGT-C4-VIEW-MID-MID-COUNT 4500
MOVE VR-NOTGT-C5-VIEW-BEG-END-SECS (VR-SUB) 3510 TO
    VO-NOTGT-C5-VIEW-BEG-END-SECS 4510
MOVE VR-NOTGT-C5-VIEW-BEG-END-COUNT (VR-SUB) 3520 TO
    VO-NOTGT-C5-VIEW-BEG-END-COUNT 4520
MOVE VR-NOTGT-C6-VIEW-PARTIAL-SECS (VR-SUB) 3530 TO
    VO-NOTGT-C6-VIEW-PARTIAL-SECS 4530
MOVE VR-NOTGT-C6-VIEW-PARTIAL-COUNT (VR-SUB) 3540 TO
    VO-NOTGT-C6-VIEW-PARTIAL-COUNT 4540
MOVE VR-TOTAL-EXPECT-VIEW-SECS(VR-SUB) 3550 TO
    VO-TOTAL-EXPECT-VIEW-SECS 4550
MOVE VR-TOTAL-ACTUAL-VIEW-SECS(VR-SUB) 3560 TO
    VO-TOTAL-ACTUAL-VIEW-SECS 4560
```

FIG. 15-B continued

```
MOVE VR-PCT-OF-EXPECTED-VIEW-SECS(VR-SUB) 3570 TO
    VO-PCT-OF-EXPECTED-VIEW-SECS 4570
MOVE VR-NOTGT-ACCIDENTAL-VIEW-SECS (VR-SUB) 3580 TO
    VO-NOTGT-ACCIDENTAL-VIEW-SECS 4580
MOVE VR-NOTGT-ACCID-RETENT-RATE-SEC (VR-SUB) 3590 TO
    VO-NOTGT-ACCID-RETENT-RATE-SEC 4590
MOVE VR-NOTGT-ACCIDENTAL-VIEW-CNT(VR-SUB) 3600 TO
    VO-NOTGT-ACCIDENTAL-VIEW-CNT 4600
MOVE VR-NOTGT-ACCID-RETENT-RATE-CNT (VR-SUB) 3610 TO
    VO-NOTGT-ACCID-RETENT-RATE-CNT 4610
MOVE VR-VIDEO-ASSET-ID(VR-SUB) 3620 TO
    VO-VIDEO-ASSET-ID 4620
MOVE VR-PRODUCT-TYPE(VR-SUB) 3630 TO
    VO-PRODUCT-TYPE 4630
MOVE VR-VIDEO-ASSET-NAME (VR-SUB) 3640 TO
    VO-VIDEO-ASSET-NAME 4640
MOVE VR-PRODUCER-NAME (VR-SUB) 3650 TO
    VO-PRODUCER-NAME 4650
MOVE VR-AGENCY-NAME (VR-SUB) 3660 TO
    VO-AGENCY-NAME 4660
MOVE VR-SCRIPT-WRITER (VR-SUB) 3670 TO
    VO-SCRIPT-WRITER 4670
MOVE VR-FEATURED-ACTOR(VR-SUB) 3680 TO
    VO-FEATURED-ACTOR 4680
MOVE VR-ACTOR-CELEBRITY-STATUS(VR-SUB) 3690 TO
    VO-ACTOR-CELEBRITY-STATUS 4690
MOVE VR-FEATURED-VOICE(VR-SUB) 3700 TO
    VO-FEATURED-VOICE 4700
MOVE VR-PRODUCT-CATEGORY (VR-SUB) 3710 TO
    VO-PRODUCT-CATEGORY 4710
MOVE VR-LANGUAGE(VR-SUB) 3720 TO
    VO-LANGUAGE 4720
MOVE VR-INFORMATIONAL-CONTENT-CODE (VR-SUB) 3730 TO
    VO-INFORMATIONAL-CONTENT-CODE 4730
MOVE VR-DELIVERY-FORMAT(VR-SUB) 3740 TO
    VO-DELIVERY-FORMAT 4740
```

FIG. 15-B continued

```
MOVE VR-AUDIO-TRACK-CODE (VR-SUB) 3750 TO
    VO-AUDIO-TRACK-CODE 4750
MOVE VR-AUDIENCE-SUITABILITY-RATING (VR-SUB) 3760 TO
    VO-AUDIENCE-SUITABILITY-RATING 4760
MOVE VR-EPISODE-IDENTIFIER (VR-SUB) 3770 TO
    VO-EPISODE-IDENTIFIER 4770
MOVE VR-ASSET-DELIVERY-INSTANCE-ID (VR-SUB) 3780 TO
    VO-ASSET-DELIVERY-INSTANCE-ID 4780
MOVE VR-PROGRAM-ATTRIBUTE-1 (VR-SUB) 3790 TO
    VO-PROGRAM-ATTRIBUTE-1 4790
MOVE VR-PROGRAM-ATTRIBUTE-2 (VR-SUB) 3800 TO
    VO-PROGRAM-ATTRIBUTE-2 4800
MOVE VR-TIME-OF-DAY-CODE(VR-SUB) 3810 TO
    VO-TIME-OF-DAY-CODE 4810
MOVE VR-DEMOGRAPHIC-GROUP (VR-SUB) 3820 TO
    VO-DEMOGRAPHIC-GROUP 4820
MOVE VR-INFERRED-RACE (VR-SUB) 3830 TO
    VO-INFERRED-RACE 4830
MOVE VR-INFERRED-GENDER(VR-SUB) 3840 TO
    VO-INFERRED-GENDER 4840
MOVE VR-INFERRED-AGE-GROUP (VR-SUB) 3850 TO
    VO-INFERRED-AGE-GROUP 4850
MOVE VR-INFERRED-INCOME-BRACKET (VR-SUB) 3860 TO
    VO-INFERRED-INCOME-BRACKET 4860
MOVE VR-INFERRED-MARITAL-STATUS (VR-SUB) 3870 TO
    VO-INFERRED-MARITAL-STATUS 4870
MOVE VR-SET-TOP-BOX-ZIP-CODE (VR-SUB) 3880 TO
    VO-SET-TOP-BOX-ZIP-CODE 4880
MOVE VR-SUBSCRIBER-TYPE(VR-SUB) 3890 TO
    VO-SUBSCRIBER-TYPE 4890
MOVE VR-SUBSCRIBER-PACKAGE-LEVEL(VR-SUB) 3900 TO
    VO-SUBSCRIBER-PACKAGE-LEVEL 4900
MOVE VR-SMA-CODE(VR-SUB) 3910 TO
    VO-SMA-CODE 4910

WRITE VIEWING-RESULT-REC
```

FIG. 16-A

| | 1000 NAME | 1002 TYPE | 1004 SIZE | 1006 DESCRIPTION |
|---|---|---|---|---|
| 1010 | SET-TOP-BOX-ID | CHAR | 20 | Unique identifier of set-top box.<br>May be provided in encrypted format. |
| 1020 | TUNER-INDEX | CHAR | 1 | Identifies which tuner on the set-top box performed the channel change. Typically:<br>0 = primary tuner; 1 = secondary tuner |
| 1030 | MARKET | CHAR | 4 | Identifier of market code in cable company's network hierarchy. |
| 1040 | SERVICE-GROUP | CHAR | 6 | Identifier of service group in cable company's network hierarchy. |
| 1050 | HUB | CHAR | 4 | Identifier of hub in cable company's network hierarchy. |
| 1060 | HEADEND | CHAR | 4 | Identifier of headend in cable company's network hierarchy. |
| 1070 | TUNE-IN-DATE-TIME | CHAR | 22 | Tune in date and time.<br>Format is typically:<br>YYYY-MM-DD HH:MM:SS AM/PM |
| 1080 | TUNE-OUT-DATE-TIME | CHAR | 22 | Tune out date and time.<br>Format is typically:<br>YYYY-MM-DD HH:MM:SS AM/PM |
| 1090 | CHANNEL-CALL-SIGN | CHAR | 6 | Channel call sign or short name of the channel. |
| 1100 | CHANNEL-SOURCE-ID | CHAR | 5 | Channel source id which is a numeric identifier of the channel. |
| 1110 | BIT-RATE | CHAR | 5 | Bit rate identifies the rate in megabits per second required to deliver the channel. Used in capacity calculations. Typical format:<br>3.75 for standard definition<br>15 for high definition<br>Coded as PIC 999V99. Ex: 00375 |
| 1120 | SDV-OR-BROADCAST-CODE | CHAR | 3 | Identifies whether the channel being tuned to is a broadcast channel or a switched channel in a switched digital video configuration. Typical values:<br>B = Broadcast, SDV = Switched Digital Video |
| 1130 | HIGH-DEF-OR-STD-DEF | CHAR | 2 | High definition or standard definition code.<br>Typical values:<br>HD = High Definition, SD = Standard Definition |

Record 1:

00:01:02:03:04:05|0|DENV|SG-01|HUB1|HE01|2010-06-01 07:02:03 AM|2010-06-01 07:29:44 AM|FOX|201|3.75|SDV|SD

1005

Record 2:

00:AB:02:CD:04:EF|1|BOST|SG-05|HUB2|HE02|2010-06-01 05:13:03 PM|2010-06-01 05:25:08 PM|DISC|305|15|B|HD

FIG. 16-C

| | 1000 | 1003 | 1005 |
|---|---|---|---|
| | **NAME** | **Record 1** | **Record 2** |
| 1010 | SET-TOP-BOX-ID | 00:01:02:03:04:05 | 00:AB:02:CD:04:EF |
| 1020 | TUNER-INDEX | 0 | 1 |
| 1030 | MARKET | DENV | BOST |
| 1040 | SERVICE-GROUP | SG-01 | SG-05 |
| 1050 | HUB | HUB1 | HUB2 |
| 1060 | HEADEND | HE01 | HE02 |
| 1070 | TUNE-IN-DATE-TIME | 2010-06-01 07:02:03 AM | 2010-06-01 05:13:03 PM |
| 1080 | TUNE-OUT-DATE-TIME | 2010-06-01 07:29:44 AM | 2010-06-01 05:25:08 PM |
| 1090 | CHANNEL-CALL-SIGN | FOX | DISC |
| 1100 | CHANNEL-SOURCE-ID | 201 | 305 |
| 1110 | BIT-RATE | 3.75<br>Coded as PIC 999V99.<br>Ex: 00375 | 15<br>Coded as PIC 999V99.<br>Ex: 01500 |
| 1120 | SDV-OR-BROADCAST-CODE | SDV | B |
| 1130 | HIGH-DEF-OR-STD-DEF | SD | HD |

FIG. 17-A

| | 1200 NAME | 1202 TYPE | 1204 SIZE | 1206 DESCRIPTION |
|---|---|---|---|---|
| 1210 | MARKET | CHAR | 4 | Identifier of market code in cable company's network hierarchy. |
| 1220 | SERVICE-GROUP | CHAR | 6 | Identifier of service group in cable company's network hierarchy. Typically unique within a market in the cable company's network hierarchy. |
| 1230 | SET-TOP-BOX-ID | CHAR | 20 | Unique identifier of set-top box.<br>May be provided in encrypted format. |
| 1240 | TUNER-INDEX | CHAR | 1 | Identifies which tuner on the set-top box performed the channel change.<br>Typically:<br>0 = primary tuner<br>1 = secondary tuner |
| 1250 | EVENT-DATE | CHAR | 10 | Identifies the date of the event specified in event code. Can be a tune-in date or a tune-out date depending on the value in event-code. Typical format:<br>YYYY-MM-DD |
| 1260 | EVENT-TIME | CHAR | 11 | Identifies the time of the event specified in event code. Can be a tune-in time or a tune-out time depending on the value in event-code. Typical format:<br>HH:MM:SS AM/PM |
| 1270 | EVENT-CODE | CHAR | 1 | Identifies whether the record is a tune-in event or a tune-out event.<br>Typical format:<br>1 = TUNE-IN<br>2 = TUNE-OUT |
| 1280 | CHANNEL-SOURCE-ID | CHAR | 5 | Channel source id which is a numeric identifier of the channel. |

Record 1:

DENV|302|00:01:02:03:04:05|0|2010-06-01|07:02:03 AM|1|201

1205

Record 2:

BOST|405|00:AB:02:CD:04:EF|1|2010-06-01|05:25:08 PM|2|305

FIG. 17-C

| | 1200 NAME | 1203 Record 1 | 1205 Record 2 |
|---|---|---|---|
| 1210 | MARKET | DENV | BOST |
| 1220 | SERVICE-GROUP | 302 | 405 |
| 1230 | SET-TOP-BOX-ID | 00:01:02:03:04:05 | 00:AB:02:CD:04:EF |
| 1240 | TUNER-INDEX | 0 | 1 |
| 1250 | EVENT-DATE | 2010-06-01 | 2010-06-01 |
| 1260 | EVENT-TIME | 07:02:03 AM | 05:25:08 PM |
| 1270 | EVENT-CODE | 1 | 2 |
| 1280 | CHANNEL-SOURCE-ID | 201 | 305 |

FIG. 18-A

| | 1400 NAME | 1402 TYPE | 1404 SIZE | 1406 DESCRIPTION |
|---|---|---|---|---|
| 1410 | SET-TOP-BOX-ID | CHAR | 20 | Unique identifier of set-top box. May be provided in encrypted format. |
| 1420 | TUNER-INDEX | CHAR | 1 | Identifies which tuner on the set-top box performed the channel change. Typically: 0 = primary tuner 1 = secondary tuner |
| 1430 | TIME-IN-SECONDS | NUMBER | 15 | Time in seconds of tuning event represented as seconds from some historic date such as January 1, 1990 at midnight. |
| 1440 | CHANNEL-CALL-SIGN | CHAR | 5 | Channel call sign or short name of the channel being tuned to. |
| 1450 | CHANNEL-SOURCE-ID | CHAR | 5 | Channel source id which is a numeric identifier of the channel being tuned to. |

Record 1:

00:01:02:03:04:05|0|127818437|FOX|201

1405

Record 2:

00:AB:02:CD:04:EF|1|127818655|DISC|305

FIG. 18-C

| | 1400 NAME | 1403 Record 1 | 1405 Record 2 |
|---|---|---|---|
| 1410 | SET-TOP-BOX-ID | 00:01:02:03:04:05 | 00:AB:02:CD:04:EF |
| 1420 | TUNER-INDEX | 0 | 1 |
| 1630 | TIME-IN-SECONDS | 127818437 | 127818655 |
| 1440 | CHANNEL-CALL-SIGN | FOX | DISC |
| 1450 | CHANNEL-SOURCE-ID | 201 | 305 |

FIG. 19-A 1600 1602 1604 1606

| | NAME | TYPE | SIZE | DESCRIPTION |
|---|---|---|---|---|
| 1610 | MARKET | CHAR | 4 | Identifier of market code in cable company's network hierarchy. |
| 1620 | SERVICE-GROUP | CHAR | 6 | Identifier of service group in cable company's network hierarchy. |
| 1630 | HUB | CHAR | 4 | Identifier of hub in cable company's network hierarchy. |
| 1640 | HEADEND | CHAR | 4 | Identifier of headend in cable company's network hierarchy. |
| 1650 | SET-TOP-BOX-ID | CHAR | 20 | Unique identifier of set-top box. May be provided in encrypted format. |
| 1660 | TUNER-INDEX | CHAR | 1 | Identifies which tuner on the set-top box performed the channel change. Typically: 0 = primary tuner; 1 = secondary tuner |
| 1670 | CHANNEL-CALL-SIGN | CHAR | 6 | Channel call sign or short name of the channel. |
| 1680 | CHANNEL-SOURCE-ID | CHAR | 5 | Channel source id which is a numeric identifier of the channel. |
| 1690 | TUNE-IN-DATE | CHAR | 10 | Tune-in date. Format is: YYYY-MM-DD |
| 1700 | TUNE-IN-TIME | CHAR | 8 | Tune-in time. Format is: HH:MM:SS |
| 1710 | TUNE-IN-AM-PM | CHAR | 2 | Tune-in AM/PM indicator. Format is: AM or PM |
| 1720 | TUNE-IN-SECOND-OF-DAY | NUMBER | 5 | Tune-in time in seconds of day since midnight. |
| 1730 | TUNE-OUT-DATE | CHAR | 10 | Tune-out date. Format is: YYYY-MM-DD |
| 1740 | TUNE-OUT-TIME | CHAR | 8 | Tune-out time. Format is: HH:MM:SS |
| 1750 | TUNE-OUT-AM-PM | CHAR | 2 | Tune-out AM/PM indicator. Format is: AM or PM |
| 1760 | TUNE-OUT-SECOND-OF-DAY | NUMBER | 5 | Tune-out time in seconds of day since midnight. |

FIG. 19-A – Continued

| | | | | |
|---|---|---|---|---|
| 1770 | BIT-RATE | CHAR | 5 | Bit rate identifies the rate in megabits per second required to deliver the channel. Typical format:<br>3.75 for standard definition<br>15 for high definition<br>Coded as PIC 999V99.<br>Ex: 00375<br>Note: Not used for Ad Measurement, but is used by other analytic programs. |
| 1780 | SDV-OR-BROADCAST-CODE | CHAR | 3 | Identifies whether the channel being tuned to is a broadcast channel or a switched channel in a switched digital video configuration. Typical values:<br>B = Broadcast; SDV = Switched Digital Video |
| 1790 | HIGH-DEF-OR-STD-DEF | CHAR | 2 | High definition or standard definition code. Typical values:<br>HD = High Definition,<br>SD = Standard Definition |
| 1800 | PROGRAM-ATTRIBUTE-1 | CHAR | 6 | Identifies a first attribute of the program playing during the tuning event. Typical values:<br>NEWS, SPORTS, MOVIE, SITCOM |
| 1810 | PROGRAM-ATTRIBUTE-2 | CHAR | 6 | Identifies a second attribute of the program playing during the tuning event. Typical values:<br>G, PG, PG13, R |
| 1820 | DEMOGRAPHIC-CATEGORY-1 | CHAR | 6 | Identifies a first demographic category provided by the cable company.<br>Typical values:<br>If Income is category:<br>LOW, MID, HIGH<br>If Age is category:<br>CHILD, TEEN, ADULT, SENIOR<br>If Race is category: WHITE, HISPAN |
| 1830 | DEMOGRAPHIC-CATEGORY-2 | CHAR | 6 | Identifies a second demographic category provided by the cable company.<br>See DEMOGRAPHIC-CATEGORY-1 for typical values. |

FIG. 19-B

| NAME | Record 1 | Record 2 |
|---|---|---|
| MARKET | DENV | BOST |
| SERVICE-GROUP | SG-01 | SG-05 |
| HUB | HUB1 | HUB2 |
| HEADEND | HE01 | HE02 |
| SET-TOP-BOX-ID | 00:01:02:03:04:05 | 00:AB:02:CD:04:EF |
| TUNER-INDEX | 0 | 1 |
| CHANNEL-CALL-SIGN | FOX | DISC |
| CHANNEL-SOURCE-ID | 201 | 305 |
| TUNE-IN-DATE | 2010-06-01 | 2010-06-01 |
| TUNE-IN-TIME | 07:02:03 | 05:13:03 |
| TUNE-IN-AM-PM | AM | PM |
| TUNE-IN-SECOND-OF-DAY | 25323 | 18783 |
| TUNE-OUT-DATE | 2010-06-01 | 2010-06-01 |
| TUNE-OUT-TIME | 07:29:44 | 05:25:08 |
| TUNE-OUT-AM-PM | AM | PM |
| TUNE-OUT-SECOND-OF-DAY | 26984 | 19508 |
| BIT-RATE | 3.75<br>Coded as PIC 999V99.<br>Ex: 00375 | 15<br>Coded as PIC 999V99.<br>Ex: 01500 |
| SDV-OR-BROADCAST-CODE | SDV | B |
| HIGH-DEF-OR-STD-DEF | SD | HD |
| PROGRAM-ATTRIBUTE-1 | | |
| PROGRAM-ATTRIBUTE-2 | | |
| DEMOGRAPHIC-CATEGORY-1 | | |
| DEMOGRAPHIC-CATEGORY-2 | | |

FIG. 19-C

| | 1600 NAME | 1607 Record 1 | 1609 Record 2 |
|---|---|---|---|
| 1610 | MARKET | DENV | BOST |
| 1620 | SERVICE-GROUP | SG-01 | SG-05 |
| 1630 | HUB | HUB1 | HUB2 |
| 1640 | HEADEND | HE01 | HE02 |
| 1650 | SET-TOP-BOX-ID | 00:01:02:03:04:05 | 00:AB:02:CD:04:EF |
| 1660 | TUNER-INDEX | 0 | 1 |
| 1670 | CHANNEL-CALL-SIGN | FOX | DISC |
| 1680 | CHANNEL-SOURCE-ID | 201 | 305 |
| 1690 | TUNE-IN-DATE | 2010-06-01 | 2010-06-01 |
| 1700 | TUNE-IN-TIME | 07:02:03 | 05:13:03 |
| 1710 | TUNE-IN-AM-PM | AM | PM |
| 1720 | TUNE-IN-SECOND-OF-DAY | 25323 | 18783 |
| 1730 | TUNE-OUT-DATE | 2010-06-01 | 2010-06-01 |
| 1740 | TUNE-OUT-TIME | 07:29:44 | 05:25:08 |
| 1750 | TUNE-OUT-AM-PM | AM | PM |
| 1760 | TUNE-OUT-SECOND-OF-DAY | 26984 | 19508 |
| 1770 | BIT-RATE | 3.75<br>Coded as PIC 999V99.<br>Ex: 00375 | 15<br>Coded as PIC 999V99.<br>Ex: 01500 |
| 1780 | SDV-OR-BROADCAST-CODE | SDV | B |
| 1790 | HIGH-DEF-OR-STD-DEF | SD | HD |
| 1800 | PROGRAM-ATTRIBUTE-1 | NEWS | SPORT |
| 1810 | PROGRAM-ATTRIBUTE-2 | G | G |
| 1820 | DEMOGRAPHIC-CATEGORY-1 | ADULT | TEEN |
| 1830 | DEMOGRAPHIC-CATEGORY-2 | MID | WHITE |

FIG. 20-A

| | 3000 | 3002 NAME | 3004 TYPE | 3006 SIZE | 3008 DESCRIPTION |
|---|---|---|---|---|---|
| 3010 | These fields occur 3000 times. | MARKET | CHAR | 4 | For set-top box channel viewing detail, identifier of market code in cable company's network hierarchy in which the tuning activity occurred. |
| 3020 | | SERVICE-GROUP | CHAR | 6 | For set-top box channel viewing detail, identifier of service group in cable company's network hierarchy in which the tuning activity occurred. |
| 3030 | | HUB | CHAR | 4 | For set-top box channel viewing detail, identifier of hub in cable company's network hierarchy in which the tuning activity occurred. |
| 3040 | | HEADEND | CHAR | 4 | For set-top box channel viewing detail, identifier of headend in cable company's network hierarchy in which the tuning activity occurred. |
| 3050 | | CHANNEL-CALL-SIGN | CHAR | 6 | For set-top box channel viewing detail, channel call sign or short name of the channel involved in the tuning activity. |
| 3060 | | CHANNEL-SOURCE-ID | NUMBER | 5 | For set-top box channel viewing detail, channel source id which is a numeric identifier of the channel involved in the tuning activity. |
| 3070 | | SET-TOP-BOX-ID | CHAR | 20 | For set-top box channel viewing detail, unique identifier of set-top box. The provider of the tuning data may or may not provide this in an encrypted format. |
| 3080 | | TUNER-INDEX | CHAR | 1 | For set-top box channel viewing detail, identifies which tuner on the set-top box performed the tuning activity. Typically:<br>0 = primary tuner<br>1 = secondary tuner |

FIG. 20-A Continued

| | | | | | |
|---|---|---|---|---|---|
| 3090 | This fiels occur 3000 times. | VIEWED~CHANNEL~FLAG<br><br>OCCURS 86400 TIMES | NUMBER | 1 | For each set-top box + channel combination in the set-top box channel viewing detail, this is a flag to indicate whether or not the STB + Tuner was tuned to the indicated channel during that second of the day. There are 86,400 buckets to represent each second of the day.<br>Values:<br>1 = tuned<br>0 = not tuned |

FIG. 20-B

| | 3000 | 3002 NAME | 3003 Row 1 | 3005 Row 2 |
|---|---|---|---|---|
| 3010 | These fields occur 3000 times. | MARKET | DENV | BOST |
| 3020 | | SERVICE~GROUP | SG-01 | SG-05 |
| 3030 | | HUB | HUB1 | HUB2 |
| 3040 | | HEADEND | HE01 | HE02 |
| 3050 | | CHANNEL~CALL~SIGN | FOX | DISC |
| 3060 | | CHANNEL~SOURCE~ID | 201 | 305 |
| 3070 | | SET~TOP~BOX~ID | 00:01:02:03:04:05 | 00:AB:02:CD:04:EF |
| 3080 | | TUNER~INDEX | 0 | 1 |
| 3090 | | VIEWED~CHANNEL~FLAG<br><br>OCCURS 86400 TIMES<br>See Note 1 below | 0 0 1 1 1 ... 1 ... 1<br>1 1 0 0 1 1 .. 1 ... | 0 ... 1 1 1 ... 0 0 ...<br>0 ... 1 1 1 ... 0 1 ... |

Note 1: This cell contains 86,400 buckets, one for each second of the day. When the STB is tuned to the channel during that second of the day, the bucket is assigned a '1'.

FIG. 21-A

| | 2000 NAME | 2002 TYPE | 2004 SIZE | 2006 DESCRIPTION |
|---|---|---|---|---|
| 2010 | US-MARKET | CHAR | 4 | Identifier of market code in cable company's network hierarchy in which the video asset was viewed. |
| 2020 | US-SERVICE-GROUP | CHAR | 6 | Identifier of service group in cable company's network hierarchy in which the video asset was viewed. |
| 2030 | US-HUB | CHAR | 4 | Identifier of hub in cable company's network hierarchy in which the video asset was viewed. |
| 2040 | US-HEADEND | CHAR | 4 | Identifier of headend in cable company's network hierarchy in which the video asset was viewed. |
| 2050 | US-CHANNEL-CALL-SIGN | CHAR | 6 | Channel call sign or short name of the channel on which the video asset was viewed. |
| 2060 | US-CHANNEL-SOURCE-ID | CHAR | 5 | Channel source id which is a numeric identifier of the channel on which the video asset was viewed. |
| 2070 | US-AD-DURATION-IN-SECONDS | NUMBER | 5 | Identifies the length or duration of the video asset (advertisement or program) measured in seconds. |
| 2080 | US-AD-PLAY-DATE | CHAR | 10 | Identifies the date on which the video asset was aired or played in the context of the other attributes. Format is typically: YYYY-MM-DD |
| 2090 | US-AD-PLAY-TIME-BEG | CHAR | 11 | Identifies the time of day when the video asset began to air or play. Format is typically: HH:MM:SS AM/PM |
| 2110 | US-AD-PLAY-TIME-END | CHAR | 11 | Identifies the time of day when the video asset finished playing. Format is typically: HH:MM:SS AM/PM |

FIG. 21-A Continued

| | | | | |
|---|---|---|---|---|
| 2130 | US-TARGETED-AD-FLAG | CHAR | 1 | Identifies whether or not the video asset (advertisement) was targeted to specific set-top boxes based on some criteria, typically demographic. Value values: Y for yes; N for no. |
| 2140 | US-TARGETED-SET-TOP-BOX-COUNT | NUMBER | 7 | Identifies the number of set-top boxes to which the video asset (advertisement) was targeted. Zero if it is not a targeted ad. |
| 2150 | US-VIDEO-ASSET-ID | CHAR | 12 | Provides a unique identifier for a Viedo Asset. This is the unique identifier of an ad or of a program. This contains the industry standard identifier for the ad. |
| 2160 | US-PRODUCT-TYPE | CHAR | 12 | Identifies the type of product featured in the video asset (advertisement or program). |
| 2170 | US-VIDEO-ASSET-NAME | CHAR | 20 | Identifies the name of the video asset. |
| 2180 | US-PRODUCER-NAME | CHAR | 20 | Identifies the producer of the video asset (advertisement or program). |
| 2190 | US-AGENCY-NAME | CHAR | 20 | Identifies the name of the advertising agency that produced the video asset (advertisement or program). |
| 2200 | US-SCRIPT-WRITER | CHAR | 20 | Identifies the name of the person or organization that wrote the script for the video asset (advertisement or program). |
| 2210 | US-FEATURED-ACTOR | CHAR | 20 | Identifies the lead actor that is featured in the video asset (advertisement or program). Note: This could be expanded to include multiple actors or actresses with information about the role they play. |
| 2220 | US-ACTOR-CELEBRITY-STATUS | CHAR | 1 | Identifies the celibrity status of the lead actor that is featured in the video asset (advertisement or program). Note: This could be expanded to include sports celebrity, musical celebrity, acting celebrity, etc. |

FIG. 21-A Continued

| | | | | |
|---|---|---|---|---|
| 2230 | US-FEATURED-VOICE | CHAR | 20 | Identifies the person whose voice is used in the ad, perhaps in the case of an advertisement or program where no person is visible.<br>Note: This could be expanded to include things such as male voice, female voice, soft voice, manly voice, etc. |
| 2240 | US-PRODUCT-CATEGORY | CHAR | 20 | Identifies the category of product featured in the video asset (advertisement or program). Examples:<br>Auto<br>Truck<br>Cleaning product<br>Hotel<br>Clothing<br>Food for home<br>Food for eating out<br>Etc. |
| 2250 | US-LANGUAGE | CHAR | 8 | Identifies the language (English, Spanish, etc.) spoken in the video asset (advertisement or program). |
| 2260 | US-INFORMATIONAL-CONTENT-CODE | CHAR | 12 | Identifes the informational content being featured in the video asset.<br>Example:<br>Educational<br>Product Awareness<br>Humorous<br>Etc. |
| 2270 | US-DELIVERY-FORMAT | CHAR | 2 | Identifies the delivery format used in the video asset (advertisement or program). Examples:<br>High Definition<br>Standard Definition |
| 2280 | US-AUDIO-TRACK-CODE | CHAR | 20 | Identifies the nature of any music or audio track featured in the video asset. Examples include:<br>Classical music<br>High Energy music<br>Calming music |

FIG. 21-A Continued

| | | | | |
|---|---|---|---|---|
| 2290 | US-AUDIENCE-SUITABILITY-RATING | CHAR | 4 | Identifies whether the video asset is suitable for all audiences, only children, only adults, etc. |
| 2300 | US-EPISODE-IDENTIFIER | CHAR | 4 | Identifies, in the case of a video asset which is presented as a series, the episode number or other identifier. Note: This could be used in the case of a series of educational or information commercials in which there is an on-going dialog about a product. |
| 2310 | US-ASSET-DELIVERY-INSTANCE-ID | CHAR | 10 | Provide a unique identifier of this video asset delivery instance. This is used to distinguish between the various airings of a video asset. For example, if the same commercial airs multiple times, this field allows us to associate a unique identifier with each airing. This is important because we track viewing seconds for each airing. |
| 2320 | US-PROGRAM-ATTRIBUTE-1 | CHAR | 6 | An first attribute which defines some characteristic about the program in which the video asset was aired.<br>Examples:<br>Program Type such as:<br>Newscast, Sporting event, Movie<br>Sitcom |
| 2330 | US-PROGRAM-ATTRIBUTE-2 | CHAR | 6 | An second attribute which defines some characteristic about the program in which the video asset was aired.<br>Examples:<br>TV rating such as: G, PG, PG-13, Etc. |
| 2340 | US-TIME-OF-DAY-CODE | CHAR | 12 | Identifies the general time of day in which the video asset was aired.<br>Examples:<br>Early AM - Early morning<br>Mid AM - Mid morning<br>Late AM - Late Morning<br>Noon - Noon<br>Ealy PM - Afternoon<br>Mid PM - Evening<br>Lat PM - Late night |

FIG. 21-A Continued

The following fields are populated for targeted ads only.

| | | | | |
|---|---|---|---|---|
| 2350 | US~DEMOGRAPHIC~GROUP | CHAR | 20 | Identifies the demographic group with which this Set-top Box is associated when the ad is targeted to a set-top box. |
| 2360 | US~INFERRED~RACE | CHAR | 10 | Identifies the inferred or presumed race, based on the demographic model, of the person operating the set-top box when the ad is targeted to a set-top box. Example: White, Hispanic |
| 2370 | US~INFERRED~GENDER | CHAR | 1 | Identifies the inferred or presumed gender, based on the demographic model, of the person operating the set-top box when the ad is targeted to a set-top box. Example: Male, Female |
| 2380 | US~INFERRED~AGE~GROUP | CHAR | 20 | Identifies the inferred or presumed age group, based on the demographic model, of the person operating the set-top box when the ad is targeted to a set-top box. Example: Child, Teen, Yound Adult, Adult, Senior Citizen, Etc. |
| 2390 | US~INFERRED~INCOME~BRACKET | CHAR | 10 | Identifies the inferred or presumed income bracket, based on the demographic model, of the person operating the set-top box when the ad is targeted to a set-top box. Example: Lower, Middle, Upper Income |
| 2400 | US~INFERRED~MARITAL~STATUS | CHAR | 1 | Identifies the inferred or presumed marital status, based on the demographic model, of the person operating the set-top box when the ad is targeted to a set-top box. Example: Single, Married, Etc. |
| 2410 | US~SET~TOP~BOX~ZIP~CODE | NUMBER | 5 | Identifies the zip code where the set-top box is located when the ad is targeted to a set-top box. |
| 2420 | US~SUBSCRIBER~TYPE | CHAR | 5 | Identifies the subscriber type according to the cable company classification when the ad is targeted to a set-top box. |
| 2430 | US~SUBSCRIBER~PACKAGE~LEVEL | CHAR | 10 | Identifies the subscriber package level according to the cable company records when the ad is targeted to a set-top box. |
| 2440 | US~SMA~CODE | CHAR | 10 | Identifies a marketing area when the ad is targeted to a set-top box. |

Record 1:

DENV|SG01|HUB1|HE1|Ch-M|201|60|09/01/2010|05:00:00 PM|05:00:59 PM|N|0|AD-20|HOUSE|Soap|T1+ producer|T1+ Agency|T1+ Writer|T1+ Actor|N|Soft Voice|HOUSE|ENGLISH|Awareness|HD|Energetic|G|none|AD-20-DI-01|MOVIE|G|Mid PM||||||||||

2005

Record 2:

DENV|SG01|HUB1|HE1|Ch-M|201|60|09/01/2010|05:00:00 PM|05:00:59 PM|Y|4|AD-TGT-01|HOUSE|Special Soap|T1+ producer|T1+ Agency|T1+ Writer|T1+ Actor|N|Soft Voice|HOUSE|ENGLISH|Awareness|HD|Energetic|G|none|AD-20-DI-01|MOVIE|G|Mid PM|DEMO-A|WHITE|FEMALE|30-40|50-60K|MARRIED|80251|BASIC|BASIC+|DMA-A

FIG. 21-C

| | 2000 | 2003 | 2005 |
|---|---|---|---|
| | NAME | SIZE | SIZE |
| 2010 | US-MARKET | DENV | DENV |
| 2020 | US-SERVICE-GROUP | SG01 | SG01 |
| 2030 | US-HUB | HUB1 | HUB1 |
| 2040 | US-HEADEND | HE1 | HE1 |
| 2050 | US-CHANNEL-CALL-SIGN | Ch-M | Ch-M |
| 2060 | US-CHANNEL-SOURCE-ID | 201 | 201 |
| 2070 | US-AD-DURATION-IN-SECONDS | 60 | 60 |
| 2080 | US-AD-PLAY-DATE | 9/1/2010 | 9/1/2010 |
| 2090 | US-AD-PLAY-TIME-BEG | 5:00:00 PM | 5:00:00 PM |
| 2110 | US-AD-PLAY-TIME-END | 5:00:59 PM | 5:00:59 PM |
| 2130 | US-TARGETED-AD-FLAG | N | Y |
| 2140 | US-TARGETED-SET-TOP-BOX-COUNT | 0 | 4 |

FIG. 21-C  Continued

| | | | |
|---|---|---|---|
| 2150 | US-VIDEO-ASSET-ID | AD-20 | AD-TGT-01 |
| 2160 | US-PRODUCT-TYPE | HOUSE | HOUSE |
| 2170 | US-VIDEO-ASSET-NAME | Soap | Special Soap |
| 2180 | US-PRODUCER-NAME | T1+ producer | T1+ producer |
| 2190 | US-AGENCY-NAME | T1+ Agency | T1+ Agency |
| 2200 | US-SCRIPT-WRITER | T1+ Writer | T1+ Writer |
| 2210 | US-FEATURED-ACTOR | T1+ Actor | T1+ Actor |
| 2220 | US-ACTOR-CELEBRITY-STATUS | N | N |
| 2230 | US-FEATURED-VOICE | Soft Voice | Soft Voice |
| 2240 | US-PRODUCT-CATEGORY | HOUSE | HOUSE |
| 2250 | US-LANGUAGE | ENGLISH | ENGLISH |
| 2260 | US-INFORMATIONAL-CONTENT-CODE | Awareness | Awareness |
| 2270 | US-DELIVERY-FORMAT | HD | HD |
| 2280 | US-AUDIO-TRACK-CODE | Energetic | Energetic |
| 2290 | US-AUDIENCE-SUITABILITY-RATING | G | G |
| 2300 | US-EPISODE-IDENTIFIER | none | none |
| 2310 | US-ASSET-DELIVERY-INSTANCE-ID | AD-20-DI-01 | AD-20-DI-01 |
| 2320 | US-PROGRAM-ATTRIBUTE-1 | MOVIE | MOVIE |
| 2330 | US-PROGRAM-ATTRIBUTE-2 | G | G |
| 2340 | US-TIME-OF-DAY-CODE | Mid PM | Mid PM |
| 2350 | US-DEMOGRAPHIC-GROUP | | DEMO-A |

FIG. 21-C Continued

| | | | |
|---|---|---|---|
| 2360 | US-INFERRED-RACE | | WHITE |
| 2370 | US-INFERRED-GENDER | | FEMALE |
| 2380 | US-INFERRED-AGE-GROUP | | 30-40 |
| 2390 | US-INFERRED-INCOME-BRACKET | | 50-60K |
| 2400 | US-INFERRED-MARITAL-STATUS | | MARRIED |
| 2410 | US-SET-TOP-BOX-ZIP-CODE | | 80251 |
| 2420 | US-SUBSCRIBER-TYPE | | BASIC |
| 2430 | US-SUBSCRIBER-PACKAGE-LEVEL | | BASIC+ |
| 2440 | US-SMA-CODE | | DMA-A |

FIG. 22-A

| | 2000 NAME | 2002 TYPE | 2004 SIZE | 2006 DESCRIPTION |
|---|---|---|---|---|
| 2015~ | DI~MARKET | CHAR | 4 | See corresponding field in Fig 21A. |
| 2025~ | DI~SERVICE~GROUP | CHAR | 6 | See corresponding field in Fig 21A. |
| 2035~ | DI~HUB | CHAR | 4 | See corresponding field in Fig 21A. |
| 2045~ | DI~HEADEND | CHAR | 4 | See corresponding field in Fig 21A. |
| 2055~ | DI~CHANNEL~CALL~SIGN | CHAR | 6 | See corresponding field in Fig 21A. |
| 2065~ | DI~CHANNEL~SOURCE~ID | CHAR | 5 | See corresponding field in Fig 21A. |
| 2075~ | DI~AD~DURATION~IN~SECONDS | NUMBER | 5 | See corresponding field in Fig 21A. |
| 2085~ | DI~AD~PLAY~DATE | CHAR | 10 | See corresponding field in Fig 21A. |
| 2095~ | DI~AD~PLAY~TIME~BEG | CHAR | 11 | See corresponding field in Fig 21A. |
| 2105~ | DI~AD~PLAY~BEG~SEC~OF~DAY | NUMBER | 5 | Identifies the time of day when the video asset began to air or play as measured in seconds of the day since midnight. |
| 2115~ | DI~AD~PLAY~TIME~END | CHAR | 11 | See corresponding field in Fig 21A. |
| 2125~ | DI~AD~PLAY~END~SEC~OF~DAY | NUMBER | 5 | Identifies the time of day when the video asset finished airing or playing as measured in seconds of the day since midnight. |
| 2135~ | DI~TARGETED~AD~FLAG | CHAR | 1 | See corresponding field in Fig 21A. |
| 2145~ | DI~TARGETED~SET~TOP~BOX~COUNT | NUMBER | 7 | See corresponding field in Fig 21A. |
| | The following fields identify things about the asset itself. | | | |
| 2155~ | DI~VIDEO~ASSET~ID | CHAR | 12 | See corresponding field in Fig 21A. |
| 2165~ | DI~PRODUCT~TYPE | CHAR | 12 | See corresponding field in Fig 21A. |
| 2175~ | DI~VIDEO~ASSET~NAME | CHAR | 20 | See corresponding field in Fig 21A. |
| 2185~ | DI~PRODUCER~NAME | CHAR | 20 | See corresponding field in Fig 21A. |
| 2195~ | DI~AGENCY~NAME | CHAR | 20 | See corresponding field in Fig 21A. |
| 2205~ | DI~SCRIPT~WRITER | CHAR | 20 | See corresponding field in Fig 21A. |
| 2215~ | DI~FEATURED~ACTOR | CHAR | 20 | See corresponding field in Fig 21A. |
| 2225~ | DI~ACTOR~CELEBRITY~STATUS | CHAR | 1 | See corresponding field in Fig 21A. |
| 2235~ | DI~FEATURED~VOICE | CHAR | 20 | See corresponding field in Fig 21A. |
| 2245~ | DI~PRODUCT~CATEGORY | CHAR | 20 | See corresponding field in Fig 21A. |
| 2255~ | DI~LANGUAGE | CHAR | 8 | See corresponding field in Fig 21A. |
| 2265~ | DI~INFORMATIONAL~CONTENT~CODE | CHAR | 12 | See corresponding field in Fig 21A. |
| 2275~ | DI~DELIVERY~FORMAT | CHAR | 2 | See corresponding field in Fig 21A. |

FIG. 22-A Continued

| | | | | |
|---|---|---|---|---|
| 2285~ | DI-AUDIO-TRACK-CODE | CHAR | 20 | See corresponding field in Fig 21A. |
| 2295~ | DI-AUDIENCE-SUITABILITY-RATING | CHAR | 4 | See corresponding field in Fig 21A. |
| 2305~ | DI-EPISODE-IDENTIFIER | CHAR | 4 | See corresponding field in Fig 21A. |
| | The following field identifies the unique identifier associated with this asset delivery instance. For example, when an asset is run multiple times in one day, this field is the unique id associated with each airing of the asset. | | | |
| 2315~ | DI-ASSET-DELIVERY-INSTANCE-ID | CHAR | 10 | See corresponding field in Fig 21A. |
| | The following fields identify two program attributes related to the program in which the asset was aired. These can be used as desired. Examples include:<br>Sports + Football<br>Movie + Action<br>Movie + Drama<br>Action Movie + PG13<br><br>Following these, we identify the time of day block when the asset aired. | | | |
| 2325~ | DI-PROGRAM-ATTRIBUTE-1 | CHAR | 6 | See corresponding field in Fig 21A. |
| 2335~ | DI-PROGRAM-ATTRIBUTE-2 | CHAR | 6 | See corresponding field in Fig 21A. |
| 2345~ | DI-TIME-OF-DAY-CODE | CHAR | 12 | See corresponding field in Fig 21A. |
| | For a targeted ad, the following fields identify demographics about the person operating the Set-top Box to which ad was targeted.<br>These fields are present only if the VR-TARGETED-AD-FLAG is "Y".<br>These fields would be captured by the software that decides which set-top box to which to target an ad. They can be provided on an as-available basis. | | | |
| 2355~ | DI-DEMOGRAPHIC-GROUP | CHAR | 20 | See corresponding field in Fig 21A. |
| 2365~ | DI-INFERRED-RACE | CHAR | 10 | See corresponding field in Fig 21A. |
| 2375~ | DI-INFERRED-GENDER | CHAR | 1 | See corresponding field in Fig 21A. |
| 2385~ | DI-INFERRED-AGE-GROUP | CHAR | 20 | See corresponding field in Fig 21A. |
| 2395~ | DI-INFERRED-INCOME-BRACKET | CHAR | 10 | See corresponding field in Fig 21A. |
| 2405~ | DI-INFERRED-MARITAL-STATUS | CHAR | 1 | See corresponding field in Fig 21A. |
| 2415~ | DI-SET-TOP-BOX-ZIP-CODE | NUMBER | 5 | See corresponding field in Fig 21A. |
| 2425~ | DI-SUBSCRIBER-TYPE | CHAR | 5 | See corresponding field in Fig 21A. |
| 2435~ | DI-SUBSCRIBER-PACKAGE-LEVEL | CHAR | 10 | See corresponding field in Fig 21A. |
| 2445~ | DI-SMA-CODE | CHAR | 10 | See corresponding field in Fig 21A. |

FIG. 22-8

| | 2000 NAME | 2007 SIZE | 2009 SIZE |
|---|---|---|---|
| 2015 | DI-MARKET | DENV | DENV |
| 2025 | DI-SERVICE-GROUP | SG01 | SG01 |
| 2035 | DI-HUB | HUB1 | HUB1 |
| 2045 | DI-HEADEND | HE1 | HE1 |
| 2055 | DI-CHANNEL-CALL-SIGN | Ch-M | Ch-M |
| 2065 | DI-CHANNEL-SOURCE-ID | 201 | 201 |
| 2075 | DI-AD-DURATION-IN-SECONDS | 60 | 60 |
| 2085 | DI-AD-PLAY-DATE | 20100901 | 20100901 |
| 2095 | DI-AD-PLAY-TIME-BEG | 09/01/2010 05:00:00 PM | 09/01/2010 05:00:00 PM |
| 2105 | DI-AD-PLAY-BEG-SEC-OF-DAY | 61,201 | 61,201 |
| 2115 | DI-AD-PLAY-TIME-END | 09/01/2010 05:00:59 PM | 09/01/2010 05:00:59 PM |
| 2125 | DI-AD-PLAY-END-SEC-OF-DAY | 61,260 | 61,260 |
| 2135 | DI-TARGETED-AD-FLAG | N | Y |
| 2145 | DI-TARGETED-SET-TOP-BOX-COUNT | 0 | 4 |
| 2155 | DI-VIDEO-ASSET-ID | AD-20 | AD-TGT-01 |
| 2165 | DI-PRODUCT-TYPE | HOUSE | HOUSE |
| 2175 | DI-VIDEO-ASSET-NAME | Soap | Special Soap |
| 2185 | DI-PRODUCER-NAME | T1+ producer | T1+ producer |
| 2195 | DI-AGENCY-NAME | T1+ Agency | T1+ Agency |
| 2205 | DI-SCRIPT-WRITER | T1+ Writer | T1+ Writer |
| 2215 | DI-FEATURED-ACTOR | T1+ Actor | T1+ Actor |
| 2225 | DI-ACTOR-CELEBRITY-STATUS | N | N |
| 2235 | DI-FEATURED-VOICE | Soft Voice | Soft Voice |
| 2245 | DI-PRODUCT-CATEGORY | HOUSE | HOUSE |
| 2255 | DI-LANGUAGE | ENGLISH | ENGLISH |
| 2265 | DI-INFORMATIONAL-CONTENT-CODE | Awareness | Awareness |
| 2275 | DI-DELIVERY-FORMAT | HD | HD |
| 2285 | DI-AUDIO-TRACK-CODE | Energetic | Energetic |
| 2295 | DI-AUDIENCE-SUITABILITY-RATING | G | G |
| 2305 | DI-EPISODE-IDENTIFIER | none | none |
| 2315 | DI-ASSET-DELIVERY-INSTANCE-ID | AD-20-DI-01 | AD-20-DI-01 |
| 2325 | DI-PROGRAM-ATTRIBUTE-1 | MOVIE | MOVIE |
| 2335 | DI-PROGRAM-ATTRIBUTE-2 | G | G |
| 2345 | DI-TIME-OF-DAY-CODE | Mid PM | Mid PM |
| 2355 | DI-DEMOGRAPHIC-GROUP | | DEMO-A |
| 2365 | DI-INFERRED-RACE | | WHITE |

FIG. 22-B Continued

| | | | |
|---|---|---|---|
| 2375 | DI-INFERRED-GENDER | | FEMALE |
| 2385 | DI-INFERRED-AGE-GROUP | | 30-40 |
| 2395 | DI-INFERRED-INCOME-BRACKET | | 50-60K |
| 2405 | DI-INFERRED-MARITAL-STATUS | | MARRIED |
| 2415 | DI-SET-TOP-BOX-ZIP-CODE | | 80251 |
| 2425 | DI-SUBSCRIBER-TYPE | | BASIC |
| 2435 | DI-SUBSCRIBER-PACKAGE-LEVEL | | BASIC+ |
| 2445 | DI-SMA-CODE | | SMA-A |

FIG 23-A

| 3200 | | 3202 NAME | 3204 TYPE | 3206 SIZE | 3208 DESCRIPTION |
|---|---|---|---|---|---|
| 3210 | These fields occur 1500 times. | VR-MARKET | CHAR | 4 | See corresponding field in Fig 21-A. |
| 3220 | | VR-SERVICE-GROUP | CHAR | 6 | See corresponding field in Fig 21-A. |
| 3230 | | VR-HUB | CHAR | 4 | See corresponding field in Fig 21-A. |
| 3240 | | VR-HEADEND | CHAR | 4 | See corresponding field in Fig 21-A. |
| 3250 | | VR-CHANNEL-CALL-SIGN | CHAR | 6 | See corresponding field in Fig 21-A. |
| 3260 | | VR-CHANNEL-SOURCE-ID | CHAR | 5 | See corresponding field in Fig 21-A. |
| 3270 | | VR-AD-DURATION-IN-SECONDS | NUMBER | 5 | See corresponding field in Fig 21-A. |
| 3280 | | VR-AD-PLAY-DATE | CHAR | 10 | See corresponding field in Fig 21-A. |
| 3290 | | VR-AD-PLAY-TIME-BEG | CHAR | 11 | See corresponding field in Fig 21-A. |
| 3300 | | VR-AD-PLAY-BEG-SEC-OF-DAY | NUMBER | 5 | Identifies the time of day when the video asset began to air or play as measured in seconds of the day. |
| 3310 | | VR-AD-PLAY-TIME-END | CHAR | 11 | See corresponding field in Fig 21-A. |
| 3320 | | VR-AD-PLAY-END-SEC-OF-DAY | NUMBER | 5 | Identifies the time of day when the video asset finished airing or playing as measured in seconds of the day. |

FIG 23-A - continued

| | | | | | |
|---|---|---|---|---|---|
| 3330 | These fields occur 1500 times. | VR-TARGETED-AD-FLAG | CHAR | 1 | See corresponding field in Fig 21-A. |
| 3340 | | VR-TARGETED-SET-TOP-BOX-COUNT | NUMBER | 7 | See corresponding field in Fig 21-A. |
| 3350 | | VR-TARGT-C1-VIEW-BEG-END-SECS | NUMBER | 7 | Viewing seconds for a Case 1 targeted ad. Case 1 is when the targeted ad was viewed from beginning to end. |
| 3360 | | VR-TARGT-C1-VIEW-BEG-END-COUNT | NUMBER | 5 | Set-top box count for a Case 1 targeted ad. Case 1 is when the targeted ad was viewed from beginning to end. |
| 3370 | | VR-TARGT-C2-VIEW-BEG-MID-SECS | NUMBER | 7 | Viewing seconds for a Case 2 targeted ad. Case 2 is when the targeted ad was viewed from beginning to some point in the middle. |
| 3380 | | VR-TARGT-C2-VIEW-BEG-MID-COUNT | NUMBER | 5 | Set-top box count for a Case 2 targeted ad. Case 2 is when the targeted ad was viewed from beginning to some point in the middle. |
| 3390 | | VR-TARGT-C3-VIEW-BEG-END-SECS | NUMBER | 7 | Viewing seconds for a Case 3 targeted ad. Case 3 is when the targeted ad was viewed on the beginning and ending seconds but missed some part in the middle of the ad. |
| 3400 | | VR-TARGT-C3-VIEW-BEG-END-COUNT | NUMBER | 5 | Set-top box count for a Case 3 targeted ad. Case 3 is when the targeted ad was viewed on the beginning and ending seconds but missed some part in the middle of the ad. |
| 3410 | | VR-TARGT-C4-VIEW-PARTIAL-SECS | NUMBER | 7 | Viewing seconds for a Case 4 targeted ad. Case 4 is any targeted ad viewing not covered by cases 1 to 3. |

FIG 23-A ~ continued

| | | | | | |
|---|---|---|---|---|---|
| 3420 | These fields occur 1500 times. | VR-TARGT-C4-VIEW-PARTIAL-COUNT | NUMBER | 5 | Set-top box count for a Case 4 targeted ad. Case 4 is any targeted ad viewing not covered by cases 1 to 3. |
| 3430 | | VR-NOTGT-C1-VIEW-BEG-END-SECS | NUMBER | 7 | Viewing seconds for a Case 1 nontargeted ad. Case 1 is when the nontargeted ad was viewed from beginning to end. |
| 3440 | | VR-NOTGT-C1-VIEW-BEG-END-COUNT | NUMBER | 5 | Set-top box count for a Case 1 nontargeted ad. Case 1 is when the nontargeted ad was viewed from beginning to end. |
| 3450 | | VR-NOTGT-C2-VIEW-BEG-MID-SECS | NUMBER | 7 | Viewing seconds for a Case 2 nontargeted ad. Case 2 is when the nontargeted ad was viewed from beginning to some point in the middle. |
| 3460 | | VR-NOTGT-C2-VIEW-BEG-MID-COUNT | NUMBER | 5 | Set-top box count for a Case 2 nontargeted ad. Case 2 is when the nontargeted ad was viewed from beginning to some point in the middle. |
| 3470 | | VR-NOTGT-C3-VIEW-MID-END-SECS | NUMBER | 7 | Viewing seconds for a Case 3 nontargeted ad. Case 3 is when the nontargeted ad was viewed from some point in the middle to the end. |
| 3480 | | VR-NOTGT-C3-VIEW-MID-END-COUNT | NUMBER | 5 | Set-top box count for a Case 3 nontargeted ad. Case 3 is when the nontargeted ad was viewed from some point in the middle to the end. |
| 3490 | | VR-NOTGT-C4-VIEW-MID-MID-SECS | NUMBER | 7 | Viewing seconds for a Case 4 nontargeted ad. Case 4 is when the nontargeted ad was viewed for some duration in the middle but not the beginning or the end. |
| 3500 | | VR-NOTGT-C4-VIEW-MID-MID-COUNT | NUMBER | 5 | Set-top box count for a Case 4 nontargeted ad. Case 4 is when the nontargeted ad was viewed for some duration in the middle but not the beginning or the end. |

FIG 23-A – continued

| | | | | | |
|---|---|---|---|---|---|
| 3510 | These fields occur 1500 times. | VR-NOTGT-C5-VIEW-BEG-END-SECS | NUMBER | 7 | Viewing seconds for a Case 5 nontargeted ad. Case 5 is when the nontargeted ad was viewed on the beginning and ending seconds but missed some part in the middle of the ad. |
| 3520 | | VR-NOTGT-C5-VIEW-BEG-END-COUNT | NUMBER | 5 | Set-top box count for a Case 5 nontargeted ad. Case 5 is when the nontargeted ad was viewed on the beginning and ending seconds but missed some part in the middle of the ad. |
| 3530 | | VR-NOTGT-C6-VIEW-PARTIAL-SECS | NUMBER | 7 | Viewing seconds for a Case 6 nontargeted ad. Case 6 is any nontargeted ad viewing not covered by cases 1 to 5. |
| 3540 | | VR-NOTGT-C6-VIEW-PARTIAL-COUNT | NUMBER | 5 | Set-top box count for a Case 6 nontargeted ad. Case 6 is any nontargeted ad viewing not covered by cases 1 to 5. |
| 3550 | | VR-TOTAL-EXPECT-VIEW-SECS | NUMBER | 7 | Total expected viewing seconds is calculated based on the number of set-top boxes tuned in at the start of the ad * the duration of the ad in seconds. |
| 3560 | | VR-TOTAL-ACTUAL-VIEW-SECS | NUMBER | 7 | Total actual viewing seconds is a count of the actual viewing seconds that the ad received. |
| 3570 | | VR-PCT-OF-EXPECTED-VIEW-SECS | NUMBER | 9(3) V99 | Percent of expected viewing seconds is computed as Total Actual Viewing Seconds / Total Expected Viewing Seconds * 100 |
| 3580 | | VR-NOTGT-ACCIDENTAL-VIEW-SECS | NUMBER | 7 | NonTargeted accidental viewing seconds is the number of viewing seconds earned by a nontargeted ad but including only set-top boxes that tuned to the ad after it started. See calculation description for details. |

FIG 23-A - continued

| | | | | | |
|---|---|---|---|---|---|
| 3590 | These fields occur 1500 times. | VR-NOTGT-ACCID-RETENT-RATE-SEC | NUMBER | 9(3)V99 | Non-targeted accidental retention rate seconds measures for set-top boxes that tune-in during the middle of the ad, what proportion stayed tuned in until the end of the ad, based on viewing seconds count. See calculation description for details. |
| 3600 | | VR-NOTGT-ACCIDENTAL-VIEW-CNT | NUMBER | 7 | Non-targeted accidental viewing count measures the number of set-top boxes that tuned to the ad after it started. See calculation description for details. |
| 3610 | | VR-NOTGT-ACCID-RETENT-RATE-CNT | NUMBER | 9(3)V99 | Non-targeted accidental retention rate count measures for set-top boxes that tune-in during the middle of the ad, what proportion stayed tuned in until the end of the ad, based on set-top box count. See calculation description for details. |
| 3620 | | VR-VIDEO-ASSET-ID | CHAR | 12 | See corresponding field in Fig 21-A. |
| 3630 | | VR-PRODUCT-TYPE | CHAR | 12 | See corresponding field in Fig 21-A. |
| 3640 | | VR-VIDEO-ASSET-NAME | CHAR | 20 | See corresponding field in Fig 21-A. |
| 3650 | | VR-PRODUCER-NAME | CHAR | 20 | See corresponding field in Fig 21-A. |
| 3660 | | VR-AGENCY-NAME | CHAR | 20 | See corresponding field in Fig 21-A. |
| 3670 | | VR-SCRIPT-WRITER | CHAR | 20 | See corresponding field in Fig 21-A. |

FIG 23-A - continued

| | | | | | |
|---|---|---|---|---|---|
| 3680 | These fields occur 1500 times. | VR-FEATURED-ACTOR | CHAR | 20 | See corresponding field in Fig 21-A |
| 3690 | | VR-ACTOR-CELEBRITY-STATUS | CHAR | 1 | See corresponding field in Fig 21-A |
| 3700 | | VR-FEATURED-VOICE | CHAR | 20 | See corresponding field in Fig 21-A |
| 3710 | | VR-PRODUCT-CATEGORY | CHAR | 20 | See corresponding field in Fig 21-A |
| 3720 | | VR-LANGUAGE | CHAR | 8 | See corresponding field in Fig 21-A |
| 3730 | | VR-INFORMATIONAL-CONTENT-CODE | CHAR | 12 | See corresponding field in Fig 21-A |
| 3740 | | VR-DELIVERY-FORMAT | CHAR | 2 | See corresponding field in Fig 21-A |
| 3750 | | VR-AUDIO-TRACK-CODE | CHAR | 20 | See corresponding field in Fig 21-A |
| 3760 | | VR-AUDIENCE-SUITABILITY-RATING | CHAR | 4 | See corresponding field in Fig 21-A |
| 3770 | | VR-EPISODE-IDENTIFIER | CHAR | 4 | See corresponding field in Fig 21-A |
| 3780 | | VR-ASSET-DELIVERY-INSTANCE-ID | CHAR | 10 | See corresponding field in Fig 21-A |
| 3790 | | VR-PROGRAM-ATTRIBUTE-1 | CHAR | 6 | See corresponding field in Fig 21-A |
| 3800 | | VR-PROGRAM-ATTRIBUTE-2 | CHAR | 6 | See corresponding field in Fig 21-A |
| 3810 | | VR-TIME-OF-DAY-CODE | CHAR | 12 | See corresponding field in Fig 21-A |
| | | The following fields are populated for Targeted Ads only. They are optional, but only applicable to Targeted Ads. The fields with 'inferred' in the name are labeled as such because the presumption is that demographic model suggests the value provided, but this is not guaranteed. Example: The targeting model may infer that a male is watching the program and thus the targeted ad should be of interest to a male, but it is possible that a female is viewing a program the model incorrectly inferred a male viewer. | | | |
| 3820 | | VR-DEMOGRAPHIC-GROUP | CHAR | 20 | See corresponding field in Fig 21-A |

FIG 23-A - continued

| | | | | | |
|---|---|---|---|---|---|
| 3830~ | These fields occur 1500 times. | VR~INFERRED~RACE | CHAR | 10 | See corresponding field in Fig 21-A |
| 3840~ | | VR~INFERRED~GENDER | CHAR | 1 | See corresponding field in Fig 21-A |
| 3850~ | | VR~INFERRED~AGE~GROUP | CHAR | 20 | See corresponding field in Fig 21-A |
| 3860~ | | VR~INFERRED~INCOME~BRACKET | CHAR | 10 | See corresponding field in Fig 21-A |
| 3870~ | | VR~INFERRED~MARITAL~STATUS | CHAR | 1 | See corresponding field in Fig 21-A |
| 3880~ | | VR~SET~TOP~BOX~ZIP~CODE | NUMBER | 5 | See corresponding field in Fig 21-A |
| 3890~ | | VR~SUBSCRIBER~TYPE | CHAR | 5 | See corresponding field in Fig 21-A |
| 3900~ | | VR~SUBSCRIBER~PACKAGE~LEVEL | CHAR | 10 | See corresponding field in Fig 21-A |
| 3910~ | | VR~SMA~CODE | CHAR | 10 | See corresponding field in Fig 21-A |

FIG. 23-B

| | 3202 | 3205 | 3207 |
|---|---|---|---|
| | NAME | Row 1 in Viewing Result Data Structure | Row 2 in Viewing Result Data Structure |
| 3210~ | VR-MARKET | DENV | DENV |
| 3220~ | VR-SERVICE-GROUP | SG01 | SG01 |
| 3230~ | VR-HUB | HUB1 | HUB1 |
| 3240~ | VR-HEADEND | HE1 | HE1 |
| 3250~ | VR-CHANNEL-CALL-SIGN | Ch-A | Ch-A |
| 3260~ | VR-CHANNEL-SOURCE-ID | 205 | 205 |
| 3270~ | VR-AD-DURATION-IN-SECONDS | 60 | 60 |
| 3280~ | VR-AD-PLAY-DATE | 9/1/2010 | 9/1/2010 |
| 3290~ | VR-AD-PLAY-TIME-BEG | 5:00:00 PM | 5:30:00 PM |
| 3300~ | VR-AD-PLAY-BEG-SEC-OF-DAY | 61201 | 63001 |
| 3310~ | VR-AD-PLAY-TIME-END | 5:00:59 PM | 5:30:59 PM |
| 3320~ | VR-AD-PLAY-END-SEC-OF-DAY | 61260 | 63060 |
| 3330~ | VR-TARGETED-AD-FLAG | N | Y |
| 3340~ | VR-TARGETED-SET-TOP-BOX-COUNT | 0 | 3 |
| 3350~ | VR-TARGT-C1-VIEW-BEG-END-SECS | 0 | 60 |
| 3360~ | VR-TARGT-C1-VIEW-BEG-END-COUNT | 0 | 1 |
| 3370~ | VR-TARGT-C2-VIEW-BEG-MID-SECS | 0 | 70 |
| 3380~ | VR-TARGT-C2-VIEW-BEG-MID-COUNT | 0 | 2 |

FIG. 23-B Continued

| | | | |
|---|---|---|---|
| 3390 | VR~TARGT~C3~VIEW~BEG~END~SECS | 0 | 0 |
| 3400 | VR~TARGT~C3~VIEW~BEG~END~COUNT | 0 | 0 |
| 3410 | VR~TARGT~C4~VIEW~PARTIAL~SECS | 0 | 0 |
| 3420 | VR~TARGT~C4~VIEW~PARTIAL~COUNT | 0 | 0 |
| 3430 | VR~NOTGT~C1~VIEW~BEG~END~SECS | 120 | 0 |
| 3440 | VR~NOTGT~C1~VIEW~BEG~END~COUNT | 2 | 0 |
| 3450 | VR~NOTGT~C2~VIEW~BEG~MID~SECS | 0 | 0 |
| 3460 | VR~NOTGT~C2~VIEW~BEG~MID~COUNT | 0 | 0 |
| 3470 | VR~NOTGT~C3~VIEW~MID~END~SECS | 0 | 0 |
| 3480 | VR~NOTGT~C3~VIEW~MID~END~COUNT | 0 | 0 |
| 3490 | VR~NOTGT~C4~VIEW~MID~MID~SECS | 0 | 0 |
| 3500 | VR~NOTGT~C4~VIEW~MID~MID~COUNT | 0 | 0 |
| 3510 | VR~NOTGT~C5~VIEW~BEG~END~SECS | 0 | 0 |
| 3520 | VR~NOTGT~C5~VIEW~BEG~END~COUNT | 0 | 0 |
| 3530 | VR~NOTGT~C6~VIEW~PARTIAL~SECS | 0 | 0 |
| 3540 | VR~NOTGT~C6~VIEW~PARTIAL~COUNT | 0 | 0 |
| 3550 | VR~TOTAL~EXPECT~VIEW~SECS | 120 | 180 |
| 3560 | VR~TOTAL~ACTUAL~VIEW~SECS | 120 | 130 |
| 3570 | VR~PCT~OF~EXPECTED~VIEW~SECS | 100 | 72 |
| 3580 | VR~NOTGT~ACCIDENTAL~VIEW~SECS | 0 | 0 |
| 3590 | VR~NOTGT~ACCID~RETENT~RATE~SEC | 0 | 0 |

FIG. 23-B Continued

| | | | |
|---|---|---|---|
| 3600 | VR-NOTGT-ACCIDENTAL-VIEW-CNT | 0 | 0 |
| 3610 | VR-NOTGT-ACCID-RETENT-RATE-CNT | 0 | 0 |
| 3620 | VR-VIDEO-ASSET-ID | AD-35 | AD-TGT-05 |
| 3630 | VR-PRODUCT-TYPE | GEAR | GEAR |
| 3640 | VR-VIDEO-ASSET-NAME | Boots | Super Boots |
| 3650 | VR-PRODUCER-NAME | T1+ producer | T1+ producer |
| 3660 | VR-AGENCY-NAME | T1+ Agency | T1+ Agency |
| 3670 | VR-SCRIPT-WRITER | Boot+Writer | T1+ Writer |
| 3680 | VR-FEATURED-ACTOR | T1+ Actor | T1+ Actor |
| 3690 | VR-ACTOR-CELEBRITY-STATUS | N | N |
| 3700 | VR-FEATURED-VOICE | Strong Voice | Strong Voice |
| 3710 | VR-PRODUCT-CATEGORY | GEAR | GEAR |
| 3720 | VR-LANGUAGE | ENGLISH | ENGLISH |
| 3730 | VR-INFORMATIONAL-CONTENT-CODE | Awareness | Awareness |
| 3740 | VR-DELIVERY-FORMAT | HD | HD |
| 3750 | VR-AUDIO-TRACK-CODE | | |
| 3760 | VR-AUDIENCE-SUITABILITY-RATING | G | G |
| 3770 | VR-EPISODE-IDENTIFIER | E-1 | E-8 |
| 3780 | VR-ASSET-DELIVERY-INSTANCE-ID | AD-35-DI-0 | AD-35-DI-0 |
| 3790 | VR-PROGRAM-ATTRIBUTE-1 | ANIMAL | ANIMAL |

FIG. 23-B Continued

| | | | |
|---|---|---|---|
| 3800 | VR-PROGRAM-ATTRIBUTE-2 | G | G |
| 3810 | VR-TIME-OF-DAY-CODE | Mid PM | Mid PM |
| 3820 | VR-DEMOGRAPHIC-GROUP | | DEMO-E |
| 3830 | VR-INFERRED-RACE | | ASIAN |
| 3840 | VR-INFERRED-GENDER | | M |
| 3850 | VR-INFERRED-AGE-GROUP | | 20-30 |
| 3860 | VR-INFERRED-INCOME-BRACKET | | 30-40 |
| 3870 | VR-INFERRED-MARITAL-STATUS | | S |
| 3880 | VR-SET-TOP-BOX-ZIP-CODE | 0 | 82345 |
| 3890 | VR-SUBSCRIBER-TYPE | | BASIC |
| 3900 | VR-SUBSCRIBER-PACKAGE-LEVEL | | BASIC+ |
| 3910 | VR-SMA-CODE | | DMA-E |

FIG. 24-A

| | NAME (2600) | TYPE (2602) | SIZE (2604) | DESCRIPTION (2606) |
|---|---|---|---|---|
| 2610 | MARKET | CHAR | 4 | For this ad which was targeted to the set-top box identified in this record, the identifier of market in cable company's network hierarchy where the set-top box resides. |
| 2620 | SERVICE~GROUP | CHAR | 6 | For this ad which was targeted to the set-top box identified in this record, the identifier of service group in cable company's network hierarchy where the set-top box resides. |
| 2630 | HUB | CHAR | 4 | For this ad which was targeted to the set-top box identified in this record, the identifier of hub in cable company's network hierarchy where the set-top box resides. |
| 2640 | HEADEND | CHAR | 4 | For this ad which was targeted to the set-top box identified in this record, the identifier of headend in cable company's network hierarchy where the set-top box resides. |
| 2650 | CHANNEL~CALL~SIGN | CHAR | 6 | For this ad which was targeted to the set-top box identified in this record, the channel call sign (short name of the channel) identifies the channel to which the set-top box was tuned at the time the ad was targeted to the STB. |
| 2660 | CHANNEL~SOURCE~ID | CHAR | 5 | For this ad which was targeted to the set-top box identified in this record, the channel source id (numeric identifier of the channel) identifies the channel to which the set-top box was tuned at the time the ad was targeted to the STB. |
| 2670 | SET~TOP~BOX~ID | CHAR | 20 | Set-top box id identifies the set-top box to which the ad identified in this record was targeted. |
| 2674 | TUNER~INDEX | CHAR | 1 | Tuner index identifies the tuner on the set-top box to which the ad identified in this record was targeted. |
| 2680 | AD~PLAY~BEG~DATE~TIME~US | CHAR | 22 | Identifies the date and time of day on which the targeted ad identified in this record was played. Format is typically: YYYY-MM-DD HH:MM:SSAM/PM |

FIG. 24-A Continued

| | | | | |
|---|---|---|---|---|
| 2710 | AD-PLAY-END-DATE-TIME-US | CHAR | 22 | Identifies the date and time of day on which the targeted ad identified in this record ended play. Format is typically: YYYY-MM-DD HH:MM:SS AM/PM |
| 2740 | VIDEO-ASSET-ID | CHAR | 12 | Provides a unique identifier for a Viedo Asset. This could be the unique identifier of an ad or of a program. For targeting calculations, this value is matched with the corresponding value in the VIEWING-RESULT table. |
| 2750 | ASSET-DELIVERY-INSTANCE-ID | CHAR | 10 | Provide a unique identifier of this video asset delivery instance. This is used to distinguish between the various airings of a video asset. For example, if the same commercial airs multiple times, this field allows us to associate a unique identifier with each airing. This is important because we track viewing seconds for each airing. For targeting calculations, this value is matched with the corresponding value in the VIEWING-RESULT table. |

FIG. 24-B
2603
Record 1:
DENV|SG01|HUB1|HE1|Ch-M|00201|MAC-STB-LG1|1|09/01/2010 05:00:00 PM|09/01/2010 05:00:59 PM|AD-TGT-01|AD-20-DI-0

2605
Record 2:
DENV|SG01|HUB1|HE1|Ch-M|00201|MAC-STB-R1|1|09/01/2010 05:00:00 PM|09/01/2010 05:00:59 PM|AD-TGT-01|AD-20-DI-0

FIG. 24-C

| | 2600 | 2603 | 2605 |
|---|---|---|---|
| | NAME | Row 1 | Row 2 |
| 2610 | MARKET | DENV | DENV |
| 2620 | SERVICE~GROUP | SG01 | SG01 |
| 2630 | HUB | HUB1 | HUB1 |
| 2640 | HEADEND | HE1 | HE1 |
| 2650 | CHANNEL~CALL~SIGN | Ch-M | Ch-M |
| 2660 | CHANNEL~SOURCE~ID | 201 | 201 |
| 2670 | SET~TOP~BOX~ID | MAC-STB-LG1 | MAC-STB-R1 |
| 2674 | TUNER~INDEX | 1 | 1 |
| 2680 | AD~PLAY~BEG~DATE~TIME~US | 9/1/2010 17:00:00 | 9/1/2010 17:00:00 |
| 2710 | AD~PLAY~END~DATE~TIME~US | 9/1/2010 17:00:59 | 9/1/2010 17:00:59 |
| 2740 | VIDEO~ASSET~ID | AD-TGT-01 | AD-TGT-01 |
| 2750 | ASSET~DELIVERY~INSTANCE~ID | AD-20-DI-0 | AD-20-DI-0 |

FIG. 25-A

| | 2800 | 2802 | 2804 | 2806 |
|---|---|---|---|---|
| | NAME | TYPE | SIZE | DESCRIPTION |
| 2810 | TA-MARKET | CHAR | 4 | See corresponding field in Fig 24-A. |
| 2820 | TA-SERVICE-GROUP | CHAR | 6 | See corresponding field in Fig 24-A. |
| 2830 | TA-HUB | CHAR | 4 | See corresponding field in Fig 24-A. |
| 2840 | TA-HEADEND | CHAR | 4 | See corresponding field in Fig 24-A. |
| 2850 | TA-CHANNEL-CALL-SIGN | CHAR | 6 | See corresponding field in Fig 24-A. |
| 2860 | TA-CHANNEL-SOURCE-ID | CHAR | 5 | See corresponding field in Fig 24-A. |
| 2870 | TA-SET-TOP-BOX-ID | CHAR | 20 | See corresponding field in Fig 24-A. |
| 2874 | TA-TUNER-INDEX | CHAR | 1 | See corresponding field in Fig 24-A. |
| 2880 | TA-AD-PLAY-DATE | CHAR | 10 | Identifies the date on which the targeted ad identified in this record was played. Format is typically: YYYY-MM-DD |
| 2890 | TA-AD-PLAY-TIME-BEG | CHAR | 10 | Identifies the time of day when the targeted ad identified in this record began to play. Format is typically: HH:MM:SSAM/PM |
| 2900 | TA-AD-PLAY-BEG-SEC-OF-DAY | NUMBER | 5 | Identifies the time of day in seconds since midnight when the targeted ad identified in this record began to play. Format is typically: 99999 |
| 2910 | TA-AD-PLAY-END-DATE | CHAR | 10 | Identifies the date on which the targeted ad identified in this record ended play. Format is typically: YYYY-MM-DD. |
| 2920 | TA-AD-PLAY-TIME-END | CHAR | 10 | Identifies the time of day when the targeted ad identified in this record finished playing. Format is typically: HH:MM:SS AM/PM |
| 2930 | TA-AD-PLAY-END-SEC-OF-DAY | NUMBER | 5 | Identifies the time of day in seconds since midnight when the targeted ad identified in this record completed playing. Format is typically: 99999 |
| 2940 | TA-VIDEO-ASSET-ID | CHAR | 12 | See corresponding field in Fig 24-A. |
| 2950 | TA-ASSET-DELIVERY-INSTANCE-ID | CHAR | 10 | See corresponding field in Fig 24-A. |

FIG. 25-B 2800 2805 2807

| | NAME | Row 1 | Row 2 |
|---|---|---|---|
| 2810 | TA-MARKET | DENV | DENV |
| 2820 | TA-SERVICE-GROUP | SG01 | SG01 |
| 2830 | TA-HUB | HUB1 | HUB1 |
| 2840 | TA-HEADEND | HE1 | HE1 |
| 2850 | TA-CHANNEL-CALL-SIGN | Ch-M | Ch-M |
| 2860 | TA-CHANNEL-SOURCE-ID | 201 | 201 |
| 2870 | TA-SET-TOP-BOX-ID | MAC-STB-LG1 | MAC-STB-R1 |
| 2874 | TA-TUNER-INDEX | 1 | 1 |
| 2880 | TA-AD-PLAY-DATE | 9/1/2010 | 9/1/2010 |
| 2890 | TA-AD-PLAY-TIME-BEG | 05:00:00PM | 05:00:00PM |
| 2900 | TA-AD-PLAY-BEG-SEC-OF-DAY | 61201 | 61201 |
| 2910 | TA-AD-PLAY-END-DATE | 9/1/2010 | 9/1/2010 |
| 2920 | TA-AD-PLAY-TIME-END | 05:00:59PM | 05:00:59PM |
| 2930 | TA-AD-PLAY-END-SEC-OF-DAY | 61260 | 61260 |
| 2940 | TA-VIDEO-ASSET-ID | AD-TGT-01 | AD-TGT-01 |
| 2950 | TA-ASSET-DELIVERY-INSTANCE-ID | AD-20-DI-0 | AD-20-DI-0 |

FIG. 26-A

| | 4202 NAME | 4204 TYPE | 4206 SIZE | 4208 DESCRIPTION |
|---|---|---|---|---|
| 4210 | VO~MARKET | CHAR | 4 | See corresponding field in Fig 22A. |
| 4220 | VO~SERVICE~GROUP | CHAR | 6 | See corresponding field in Fig 22A. |
| 4230 | VO~HUB | CHAR | 4 | See corresponding field in Fig 22A. |
| 4240 | VO~HEADEND | CHAR | 4 | See corresponding field in Fig 22A. |
| 4250 | VO~CHANNEL~CALL~SIGN | CHAR | 6 | See corresponding field in Fig 22A. |
| 4260 | VO~CHANNEL~SOURCE~ID | CHAR | 5 | See corresponding field in Fig 22A. |
| 4270 | VO~AD~DURATION~IN~SECONDS | NUMBER | 5 | See corresponding field in Fig 22A. |
| 4280 | VO~AD~PLAY~DATE | CHAR | 10 | See corresponding field in Fig 22A. |
| 4290 | VO~AD~PLAY~TIME~BEG | CHAR | 11 | See corresponding field in Fig 22A. |
| 4300 | VO~AD~PLAY~BEG~SEC~OF~DAY | NUMBER | 5 | See corresponding field in Fig 22A. |
| 4310 | VO~AD~PLAY~TIME~END | CHAR | 11 | See corresponding field in Fig 22A. |
| 4320 | VO~AD~PLAY~END~SEC~OF~DAY | NUMBER | 5 | See corresponding field in Fig 22A. |
| 4330 | VO~TARGETED~AD~FLAG | CHAR | 1 | See corresponding field in Fig 22A. |
| 4340 | VO~TARGETED~SET~TOP~BOX~COUNT | NUMBER | 7 | See corresponding field in Fig 22A. |
| 4350 | VO~TARGT~C1~VIEW~BEG~END~SECS | NUMBER | 7 | See corresponding field in Fig 22A. |
| 4360 | VO~TARGT~C1~VIEW~BEG~END~COUNT | NUMBER | 5 | See corresponding field in Fig 22A. |
| 4370 | VO~TARGT~C2~VIEW~BEG~MID~SECS | NUMBER | 7 | See corresponding field in Fig 22A. |
| 4380 | VO~TARGT~C2~VIEW~BEG~MID~COUNT | NUMBER | 5 | See corresponding field in Fig 22A. |
| 4390 | VO~TARGT~C3~VIEW~BEG~END~SECS | NUMBER | 7 | See corresponding field in Fig 22A. |
| 4400 | VO~TARGT~C3~VIEW~BEG~END~COUNT | NUMBER | 5 | See corresponding field in Fig 22A. |
| 4410 | VO~TARGT~C4~VIEW~PARTIAL~SECS | NUMBER | 7 | See corresponding field in Fig 22A. |
| 4420 | VO~TARGT~C4~VIEW~PARTIAL~COUNT | NUMBER | 5 | See corresponding field in Fig 22A. |
| 4430 | VO~NOTGT~C1~VIEW~BEG~END~SECS | NUMBER | 7 | See corresponding field in Fig 22A. |
| 4440 | VO~NOTGT~C1~VIEW~BEG~END~COUNT | NUMBER | 5 | See corresponding field in Fig 22A. |
| 4450 | VO~NOTGT~C2~VIEW~BEG~MID~SECS | NUMBER | 7 | See corresponding field in Fig 22A. |

FIG. 26-A Continued

| | | | | |
|---|---|---|---|---|
| 4460 | VO-NOTGT-C2-VIEW-BEG-MID-COUNT | NUMBER | 5 | See corresponding field in Fig 22A. |
| 4470 | VO-NOTGT-C3-VIEW-MID-END-SECS | NUMBER | 7 | See corresponding field in Fig 22A. |
| 4480 | VO-NOTGT-C3-VIEW-MID-END-COUNT | NUMBER | 5 | See corresponding field in Fig 22A. |
| 4490 | VO-NOTGT-C4-VIEW-MID-MID-SECS | NUMBER | 7 | See corresponding field in Fig 22A. |
| 4500 | VO-NOTGT-C4-VIEW-MID-MID-COUNT | NUMBER | 5 | See corresponding field in Fig 22A. |
| 4510 | VO-NOTGT-C5-VIEW-BEG-END-SECS | NUMBER | 7 | See corresponding field in Fig 22A. |
| 4520 | VO-NOTGT-C5-VIEW-BEG-END-COUNT | NUMBER | 5 | See corresponding field in Fig 22A. |
| 4530 | VO-NOTGT-C6-VIEW-PARTIAL-SECS | NUMBER | 7 | See corresponding field in Fig 22A. |
| 4540 | VO-NOTGT-C6-VIEW-PARTIAL-COUNT | NUMBER | 5 | See corresponding field in Fig 22A. |
| 4550 | VO-TOTAL-EXPECT-VIEW-SECS | NUMBER | 7 | See corresponding field in Fig 22A. |
| 4560 | VO-TOTAL-ACTUAL-VIEW-SECS | NUMBER | 7 | See corresponding field in Fig 22A. |
| 4570 | VO-PCT-OF-EXPECTED-VIEW-SECS | NUMBER | 9(3)V99 | See corresponding field in Fig 22A. |
| 4580 | VO-NOTGT-ACCIDENTAL-VIEW-SECS | NUMBER | 7 | See corresponding field in Fig 22A. |
| 4590 | VO-NOTGT-ACCID-RETENT-RATE-SEC | NUMBER | 9(3)V99 | See corresponding field in Fig 22A. |
| 4600 | VO-NOTGT-ACCIDENTAL-VIEW-CNT | NUMBER | 7 | See corresponding field in Fig 22A. |
| 4610 | VO-NOTGT-ACCID-RETENT-RATE-CNT | NUMBER | 9(3)V99 | See corresponding field in Fig 22A. |
| 4620 | VO-VIDEO-ASSET-ID | CHAR | 12 | See corresponding field in Fig 22A. |
| 4630 | VO-PRODUCT-TYPE | CHAR | 12 | See corresponding field in Fig 22A. |
| 4640 | VO-VIDEO-ASSET-NAME | CHAR | 20 | See corresponding field in Fig 22A. |
| 4650 | VO-PRODUCER-NAME | CHAR | 20 | See corresponding field in Fig 22A. |
| 4660 | VO-AGENCY-NAME | CHAR | 20 | See corresponding field in Fig 22A. |
| 4670 | VO-SCRIPT-WRITER | CHAR | 20 | See corresponding field in Fig 22A. |
| 4680 | VO-FEATURED-ACTOR | CHAR | 20 | See corresponding field in Fig 22A. |
| 4690 | VO-ACTOR-CELEBRITY-STATUS | CHAR | 1 | See corresponding field in Fig 22A. |
| 4700 | VO-FEATURED-VOICE | CHAR | 20 | See corresponding field in Fig 22A. |
| 4710 | VO-PRODUCT-CATEGORY | CHAR | 20 | See corresponding field in Fig 22A. |

FIG. 26-A Continued

| | | | | |
|---|---|---|---|---|
| 4720 | VO~LANGUAGE | CHAR | 8 | See corresponding field in Fig 22A. |
| 4730 | VO~INFORMATIONAL~CONTENT~CODE | CHAR | 12 | See corresponding field in Fig 22A. |
| 4740 | VO~DELIVERY~FORMAT | CHAR | 2 | See corresponding field in Fig 22A. |
| 4750 | VO~AUDIO~TRACK~CODE | CHAR | 20 | See corresponding field in Fig 22A. |
| 4760 | VO~AUDIENCE~SUITABILITY~RATING | CHAR | 4 | See corresponding field in Fig 22A. |
| 4770 | VO~EPISODE~IDENTIFIER | CHAR | 4 | See corresponding field in Fig 22A. |
| 4780 | VO~ASSET~DELIVERY~INSTANCE~ID | CHAR | 10 | See corresponding field in Fig 22A. |
| 4790 | VO~PROGRAM~ATTRIBUTE~1 | CHAR | 6 | See corresponding field in Fig 22A. |
| 4800 | VO~PROGRAM~ATTRIBUTE~2 | CHAR | 6 | See corresponding field in Fig 22A. |
| 4810 | VO~TIME~OF~DAY~CODE | CHAR | 12 | See corresponding field in Fig 22A. |
| 4820 | VO~DEMOGRAPHIC~GROUP | CHAR | 20 | See corresponding field in Fig 22A. |
| 4830 | VO~INFERRED~RACE | CHAR | 10 | See corresponding field in Fig 22A. |
| 4840 | VO~INFERRED~GENDER | CHAR | 1 | See corresponding field in Fig 22A. |
| 4850 | VO~INFERRED~AGE~GROUP | CHAR | 20 | See corresponding field in Fig 22A. |
| 4860 | VO~INFERRED~INCOME~BRACKET | CHAR | 10 | See corresponding field in Fig 22A. |
| 4870 | VO~INFERRED~MARITAL~STATUS | CHAR | 1 | See corresponding field in Fig 22A. |
| 4880 | VO~SET~TOP~BOX~ZIP~CODE | NUMBER | 5 | See corresponding field in Fig 22A |
| 4890 | VO~SUBSCRIBER~TYPE | CHAR | 5 | See corresponding field in Fig 22A. |
| 4900 | VO~SUBSCRIBER~PACKAGE~LEVEL | CHAR | 10 | See corresponding field in Fig 22A. |
| 4910 | VO~SMA~CODE | CHAR | 10 | See corresponding field in Fig 22A. |

FIG. 26-B

| | 4202 NAME | 4205 Row 1 | 4207 Row 2 |
|---|---|---|---|
| 4210 | VO~MARKET | DENV | DENV |
| 4220 | VO~SERVICE~GROUP | SG01 | SG01 |
| 4230 | VO~HUB | HUB1 | HUB1 |
| 4240 | VO~HEADEND | HE1 | HE1 |
| 4250 | VO~CHANNEL~CALL~SIGN | Ch-A | Ch-A |
| 4260 | VO~CHANNEL~SOURCE~ID | 205 | 205 |
| 4270 | VO~AD~DURATION~IN~SECONDS | 60 | 60 |
| 4280 | VO~AD~PLAY~DATE | 9/1/2010 | 9/1/2010 |
| 4290 | VO~AD~PLAY~TIME~BEG | 5:00:00 PM | 5:30:00 PM |
| 4300 | VO~AD~PLAY~BEG~SEC~OF~DAY | 61201 | 63001 |
| 4310 | VO~AD~PLAY~TIME~END | 5:00:59 PM | 5:30:59 PM |
| 4320 | VO~AD~PLAY~END~SEC~OF~DAY | 61260 | 63060 |
| 4330 | VO~TARGETED~AD~FLAG | N | Y |
| 4340 | VO~TARGETED~SET~TOP~BOX~COUNT | 0 | 3 |
| 4350 | VO~TARGT~C1~VIEW~BEG~END~SECS | 0 | 60 |
| 4360 | VO~TARGT~C1~VIEW~BEG~END~COUNT | 0 | 1 |
| 4370 | VO~TARGT~C2~VIEW~BEG~MID~SECS | 0 | 70 |
| 4380 | VO~TARGT~C2~VIEW~BEG~MID~COUNT | 0 | 2 |

FIG. 26-B Continued

| | | | |
|---|---|---|---|
| 4390 | VO~TARGT~C3~VIEW~BEG~END~SECS | 0 | 0 |
| 4400 | VO~TARGT~C3~VIEW~BEG~END~COUNT | 0 | 0 |
| 4410 | VO~TARGT~C4~VIEW~PARTIAL~SECS | 0 | 0 |
| 4420 | VO~TARGT~C4~VIEW~PARTIAL~COUNT | 0 | 0 |
| 4430 | VO~NOTGT~C1~VIEW~BEG~END~SECS | 120 | 0 |
| 4440 | VO~NOTGT~C1~VIEW~BEG~END~COUNT | 2 | 0 |
| 4450 | VO~NOTGT~C2~VIEW~BEG~MID~SECS | 0 | 0 |
| 4460 | VO~NOTGT~C2~VIEW~BEG~MID~COUNT | 0 | 0 |
| 4470 | VO~NOTGT~C3~VIEW~MID~END~SECS | 0 | 0 |
| 4480 | VO~NOTGT~C3~VIEW~MID~END~COUNT | 0 | 0 |
| 4490 | VO~NOTGT~C4~VIEW~MID~MID~SECS | 0 | 0 |
| 4500 | VO~NOTGT~C4~VIEW~MID~MID~COUNT | 0 | 0 |
| 4510 | VO~NOTGT~C5~VIEW~BEG~END~SECS | 0 | 0 |
| 4520 | VO~NOTGT~C5~VIEW~BEG~END~COUNT | 0 | 0 |
| 4530 | VO~NOTGT~C6~VIEW~PARTIAL~SECS | 0 | 0 |
| 4540 | VO~NOTGT~C6~VIEW~PARTIAL~COUNT | 0 | 0 |
| 4550 | VO~TOTAL~EXPECT~VIEW~SECS | 120 | 180 |
| 4560 | VO~TOTAL~ACTUAL~VIEW~SECS | 120 | 130 |
| 4570 | VO~PCT~OF~EXPECTED~VIEW~SECS | 100 | 72 |
| 4580 | VO~NOTGT~ACCIDENTAL~VIEW~SECS | 0 | 0 |

FIG. 26-B Continued

| | | | |
|---|---|---|---|
| 4590 | VO~NOTGT~ACCID~RETENT~RATE~SEC | 0 | 0 |
| 4600 | VO~NOTGT~ACCIDENTAL~VIEW~CNT | 0 | 0 |
| 4610 | VO~NOTGT~ACCID~RETENT~RATE~CNT | 0 | 0 |
| 4620 | VO~VIDEO~ASSET~ID | AD-35 | AD-TGT-05 |
| 4630 | VO~PRODUCT~TYPE | GEAR | GEAR |
| 4640 | VO~VIDEO~ASSET~NAME | Boots | Super Boots |
| 4650 | VO~PRODUCER~NAME | T1+ producer | T1+ producer |
| 4660 | VO~AGENCY~NAME | T1+ Agency | T1+ Agency |
| 4670 | VO~SCRIPT~WRITER | Boot+Writer | T1+ Writer |
| 4680 | VO~FEATURED~ACTOR | T1+ Actor | T1+ Actor |
| 4690 | VO~ACTOR~CELEBRITY~STATUS | N | N |
| 4700 | VO~FEATURED~VOICE | Strong Voice | Strong Voice |
| 4710 | VO~PRODUCT~CATEGORY | GEAR | GEAR |
| 4720 | VO~LANGUAGE | ENGLISH | ENGLISH |
| 4730 | VO~INFORMATIONAL~CONTENT~CODE | Awareness | Awareness |
| 4740 | VO~DELIVERY~FORMAT | HD | HD |
| 4750 | VO~AUDIO~TRACK~CODE | | |
| 4760 | VO~AUDIENCE~SUITABILITY~RATING | G | G |
| 4770 | VO~EPISODE~IDENTIFIER | E-1 | E-8 |
| 4780 | VO~ASSET~DELIVERY~INSTANCE~ID | AD-35-DI-0 | AD-35-DI-0 |

FIG. 26-B Continued

| | | | |
|---|---|---|---|
| 4790 | VO~PROGRAM~ATTRIBUTE~1 | ANIMAL | ANIMAL |
| 4800 | VO~PROGRAM~ATTRIBUTE~2 | G | G |
| 4810 | VO~TIME~OF~DAY~CODE | Mid PM | Mid PM |
| 4820 | VO~DEMOGRAPHIC~GROUP | | DEMO-E |
| 4830 | VO~INFERRED~RACE | | ASIAN |
| 4840 | VO~INFERRED~GENDER | | M |
| 4850 | VO~INFERRED~AGE~GROUP | | 20-30 |
| 4860 | VO~INFERRED~INCOME~BRACKET | | 30-40 |
| 4870 | VO~INFERRED~MARITAL~STATUS | | S |
| 4880 | VO~SET~TOP~BOX~ZIP~CODE | 0 | 82345 |
| 4890 | VO~SUBSCRIBER~TYPE | | BASIC |
| 4900 | VO~SUBSCRIBER~PACKAGE~LEVEL | | BASIC+ |
| 4910 | VO~SMA~CODE | | DMA-E |

FIG. 27-A 5602 5604 5606 5608

| | NAME | TYPE | SIZE | DESCRIPTION |
|---|---|---|---|---|
| 5610 | BSAV-MARKET | Char | 4 | Identifier of market code in cable company's network hierarchy. |
| 5620 | BSAV-SERVICE-GROUP | Char | 6 | Identifier of service group in cable company's network hierarchy. |
| 5630 | BSAV-HUB | Char | 4 | Identifier of hub in cable company's network hierarchy. |
| 5640 | BSAV-HEADEND | Char | 4 | Identifier of headend in cable company's network hierarchy. |
| 5650 | BSAV-CHANNEL-CALL-SIGN | Char | 6 | Channel call sign or short name of the channel. |
| 5660 | BSAV-CHANNEL-SOURCE-ID | Char | 5 | Channel source id which is a numeric identifier of the channel. |
| 5670 | BSAV-VIDEO-ASSET-ID | Char | 12 | A unique identifier for a Video Asset, either of an ad or of a program. |
| 5680 | BSAV-ASSET-DELIV-INST-ID | Char | 10 | A unique identifier of this video asset delivery instance. This is used to distinguish between the various airings of a video asset. For example, if the same commercial airs multiple times, this field allows us to associate a unique identifier with each airing. This is important because we track viewing seconds for each airing. |
| 5690 | BSAV-TARGETED-AD-FLAG | Char | 1 | Identifies whether or not the video asset (advertisement) was targeted to specific set-top boxes based on some criteria, typically demographic. Value values: Y for yes, N for no. |
| 5700 | BSAV-VIDEO-ASSET-NAME | Char | 20 | Identifies the name of the video asset. |
| 5710 | BSAV-AD-DURATION-IN-SECONDS | Number | 5 | Identifies the length or duration of the video asset (advertisement or program) measured in seconds. |
| 5720 | BSAV-asset-second | Number | 5 | Identifies the second of the day when this activity occurred. This value will be each second between the beginning and ending second of the day inclusive when the ad or program aired. |

FIG. 27-A Continued

| | | | | |
|---|---|---|---|---|
| 5730 | BSAV-AD-PLAY-DATE | Char | 10 | Identifies the date on which the video asset was aired or played in the context of the other attributes. Format is typically: YYYY-MM-DD |
| 5740 | BSAV-AD-PLAY-TIME-BEG | Char | 11 | Identifies the time of day when the video asset began to air or play. Format is typically: HH:MM:SS AM/PM |
| 5750 | BSAV-AD-PLAY-BEG-SEC-OF-DAY | Number | 5 | Identifies the time of day when the video asset began to air or play as measured in seconds of the day. |
| 5760 | BSAV-AD-PLAY-TIME-END | Char | 11 | Identifies the time of day when the video asset finished playing. |
| 5770 | BSAV-AD-PLAY-END-SEC-OF-DAY | Number | 5 | Identifies the time of day when the video asset finished airing or playing as measured in seconds of the day. |
| 5780 | BSAV-viewed-this-asset-count | Number | 5 | Viewed this asset count is a count of the number of set-top boxes that were viewing this asset during the second identified by BSAV-asset-second. |
| 5790 | BSAV-viewed-any-asset-count | Number | 5 | Viewed any asset count is a count of the number of set-top boxes that were viewing any asset during the second identified by BSAV-asset-second. |
| 5800 | BSAV-agg-vw-this-asset-count | Number | 7 | Aggregate viewed this asset count is a count of the number of aggregate viewing seconds of this asset by all the set-top boxes that were viewing this asset from the first second of asset viewing to this second of asset viewing. This number can be graphed to see if it produces a rising or falling curve to indicate if the asset is holding viewers or losing viewers the longer it plays. |
| 5810 | BSAV-PCT-VIEWING-THIS-ASSET | Number | 3 | Percent viewing this asset is calculated as: 'BSAV-viewed-this-asset-count / BSAV-viewed-any-asset-count'. This identifies what percent of the active viewing audience in this geographic area is viewing this ad or program during the second identified by BSAV-asset-second. |

Note: BSAV prefix is for By Second Asset View

FIG. 27-B

| | 5602 NAME | 5605 TYPE | 5607 SIZE |
|---|---|---|---|
| 5610 | BSAV-MARKET | DENV | DENV |
| 5620 | BSAV-SERVICE-GROUP | SG01 | SG01 |
| 5630 | BSAV-HUB | HUB1 | HUB1 |
| 5640 | BSAV-HEADEND | HE1 | HE1 |
| 5650 | BSAV-CHANNEL-CALL-SIGN | Ch-A | Ch-A |
| 5660 | BSAV-CHANNEL-SOURCE-ID | 205 | 205 |
| 5670 | BSAV-VIDEO-ASSET-ID | AD-TGT-05 | AD-TGT-05 |
| 5680 | BSAV-ASSET-DELIV-INST-ID | AD-35-DI-0 | AD-35-DI-0 |
| 5690 | BSAV-TARGETED-AD-FLAG | Y | Y |
| 5700 | BSAV-VIDEO-ASSET-NAME | Super Boots | Super Boots |
| 5710 | BSAV-AD-DURATION-IN-SECONDS | 60 | 60 |
| 5720 | BSAV-asset-second | 63001 | 63060 |
| 5730 | BSAV-AD-PLAY-DATE | 9/1/2010 | 9/1/2010 |
| 5740 | BSAV-AD-PLAY-TIME-BEG | 5:30:00 PM | 5:30:00 PM |
| 5750 | BSAV-AD-PLAY-BEG-SEC-OF-DAY | 63001 | 63001 |
| 5760 | BSAV-AD-PLAY-TIME-END | 5:30:59 PM | 5:30:59 PM |
| 5770 | BSAV-AD-PLAY-END-SEC-OF-DAY | 63060 | 63060 |
| 5780 | BSAV-viewed-this-asset-count | 3 | 1 |
| 5790 | BSAV-viewed-any-asset-count | 8 | 6 |
| 5800 | BSAV-agg-vw-this-asset-count | 3 | 130 |
| 5810 | BSAV-PCT-VIEWING-THIS-ASSET | 37 | 16 |

FIG. 28-A

| | 6002 | 6004 | 6006 | 6008 |
|---|---|---|---|---|
| | NAME | TYPE | SIZE | DESCRIPTION |
| 6010 | BSAV-MARKET | Char | 4 | See corresponding field in FIG 27-A |
| 6020 | BSAV-SERVICE-GROUP | Char | 6 | See corresponding field in FIG 27-A |
| 6030 | BSAV-HUB | Char | 4 | See corresponding field in FIG 27-A |
| 6040 | BSAV-HEADEND | Char | 4 | See corresponding field in FIG 27-A |
| 6050 | BSAV-CHANNEL-CALL-SIGN | Char | 6 | See corresponding field in FIG 27-A |
| 6060 | BSAV-CHANNEL-SOURCE-ID | Char | 5 | See corresponding field in FIG 27-A |
| 6070 | BSAV-VIDEO-ASSET-ID | Char | 12 | See corresponding field in FIG 27-A |
| 6080 | BSAV-ASSET-DELIV-INST-ID | Char | 10 | See corresponding field in FIG 27-A |
| 6090 | BSAV-TARGETED-AD-FLAG | Char | 1 | See corresponding field in FIG 27-A |
| 6100 | BSAV-VIDEO-ASSET-NAME | Char | 20 | See corresponding field in FIG 27-A |
| 6110 | BSAV-AD-DURATION-IN-SECONDS | Number | 5 | See corresponding field in FIG 27-A |
| 6120 | BSAV-asset-second | Number | 5 | See corresponding field in FIG 27-A |
| 6130 | BSAV-AD-PLAY-DATE | Char | 10 | See corresponding field in FIG 27-A |
| 6140 | BSAV-AD-PLAY-TIME-BEG | Char | 11 | See corresponding field in FIG 27-A |
| 6150 | BSAV-AD-PLAY-BEG-SEC-OF-DAY | Number | 5 | See corresponding field in FIG 27-A |
| 6160 | BSAV-AD-PLAY-TIME-END | Char | 11 | See corresponding field in FIG 27-A |
| 6170 | BSAV-AD-PLAY-END-SEC-OF-DAY | Number | 5 | See corresponding field in FIG 27-A |
| 6180 | BSAV-viewed-this-asset-count | Number | 5 | See corresponding field in FIG 27-A |
| 6190 | BSAV-viewed-any-asset-count | Number | 5 | See corresponding field in FIG 27-A |
| 6200 | BSAV-agg-vw-this-asset-count | Number | 7 | See corresponding field in FIG 27-A |
| 6210 | BSAV-PCT-VIEWING-THIS-ASSET | Number | 3 | See corresponding field in FIG 27-A |

Note: BSAV prefix is for By Second Asset View

FIG. 28-B

| | 6002 NAME | 6005 TYPE | 6007 SIZE |
|---|---|---|---|
| 6010 | BSAV-MARKET | DENV | DENV |
| 6020 | BSAV-SERVICE-GROUP | SG01 | SG01 |
| 6030 | BSAV-HUB | HUB1 | HUB1 |
| 6040 | BSAV-HEADEND | HE1 | HE1 |
| 6050 | BSAV-CHANNEL-CALL-SIGN | Ch-A | Ch-A |
| 6060 | BSAV-CHANNEL-SOURCE-ID | 205 | 205 |
| 6070 | BSAV-VIDEO-ASSET-ID | AD-35 | AD-35 |
| 6080 | BSAV-ASSET-DELIV-INST-ID | AD-35-DI-0 | AD-35-DI-0 |
| 6090 | BSAV-TARGETED-AD-FLAG | N | N |
| 6100 | BSAV-VIDEO-ASSET-NAME | Boots | Boots |
| 6110 | BSAV-AD-DURATION-IN-SECONDS | 60 | 60 |
| 6120 | BSAV-asset-second | 61201 | 61260 |
| 6130 | BSAV-AD-PLAY-DATE | 9/1/2010 | 9/1/2010 |
| 6140 | BSAV-AD-PLAY-TIME-BEG | 5:00:00 PM | 5:00:00 PM |
| 6150 | BSAV-AD-PLAY-BEG-SEC-OF-DAY | 61201 | 61201 |
| 6160 | BSAV-AD-PLAY-TIME-END | 5:00:59 PM | 5:00:59 PM |
| 6170 | BSAV-AD-PLAY-END-SEC-OF-DAY | 61260 | 61260 |
| 6180 | BSAV-viewed-this-asset-count | 2 | 2 |
| 6190 | BSAV-viewed-any-asset-count | 11 | 9 |
| 6200 | BSAV-agg-vw-this-asset-count | 2 | 120 |
| 6210 | BSAV-PCT-VIEWING-THIS-ASSET | 18 | 22 |

Note: BSAV prefix is for By Second Asset View

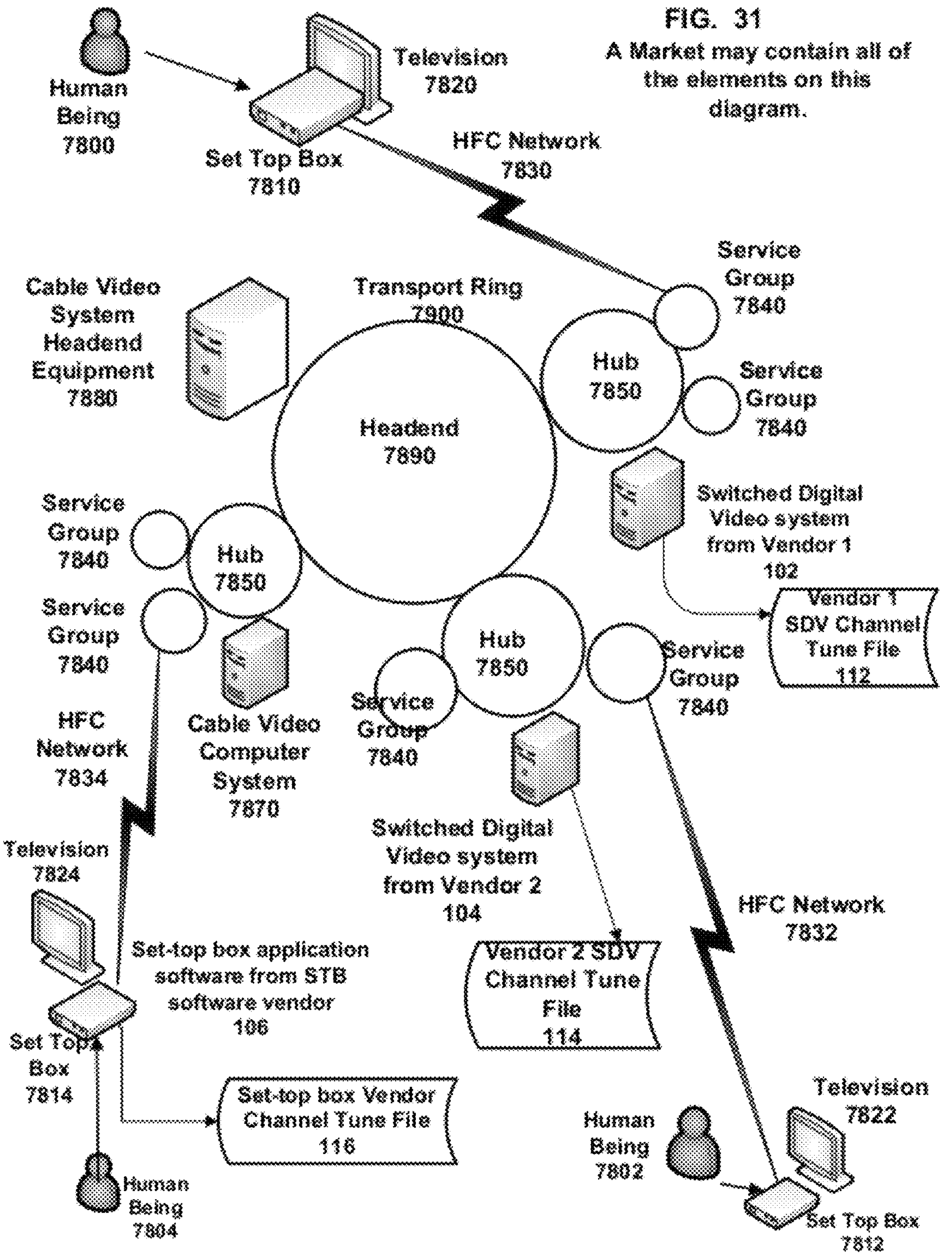
FIG. 31
A Market may contain all of the elements on this diagram.
Human Being 7800
Television 7820
Set Top Box 7810
HFC Network 7830
Service Group 7840
Cable Video System Headend Equipment 7880
Transport Ring 7900
Hub 7850
Service Group 7840
Headend 7890
Switched Digital Video system from Vendor 1 102
Service Group 7840
Hub 7850
Vendor 1 SDV Channel Tune File 112
Service Group 7840
Hub 7850
Service Group 7840
Service Group 7840
HFC Network 7834
Cable Video Computer System 7870
Switched Digital Video system from Vendor 2 104
HFC Network 7832
Television 7824
Set-top box application software from STB software vendor 106
Vendor 2 SDV Channel Tune File 114
Set Top Box 7814
Set-top box Vendor Channel Tune File 116
Human Being 7804
Human Being 7802
Television 7822
Set Top Box 7812

SYSTEM AND METHOD FOR MEASURING TELEVISION ADVERTISING AND PROGRAM VIEWING AT A SECOND-BY-SECOND LEVEL AND FOR MEASURING EFFECTIVENESS OF TARGETED ADVERTISING

CROSS-REFERENCE TO RELATED APPLICATIONS

This application is related to the co-pending application U.S. application Ser. No. 12/981,301 filed on Dec. 29, 2010 entitled "SYSTEM AND METHOD FOR ANALYZING HUMAN INTERACTION WITH ELECTRONIC DEVICES THAT ACCESS A COMPUTER SYSTEM THROUGH A NETWORK" by the present inventor which is incorporated in its entirety but is not admitted to be prior art.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

PROGRAM LISTING

This patent submission contains seven (7) program listings as shown in the table below. Each of the following program listings is incorporated in this Specification by reference.

| | Name of the ASCII Text file | Date of Creation | Size in bytes |
|---|---|---|---|
| 1. | 122-Preprocess-Channel-Tune-File.txt | Feb. 7, 2011 | 28,366 |
| 2. | 132-SORT-FOR-STB-Chan.txt | Feb. 7, 2011 | 3,509 |
| 3. | 172-PREPROCESS-ASSET-PLAY-SCHED.txt | Feb. 6, 2011 | 37,831 |
| 4. | 176-ASSET-PLAY-SCHEDULE-SORT.txt | Feb. 6, 2011 | 5,704 |
| 5. | 182-Preprocess-Targeted-Ad.txt | Feb. 6, 2011 | 21,734 |
| 6. | 186-SORT-TARGETED-AD.txt | Feb. 6, 2011 | 3,111 |
| 7. | 142-Viewing-Analytics-Engine.txt | Mar. 18, 2011 | 144,374 |

Note: Variable names used in programs correspond to specification, but may not match exactly.

BACKGROUND

Prior Art

The following is a tabulation of some prior art that presently appears relevant:

U.S. Patents

| Pat. No. | Class | Issue Date | Patentee |
|---|---|---|---|
| 7,383,243 | 725/2 | Jun. 3, 2008 | Conkwright, et al. |
| 7,590,993 | 725/35 | Sep. 15, 2009 | Hendricks , et al. |

U.S. Patent Application Publications

| Publication Number | Kind Code | Class | Publication Date | Applicant |
|---|---|---|---|---|
| 2007/0074258 | A1 | 725/105 | Mar. 29, 2007 | Wood; Catherine Alexandra |
| 2010/0145791 | A1 | 705/14.41 | Jun. 10, 2010 | Canning; Brian P. |
| 2006/0168609 | A1 | 725/9 | Jul. 27, 2006 | Chen; Michael A. |

Nonpatent Literature Documents

Rentrak Corporation website
Rentrak Corporation, 7700 NE Ambassador Place, Portland, Oreg. 97220
"TV Essentials™"
Media Post, Wayne Friedman, Jan. 27, 2010
Rentrak's 'Stickiness' Mines TV Value On Granular Level

BACKGROUND INFORMATION

General Statement of Problem

With the ever increasing number of consumer choices for television viewing, it is important for advertisers, content producers, and service providers such as cable television and satellite television companies to be able to accurately measure audience viewership. Traditional methods of measuring television viewership do not accurately measure lightly viewed channels. Traditional methods of measuring television viewership do not provide second-by-second viewing information which could be extremely helpful to advertisers, content producers, and content providers.

Advertising Industry Problem

Producing television ads and purchasing ad time to run those ads is expensive. Ideally, the advertising purchased with those dollars can be correlated with ad impressions. Unfortunately, measuring ad impressions or ad viewership is very difficult, especially when there are hundreds of channels and many of them are lightly viewed. The problem is magnified by channel-surfing. While traditional survey techniques provide audience measures for popular channels, they are inadequate for lightly-viewed channels, which can be up to 80% of the channels. In today's competitive media environment, television advertisers need accurate and detailed viewing information for ALL channels so that they can measure the effectiveness of their advertising.

As to targeting advertisements, it is well recognized that content providers can charge advertisers a premium for delivering targeted ads. Advertisers work diligently to deliver ads to the viewers that most likely are interested in the product. With presently available technology, advertisers are able to target ads to particular set-top boxes. Advertisers need to determine whether the extra cost of targeting results in more viewing seconds for targeted ads when compared with non-targeted ads. Advertisers need to be able to measure actual viewing time because it is the first and most immediate result of effective targeting; when the targeted ad is not viewed or only partially viewed, that is a very clear indicator that the targeting has failed in some manner. Correlating actual purchases with ad viewing is very difficult and does not provide the immediate feedback that is available by properly analyzing set-top box viewing activity. While there are numerous patents and patent applications which teach about targeted advertising, I do not find any that focus on measuring the effectiveness of targeted advertising.

Content Producers Problem

Producing television content is often expensive. It is difficult for the content producers to get accurate audience feedback. Additionally, there is not one audience, but many audiences, because of the wide variety of viewer interests. The content producers need to tailor the content to the audience. Traditional measurement tools do not provide the detailed information needed to help producers and writers to understand how viewers are responding to the content. The result is that producers may develop content that lacks interest to the audience. This is wasteful.

Cable Television Industry Problem

In the cable television industry, content providers offer consumers hundreds of channels. Cable television companies pay very large amounts of money for content. It is imperative for the cable television companies to be able to accurately measure audience viewership in order to understand what value the various programs bring to their customers. Also, by understanding the time of day when various programs are viewed, the cable television companies can create more attractive viewing schedules for their customers. Additionally, as cable television companies are able to accurately measure audience viewership, they will be able to better negotiate with the program providers on the price to be paid for programming content and with advertisers on the price to charge for airing advertising.

Satellite Television Industry Problem

The satellite television industry faces the same problems as the cable television industry in regard to understanding what programming the viewers are watching and at what time of day. In general they have the same need to understand viewer behavior as do the cable television companies.

Need for Information about the Customer

In addition to these issues, cable television companies, satellite television companies, television content providers, television advertisers, and other interested parties are continually desiring to know more about the customers they serve, the patterns of customer interactions, the content customers find interesting or that keeps their attention, the ads they view, the time of day when various program are viewed, how programs compare with one another in keeping viewer interest, and numerous other measures. With the advent of portable video viewing devices, the need to understand viewer behavior is even more important.

Fortunately, currently available technology enables the collection of raw data that, with proper analysis, can begin to answer many of these questions, and even do so with great specificity. We will now look at some sources of raw data in the television industry.

Channel Change Data Sources

Switched Digital Video as a Data Source

In my prior United States patent application having application Ser. No. 12/981,301 filed on Dec. 29, 2010, I reviewed switched digital video systems as a data source. In that application I noted that switched digital video channel change data is readily available under current technology. I provided information about two vendors that supply switched digital video systems, namely Motorola and CISCO.

A benefit of SDV systems is that individual set-top box channel change data is collected on the SDV servers as part of normal system operation without any additional actions on the part of the viewer.

One vendor produces channel change data containing fields similar to this (hereinafter SDV Vendor 1 Format):

a. Set-top box identifier (optionally scrambled to protect viewer identity)
b. Tuner index (to identifier the tuner in the STB)
c. Market identifier
d. Headend identifier
e. Hub identifier
f. Service Group identifier
g. Tune-in date and time to the second
h. Tune-out date and time to the second
i. Channel name
j. Channel call sign (acronym for the channel)
k. Channel source id (numeric identifier of the channel)
l. Bit rate (the megabits per second required to deliver the channel)
m. Program type (SDV or Broadcast)
n. High definition or standard definition flag Note 1: The data file is typically created daily. Business rules are applied if the tune-in and tune-out events occur on different days.

The other SDV vendor produces channel change data containing fields similar to this (hereinafter SDV Vendor 2 Format):

a. Market
b. Service Group
c. Set-top box identifier (optionally scrambled to protect viewer identity)
d. Tuner index
e. Date
f. Time to the second
g. Event code (tune-in or tune-out)
h. Channel source id—the number of the channel as known to the SDV system.

Note: The data file is typically created daily. Business rules are applied if the tune-in and tune-out events occur on different days.

Those with ordinary skill in the art will recognize that SDV Vendor 2 Format can be transformed into a format similar to SDV Vendor 1 Format by combining the tune-in record and the tune-out record into a single record containing both tune-in date-time and tune-out date-time. This is done by sorting the file in order by Market, Service Group, Set-top box identifier, Tuner index, Date, and Time and then matching each tune-out record to the previous tune-in record using Event code to identify tune-in and tune-out actions. They will also recognize that by adding a lookup table to the process they can enhance the Market+Service group information to also include Hub and Headend. They will also recognize that by adding a second lookup table to the process they can enhance the channel information to also include Channel Name, Channel Call Sign, Bit Rate, Program Type, and High definition or standard definition flag. Enhancing the tuning data with these additional fields allows us to produce valuable analytics regarding audience viewing behavior.

The vendor may generate a tune-out event in the data file when the user turns off the power.

Note: For both file formats, even with some variations in the file format, this data can still be used to achieve the objective of measuring viewership.

Set-Top Box Data as a Data Source

As a third alternative, the channel change data can be captured by the set-top box itself.

Set-top box tuning information is widely available for measuring audience viewing habits. I reviewed this in more detail in my prior United States patent application having application Ser. No. 12/981,301 filed on Dec. 29, 2010.

In the case of set-top box data capture, the cable operators have ready access to this data as it is captured on the set-top box by the STB software. The data can then be transferred to central systems at the cable company for analysis. Similarly, satellite broadcasters have access to such data.

A set-top box software application may produce channel change data containing fields similar to this:

a. Set-top box identifier (optionally scrambled to protect viewer identity)
b. Tuner index (to identifier the tuner in the STB)
c. Time in seconds since some historic date
d. Channel call sign
e. Channel source id Those with ordinary skill in the art will recognize that this file format can be transformed into a format similar to SDV Vendor 1 Format by combining data from consecutive channel tune records into a single record containing both tune-in date-time and tune-out date-time. This is done by sorting the file in order by Set-top box identifier, Tuner index, and Time and then using the Time from the next record (minus 1 second) as the tune-out time of the current record. The result is that the tune-in time comes from the current record and the tune-out time comes from the next record. They will also recognize that it is a simple task to convert the time represented in seconds since some historic date to the current date and time in YYYY-MM-DD HH:MM:SS AM/PM format. They will also recognize that by adding a lookup table to the process they can use the Set-top box identifier to look up the values for Market, Headend, Hub, and Service Group. They will also recognize that by adding a second lookup table to the process they can enhance the channel information to also include Channel Name, High Definition or Standard Definition, Bit Rate, and Program Type.

The vendor may generate a tune-out event in the data file when the user turns off the power.

The vendor may also provide the tune-out time in the data file.

Note that current data collection methods support granularity of tuning data down to the second level.

Note: Even with some variation in the file format, this data can still be used to achieve the objective of measuring viewing time.

IPTV Data as a Data Source

In the case of Internet protocol television (IPTV) or portable (handheld) video viewing devices, content viewing activity can be captured at the device level and transmitted to the IPTV provider. Such data may include a device identifier, a web site or internet protocol address that provided the video content, a video asset identifier, viewing start time, and viewing end time, Video Asset Schedule Data Sources Cable television providers and satellite television providers keep accurate scheduling information in order to support their business operations. These systems track the time when programs and advertisements are aired. Programs and advertisements can be labeled with the more general term of video asset. These systems track numerous details about the video assets. Such details typically include:

a. The geographic area in which the video asset aired
b. The channel on which the video asset aired
c. The date and time when the video asset aired
d. The duration of the video asset
e. Various attributes about the video asset such as the video asset identifier, the product type, the video asset name, the producer name, the agency name, the script writer, the featured actor, the actor celebrity status, the featured voice, the product category, the language, the informational content code, the delivery format, the audio track code, the audience suitability rating, and perhaps an episode identifier.
f. For an advertisement, whether or not the ad was a targeted ad and in the case of a targeted ad, how many set-top boxes were targeted and perhaps demographic information about the viewer to whom the content was targeted.

Note: In this specification the functionality that is revealed for tracking viewership for advertisements is equally applicable to tracking viewership for longer programs. From a technical viewpoint, a 30 minute program or a 2 hour program is treated the same way as a 30 second ad. While the usage of the resulting data may vary, the methods applied to get the results are very similar. Thus in this specification, one can readily include Program wherever the term Ad is used. The term Video Asset is the more generic term that includes any video content, ad or program.

Advanced Advertising Ad Play Schedule Sources

Advanced Advertising systems typically have the objective of delivering targeted content to specific set-top boxes. Targeted content can be an advertisement or ad or commercial, the terms are used interchangeably. Targeted content can also be a movie or other video asset. With the multitude of video choices it is easy to envision systems which assist the viewer by targeting content to them where such content includes movies or documentaries or sporting events.

Advanced Advertising systems, as part of the normal operation, know the set-top box to which they are targeting specific content, the date and time of when they targeted the set-top box with the content, and numerous details about the content. When an Advanced Advertising system targets specific content to one or more set-top boxes, it does this based on rules engines which have been developed. These rules are typically based on demographics, viewing patterns, and relevant information.

For my purpose, it is sufficient to know that the Advanced Advertising systems are able to track the set-top box to which the content was targeted, the date and time of when the targeted content was aired, the channel that was playing, various details about the content, including a video asset identifier, and potentially some demographic information about the viewer to whom the content was directed. Such demographics may include the following:

a. A demographic group
b. The inferred race of the viewer
c. The inferred gender
d. The inferred age group
e. The inferred income bracket
f. The inferred marital status
g. The set-top box zip code
h. The cable/satellite company subscriber type
i. The cable/satellite company subscriber package level
j. A marketing area code.

When targeted content is delivered, it is being substituted for non-targeted content that is playing during that same program at the same time. By way of example, of all the viewers tuned to a certain sporting event, perhaps a first part of them will be targeted with a financial services commercial, a second part of them will be targeted with a sports car commercial, and the remainder will be shown whatever ad was normally set to play during that 30 second spot. At the end of the 30 seconds, all of them return to whatever program they were viewing immediately before the ad, in this case, the sporting event.

File Transfer to Receive the Data

In the case of channel change data, those with ordinary skill in the art would know how to capture channel change files or tuning data from various source systems and make them available to an analysis engine by reading them from the SDV system and transferring them to the data analysis computer using tools such as secure file transfer protocol. Other methods for receiving channel change data may be used such as Extensible Markup Language (XML) messages or any other computer readable format.

Encryption may be applied for data security purposes. Compression may be applied to reduce data transfer volumes.

In the case of video asset schedule data, those with ordinary skill in the art would know how to capture such data and make it available to an analysis engine using tools such as secure file transfer protocol. Other methods for receiving video asset schedule data may be used such as Extensible Markup Language (XML) messages or any other computer readable format.

In the case of targeted content delivery data, those with ordinary skill in the art would know how to capture such data and make it available to an analysis engine using tools such as secure file transfer protocol. Other methods for receiving targeted content delivery data may be used such as Extensible Markup Language (XML) messages or any other computer readable format.

Summary on Data Sources

For channel change data, SDV systems capture channel change data in order to support the basic function of providing Switched Digital Video. SDV channel change data is particularly useful because it includes all channel changes, both of broadcast channels and of switched channels.

As an alternative, the channel change data can be captured by the set-top box itself.

For both cases, the STB activity (both SDV and non-SDV) is collected without the viewer needing to take any special action. This avoids problems of non-response bias and respondent fatigue. STB data provides very large measurement samples. STB data provides the ability to gather data from many geographic areas. STB data can be augmented with demographic data. STB data can be augmented with program attribute data. Once the channel tune data is processed into a standardized format, the Viewing Analytics Engine 142 can produce metrics using the data—it does not matter whether the data is from an SDV system or from a STB application.

For program schedule data, providers capture this data as part of normal operations. This data is readily available.

For targeted content delivery data, advanced advertising systems have this data as part of normal operations. This data is readily available.

Similarly, for internet protocol television (IPTV) and portable video viewing devices, viewing activity can be readily captured for analysis.

Existing Tools for Data Analysis

We have seen by way of background that channel change data, program schedule data, and targeted content data is readily available. Regarding tools for using this data to analyze detailed viewing patterns, I am not aware of any vendor solutions that use channel tuning data or electronic device usage data to identify second-by-second channel viewing activity showing whether or not the set-top box (electronic device) was tuned to the channel during each second of a period of interest and then correlating that channel viewing activity with video asset schedule data and/or program attribute data and/or targeted content delivery data and/or demographic data and then using the correlated data to produce viewing metrics.

Additionally, I am not aware of any patents that use channel tuning data or electronic device usage data to identify second-by-second channel viewing activity showing whether or not the set-top box (electronic device) was tuned to the channel during each second of a period of interest and then correlating that channel viewing activity with video asset schedule data and/or program attribute data and/or targeted content delivery data and/or demographic data and then using the correlated data to produce viewing metrics.

In my research I have identified several patents or patent applications that appear to be mildly relevant; however, neither the patents nor the patent applications listed below provide any teaching on how to do second-by-second analysis of set-top box channel tuning data or electronic device usage data to actually measure program viewing. Neither do they suggest using such data to identify second-by-second channel viewing activity showing whether or not the set-top box (electronic device) was tuned to the channel during each second of a period of interest. They do not approach the level of detailed analytics that I teach in the present application.

In my research I found that the importance of targeting the right message to the right audience is well recognized. What I did not see is any teaching on how to use set-top box channel tuning data or electronic device usage data to measure second-by-second channel viewing.

Vendor Solutions

Rentrak Corporation, 7700 NE Ambassador Place, Portland, Oreg. 97220 provides a product under the name "TV Essentials™".

The product description is:

TV Essentials™ is comprehensive suite of research tools that calculates anonymous, second-by-second audience viewing patterns in all facets of television programming and advertising including VOD, DVR, interactive and linear television. By providing transaction-level performance metrics from millions of set-top boxes, TV Essentials provides exclusive insight into programming effectiveness, enabling networks and network operators to optimize their TV advertising inventory. Architected to handle data from the nation's 114.5 million television households, the system can isolate individual market, network, series, or telecast performance, administer national and local estimates, and provide an evaluation of influencing factors such as psychographics and demographics for competitive, in-depth intelligence not accessible anywhere else.

The Rentrak solution is briefly described by Wayne Friedman writing in MediaPost on Jan. 27, 2010 in an article entitled "Rentrak's 'Stickiness' Mines TV Value On Granular Level".

In this article, Wayne Friedman quotes Bruce Goerlich who is the "chief research officer of Rentrak, who devised the measuring service last fall" where Bruce Goerlich states:

"That's what 'stickiness' is: It's the percent of a program watched on an index basis."

Wayne Friedman also writes:

Rentrak's "Stickiness Index" measures stickiness on a second-by-second basis. The index, which is part of its TV Essentials products, is the average percent of a program viewed, divided by the average percentage viewed for all programs of that duration: 30 minutes, 60 minutes or 120 minutes. "It's down into a very granular level," says Goerlich.

Based on the above description by Rentrak's Bruce Goerlich, I believe that Rentrak is most likely using the tune-in time and the tune duration for each channel tuning activity and then aggregating that duration and mapping it against program data. In this way perhaps they are adding up all of the tuning durations against a program down to the one-second level to get a total of viewing time for the program and then comparing that to the program duration. It does not appear based on Mr. Goerlich's description that Rentrak is populating an array with second by second activity indicating that the set-top box is or is not tuned to the channel and then adding up the number of seconds that the set-top box is tuned to the channel as I teach in this application. Thus I believe that my method of measuring viewing activity is very different than the method used by Rentrak.

Relevant Patents

I will now review those patents and patent applications that are mildly relevant.

Conkwright, et al. in U.S. Pat. No. 7,383,243 issued Jun. 3, 2008 teaches about collecting set-top box data for the purpose of predicting what consumers will do, not for the purpose of understanding actual viewer behavior. It appears that he does not teach the loading of a data structure containing buckets representing individual units of time during a window of time of interest for analysis. He does not teach how to do second-by-second analysis of set-top box channel tuning data to actually measure program viewing.

Hendricks, et al. in U.S. Pat. No. 7,590,993 issued Sep. 15, 2009 teaches about gathering programs watched data at the set-top box. It appears that he is only gathering somewhat general information about what programs are watched by the set-top box. He does not teach the loading of a data structure containing buckets representing individual units of time during a window of time of interest for analysis. He does not teach how to do second-by-second analysis of set-top box channel tuning data to actually measure program viewing.

Relevant Patent Applications

Wood; Catherine Alexandra in U.S. Patent Application 20070074258 dated Mar. 29, 2007 teaches about collecting subscriber activity data, such as channel changes generated by the subscriber while watching video or TV in an IPTV system. It appears that she does not teach the loading of a data structure containing buckets representing individual units of time during a window of time of interest for analysis. It appears instead that she teaches loading the channel tuning data to a relational data base and then performing various SQL based queries against that data base. She does not teach how to do second-by-second analysis of set-top box channel tuning data to actually measure program viewing.

Canning; Brian P.; et al. in U.S. Patent Application 20100145791 dated Jun. 10, 2010 teaches about using an ad viewing table that contains basic facts about a program viewing event (e.g., viewing start time, household ID, and DSTB ID, ad airing ID, viewing duration, jump-in second, and number of stay away seconds). He also teaches that the viewing start field can be calculated as a number of seconds and that viewing start and jump-in second data can be used to calculate the ad airing start; he does not explain how this is done. His claims have to do with storing data in shards.

Canning does not teach how to do second-by-second analysis of set-top box channel tuning data to actually measure program viewing. He merely describes in general terms about identifying the Set-top box, viewing start time, viewing duration, and channel and then using those to compare to the program information to determine general viewing information. He does not provide a detailed description of how he does this, but he does teach to compare the time spans of the DSTB viewing versus the playing time of an ad airing (paragraph 0138). It appears that his entire focus is on teaching how to store data in shards which appear to be relational data base tables which can then be queried using SQL. He does not teach how to do second-by-second analysis of set-top box channel tuning data to actually measure program viewing.

Chen; Michael A. in U.S. Patent Application 20060168609 dated Jul. 27, 2006 teaches to compare the viewing data with reference data which includes a list of programs available on each channel during given times. He teaches that by comparing the tuned channels, i.e., the channels to which the television is tuned, to the programs available on those channels at the time, the ratings provider can determine the programs viewed by household members. He teaches that this viewing data collection method is performed on a sampled cross-section of households in a viewing area. He teaches that the ratings provider uses the viewing data from the sampled households to determine program ratings; the sampled households are a subset of all households in the viewing area. He teaches that the sampled households are chosen using methodological standards such that the subset represents the viewing behavior of all households in the viewing area. He teaches that typically, the sampled households have agreed to allow collection and use of their private viewing information.

Thus we see that he is using only a small subset of available households. Further he is merely comparing the tuning data to the programs available. He is not measuring second-by-second viewing by all the set-top boxes in a geographic area nor is he measuring all of the activity on each channel. He does not teach how to do second-by-second analysis of set-top box channel tuning data to actually measure program viewing.

Advantages

By correlating multiple data sets including (a) Second-by-second channel viewing activity derived from set-top box Channel Tuning data, (b) Video Asset Schedule data, (c) Program Attribute data, (d) Targeted Content Delivery data, and (e) Demographic data, and then using this correlated data to produce metrics regarding the interactions of the human beings with the set-top boxes and/or or Internet protocol television devices I have been able to provided detailed metrics that could not be produced previously. Existing analysis techniques simply do not allow the creation of the detailed metrics which I have been able to produce.

In my co-pending United States patent application having application Ser. No. 12/981,301 filed on Dec. 29, 2010, I taught populating a Data Structure with identifying information and device usage information such as channel tuning data to create a foundation upon which a comprehensive set of metrics can be produced. I also taught loading the tuning data on a second-by-second basis into buckets in a data structure for analytics. In this embodiment I use that concept to populate a Viewing Detail Data Structure containing the details of set-top box tuning activity.

In this embodiment I introduce the Viewing Result Data Structure which is a new data structure that I use to record detailed information about video asset viewing. I also introduce targeted content information.

By combining the teaching of my co-pending patent application with the teachings of this application on correlating these multiple data sets, I am able to produce detailed metrics based on a one-second level of granularity.

After populating both the Viewing Detail Data Structure and the Viewing Result Data Structure I can then run complex analytics against them to produce a very a comprehensive set of metrics on program viewing. The metrics can then be output as (i) a data file that can be read by a computer program, (ii) a data base table, (iii) an electronic message, or (iv) a spreadsheet.

A person skilled in the art will readily see the benefits of loading the resulting metrics to a relational data base where additional queries and analytics can be run using standard SQL. As a nonlimiting example, metrics calculated by the Viewing Analytics Engine 142 can be loaded to a data base in support of longer term analysis.

The Viewing Analytics Engine 142 presented in this embodiment provides the ability to produce metrics with a level of detail not possible previously. A sampling of the metrics produced by the Viewing Analytics Engine 142 in the context of cable television is presented next:

Targeted Advertising Metrics

Counts of viewers who viewed a targeted ad (a) from beginning to end, (b) from beginning to middle, and (c) both beginning and end, but not all of the middle.

Aggregate viewing seconds of viewers who viewed a targeted ad (a) from beginning to end, (b) from beginning to middle, and (c) both beginning and end, but not all of the middle.

Non-Targeted Advertising Metrics

Counts of viewers who viewed a non-targeted ad (a) from beginning to end, (b) from beginning to middle, and (c) both beginning and end, but not all of the middle.

Aggregate viewing seconds of viewers who viewed a non-targeted ad (a) from beginning to end, (b) from beginning to middle, and (c) both beginning and end, but not all of the middle.

Comparison of Targeted and Non-Targeted Advertising Metrics

Comparison of viewing seconds earned by targeted vs. non-targeted ads to determine whether the targeted ad actually had better viewership compared to the non-targeted ad.

Program Attributes of Both Targeted and Non-Targeted Advertising Metrics

Metrics which show viewing behavior based on attributes of the program being measured, whether targeted or non-targeted. Such attributes may include video asset identifier, the product type, the video asset name, the producer name, the agency name, the script writer, etc.

Percent of Viewing Audience

Percent of Viewing Audience identifies on a second-by-second level the number of viewers for this video asset compared to other video assets playing at the same time.

Summary of Metrics Produced

The metrics listed above are representative of those which can be produced by the Viewing Analytics Engine 142 in one embodiment. Many additional metrics could be produced once the data is loaded to the Data Structures. It is the extensive processing done by the Viewing Analytics Engine 142 which turns the correlated data sets into valuable information.

The metrics shown above all provide information useful for understanding human behavior; understanding how viewers interact with video programming on traditional television and internet protocol television; and understanding ad and program viewing habits. Such metrics will provide valuable information for advertisers, service providers (cable television companies, satellite television companies, and/or internet protocol television providers), advertising agencies, and other interested parties.

These and other advantages of one or more aspects will become apparent from a consideration of the ensuing description and accompanying drawings.

Data Encryption

To protect the privacy of the viewer and/or to comply with various laws and/or regulations, service providers (cable television companies, satellite television companies, and/or internet protocol television providers), and Targeted Ad Delivery System providers may anonymize and/or encrypt any data that could identify a specific customer or viewer.

Within the various embodiments presented herein, applying consistent encryption algorithms to the various set-top box identifiers in the data sources allows the Viewing Analytics Engine 142 to correlate the data. For example, applying the same encryption algorithms to the set-top box identifier in the Channel tuning file and the set-top box identifier in the Targeted Ad File allows the Viewing Analytics Engine 142 to correlate the data from these two sources.

In like manner, if the encryption algorithms are consistently applied over an extended period of time, this allows longitudinal analysis of the data while protecting the privacy of the viewer. In this case, the systems would need to apply consistent encryption algorithms to the various set-top box identifiers in the data sources to allow the Viewing Analytics Engine 142 to correlate the data. For example, applying the same encryption algorithms to the set-top box identifier in the Channel tuning file and the set-top box identifier in the Targeted Ad File allows the Viewing Analytics Engine 142 to correlate the data from these two sources over a period of weeks or months or longer.

Also in like manner, the identifier of an internet protocol television or other electronic device can be protected by encryption. This would enable us to produce similar metrics for internet protocol television as for traditional television viewing.

SUMMARY

In accordance with one embodiment, I disclose a computer-implemented method, executed on a data analysis computer system, of correlating multiple data sets including (a) Second-by-second channel viewing activity derived from set-top box Channel Tuning data, (b) Video Asset Schedule data, (c) Program Attribute data, (d) Targeted Content Delivery data, and (e) Demographic data, and then using this correlated data to produce metrics regarding a plurality of human interactions by a plurality of human beings with a plurality of set-top boxes or internet protocol television devices, each interacting with a computer system accessed through a network with the result of being able to (a) provide insight into the viewing habits of the human beings as they interact with the set-top box or internet protocol television devices, (b) provide insight into the set-top box or internet protocol television device usage patterns, (c) provide insight into the behavior of the human operators, (d) provide insight into the viewer response to content that was targeted to them, (e) provide second-by-second viewing metrics for advertisements and programs, and (f) compare individual program viewing counts with aggregate viewing counts at each second of the day. All of this can be done while maintaining viewer privacy.

DEFINITIONS

The following are definitions that will aid in understanding one or more of the embodiments presented herein:

Activity occurring on set-top box means any interaction or activity that may happen as a result of any aspect of a human interaction with a set-top box. Nonlimiting examples include:

(i) tuning activity on a set-top box, (ii) viewing a television program, (iii) recording video content,
(iv) playing back recorded video content,
(v) using trick plays such as fast forward, rewind, pause,
(vi) invoking a menu, choosing a menu option,
(vii) responding to a screen prompt,
(viii) power on/power off.

Buckets means individual cells in a Data Structure. Nonlimiting examples include:
(i) addressable fields in a table in a COBOL program,
(ii) addressable fields in an array or similar structures in a 'C' program or a C++ program,
(iii) cells in a spreadsheet.

Cable Television System Equipment Identifier means any field or combination of fields that can be used to identify the computer hardware being used to provide service to a set-top box in a cable television system.

Channel tuning data means any data that captures any aspect of viewer interaction with a set-top box being used to view and/or record video assets, along with supporting information. One of the uses of channel tuning data is to identify content viewed and the times the content was viewed by the set-top box. Nonlimiting examples include:
(i) tuning activity on a set-top box,
(ii) recording video content,
(iii) playing back recorded video content,
(iv) using trick plays such as fast forward, rewind, pause, etc.
(v) invoking a menu, choosing a menu option,
(vi) any response to a screen prompt,
(vii) power on/power off.

Supporting information includes but is not limited to set-top box information, channel information, geographic area, and information about the computer or cable television system that serves the set-top box.

Channel tuning events means any identifiable activity that a set-top box operator may do in regard to a set-top box and where such activity can be captured by the set-top box. Nonlimiting examples include:
(i) power on/power off,
(ii) channel up/channel down/channel selection,
(iii) volume up/volume down/mute/unmute,
(iv) any trick play such as fast forward, rewind,
(v) recording video content,
(vi) playing back recorded video content,
(vii) invoking a menu, choosing a menu option,
(viii) any response to a screen prompt.

Channel viewing activity means information derived from the channel tuning data which shows on a second-by-second basis whether or not the set-top box was tuned to the thing of interest for analysis identified in the Viewing Detail Data Structure during each second of a period of interest. As a nonlimiting example, this would typically identify whether or not the set-top box was tuned to the channel during each second of time that an associated commercial was aired.

COBOL is the acronym of a business oriented computing language.

Comparison of viewing metrics means any output which can be used to measure one result against another result. Nonlimiting examples include: comparing the number of viewing seconds earned by an ad featuring actor Smith with the number of viewing seconds earned by an ad featuring actor Jones; comparing the number of viewing seconds earned by an ad featuring a male voice with the number of viewing seconds earned by an ad featuring a female voice.

Computer readable format means any method of presenting data to a data analysis computer system. Nonlimiting examples include:
(i) formatted text files,
(ii) pipe delimited text files,
(iii) data base tables,
(iv) Extensible Markup Language (XML) messages.

Computer system accessed through a network means any computer system, any individual piece of computer equipment or electronic gear, or any combination of computer equipment or electronic gear which enables or facilitates the human interaction with the electronic device. Nonlimiting examples include:
(i) cable television system,
(ii) cable television switched digital video system,
(iii) cellular phone network,
(iv) satellite television system,
(v) web server,
(vi) any individual piece of computer equipment or electronic gear,
(vii) any combination of computer equipment or electronic gear.

Content viewing activity means information derived from the electronic device usage data which shows on a second-by-second basis whether or not the electronic device was viewing the content during each second of a period of interest.

Data analysis computer system means a combination of one or more computers on which a Data Analysis Program or Programs can be executed.

Data analysis computer of known type means any commonly available computer system running a commonly known operating system. Nonlimiting examples include:
(i) a standard personal computer running WINDOWS® XP operating system from MICROSOFT® Corporation,
(ii) a computer running the UNIX operating system,
(iii) a computer running the Linux operating system,
(iv) a computer in a cloud computing environment,
(v) a set-top box with its operating system,
(vi) A mainframe computer with its operating system.

Data analysis program means a computer program or programs that are able to execute on a Data analysis computer of known type.

Data base table means any relational data base table structure or comparable data base object.

Demographic data means any data item that can describe a characteristic of the human being who is operating the electronic device or set-top box. Nonlimiting examples include income, ethnicity, gender, age, marital status, location, geographic area, postal code, census data, occupation, social grouping, family status, any proprietary demographic grouping, segmentation, credit score, dwelling type, homeownership status, property ownership status, rental status, vehicle ownership, tax rolls, credit card usage, religious affiliation, sports interest, political party affiliation, cable television subscriber type, cable television subscriber package level, and cell phone service level.

Directly or indirectly is used to define the immediacy of an event. Directly refers to an event occurring in relation to a human interaction with an electronic device where the event occurs immediately as a result of the human action, a nonlimiting example would be a channel change which occurs when the user presses the keys on the remote; indirectly refers to an action which occurs at a later point in time as a result of a previous human action, a nonlimiting example would be the set-top box tuning to a channel and recording a movie because the set-top box was programmed by the human to do so.

DVR means Digital Video Recorder.

Electronic device means any electronic device that may be used either directly or indirectly by a human being to interact with video content where the video content is provided by a cable television system or a satellite television system or a computer system accessed through a network. Nonlimiting examples include: Gaming station, web browser, MP3 Player, Internet Protocol phone, Internet Protocol television, mobile device, mobile smart phone, set-top box, satellite television receiver, set-top box in a cable television network, set-top box in a satellite television system, cell phone, personal communication device, personal video recorder, personal video player, two-way interactive service platforms, personal computer, tablet device.

Electronic device identifier means any combination of letters, numbers or symbols that can identify a device. Nonlimiting examples include:

(i) set-top box Media Access Control address (MAC address), (ii) cell phone Electronic Serial Number (ESN), Mobile Identification Number (MIN), System Identification Code (SIC), phone number, (iii) computer internet protocol address, etc.

(iv) encrypted versions of these values, (v) a generic identifier assigned to a multiple electronic devices having a similar demographic profile or viewing profile or usage profile.

Electronic device usage data means any data that captures any aspect of a human interaction with an electronic device being used to view and/or record video assets, along with supporting information. One of the uses of electronic device usage data is to identify content viewed and the times the content was viewed by the device. Nonlimiting examples include:

(i) tuning activity on a set-top box, (ii) tuning activity on an electronic device, (iii) tuning activity on an internet protocol television, (iv) starting and stopping a video stream, (v) recording video content, (vi) playing back recorded video content, (vii) using trick plays such as fast forward, rewind, pause, etc.

(viii) invoking a menu, choosing a menu option, (ix) any response to a screen prompt, (x) power on/power off.

Supporting information includes but is not limited to electronic device information, set-top box information, channel information, geographic area, information about the computer that serves the electronic device.

Electronic device usage pattern means any data that captures any aspect of a human interaction with an electronic device.

Electronic message means any computer readable output that can be used as input to another computer or read by a human. Nonlimiting examples include:

(i) data output in Extensible Markup Language format, (ii) data output in Hypertext Markup Language format, etc.

Equipment identifier means any combination of letters, numbers or symbols that can identify a piece of computer hardware.

Geographic area means any service area or any network hierarchy designation used by a cable television company or a satellite television company. The boundary or description of a geographic area is defined based on the needs of the cable television company or a satellite television company.

Headend means a location in a network where incoming signals are received, prepared, and then transmitted downstream to other parts of the network. Nonlimiting examples include: In a cable television network the signals are received at the headend, prepared and amplified, and then transmitted to downstream hubs for further distribution. A headend typically serves multiple hubs.

HFC Network means hybrid fiber coax network.

High definition means television channels having high resolution and thus they are delivered using a data transfer rate of approximately 15 megabits per second.

Hub means a location in a network where incoming signals are received, and then transmitted downstream to other parts of the network. Nonlimiting examples include: In a cable television network the signals are received at the hub and then transmitted to downstream service groups or nodes for further distribution. A hub typically serves multiple service groups.

Human interactions mean any interaction with an electronic device interacting with a computer system accessed through a network. Nonlimiting examples include:

(i) any activity involving a set-top box such as tune-in, tune-out, power on, power off, fast forward, reverse, mute, trick plays, etc.

(ii) any activity involving a personal communication device or a portable (hand held) video viewing device being used to view video assets, record video assets, etc.

(iii) any activity involving a personal computer that is accessing the internet such as watching a movie, watching a video asset, etc.

(iv) any activity involving watching internet protocol television.

Identifying fields for things of interest for analysis means a field or combination of fields that can be used to identify the buckets in a Viewing Detail Data Structure. Nonlimiting examples include these and can be grouped as follows:

System information

- (i) fields to identify the topology of a cable television system where the cable television system may be subdivided based on operational, organizational, or geographic areas, one example is Market, Service Group, Headend, Hub;
- (ii) fields to identify components in a cellular network such as the cell tower, nodes, ports, circuits, etc.;
- (iii) fields to identify components in a satellite television system;
- (iv) fields to identify cable television system equipment serving a set-top box;
- (v) fields to identify the geographic area of an electronic device;
- (vi) fields to identify the system or web page that is streaming content to an electronic device;

Channel or Resource Information

- (i) fields to identify a channel tuned to by a set-top box or an electronic device;
- (ii) fields to identify channels on a cable television system or satellite television system;
- (iii) fields to identify the content being streamed to an electronic device;
- (iv) fields to identify activity occurring on an electronic device;
- (v) fields that provide information about activity occurring on an electronic device;
- (vi) fields to identify resource consumption;

Device and User Information

- (i) fields to identify a set-top box or an electronic device;
- (ii) fields to identify the demographics of a viewer.

Identifier of Electronic device see Electronic device identifier.

Identifier of resource consumed means (a) any combination of letters, numbers or symbols that can identify the medium by which or through which content is delivered to either a set-top box or an electronic device. Nonlimiting examples include:

(i) Channel call sign, (ii) Channel source id, (iii) An internet protocol address, (iv) A web page address, (b) any combination of letters, numbers or symbols that can identify the content that was delivered to either a set-top box or an electronic device. Nonlimiting examples include:

(i) Video asset identifier.

Individual units of time means any period of time that may be of interest in relation to measuring human interaction with an electronic devices accessed through a network. Nonlimiting examples include:

(i) seconds in a day,
(ii) minutes in a day,
(iii) commercial periods during a television program,
(iv) quarter hours of a day,
(v) hours of a day,
(vi) four hour blocks in a day,
(vii) days,
(viii) time period when a certain program is running,
(ix) user defined day parts,
(x) user defined time periods.

Market means a geographic area within a service providers' network.

Network means any computer network. Nonlimiting examples include:

(i) a cable television network,
(ii) a cellular telephony network,
(iii) hybrid fiber coax system,
(iv) a satellite television network,
(v) any means that supports communication among electronic devices or computers or computer systems.

Node means a component in a cellular network or a cable television network.

Non-Targeted content means any video asset that is available to all of the set-top boxes in a grouping of set-top boxes when the set-top boxes are tuned to the channel where the video asset is playing. Nonlimiting examples include:

(i) ads or advertisements or commercials that are available to all of the set-top boxes in a service group,
(ii) movies or programs that are available to all of the set-top boxes in a service group,
(iii) sporting events that are available to all of the set-top boxes in a service group.

Note that in a targeted content delivery scenario, the delivery system may substitute targeted content for the standard non-targeted content that is generally available.

Note: See also Targeted Content.

Pipe delimited text files means data files where the fields are separated by the "|" character.

Period of interest means a period of time with a defined starting point and a defined ending point.

Program attributes see Program attribute data.

Program attribute data means any data item that can describe some aspect of a video asset.

Nonlimiting examples include: advertising agency that produced the video asset, copywriter that wrote the script used in the video asset, actor(s) or actress(es) featured in the video asset, celebrity status or non-celebrity status of persons in the video asset, language featured in the video asset, informational content provided in the video asset, topic being addressed in the video asset, product category shown in the video asset, video format in which the video asset was delivered, content rating of the video asset, type of program in which the video asset was aired, rating of the program in which the video asset was aired, type of audio featured in the video asset, male or female voice featured in the video asset, time of day when the video asset was aired, day of week when the video asset was aired, day of year when the video asset was aired, geographic area in which the video asset was aired, duration of the video asset, episode of the video asset, original release date of the video asset, studio that produced the video asset, director that directed production of the video asset, channel on which the video asset was aired, genre of the video asset. Note: This is more fully defined in the specification.

Service group means a location in a network where incoming signals are received and then transmitted to set-top boxes. Nonlimiting examples include:

In a cable television network the signals are received at the service group and then transmitted to downstream nodes or to set-top boxes. A service group typically serves 250 to 1000 homes. In some cable television networks a service group may equate to a Node.

Set-top box means an electronic device that receives external signals and decodes those signals into content that can be viewed on a television screen or similar display device. The signals may come from a cable television system, a satellite television system, a network, or any other suitable means. A set-top box may have one or more tuners. The set-top box allows the user to interact with it to control what is displayed on the television screen. The set-top box is able to capture the commands given by the user and then transmit those commands to another computer system. For purposes of this application, stating that a set-top box tunes to a channel is equivalent to stating that a tuner in a set-top box has tuned to a channel.

Set-top box identifier means any combination of letters, numbers or symbols that can identify a set-top box. Nonlimiting examples include:

(i) Set-top box Media Access Control address (MAC address),
(ii) Set-top box serial number, etc.
(iii) Encrypted versions of these values,
(iv) A generic identifier assigned to a multiple set-top boxes having a similar demographic profile or viewing profile or usage profile.

Spreadsheet means any commonly known electronic worksheet format. Nonlimiting examples include:

(i) MICROSOFT® EXCEL® files.

Standard definition means television channels having standard resolution and thus they are delivered using a data transfer rate of approximately 3.75 megabits per second.

STB means Set-top box.

Targeted content means any video asset that is directed to a subset of the set-top boxes in some larger group of set-top boxes based on applying business rules. Nonlimiting examples include:

(i) advertisements or commercials directed to specific set-top boxes in a service group,
(ii) movies or programs directed to specific set-top boxes in a service group,
(iii) sporting events directed to specific set-top boxes in a service group.

Note: See also Non-Targeted Content.

Targeted content delivery data means any information about the targeted content which is directed to the set-top boxes and information about the set-top boxes to which the targeted content is delivered.

Note: FIGS. 24 and 25 in this specification describe one embodiment of Targeted content delivery data.

Targeted set-top box means any set-top box to which a video asset is directed based on the application of business rules.

Targeted electronic device means any electronic device to which a video asset is directed based on the application of business rules.

Tune-in date and time means the date and time when the set-top box or electronic device initiates viewing on the channel. This can be represented in any format that can be used to identify the point in time when the set-top box initiates viewing on the channel. Nonlimiting examples include:
(i) YYYY-MM-DD HH:MM:SS AM/PM,
(ii) YYYY-MM-DD 24 HH:MM:SS,
(iii) seconds since some historic date.

Tune-out date and time means the date and time when the set-top box or electronic device ended viewing on the channel. This can be represented in any format that can be used to identify the point in time when the set-top box ended viewing on the channel. Nonlimiting examples include:
(i) YYYY-MM-DD HH:MM:SS AM/PM,
(ii) YYYY-MM-DD 24 HH:MM:SS,
(iii) seconds since some historic date.

Tuner means a tuner in a Set-top box.

Tuner index means an identifier of a tuner in a Set-top box.

Useful format means any flat file, spreadsheet, data base table, xml message, etc. that can convey information or that can be used to transmit data for further analysis.

Video asset means any programming content that may be viewed and/or heard. A video asset may be targeted or non-targeted content. Nonlimiting examples include:
(i) advertisements or commercials,
(ii) movies,
(iii) sports programs,
(iv) news casts,
(v) music.

Video asset identifier means a field or combination of fields that can uniquely identify both (a) a video asset, and (b) the unique airing of a video asset which is typically based on geography, date, time and channel. A Nonlimiting example is provided to illustrate: A video asset such as an automobile ad is assigned unique identifier; then each time the ad airs requires another level of tracking; together these form the video asset identifier.

Video asset schedule see Video asset schedule data.

Video asset schedule data means any data regarding the play schedule of programming or video content being delivered to a set-top box or an electronic device.

Note: FIGS. 21 and 22 in this specification describe one embodiment of Video asset schedule data.

Viewer means the human being causing a Viewer interaction; the user of a Set-top box or an electronic device.

Viewer interactions means any identifiable activity that an electronic device operator may do in regard to an electronic device and where such activity can be captured by the electronic device. Nonlimiting examples include:
(i) power on/power off, open web page, close web page,
(ii) channel up/channel down/channel selection, play video content on web browser,
(iii) volume up/volume down/mute/unmute,
(iv) any trick play such as fast forward, rewind, pause
(v) recording video content,
(vi) playing back recorded video content,
(vii) invoking a menu, choosing a menu option,
(viii) any response to a screen prompt.

Viewer response see Viewer's response.

Viewer's response means any identifiable activity that a set-top box operator may do in regard to a video asset which is delivered to a set-top box and where such activity can be captured by the set-top box. Nonlimiting examples of activities include:
(i) power on/power off,
(ii) channel up/channel down/channel selection, previous channel,
(iii) volume up/volume down/mute/unmute,
(iv) any trick play such as fast forward, rewind,
(v) any recording or playback,
(vi) no response (inferring that the viewer continued viewing the video asset),
(vii) invoking a menu, By analyzing activity, viewing time can be measured and other outcomes can be measured.

Viewing habits means any information that provides insight into how a video asset viewer interacts with the content provided to them.

Viewing metrics means any value calculated by a Data Analysis Program.

Viewing Detail data structure means a place in a computer program or computer system where data can be stored in tabular form with identifying fields for things of interest for analysis and buckets associated with those identifying fields in such a manner that formula and algorithms can be run against the data to produce meaningful metrics. Nonlimiting examples include:
(i) table in a COBOL program,
(ii) array or similar structure in a 'C' program or a C++ program,
(iii) spreadsheet; such structures may be stored in the memory of the computer, but they could also be stored on electronic disk or other computer hardware.

Note: FIG. 20 in this specification describes one embodiment of a Viewing Detail data structure.

Viewing Result data structure means a place in a computer program or a relational data base or other file system where data can be stored for analysis in such a manner that formula and algorithms can be run against the data to produce meaningful metrics. Nonlimiting examples include:
(i) table in a COBOL program,
(ii) array or similar structure in a 'C' program or a C++ program,
(iii) spreadsheet,
(iv) table in a relational data base, such structures may be stored in the memory of the computer, but they could also be stored on electronic disk or other computer hardware.

Note: FIG. 23 in this specification describes one embodiment of a Viewing result data structure.

Viewing time means a count of the number of viewing seconds.

Window of time of interest for analysis means any period of time during which it is desired to measure the human interaction with an electronic devices accessed through a network. Nonlimiting examples include:
(i) minutes in a day,
(ii) commercial periods during a television program,
(iii) quarter hours of a day,
(iv) hours of a day,
(v) four hour blocks in a day,
(vi) days,
(vii) any period of time useful for analysis
Etc.

BRIEF DESCRIPTION OF THE DRAWINGS

In the drawings, closely related figures have the same number but different alphabetic suffixes.

FIGS. 14-A-B illustrate an exemplary process for calculating ad viewing by seconds on a second-by-second basis for non-targeted ads, according to one embodiment with FIG. 14-A illustrating a flowchart of the process and FIG. 14-B illustrating an exemplary code sample.

FIG. 15-A-B illustrate an exemplary process for writing the viewing result file with the various metrics, according to one embodiment with FIG. 15-A illustrating a flowchart of the process and FIG. 15-B illustrating an exemplary code sample.

FIGS. 16-A-B-C illustrate an exemplary channel tune file format and data according to one embodiment with FIG. 16-A illustrating the file format, FIG. 16-B illustrating the channel tune data as it is received from the source in pipe delimited format, and FIG. 16-C illustrating the channel tune data formatted into a table for human readability. This represents SDV Vendor 1 Format. This is the detail of part 112.

FIGS. 17-A-B-C illustrate another exemplary channel tune file format and data according to one embodiment with FIG. 17-A illustrating the file format, FIG. 17-B illustrating the channel tune data as it is received from the source in pipe delimited format, and FIG. 17-C illustrating the channel tune data formatted into a table for human readability. This represents SDV Vendor 2 Format. This is the detail of part 114.

FIGS. 18-A-B-C illustrate an exemplary channel tune file format and data from a Set-top box system according to one embodiment with FIG. 18-A illustrating the file format, FIG. 18-B illustrating the channel tune data as it is received from the source in pipe delimited format, and FIG. 18-C illustrating the channel tune data formatted into a table for human readability. This is the detail of part 116.

FIGS. 19-A-B-C illustrate an exemplary channel tune file formatted for use as input to the Viewing Analytics Engine 142 with FIG. 19-A illustrating the file format, and FIG. 19-B illustrating sample data without program attribute, or demographics, and FIG. 19-C illustrating sample data with program attribute, and demographics, according to one embodiment. This relates to parts 130 and 134.

FIGS. 20-A-B illustrate an exemplary Viewing Detail Data Structure for use by the Viewing Analytics Engine 142 when processing channel tune records to produce viewing metrics where the granularity is second of day, according to one embodiment. FIG. 20-A illustrates the Data Structure, and FIG. 20-B illustrates sample data in this Data Structure, according to one embodiment.

FIGS. 21-A-B-C illustrate an exemplary Video Asset Schedule file before formatting for use as input to the Viewing Analytics Engine 142 with FIG. 21-A illustrating the file format, and FIG. 21-B part 2003 illustrating sample data in pipe delimited format, and FIG. 21-C part 2003 illustrating sample data formatted for human readability, all according to one embodiment. This is the detail of part 170.

FIGS. 22-A-B illustrate an exemplary Video Asset Schedule file formatted for use as input to the Viewing Analytics Engine 142 with FIG. 22-A illustrating the file format, and FIG. 22-B part 2007 illustrating sample data without targeted ad data, and FIG. 22-B part 2009 illustrating sample data with targeted ad data, according to one embodiment. This relates to parts 174 and 178.

FIGS. 23-A-B illustrate an exemplary Viewing Result Data Structure for use by the Viewing Analytics Engine 142 to record the Video Asset Schedule data and the viewing metrics for each ad or program being analyzed with FIG. 23-A illustrating the Data Structure, and FIG. 23-B part 3205 illustrating sample data without targeted ad data, and FIG. 23-B part 3207 illustrating sample data with targeted ad data, according to one embodiment.

FIGS. 24-A-B-C illustrate an exemplary pipe delimited Targeted Ad Delivery file before formatting for use as input to the Viewing Analytics Engine 142 with FIG. 24-A illustrating the file format, and FIG. 24-B illustrating two records, part 2603 and 2605, of targeted ad data as it is received from the source in pipe delimited format, and FIG. 24-C illustrating the targeted ad data formatted into a table for human readability, according to one embodiment.

FIGS. 25-A-B illustrate an exemplary Targeted Ad Delivery file formatted for use as input to the Viewing Analytics Engine 142 with FIG. 25-A illustrating the file format, and FIG. 25-B illustrating sample data, according to one embodiment.

FIGS. 26-A-B illustrate an exemplary output record format for the flat file which contains the viewing result metrics calculated by the Viewing Analytics Engine 142, according to one embodiment. FIG. 26-A illustrates the record format, and FIG. 26-B illustrates sample data in this record format, according to one embodiment.

FIGS. 27-A-B illustrate an exemplary output record format for the flat file which contains the viewing by second for targeted ad metrics calculated by the Viewing Analytics Engine 142, according to one embodiment. FIG. 27-A illustrates the record format, and FIG. 27-B illustrates sample data in this record format, according to one embodiment.

FIGS. 28-A-B illustrate an exemplary output record format for the flat file which contains the viewing by second for Non-targeted ad metrics calculated by the Viewing Analytics Engine 142, according to one embodiment. FIG. 28-A illustrates the record format, and FIG. 28-B illustrates sample data in this record format, according to one embodiment.

FIG. 31 illustrates various human beings (television viewers) interacting with various set-top boxes which are each interacting with a computer system accessed through a network, according to one embodiment.

DETAILED DESCRIPTION OF THE DRAWINGS

When reading the information below, it can be appreciated that these are merely samples of table layouts, format and content, and many aspects of these tables may be varied or expanded within the scope of the embodiment. The table layouts, field formats and content, algorithms, and other aspects are what I presently contemplate for this embodiment, but other table layouts, field formats and content, algorithms, etc. can be used. The algorithms are samples and various aspects of the algorithms may be varied or expanded within the scope of the embodiment.

For many of the metrics shown below, I have suggested what the metric indicates. This is not to limit the purpose of the metric to that one usage, but simply to indicate one of potentially many valuable uses for the metric.

In one embodiment the Viewing Analytics Engine 142 can be implemented on processors provided by the INTEL® Corporation under the trademark PENTIUM® using single or multiple processor configurations. The operating system offered by MICROSOFT® Corporation under the trademark WINDOWS® XP Professional can be used as the computer operating system. The Viewing Analytics Engine 142 can be implemented in a number of programming languages, including but not limited to, COBOL, C and C++.

I have implemented the Viewing Analytics Engine 142 and supporting code in FUJITSU® NetCOBOL® for WINDOWS® version 10.1 developed by Fujitsu® and distributed by Alchemy Solutions Inc. This product is available at http://www.alchemysolutions.com or http://www.netcobol.com. The Viewing Analytics Engine 142 and all of the supporting processes have been developed and run on a DELL® WORKSTATION PWS360 with INTEL® PENTIUM® 4 CPU 2.60 GHz with 2.25 GB of RAM running MICROSOFT® WINDOWS® XP Professional Version 2002 Service Pack 3. The computer was purchased from Dell Computer Corporation. The operating system is from Microsoft.

Although the embodiments described herein enable one of ordinary skill in the art to implement (i.e. build) the Viewing Analytics Engine 142 and supporting software, it in no way restricts the method of implementation, the Viewing Analytics Engine 142 and supporting software being capable of being implemented on a variety of hardware/software platforms using a variety of development languages, databases, communication protocols and frameworks as will be evident to those of ordinary skill in the art.

Figure 1:
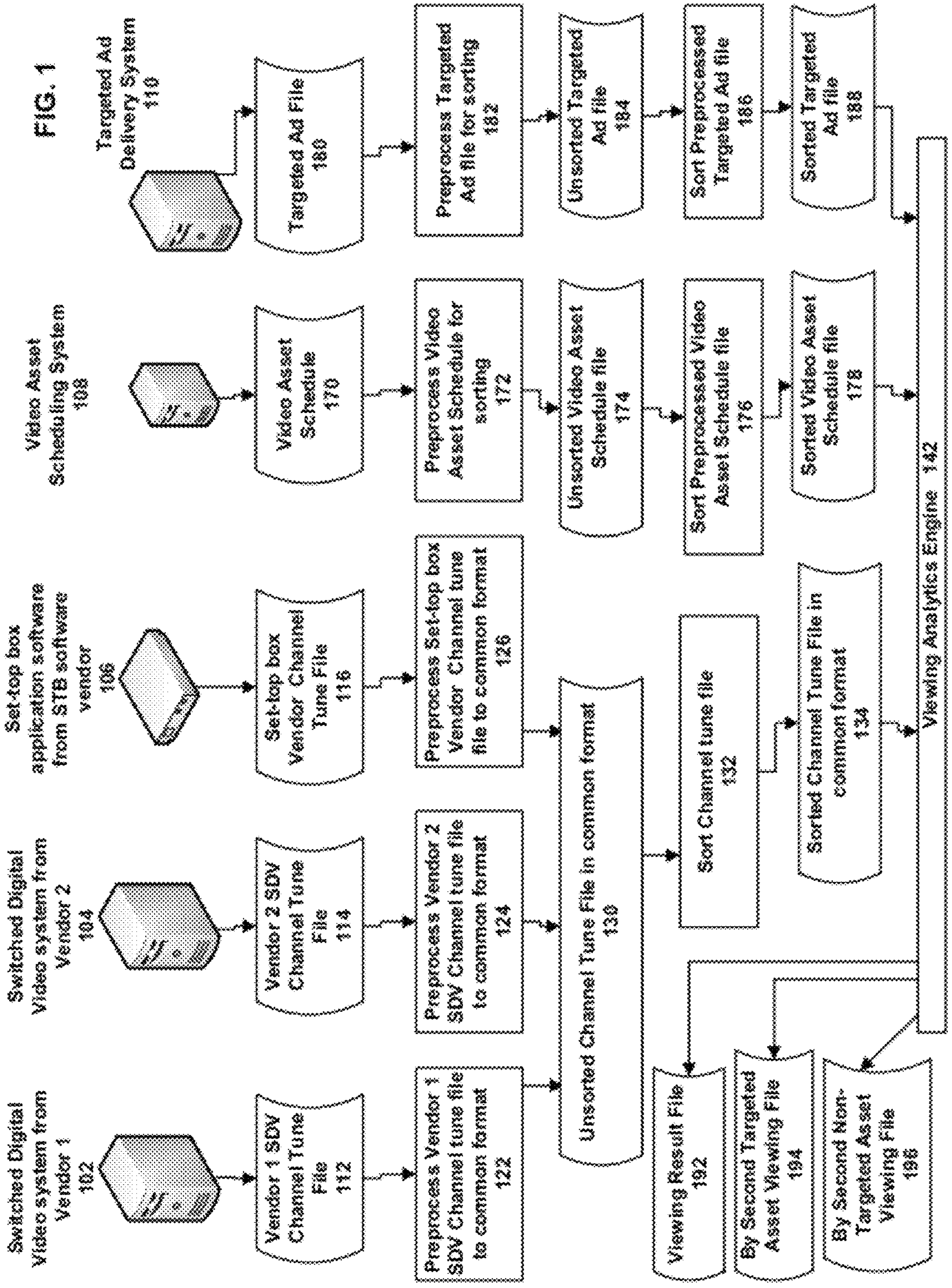
FIG. 1 is a flowchart illustrating an overview of an exemplary process for receiving and processing (a) channel tune data from various sources, (b) video asset schedule data from a Video Asset Scheduling System, and (c) targeted ad data from a Targeted Advertising Delivery system and then using these data sources to produce viewing metrics, according to one embodiment.

FIG. 1 is a flowchart illustrating an overview of an exemplary process for receiving and processing (a) channel tune data from various sources, (b) video asset schedule data from a Video Asset Scheduling System, and (c) targeted ad data from a Targeted Advertising Delivery system and then using these data sources to produce viewing metrics, according to one embodiment.

A cable television company operating a Switched Digital Video system using the SDV platform of a first vendor 102 collects channel tune data 112 in the format provided by Vendor 1's SDV system as part of the normal operation of said Switched Digital Video system. The detail for this file is shown in FIG. 16-A-B-C. Channel tune data 112 is then preprocessed using a computer program 122 which reformats said SDV vendor's channel tune data into a common format, performs data enrichments, and applies business rules as data quality checks all in preparation for passing an unsorted channel tune file in a common or standardized format 130 into a sort function 132 which then sorts the data producing Sorted Channel Tune File in common format 134 (see FIG. 19-A-B-C for details) in preparation for processing by a Viewing Analytics Engine 142.

A cable television company operating a Switched Digital Video system using the SDV platform of a second vendor 104 collects channel tune data in the format provided by Vendor 2's SDV system as part of the normal operation of said Switched Digital Video system (see FIG. 17-A-B-C for details). Channel tune data 114 is then preprocessed using a computer program 124 which reformats said SDV vendor's channel tune data into a common format, performs data enrichments, and applies business rules as data quality checks all in preparation for passing an unsorted channel tune file in a common or standardized format 130 into a sort function 132 which then sorts the data producing Sorted Channel Tune File in common format 134 (see FIG. 19-A-B-C for details) in preparation for processing by a Viewing Analytics Engine 142.

A cable television company or satellite television broadcasting company provides Set-top box application software 106 for its customers to use to operate their set-top box. Such software may be developed in-house or by a third party. The STB software 106 collects channel tune data 116 as part of the normal operation of said Set-top box application software system (see FIG. 18-A-B-C for details). STB Channel tune data 116 is then preprocessed using a computer program 126 which reformats the STB Channel tune data 116 into a common format, performs data enrichments, and applies business rules as data quality checks all in preparation for passing an unsorted channel tune file in a common or standardized format 130 into a sort function 132 which then sorts the data producing Sorted Channel Tune File in common format 134 (see FIG. 19-A-B-C for details) in preparation for processing by a Viewing Analytics Engine 142.

In a similar manner, an internet protocol television system can track the viewing activity related to each video asset and make that viewing activity available to the Viewing Analytics Engine 142.

A cable television company or satellite television broadcasting company operates a Video Asset Scheduling System 108 which records the play times of every video asset that is broadcast to the set-top boxes within a Geographic area. Recall that an ad or program is also known by the more general term video asset. Video Asset Scheduling System 108 captures numerous details such as Geographic information of where the Video asset played, Channel information, Play date, Play Time Begin, Play Time End, and various fields about the video asset. The detail for this is specified in FIGS. 21-A-B-C. Video Asset Scheduling System 108 may be developed in-house or by a third party. Video Asset Scheduling System 108 produces a Video Asset Schedule file 170 which is then preprocessed using a computer program Preprocess Video Asset Schedule for sorting 172 which reformats the Video Asset Schedule file 170 into a suitable format (see FIG. 22-A-B-C for details), performs data enrichments, and applies business rules as data quality checks all in preparation for passing an unsorted Video Asset Schedule file 174 into a sort function 176 which then sorts the data producing Sorted Video Asset Schedule file 178 in preparation for processing by a Viewing Analytics Engine 142.

In a similar manner, an internet protocol television system can track the video assets that it delivers to an internet protocol television and make that information available to the Viewing Analytics Engine 142.

A cable television company or satellite television broadcasting company may also operate a Targeted Ad Delivery System 110 which directs specific Ads to selected set-top boxes based on rules implemented in the Targeted Ad Delivery System. Targeted Ad Delivery System 110 may be developed in-house or provided by a Targeted Advertising Vendor. The Targeted Ad Delivery System 110 captures the details of every targeted ad that is generated by the system. The targeted ad information is provided in a Targeted Ad File 180 which records numerous details such as Geographic information of where the Targeted Ad played, Channel information, Set-top box id, Tuner index, Play date, Play Time Begin, Play Time End, and various fields about the Ad or Program. The detail for this file is specified in FIGS. 24-A-B.

Targeted Ad File 180 is then preprocessed using a computer program Preprocess Targeted Ad file for sorting 182 which reformats the Targeted Ad file 180 into a suitable format, performs data enrichments, and applies business rules as data quality checks producing the formatted Unsorted Targeted Ad file 184. The detail for this file is specified in FIGS. 25-A-B.

The unsorted Targeted Ad file 184 is then delivered to a sort function Sort Preprocessed Targeted Ad file 186 which then sorts the data producing Sorted Targeted Ad file 188 in preparation for processing by a Viewing Analytics Engine 142.

Figure 9:
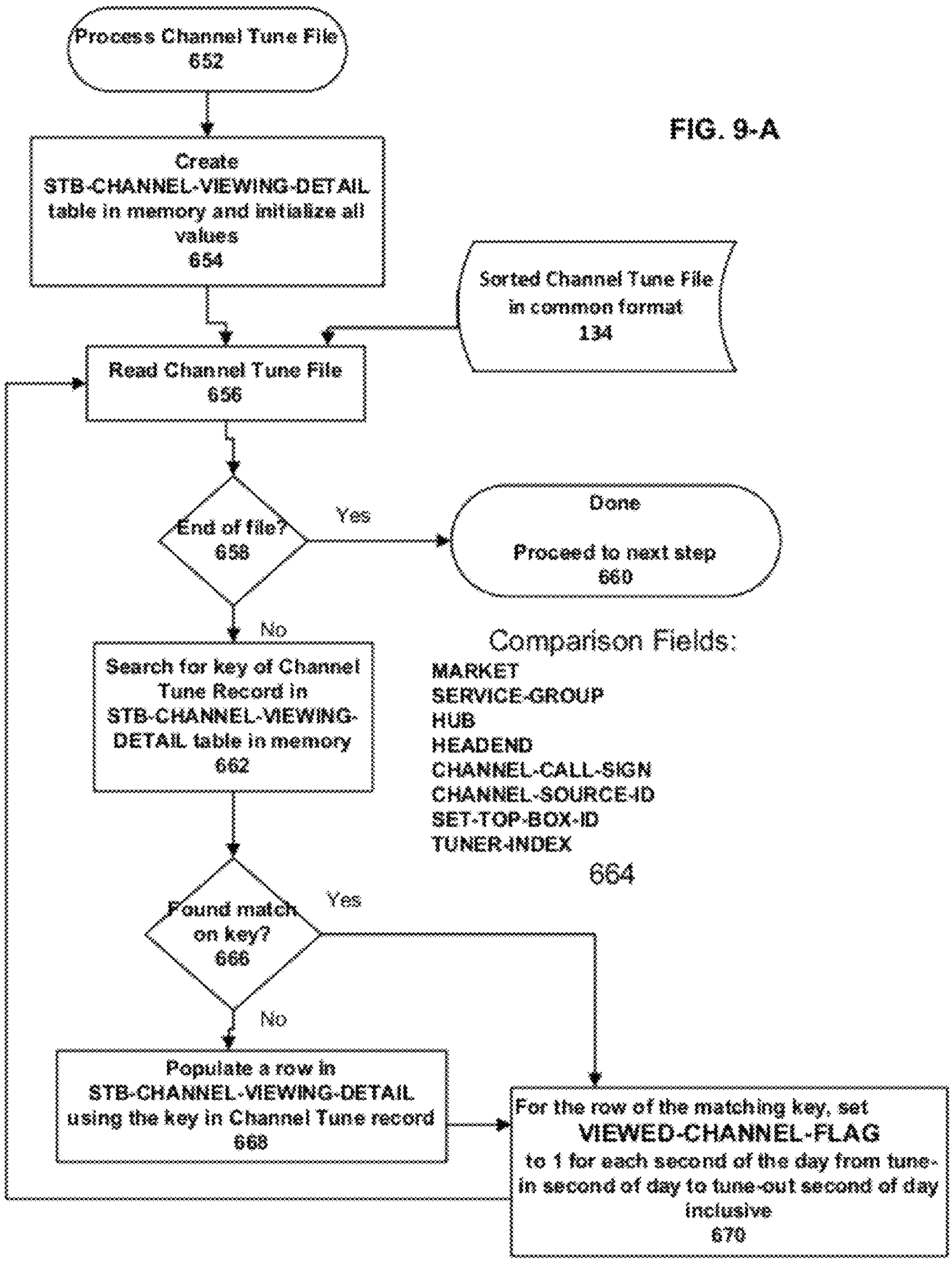
FIGS. 9A-B illustrate an exemplary process for loading standardized channel tune data into the STB-CHANNEL-VIEWING-DETAIL table in the Viewing Analytics Engine 142 in preparation for calculating the various viewing metrics, according to one embodiment with FIG. 9A illustrating a flowchart of the process and FIG. 9B illustrating an exemplary code sample.

Viewing Analytics Engine 142 then loads the Sorted Channel Tune File in common format 134 into a Viewing Detail Data Structure (see FIG. 20-A-B for details), in the memory of a computer as described more fully in FIGS. 9-A-B. Viewing Analytics Engine 142 also loads the Sorted Video Asset Schedule file 178 into a Viewing Result Data Structure (see FIG. 23-A-B for details) in the memory of a computer as described more fully in FIGS. 10-A-B.

If the Sorted Targeted Ad file 188 is present, the Viewing Analytics Engine 142 then reads the Sorted Targeted Ad file 188 and performs various analytics to determine viewing seconds for each Targeted Ad represented in the Sorted Targeted Ad file 188. See FIGS. 11-A-B and FIGS. 12-A-B for details.

If the Sorted Targeted Ad file 188 is not present, the Viewing Analytics Engine 142 skips processing of the Targeted Ad data.

The Viewing Analytics Engine 142 then performs various calculations against the data in the Viewing Result Data Structure (FIG. 23-A-B) to determine viewing seconds for the video assets that were identified in the Sorted Video Asset Schedule file 178. Some of the calculations use the data that was loaded to the Viewing Detail Data Structure (FIGS. 20-A-B).

As part of this process, Viewing Analytics Engine 142 produces these files: Viewing Result File 192 (FIG. 26-A-B), By Second Targeted Asset Viewing File 194 (FIGS. 27-A-B), and By Second Non-Targeted Asset Viewing File 196 (FIG. 28-A-B) which are then made available for further reporting and analysis or for loading to downstream systems. Together these files provide insight into the viewing habits of the viewers, the behavior of the viewers, and the electronic device usage pattern of the viewers.

The receiving and processing of channel tune data from various sources is further defined in Applicant's co-pending U.S. application Ser. No. 12/981,301 filed on Dec. 29, 2010 entitled "SYSTEM AND METHOD FOR ANALYZING HUMAN INTERACTION WITH ELECTRONIC DEVICES THAT ACCESS A COMPUTER SYSTEM THROUGH A NETWORK". This application is incorporated in its entirety but is not admitted to be prior art.

Figure 2:
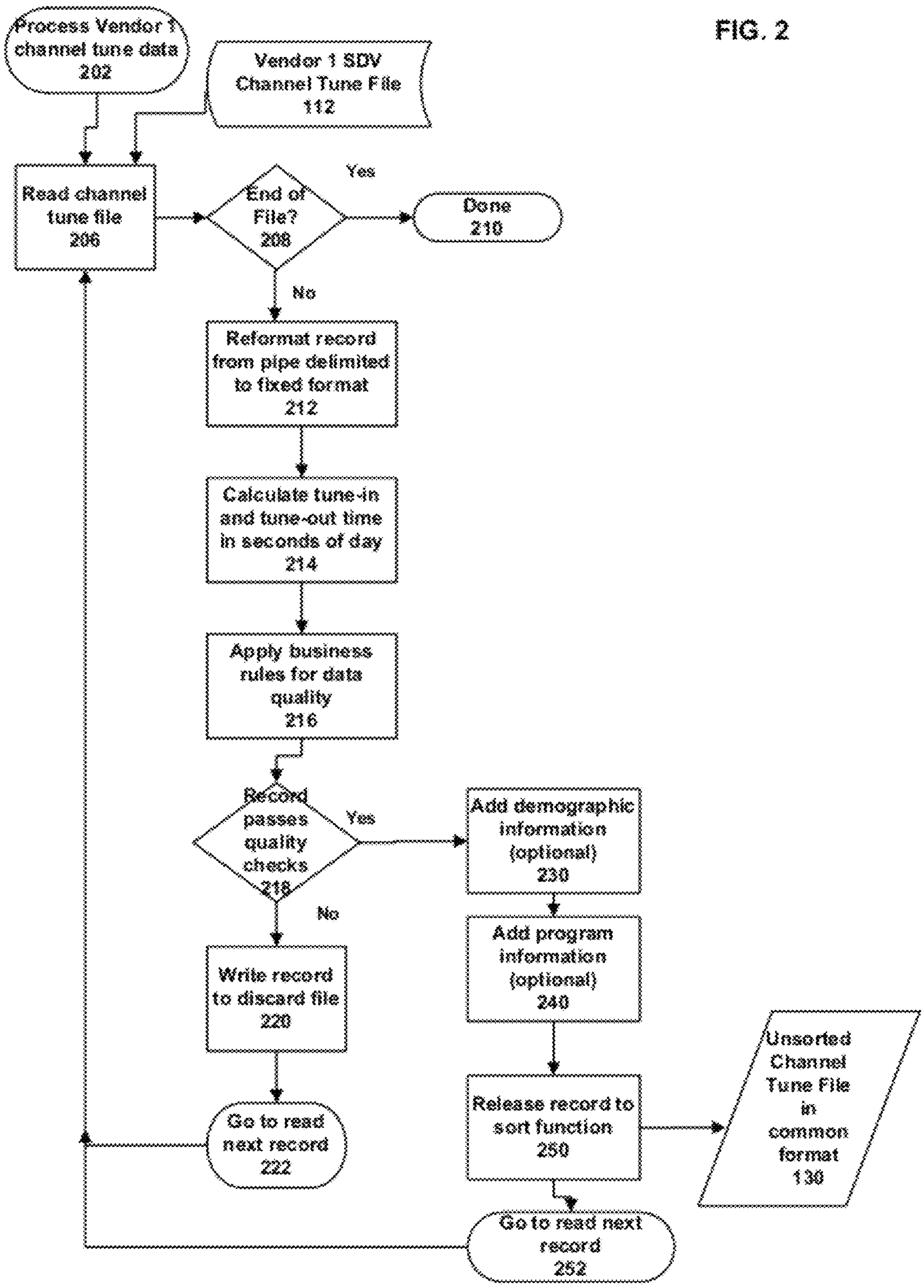
FIG. 2 illustrates an exemplary flowchart for preprocessing channel tune data from a Switched Digital Video system, according to one embodiment.

FIG. 2 is a flowchart which illustrates an exemplary process using a computer for preprocessing channel tune data from a Switched Digital Video system so that it can be used by the Viewing Analytics Engine 142, according to one embodiment.

FIG. 2 provides the detail of Preprocess Vendor 1 SDV Channel tune file to common format 122. The process begins with Process Vendor 1 channel tune data 202. A Read channel tune file 206 process reads each record in Vendor 1 SDV Channel Tune File 112. The program checks for End of file 208 and stops when Done 210.

For each record the program Reformats the record from the pipe-delimited format in which it was received to a fixed format 212.

The program then Calculates tune-in and tune-out time in seconds of the day 214 resulting in values between 1 and 86,400 for each. The calculations performed vary depending on the input format of the date and time.

The program then Applies business rules for data quality 216. For example, if the duration between tune-in and tune-out is more than 7,200 seconds (2 hours) the program terminates the session at the top of the next hour by assigning that second of the day minus 1 as the tune-out time. Another business rule assigns default tune-in or tune-out times as needed to account for sessions that are missing a tune-in or tune-out time because the events occurred on different dates. The business rules to be applied vary depending on what rules the SDV Vendor has applied to the file.

After the business rules 216 have been applied, the program checks to see if the Record passes the quality checks 218.

For records that pass the quality checks 218, the program then optionally performs function Add demographic information 230 to the tuning record. This is done by using the Set-top box identifier to lookup various demographic values associated with the Set-top box user and then including those values as fields in the tuning record. The cable company or satellite provider or a third party could provide a file of demographic values (not shown) to associate with the Set-top box identifier. The Set-top box identifier may or may not be encrypted as long as the value of the STB identifier matches the values used in the demographic file.

Additionally, for records that pass the quality checks 218, the program then optionally performs function Add program attribute information 240 to the tuning record. This is done by using the Channel Source Id and the tune-in time of the tuning activity, along with Market+Headend+Hub as needed to locate the programming schedule relevant to the STB. Once the programming schedule information is located, the program can then access various program attribute values such as program type (sports, news, movie, advertisement), program genre, program rating, etc. and include these values as fields in the tuning record. The cable company or satellite provider or a third party could provide a file of program attributes to associate with the tuning data. This would capture the program attribute information at the time of tune-in event. Depending upon the type of measurement desired, one could systematically generate additional tuning records as the program attributes change in order to capture viewing behavior as program attributes change. The SDV vendor may be able to include this information in the data file.

At the completion of these steps, the record is Released to the sort function 250 which writes the record to the file Unsorted Channel Tune File in common format 130.

At this point the process proceeds to Go to read the next record in the file 252.

If a tuning record fails the quality checks 218, the record is Written to the discard file 220. From here the process proceeds to Go to Read next record in the file 222.

The preprocessing of channel tune data from a Switched Digital Video system is further defined in Applicant's co-pending U.S. application Ser. No. 12/981,301 filed on Dec. 29, 2010 entitled "SYSTEM AND METHOD FOR ANALYZING HUMAN INTERACTION WITH ELECTRONIC DEVICES THAT ACCESS A COMPUTER SYSTEM THROUGH A NETWORK". This application is incorporated in its entirety but is not admitted to be prior art.

Figure 3A:
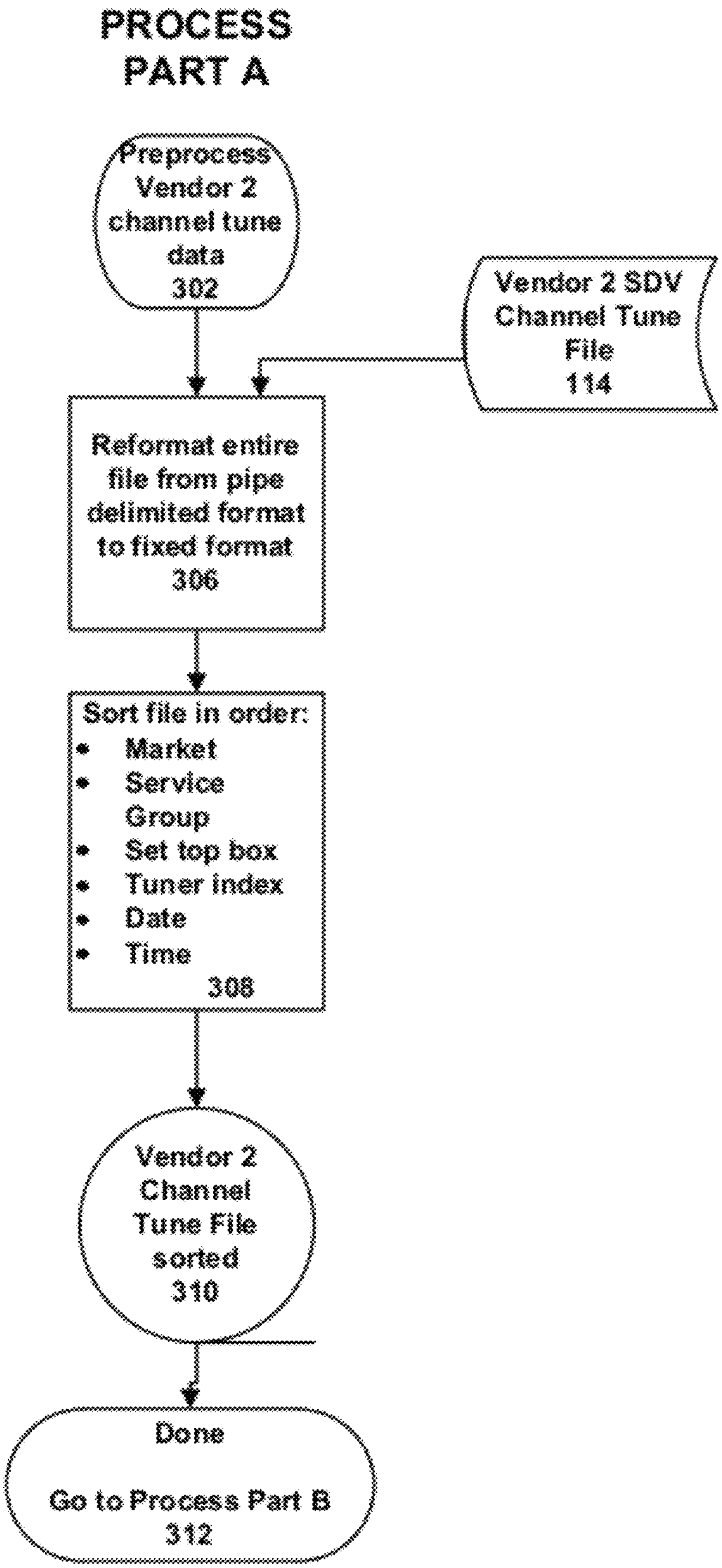
FIGS. 3A-B illustrate exemplary flowcharts for preprocessing channel tune data from another Switched Digital Video system, according to one embodiment with FIG. 3A showing Part A of the process and FIG. 3B showing Part B of the process.
Figure 3B:
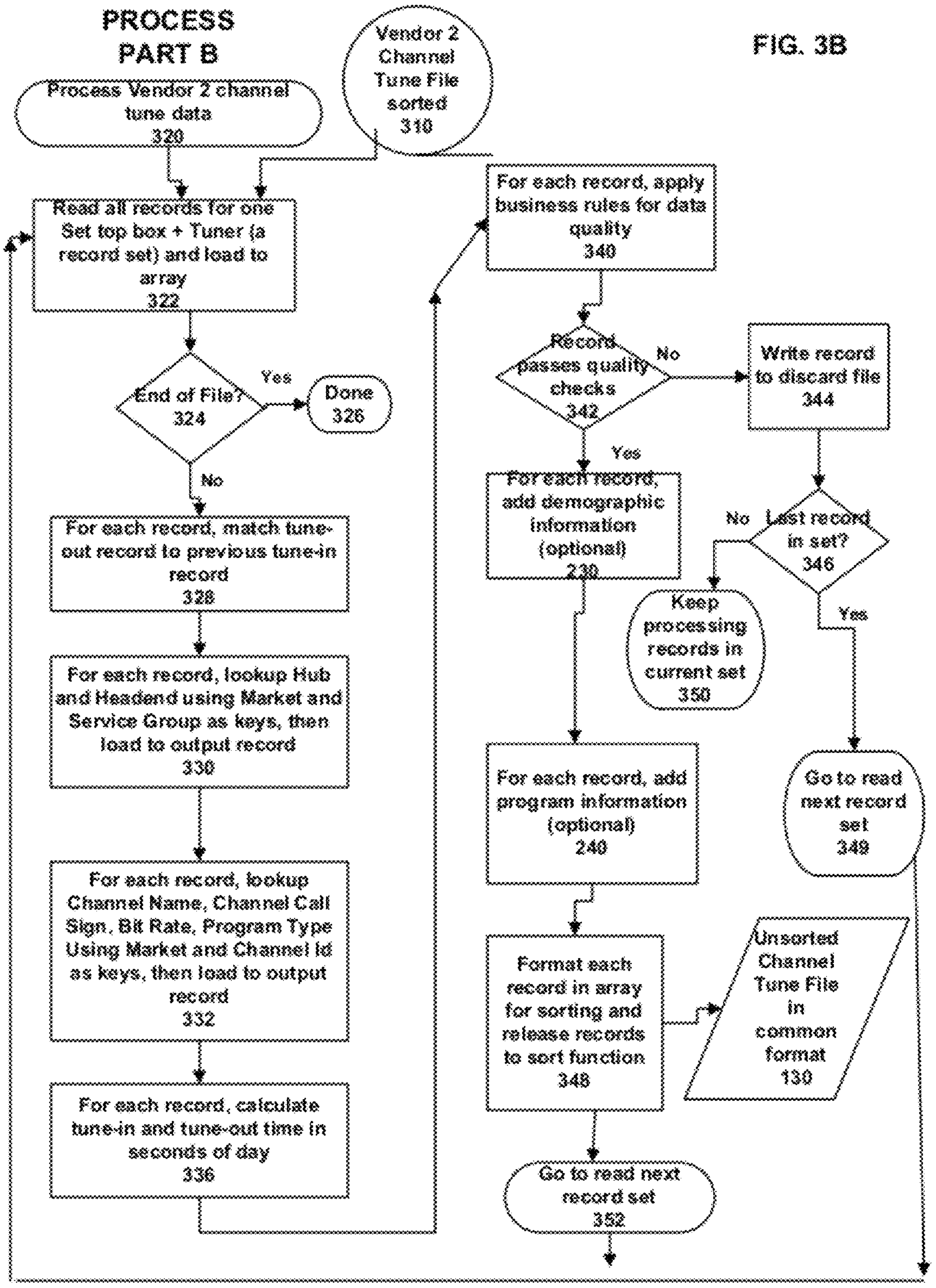

FIG. 3A is a flowchart which illustrates an exemplary process using a computer for preprocessing channel tune data from a Switched Digital Video system, according to one embodiment. FIGS. 3A-B provide the detail of 124 Preprocess Vendor 2 SDV Channel tune file to common format. In the case of Vendor 2's Channel Tuning File, each tuning record has a date+time and an event type such as tune-in or tune-out. The tune-in and tune-out are NOT on the same record.

Thus Preprocess 124 requires an initial step Process Part A to prepare to reformat the file such that the tune-in and tune-out appear on the same record. This Preprocess computer program begins with Preprocess vendor 2 channel tune data 302. The program first does Reformat entire (Vendor 2 SDV Channel Tune File 114) file from pipe delimited format to fixed format 306. The program then Sorts 308 the file in order Market, Service Group, Set-top box id, Tuner index, Date, and Time. The sort output is Vendor 2 Channel Tune File Sorted 310. The program is now Done with Process Part A and can Go to process Part B 312.

FIG. 3B describes the second part of the preprocessing activity which must be done on Vendor 2's Channel Tuning File to prepare it for the Viewing Analytics Engine 142. Process Part B begins with Process Vendor 2 channel tune data 320. Using the sorted file Vendor 2 Channel Tune File sorted 310 as input, process Reads all the records for one Set-top box+Tuner (a record set or the group of records having the same Set-top box+Tuner) and loads this record set to an array 322 in the memory of a computer.

Step 324 is to identify end of file which indicates that file processing is Done 326.

For each record set, the program processes each record 328 in the set as follows: It loads the record set to an array in the memory of the computer. The program then matches the tune-out record to the previous tune-in record building a complete tuning record (one containing both a tune-in and a tune-out time).

The program then proceeds to 330 where for each record it is enriched by looking up the Hub and Headend using Market and Service Group as keys. When we find these values we include them in the tuning record.

The program then proceeds to 332 where for each record it is enriched by looking up the Channel Name, Channel Call Sign, Bit Rate, Program Type (SDV or Broadcast) using Market and Channel Id as keys. These values are then loaded to the tuning record.

The program then proceeds to 336 where for each record it is enriched by calculating the tune-in and tune-out time in seconds of day resulting in values between 1 and 86,400. The calculations performed vary depending on the input format of the date and time. These values are then loaded to the tuning record.

The program then proceeds to apply business rules 340 for data quality. For example, if the duration between tune-in and tune-out is more than 7,200 seconds (2 hours) the program terminates the session at the top of the next hour by assigning that second of the day minus 1 as the tune-out time. Another business rule assigns default tune-in or tune-out times as needed to account for sessions that are missing a tune-in or tune-out time because the events occurred on different dates. Because of differences between the data from SDV Vendor 1 and SDV Vendor 2, the business rules may vary.

After the business rules 340 have been applied, the program checks to see if the record passes the quality checks 342.

For records that pass the quality checks 340, the program then optionally performs function Add demographic information 230 to the tuning record in the same manner as was done for SDV Vendor 1 data.

Additionally, for records that pass the quality checks 342, the program then optionally performs Add program attribute information 240 to the tuning record in the same manner as was done for SDV Vendor 1 data.

At the completion of these steps, the final formatting rules are applied and all the records in the record set are Released to the sort function 348 which writes the record to the file Unsorted Channel Tune File in common format 130.

At this point the program proceeds to go to read next record set 352.

If a tuning record fails the quality checks 342, the record is written to the discard file 344.

Step 346 checks to see if it is the last record in the set.

If there are additional records in the set, step 350 continues processing records in the set.

If the record was the last record in the set 349, the program proceeds to read the next record set in the file 322.

The preprocessing of channel tune data from a Switched Digital Video system is further defined in Applicant's co-pending U.S. application Ser. No. 12/981,301 filed on Dec. 29, 2010 entitled "SYSTEM AND METHOD FOR ANALYZING HUMAN INTERACTION WITH ELECTRONIC DEVICES THAT ACCESS A COMPUTER SYSTEM THROUGH A NETWORK". This application is incorporated in its entirety but is not admitted to be prior art.

Figure 4A:
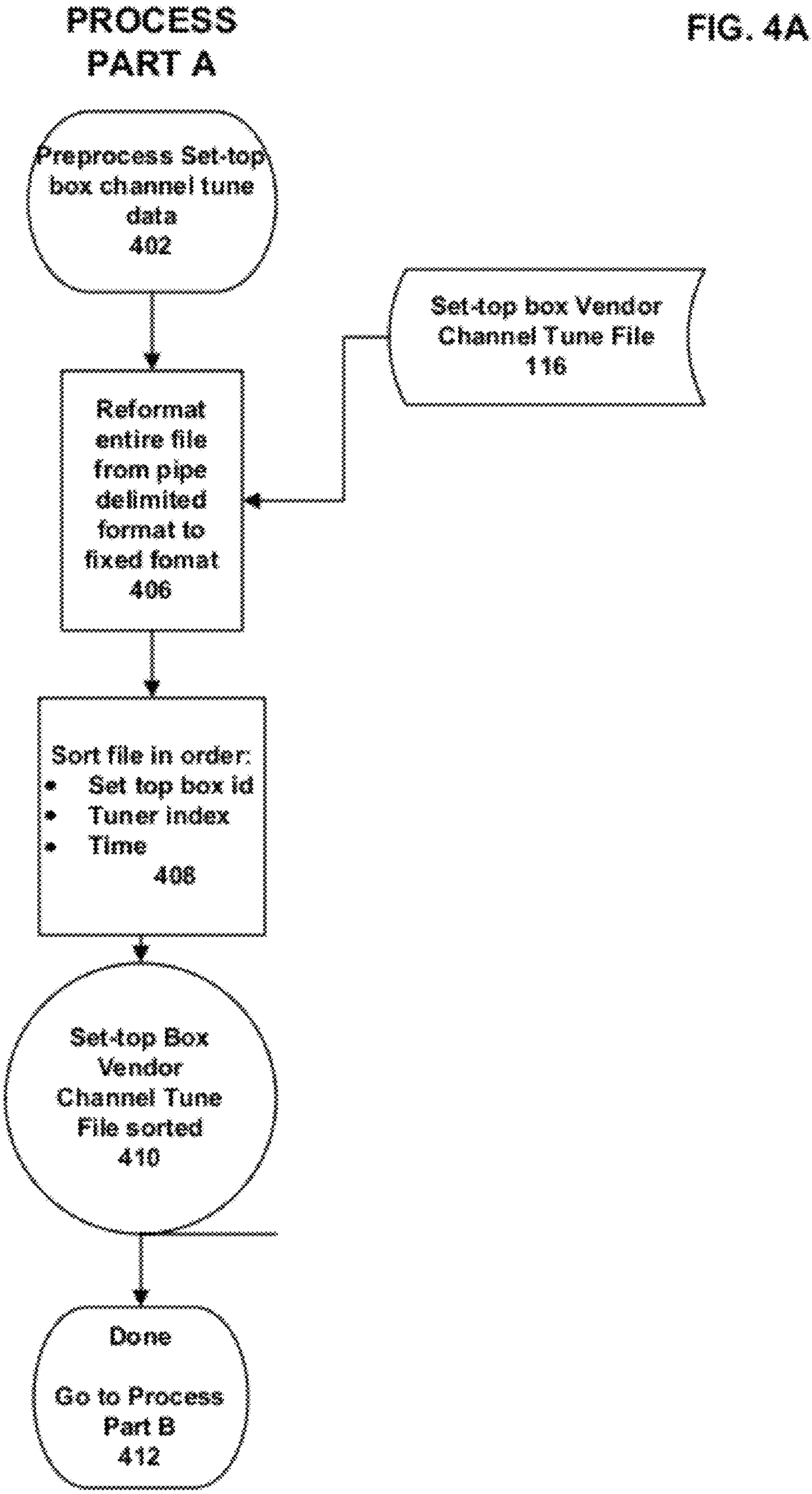
FIGS. 4A-B illustrate exemplary flowcharts for preprocessing channel tune data from a Set-top box application software system, according to one embodiment with FIG. 4A showing Part A of the process and FIG. 4B showing Part B of the process.
Figure 4B:
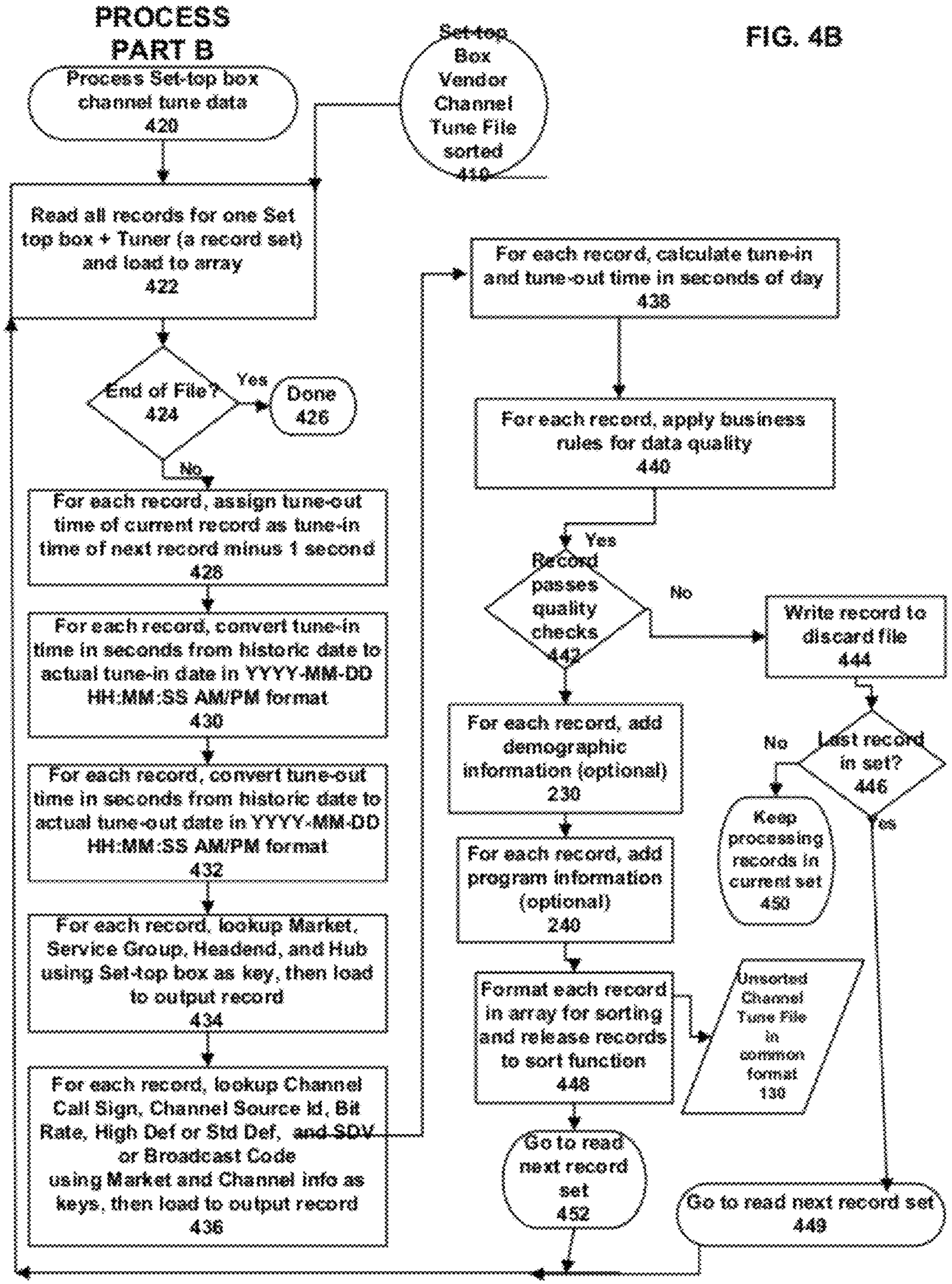

FIG. 4A is a flowchart which illustrates an exemplary process using a computer for preprocessing channel tune data from a Set-top box application system, according to one embodiment. FIGS. 4A-B provide the detail of 126 Preprocess Set-top box Vendor Channel tune file to common format. In the case of the Set-top box Channel Tuning File, each tuning record has a Set-top box identifier, a Tuner index, a time in seconds from some historic date such as EPOCH time (Jan. 1, 1970), and Channel information. The tune-in and tune-out are NOT on the same record.

Thus Preprocess 124 requires an initial step Process Part A to prepare to reformat the file such that the tune-in and tune-out appear on the same record. This Preprocess computer program begins with 402. The program first Reformats 406 the entire Set-top Box Channel Tune File 116 file from pipe delimited format to fixed format. The program then Sorts 408 the file in order Set-top box id, Tuner index, and Time (which is in seconds from some historic date). The sort output is 410 Set-top Box Vendor Channel Channel Tune File Sorted. The program is now Done with Process Part A and can proceed to Part B 412.

FIG. 4B describes the second part of the preprocessing activity which must be done on Set-top Box Channel Tuning File to prepare it for the Viewing Analytics Engine 142. Process Part B begins with 420 Process Set-top Box Channel tune data. Using the sorted file Set-top Box Vendor Channel Tune File sorted 410 as input, process 422 reads all the records for one Set-top box+Tuner (a record set or the group of records having the same Set-top box+Tuner) and loads this record set to an array in the memory of a computer.

Step 424 is to identify end of file which indicates that file processing is Done 426.

For each record set, the program processes each record 428 in the set as follows: It loads the record set to an array in the memory of the computer. The program then matches the tune-out record to the previous tune-in record building a complete tuning record (one containing both a tune-in and a tune-out time). The tune-out time of a record is the tune-in time of the next (subsequent) record minus 1 second. When the next activity is a power off, the tune-out time can be set as the time of the power off minus 1 second.

The program then proceeds to 430 where for each record it converts the tune-in time in seconds from the historic date to the actual tune-in date in YYYY-MM-DD HH:MM:SS AM/PM format.

The program then proceeds to 432 where for each record it converts the tune-out time in seconds from the historic date to the actual tune-out date in YYYY-MM-DD HH:MM:SS AM/PM format.

The program then proceeds to 434 where each record is enriched by looking up the Market, Service Group, Hub, and Headend using Set-top box identifier as the key to a lookup table. These values are then loaded to the tuning record.

The program then proceeds to 436 where each record is enriched by looking up the Channel Call Sign, Channel Source Id, Bit Rate, High Def or Standard Def code, and SDV or Broadcast code using Market and channel information as the keys to a lookup table. These values are then loaded to the tuning record.

The program then proceeds to 438 where for each record it is enriched by calculating the tune-in and tune-out time in seconds of day resulting in values between 1 and 86,400. These values are then loaded to the tuning record.

The program then proceeds to 440 where it applies business rules for data quality. For example, if the duration between tune-in and tune-out is more than 7,200 seconds (2 hours) the program terminates the session at the top of the next hour by assigning that second of the day minus 1 as the tune-out time. Another business rule assigns default tune-in or tune-out times as needed to account sessions that are missing a tune-in or tune-out time because the events occurred on different dates. Based on the particulars of the Set-top box application and the quality checks it applies to the data, the business rules may vary.

After the program has applied business rules 440, it checks to see if the record passes the quality checks 442.

For records that pass the quality checks 442, the program then optionally performs function 230 to Add demographic information to the tuning record in the same manner as was done for SDV Vendor 1 data.

Additionally, for records that pass the quality checks 442, the program then optionally performs function 240 to Add program attribute information to the tuning record in the same manner as was done for SDV Vendor 1 data. The STB vendor may add program attribute information to the tuning file.

At the completion of these steps, the program then applies final formatting rules and releases the record to sort function 448 which writes the record to the file Unsorted Channel Tune File in common format 130.

At this point the program proceeds to read next record set 452.

If a tuning record fails the quality checks 442, the record is written to the discard file 444.

If there are additional records in the set as determined by step 446, step 450 continues processing records in the set.

If the record was the last record in the set 449, the program proceeds to read the next record set in the file 422.

In the case of an electronic device, a file containing electronic device usage data resulting from the viewer interaction with the electronic device can be used as input to this process creating a file that can be used as input to the Viewing Analytics Engine 142.

The preprocessing of channel tune data from a Set-top box application system is further defined in Applicant's co-pending U.S. application Ser. No. 12/981,301 filed on Dec. 29, 2010 entitled "SYSTEM AND METHOD FOR ANALYZING HUMAN INTERACTION WITH ELECTRONIC DEVICES THAT ACCESS A COMPUTER SYSTEM THROUGH A NETWORK". This application is incorporated in its entirety but is not admitted to be prior art.

Figure 5:
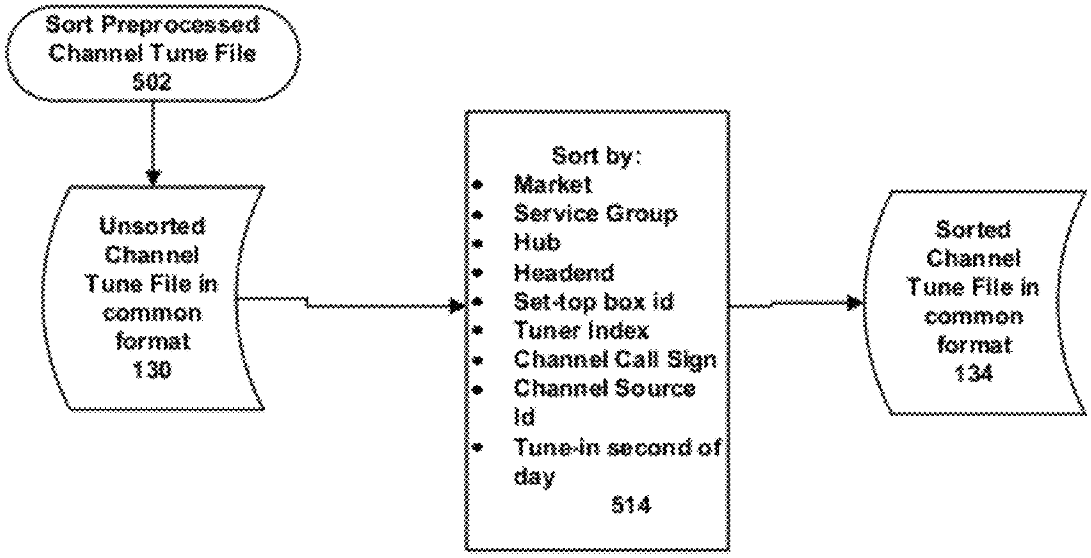
FIG. 5 illustrates an exemplary flowchart for sorting channel tune data that has been preprocessed into a standardized format so that the channel tune data can be loaded to the Viewing Analytics Engine 142 for processing, according to one embodiment.

FIG. 5 is a flowchart which illustrates an exemplary process using a computer for sorting the Unsorted Channel Tune File in common format 130, according to one embodiment. FIG. 5 provides the detail of 132 Sort Channel tune file.

FIGS. 19A-B-C provide the detail of the record that is being sorted in this step.

The Unsorted Channel Tune File in common format 130 is sorted by into order Market, Service Group, Hub, Headend, Set-top box id, Tuner Index, Channel Call Sign, Channel Source Id, and Tune-in second of day by step 514 Sort by Market, Service Group, Hub, Headend, Set-top box id, Tuner Index, Channel Call Sign, Channel Source Id, and Tune-in second of day. The resulting file from this computer sort is Sorted Channel Tune File in common format 134.

The sorting of channel tune data is further defined in Applicant's co-pending U.S. application Ser. No. 12/981,301 filed on Dec. 29, 2010 entitled "SYSTEM AND METHOD FOR ANALYZING HUMAN INTERACTION WITH ELEC- TRONIC DEVICES THAT ACCESS A COMPUTER SYSTEM THROUGH A NETWORK". This application is incorporated in its entirety but is not admitted to be prior art.

Figure 6A:
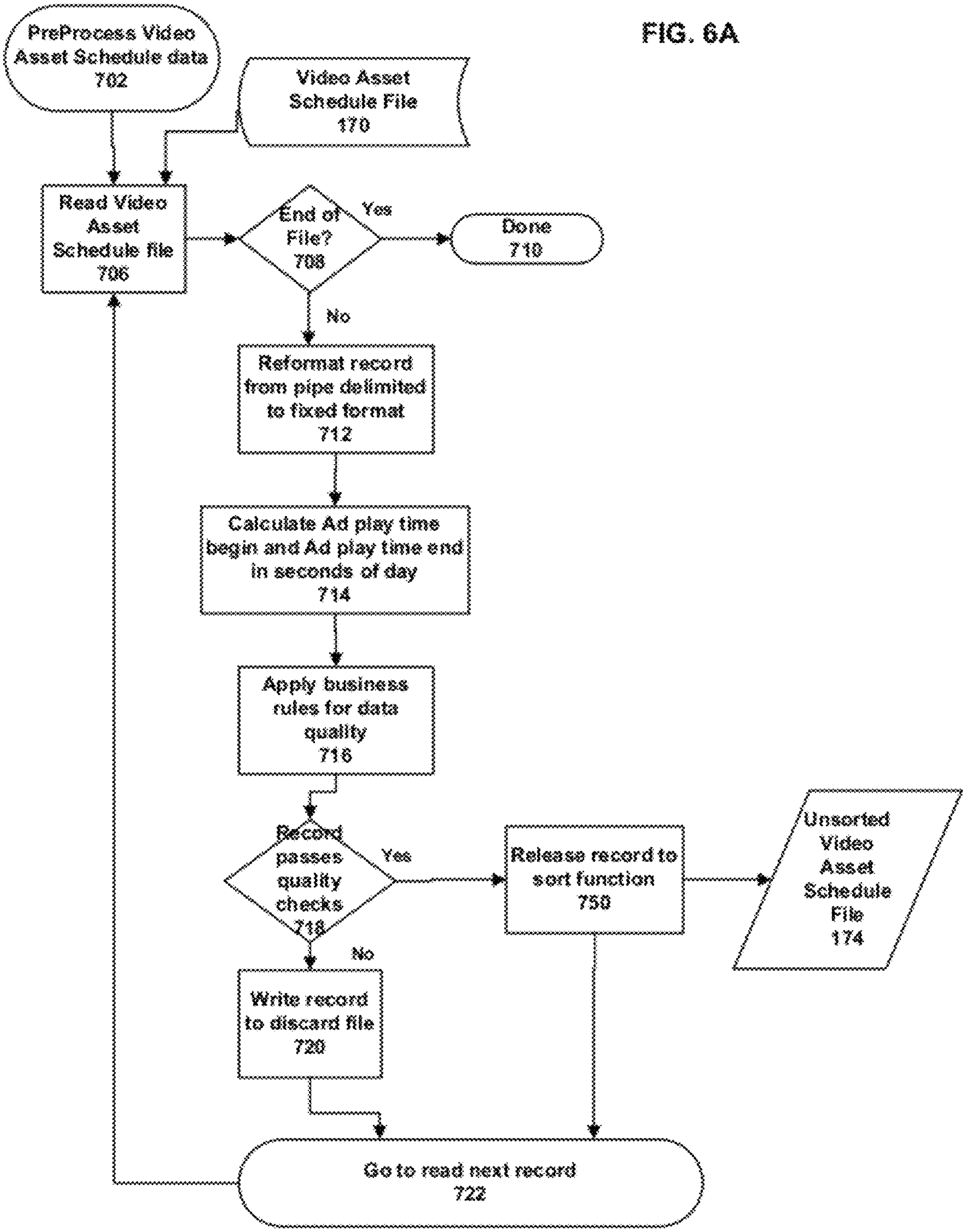
FIGS. 6A-B illustrate exemplary flowcharts for preprocessing Video Asset Schedule data, according to one embodiment with FIG. 6A showing Part A of the process and FIG. 6B showing Part B of the process.
Figure 6B:
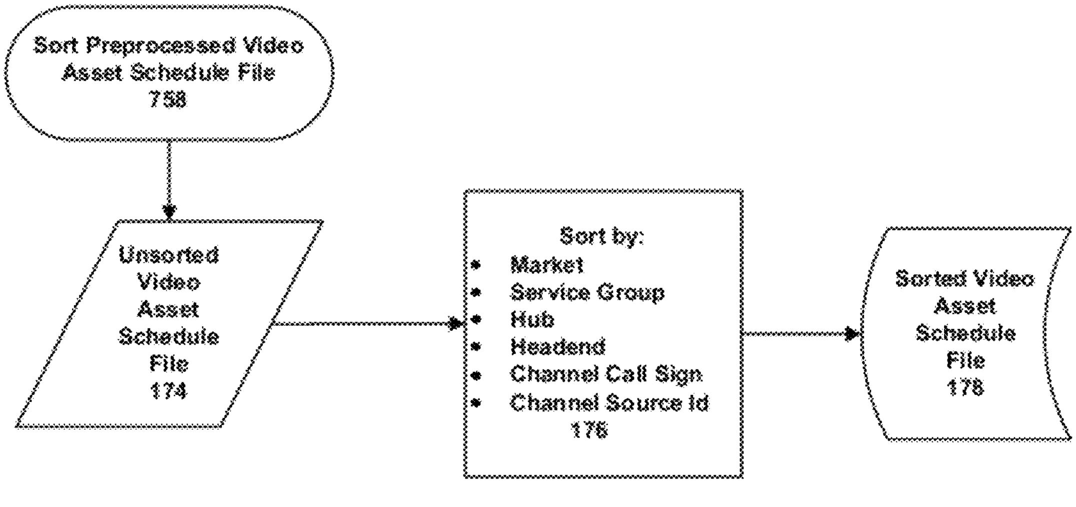

FIGS. 6A-B illustrate exemplary flowcharts for preprocessing Video Asset Schedule data, according to one embodiment with FIG. 6A showing Part A of the process and FIG. 6B showing Part B of the process.

FIG. 6A is a flowchart which illustrates an exemplary process using a computer for preprocessing Video Asset Schedule file 170 from a Video Asset Scheduling System 108 so that it can be used by the Viewing Analytics Engine 142, according to one embodiment.

FIGS. 6A-B provides the detail of Preprocess Video Asset Schedule for sorting 172.

The process begins with Preprocess Video Asset Schedule data 702. A Read Video Asset Schedule file 706 process reads each record in Video Asset Schedule file 170. The program checks for end of file 708 and stops when done 710.

For each record the program Reformats the record from the pipe-delimited format in which it was received to a fixed format 712.

The program then calculates 714 the Ad play time begin and Ad play time end in seconds of the day resulting in a value for each between 1 and 86,400. The calculations performed vary depending on the input format of the ad play begin date and time and ad play end date and time.

The program then applies business rules 716 for data quality. The business rules to be applied vary depending on what rules the Video asset Scheduling System has applied to the data.

After the business rules 716 have been applied, the program checks to see if the record passes the quality checks 718.

Records that pass the quality checks 718 are Released to the sort function 750 which writes the record to the file Unsorted Video Asset Schedule file 174.

At this point the process proceeds to go to read the next record in the file 722.

If an Video Asset Schedule record fails the quality checks 718, the record is written to the discard file 720. From here the process proceeds to go to read next record in the file 722.

FIG. 6B is a flowchart which illustrates an exemplary process using a computer to sort the file Unsorted Video Asset Schedule 174 so that it can be used by the Viewing Analytics Engine 142, according to one embodiment.

FIG. 6B provides the detail of 176 Sort Preprocessed Video Asset Schedule file. FIGS. 22-A-B-C provide the detail of the record that is being sorted in this step.

The process begins with Sort Preprocessed Video Asset Schedule File 758. The Unsorted Video Asset Schedule file 174 is sorted by into order Market, Service Group, Hub, Headend, Channel Call Sign, and Channel Source Id by step 176 Sort by Market, Service Group, Hub, Headend, Channel Call Sign, and Channel Source Id. The resulting file from this computer sort is Sorted Video Asset Schedule file 178 which is now ready for use by the Viewing Analytics Engine 142.

Figure 7A:
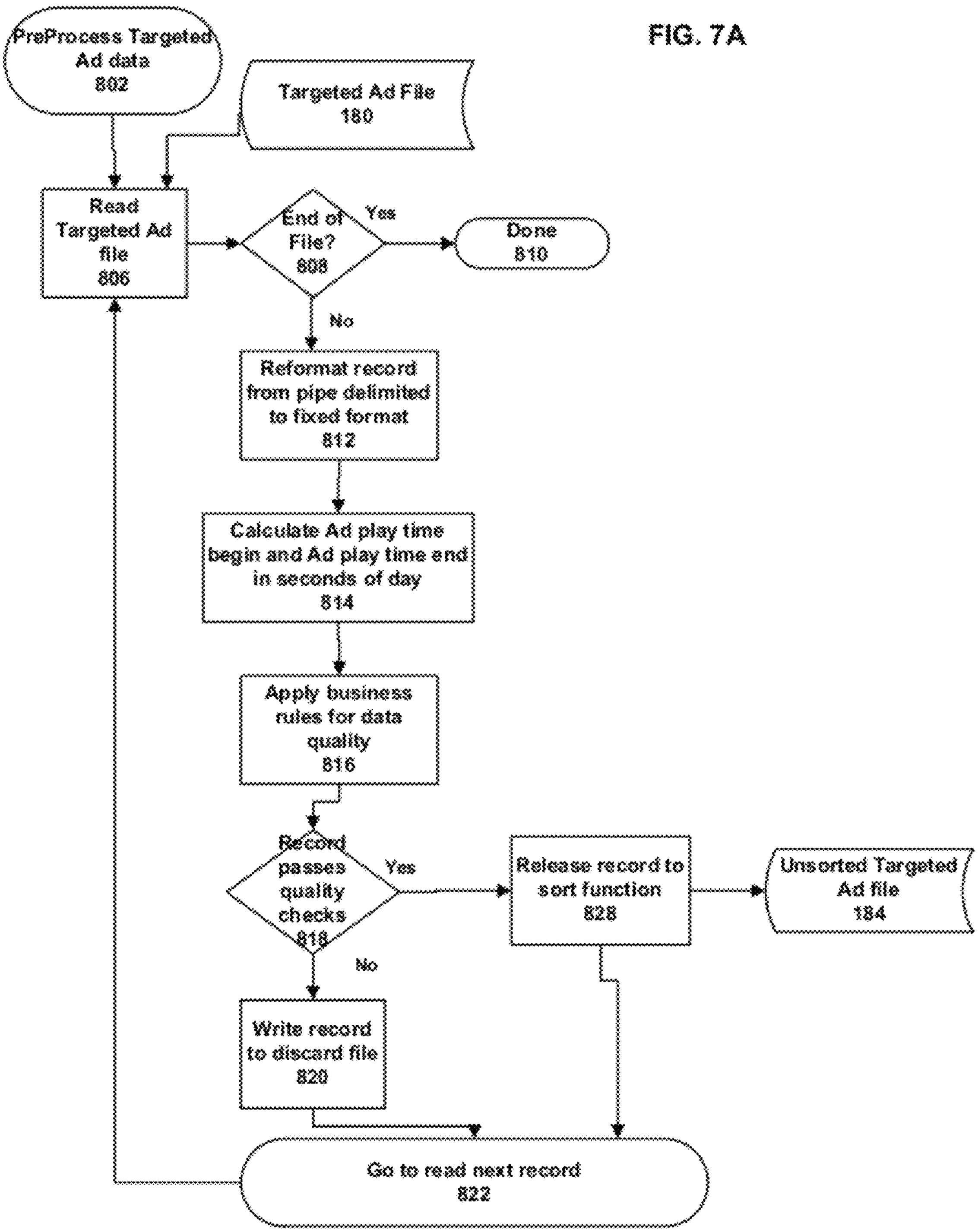
FIGS. 7A-B illustrate exemplary flowcharts for preprocessing Targeted Ad data, according to one embodiment with FIG. 7A showing Part A of the process and FIG. 7B showing Part B of the process.
Figure 7B:
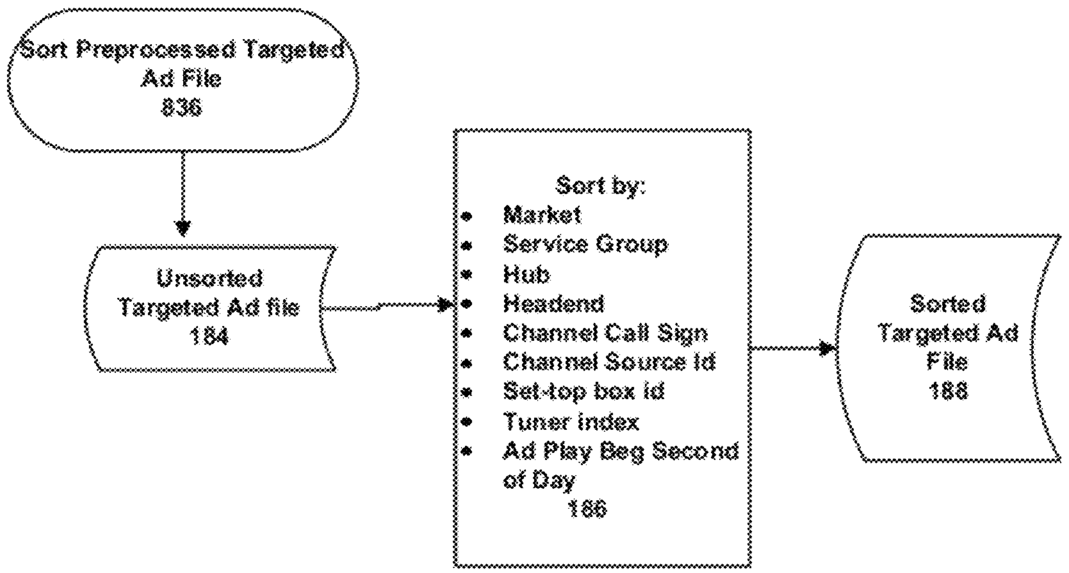

FIGS. 7A-B illustrate exemplary flowcharts for preprocessing Targeted Ad data, according to one embodiment with FIG. 7A showing Part A of the process and FIG. 7B showing Part B of the process.

FIG. 7A is a flowchart which illustrates an exemplary process using a computer for preprocessing Targeted Ad data from a Targeted Ad Delivery System 110 so that it can be used by the Viewing Analytics Engine 142, according to one embodiment.

FIG. 7A provides the detail of 182 Preprocess Targeted Ad file for sorting. FIG. 24-A-B provide the detail of the record that contains the source data for this step. FIG. 25-A-B provide the detail of the record that is being created in this step.

Note: While this description uses the term Targeted Ad, any video asset could be targeted and thus a more general term that I also use is Targeted Content.

The process begins with Preprocess Targeted Ad data 802. A Read Targeted Ad file 806 process reads each record in Targeted Ad file 180. The program checks for end of file 808 and stops when done 810.

For each record the program Reformats the record from the pipe-delimited format in which it was received to a fixed format 812.

The program then calculates 814 the Ad play time begin and Ad play time end in seconds of the day resulting in a value for each between 1 and 86,400. The calculations performed vary depending on the input format of the ad play begin date and time and ad play end date and time.

The program then applies business rules 816 for data quality. The business rules to be applied vary depending on what rules the Targeted Ad Delivery System 110 has applied to the data.

After the business rules 816 have been applied, the program checks to see if the record passes the quality checks 818.

Records that pass the quality checks 818 are Released to the sort function 828 which writes the record to the file Unsorted Targeted Ad file 184.

At this point the process proceeds to go to read the next record in the file 822.

If a Targeted Ad record fails the quality checks 818, the record is written to the discard file 820. From here the process proceeds to go to read next record in the file 822.

FIG. 7B is a flowchart which illustrates an exemplary process using a computer to sort the file Unsorted Targeted Ad file 184 so that it can be used by the Viewing Analytics Engine 142, according to one embodiment.

FIG. 7B provides the detail of 186 Sort Targeted Ad file. FIG. 25-A-B provides the detail of the record that is being sorted in this step.

The process begins with Sort Preprocessed Targeted Ad File 836. The Unsorted Targeted Ad file 184 is sorted by into order Market, Service Group, Hub, Headend, Channel Call Sign, Channel Source Id, Set-top box id, Tuner index, and Ad Play Beg Second of Day by step 186 Sort by Market, Service Group, Hub, Headend, Channel Call Sign, Channel Source Id, Set-top box id, Tuner index, and Ad Play Beg Second of Day. The resulting file from this computer sort is Sorted Targeted Ad file 188 which is now ready for use by the Viewing Analytics Engine 142.

Figure 8:
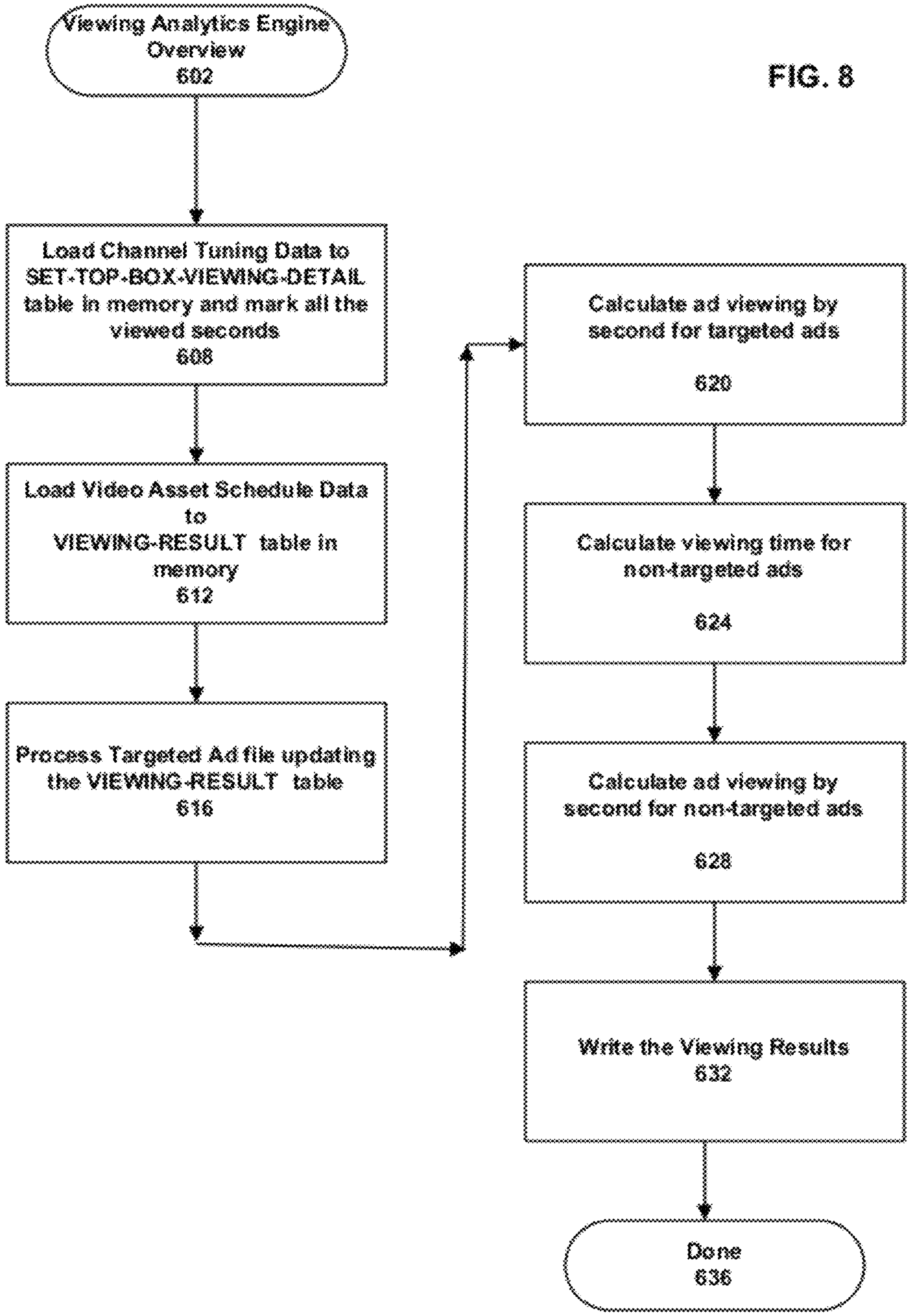
FIG. 8 illustrates exemplary flowchart for the Viewing Analytics Engine 142 overview, according to one embodiment.

FIG. 8 illustrates exemplary overview flowchart for the Viewing Analytics Engine 142, according to one embodiment.

FIG. 8 provides additional detail of Viewing Analytics Engine 142.

The process begins with Viewing Analytics Engine Overview 602. The first step is to run process 608 Load Channel Tuning Data to SET-TOP-BOX-VIEWING-DETAIL table in memory and mark all the viewed seconds. This process loads the sorted channel tuning data from 134 Sorted Channel Tune File in common format (see FIG. 19-A-B-C for details) to a Viewing Detail Data Structure in the memory of a computer (see FIG. 20-A-B for details) in preparation for the Viewing Analytics process. The detail of this process is described in FIG. 9-A-B.

The loading of channel tuning data to a table in memory and marking viewing seconds is further defined in Applicant's co-pending U.S. application Ser. No. 12/981,301 filed on Dec. 29, 2010 entitled "SYSTEM AND METHOD FOR ANALYZING HUMAN INTERACTION WITH ELECTRONIC DEVICES THAT ACCESS A COMPUTER SYSTEM THROUGH A NETWORK". This application is incorporated in its entirety but is not admitted to be prior art.

The next step is to run process 612 Load Video Asset Schedule Data (see FIG. 22-A-B-C for details) to VIEWING-RESULT Data Structure (table) (see FIG. 23-A-B for details) in memory. This process loads the sorted Video Asset schedule data from 178 Sorted Video Asset Schedule file to the VIEWING-RESULT Data Structure in the memory of a computer in preparation for the Viewing Analytics process. The detail of this process is described in FIG. 10-A-B.

The next step is to run process 616 Process Targeted Ad file updating the VIEWING-RESULT table. This process reads the Sorted Targeted Ad file 188 and for each ad, calculates the viewing seconds according to various rules. The detail of this process is described in FIGS. 11-A-B.

The next step is to run process 620 Calculate ad viewing by second for targeted ads. This process calculates the ad viewing on a second-by-second basis for each second for the targeted ads. The detail of this process is described in FIG. 12-A-B. Note: The labeling of 'targeted ad' is merely for convenience, the process will run the calculations for any targeted content.

The next step is to run process 624 Calculate viewing time for non-targeted ads. This process calculates the ad viewing time for each non-targeted ad and/or program identified in the VIEWING-RESULT table that was loaded previously. The detail of this process is described in FIGS. 13-A-B.

The next step is to run process 628 Calculate ad viewing by second for non-targeted ads. This process calculates the ad viewing on a second-by-second basis for each second for the non-targeted ads. The detail of this process is described in FIG. 14-A-B. Note: The labeling of 'non-targeted ad' is merely for convenience, the process will run the calculations for any non-targeted video asset.

The final step is to run process 632 Write the Viewing Results. This process writes the VIEWING-RESULT data to an output file. The detail of this process is described in FIG. 15-A-B.

The Viewing Analytics Engine 142 completes program wrap-up tasks as shown by the 636 Done process.

FIGS. 9-A-B illustrate an exemplary process for loading standardized channel tune data into the STB-CHANNEL-VIEWING-DETAIL Data Structure (table) in the memory of the computer that is running the Viewing Analytics Engine 142, according to one embodiment. The data is being loaded to this Data Structure so that the Viewing Analytics Engine 142 can then calculate the various viewing metrics for targeted ads (targeted content) and for other ads and/or programs (the non-targeted programs).

FIG. 9-A-B is the detail of part 608.

The input file Sorted Channel Tune File in common format 134 is described in detail in FIGS. 19-A-B-C with FIG. 19-A illustrating the file format, and FIG. 19-B illustrating sample data without program attribute, or demographics, and FIG. 19-C illustrating sample data with program attribute, and demographics, according to one embodiment.

The Viewing Detail Data Structure is described in detail in FIGS. 20-A-B where FIG. 20-A illustrates the Data Structure, and FIG. 20-B illustrates sample data in this Data Structure, according to one embodiment. Note: In the accompanying source code, the Viewing Detail Data Structure is known by the name STB-CHANNEL-VIEWING-DETAIL.

FIG. 9A illustrates a flowchart of the process which begins with Process Channel Tune File 652. The computer program first creates the STB-CHANNEL-VIEWING-DETAIL Data Structure (table) FIGS. 20-A-B in the memory of the computer and initializes all the values 654 to space or zero depending on the data type. The program next performs Reads Channel Tune File 656 using Sorted Channel Tune File in common format 134 as input. This input file format is described in FIG. 19-A-B-C. The program checks for End of file 658. When true, the loading of the Data Structure is Done 660 and the program proceeds to the next step.

When it is not end of file, the program Searches for key of Channel Tune record in STB-CHANNEL-VIEWING-DETAIL Data Structure (table) in the memory 662. The Comparison fields 664 for this search are MARKET, SERVICE-GROUP, HUB, HEADEND, CHANNEL-CALL-SIGN, CHANNEL-SOURCE-ID, SET-TOP-BOX-ID, TUNER-INDEX. When Found match on key 666 is Yes/true, the program proceeds to set VIEWED-CHANNEL-FLAG to 1 for each second of the day from tune-in second of day to tune-out second of day inclusive 670.

When Found match on key 666 is No/false, the program Populate a row in STB-CHANNEL-VIEWING-DETAIL using the key in Channel Tune record 668. It then proceeds to 670 where populates the VIEWED-CHANNEL-FLAG.

After the program has completed step 670, it proceeds to 656 to read the next record in the file.

FIG. 9B illustrates an exemplary code sample for loading the STB-CHANNEL-VIEWING-DETAIL table FIGS. 20-A-B in the memory of the computer, according to one embodiment. The code follows the pattern of the flowchart in FIG. 9A.

The process for loading standardized channel tune data to a table in memory and marking viewing seconds is further defined in Applicant's co-pending U.S. application Ser. No. 12/981,301 filed on Dec. 29, 2010 entitled "SYSTEM AND METHOD FOR ANALYZING HUMAN INTERACTION WITH ELECTRONIC DEVICES THAT ACCESS A COMPUTER SYSTEM THROUGH A NETWORK". This application is incorporated in its entirety but is not admitted to be prior art.

Note: FIG. 9-A-B describes loading values that identify second-by-second channel viewing activity to selected buckets in the viewing detail data structure based on the tune-in date and time and the tune-out date and time of each the channel tuning event thus identifying second-by-second channel viewing activity showing whether or not the set-top box was tuned to the channel during each second of a period of interest using the channel tuning data, according to one embodiment.

Note: FIG. 9-A-B also describes a method to identify channels viewed the times those channels were viewed by individual set-top boxes using the channel tuning data, according to one embodiment.

Note: The process described in FIG. 9-A-B can also be used to identify content viewed by individual electronic devices and the times that the content was viewed by individual electronic devices using the electronic device usage data, according to one embodiment.

Figure 10:
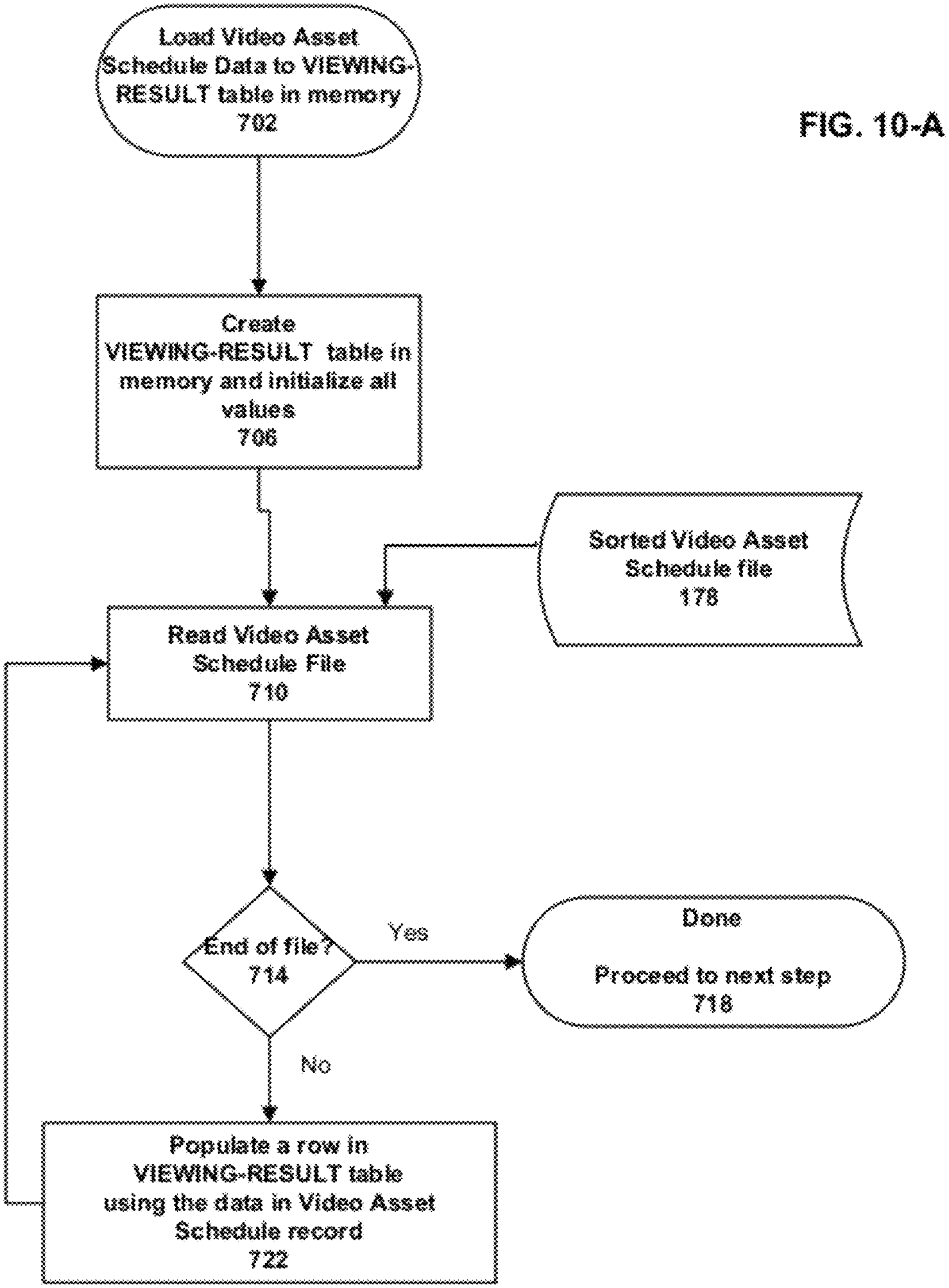
FIGS. 10A-B illustrate an exemplary process for loading Video Asset Schedule data into the VIEWING RESULT Data Structure in the Viewing Analytics Engine 142 in preparation for calculating the various viewing metrics, according to one embodiment with FIG. 10-A illustrating a flowchart of the process and FIG. 10-B illustrating an exemplary code sample.

FIGS. 10A-B illustrate an exemplary process for loading Video Asset Schedule data into the VIEWING RESULT Data Structure (table) (see FIG. 23-A-B for details) in the Viewing Analytics Engine 142 in preparation for calculating the various viewing metrics, according to one embodiment with FIG. 10-A illustrating a flowchart of the process and FIG. 10-B illustrating an exemplary code sample. The data is being loaded to this Data Structure so that the Viewing Analytics Engine 142 can then calculate the various viewing metrics for targeted ads and for other ads and/or programs (the non-targeted programs). FIG. 10-A-B is the detail of part 612.

The input file Sorted Video Asset Schedule file 178 is described in detail in FIGS. 22-A-B with FIG. 22-A illustrating the file format, and FIG. 22-B part 2007 illustrating sample data without targeted ad data, and FIG. 22-B part 2009 illustrating sample data with targeted ad data, according to one embodiment.

The VIEWING RESULT Data Structure is described in detail in FIGS. 23-A-B where FIG. 23-A illustrates the Data Structure, and FIG. 23-B part 3205 illustrates sample data without targeted ad data, and FIG. 23-B part 3207 illustrates sample data with targeted ad data, according to one embodiment.

FIG. 10-A illustrates a flowchart of the process which begins with 702 Load Video Asset Schedule Data to VIEWING-RESULT Data Structure (table) in memory. The computer program first executes 706 Create VIEWING-RESULT table in memory and initialize all values which creates the VIEWING-RESULT Data Structure (table) FIGS. 23-A-B in the memory of the computer and initializes all the values 706 to space or zero depending on the data type. The program next performs Read Video Asset Schedule File 710 using Sorted Video Asset Schedule file 178 as input. This input file format is described in FIG. 22-A-B. The program checks for End of file 714. When true, the loading of the Data Structure is Done 718 and the program proceeds to the next step.

When it is not end of file, the program does Populate a row in VIEWING-RESULT table using the data in Video Asset Schedule record 722.

After the program has completed step 722, it proceeds to 710 to read the next record in the file.

FIG. 10B illustrates an exemplary code sample for loading the VIEWING-RESULT Data Structure (table) FIGS. 23-A-B in the memory of the computer, according to one embodiment. The code follows the pattern of the flowchart in FIG. 10-A.

Note: FIG. 10-A-B describes receiving video asset schedule data and making that data available to the Viewing Analytics Engine 142, according to one embodiment. The video asset schedule data can be in regard to any electronic device, including, but not limited to, a cable television set-top box, a satellite television set-top box, or an internet protocol television.

Note: FIG. 10-A-B describes receiving program attribute data and making that data available to the Viewing Analytics Engine 142, according to one embodiment. The program attribute data can be in regard to any video asset airing on any electronic device, including, but not limited to, a cable television set-top box, a satellite television set-top box, or an internet protocol television.

Note: FIG. 10-A-B describes the process by which the Viewing Analytics Engine 142 correlates video asset schedule data and program attribute data, according to one embodiment.

Figure 11:
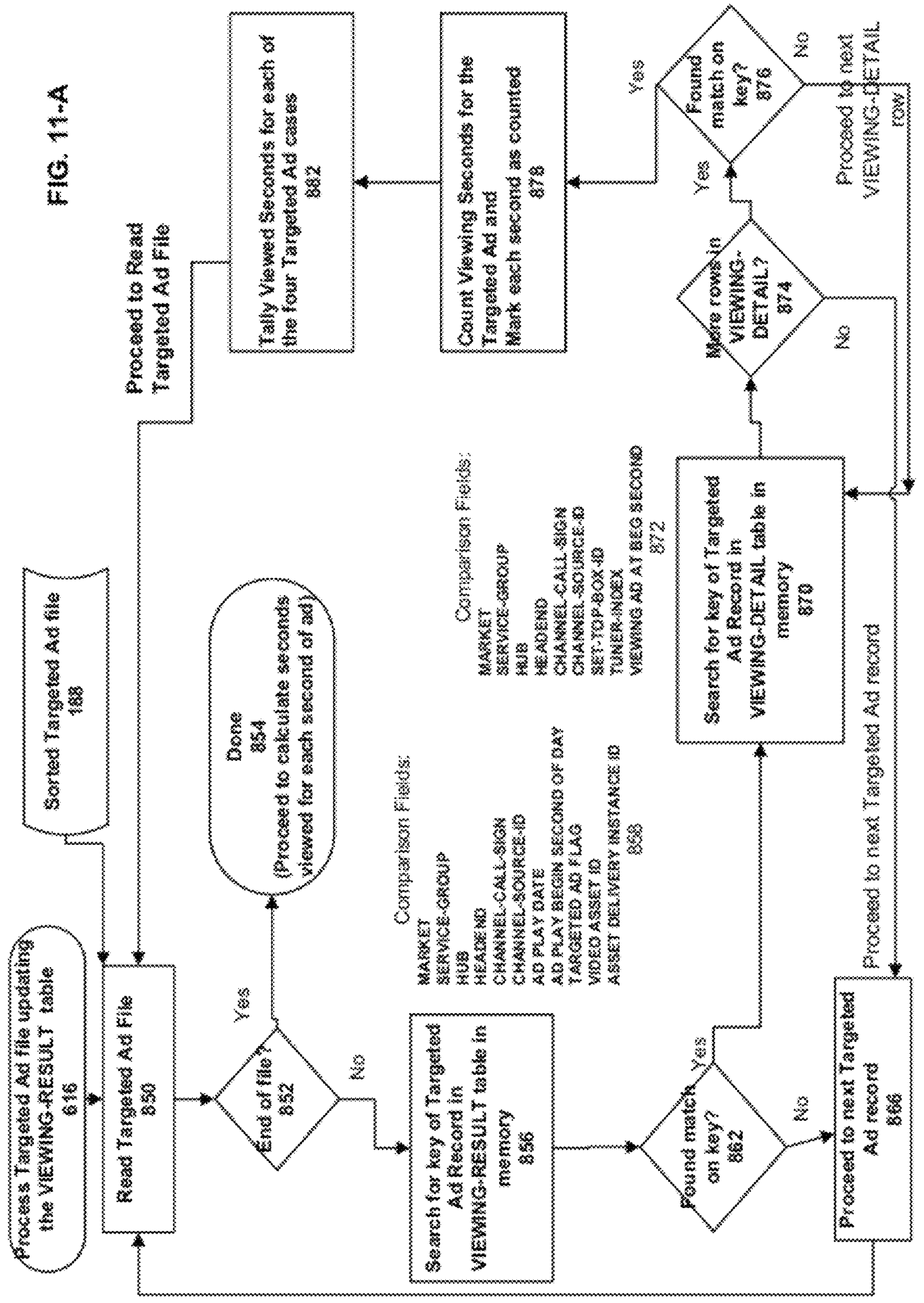
FIGS. 11-A-B illustrate an exemplary process for processing the Targeted Ad File to calculate the viewing seconds for each of the Targeted Ad cases, according to one embodiment with FIG. 11-A illustrating a flowchart of the process and FIG. 11-B illustrating an exemplary code sample.

FIGS. 11A-B illustrate an exemplary process for processing the Targeted Ad File to calculate the viewing seconds for each of the Targeted Ad cases, according to one embodiment with FIG. 11-A illustrating a flowchart of the process and FIG. 11-B illustrating an exemplary code sample.

FIGS. 11-A-B is the detail of part 616.

The input file Sorted Targeted Ad file 188 is described in detail in FIGS. 25-A-B with FIG. 25-A illustrating the file format, and FIG. 25-B illustrating sample data, according to one embodiment.

FIG. 11-A illustrates a flowchart of the process which begins with 616 Process Targeted Ad file updating the VIEWING-RESULT table. Step 850 Read Targeted Ad File reads file 188 Sorted Targeted Ad file. The program checks for End of file 852. When true, the processing of the Targeted Ad file 188 is Done 854 and the program proceeds to calculate seconds viewed for each second of ad.

When it is not end of file, the program does 856 Search for key of Targeted Ad Record in VIEWING-RESULT table in memory. The comparison fields for this search are: MARKET SERVICE-GROUP, HUB, HEADEND, CHANNEL-CALL-SIGN, CHANNEL-SOURCE-ID, AD PLAY DATE, AD PLAY BEGIN SECOND OF DAY, TARGETED AD FLAG, VIDEO ASSET ID, ASSET DELIVERY INSTANCE ID as listed in Comparison Fields in 858. This describes the process by which the Viewing Analytics Engine 142 correlates video asset schedule data (which was loaded to the Viewing Result Data Structure) with targeted content delivery data, according to one embodiment. The same process applies when correlating video asset schedule data regarding video assets delivered to an electronic device with targeted content delivery data delivered to a targeted electronic device.

Note that there can be multiple Targeted Ad file records that all point to the same key in the VIEWING-RESULT Data Structure (table). This simply means that the same ad was targeted to multiple set-top boxes.

When a match is found on the key 862, the program proceeds to 870 Search for key of Targeted Ad Record in VIEWING-DETAIL table in memory.

In routine 870 Search for key of Targeted Ad Record in VIEWING-DETAIL table in memory the system compares the fields in the Targeted Ad record with the key of the VIEWING-DETAIL table matching on MARKET, SERVICE-GROUP, HUB, HEADEND, CHANNEL-CALL-SIGN, CHANNEL-SOURCE-ID, SET-TOP-BOX-ID, TUNER-INDEX, VIEWING AD AT BEG SECOND as specified in Comparison Fields 872. The objective is to locate the VIEWING-DETAIL Data Structure row that corresponds to when the Targeted Ad was played. There can only be one such record, so when we find it, proceed to the calculations. This describes the process by which the Viewing Analytics Engine 142 correlates channel viewing activity (which was loaded to the Viewing Detail Data Structure) with targeted content delivery data, according to one embodiment. The same process applies when correlating content viewing activity derived from electronic device usage data with targeted content delivery data delivered to a targeted electronic device.

If 874 More rows in VIEWING-DETAIL is true, proceed to 876 Found match on key. When the Targeted Ad key is not found in the VIEWING-DETAIL table, the program Proceeds to the next VIEWING-DETAIL record 870 to continue looking thru the VIEWING-DETAIL table.

When 874 More rows in VIEWING-DETAIL is 'no' control passes to 866 Proceed to next Targeted Ad record.

When 876 Found match on key is 'no', the program goes to check the next record in the VIEWING-DETAIL table to repeat the process. When Found match on key 876 is 'yes' this means that we found the VIEWING-DETAIL row that corresponds to when the Targeted Ad was played. Proceed to the calculations. At this point the system does process 878 Count Viewing Seconds for the Targeted Ad and Mark each second as counted.

As noted, when the program finds a match between the Targeted Ad file and the VIEWING-DETAIL table, it then does step 878 Count Viewing Seconds for the Targeted Ad and Mark each second as counted. The purpose for marking the Targeted Ad seconds as counted is so that when the program later reviews the VIEWING-DETAIL for the non-targeted ads/programs, it does not double count those viewing seconds.

After counting the viewing seconds of the Targeted Ad by the Set-top box, the system then does step 882 Tally Viewed Seconds for each of the four Targeted Ad cases. In this step, the system updates the corresponding VIEWING-RESULT fields for each of the four targeted ad cases so as to get a count of the total number of viewing seconds for the Targeted Ad for each case and the total number of viewers of the Targeted Ad for each case. This is more fully described in DETAILED DESCRIPTION OF THE DRAWINGS for FIGS. 23-A-B.

At this point the system is done processing this Targeted Ad record and so it proceeds to 850 Read Targeted Ad File to get the next record.

To summarize, the process 856 searches for the key of the Targeted Ad record in the VIEWING-RESULT table in memory. This allows us to tally the viewing against the correct VIEWING-RESULT (the one associated with the Targeted Ad). When a match is found, then the process searches the VIEWING-DETAIL table in memory to find the row of viewing activity for the Set-top box that is specified in the Targeted Ad. When we find the VIEWING-DETAIL associated with the set-top box that was being targeted, then (assuming all the criteria match), we can add the viewing seconds to the counts in the VIEWING-RESULT table that correspond to the targeted ad.

FIG. 11B illustrates an exemplary code sample for processing the Targeted Ad File to calculate the viewing seconds for each of the Targeted Ad cases, according to one embodiment. The code follows the pattern of the flowchart in FIG. 11A. See the program source code for more details.

Figure 12:
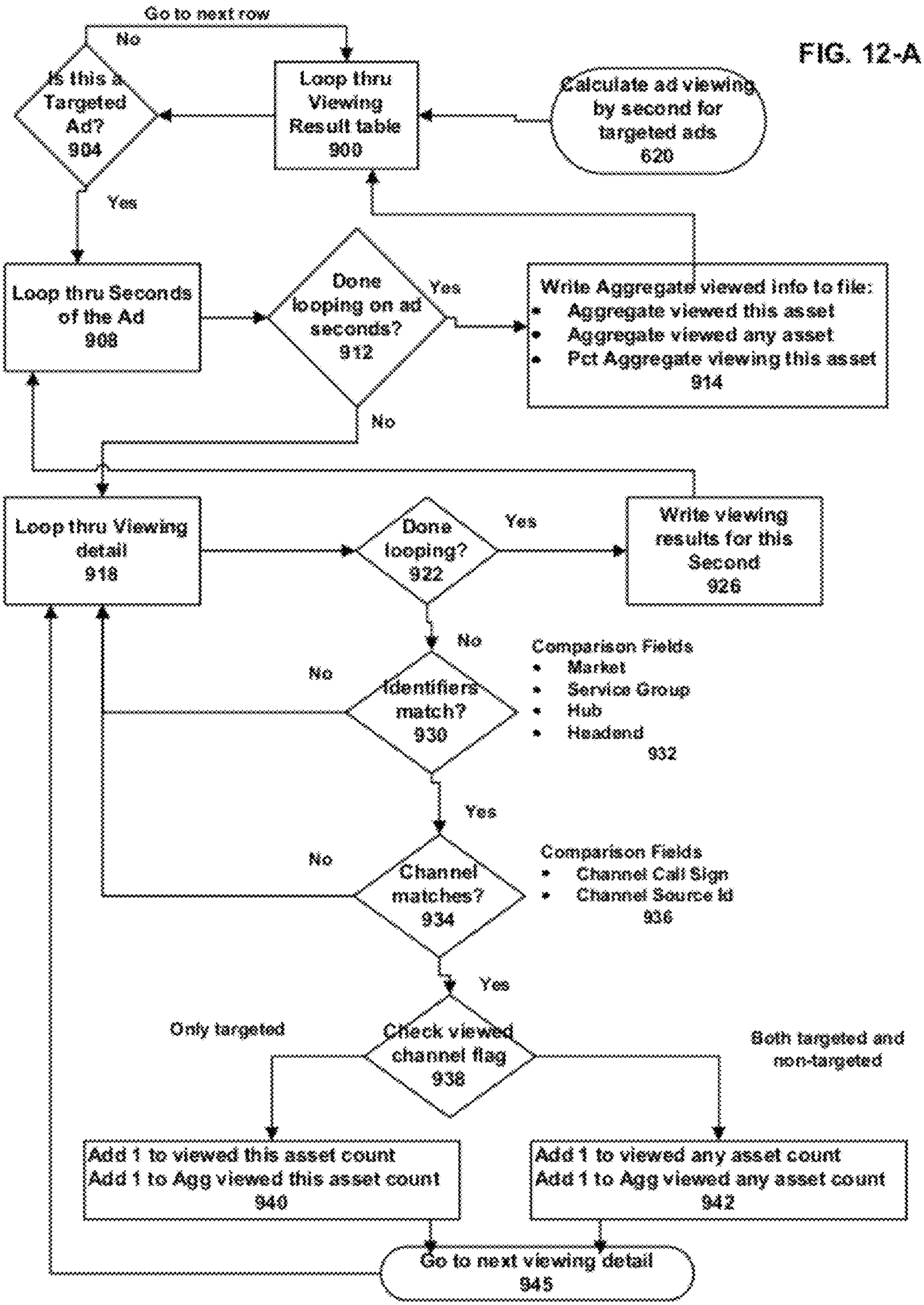
FIGS. 12-A-B illustrate an exemplary process for Calculating ad viewing seconds on a second-by-second basis for targeted ads, according to one embodiment with FIG. 12-A illustrating a flowchart of the process and FIG. 12-B illustrating an exemplary code sample.

FIGS. 12-A-B illustrate an exemplary process for Calculating ad viewing seconds on a second-by-second basis for targeted ads, according to one embodiment with FIG. 12-A illustrating a flowchart of the process and FIG. 12B illustrating an exemplary code sample.

FIGS. 12-A-B is the detail of part 620.

Note: For convenience I have used the term Targeted Ad; any targeted content (ad, program, video asset) can be processed by this routine.

This process is driven from the VIEWING-RESULT Data Structure which is described in detail in FIGS. 23-A-B, according to one embodiment. For each qualifying VIEWING-RESULT row, the process loops through the rows in the VIEWING-DETAIL Data Structure which is described in detail in FIGS. 20-A-B, according to one embodiment.

FIG. 12-A illustrates a flowchart of the process which begins with 620 Calculate ad viewing by second for targeted ads. The first step is 900 Loop thru Viewing Result table where the process creates a loop to go through each of the rows in the Viewing Result table. For each row, the process does step 904 Is this a Targeted Ad? If it is NOT a targeted ad, then the process skips that row by returning to the looping process 900.

When the VIEWING-RESULT row is a targeted ad, (VR-TARGETED-AD-FLAG is "Y"), then the program does 908 Loop thru Seconds of the Ad. The purpose here is to loop through each of the seconds time when the targeted ad ran and count how many set-top boxes where tuned to the ad for each second of the ad. The process then does the check in step 912 Done looping on ad seconds? When the process has finished looping through all of the seconds of the targeted ad, then it will execute 914 Write Aggregate viewed info to file where the system will write the following fields to the data file: Aggregate viewed this asset, Aggregate viewed any asset, Pct Aggregate viewing this asset. When the system is done writing this information, it goes back to 900 Loop thru Viewing Result table to process the next row.

When 912 Done looping on ad seconds is "No", this means that there are more ad seconds to be processed. For each second of the targeted ad the system executes process 918 Loop thru Viewing detail. The purpose here is to loop thru each of the VIEWING-DETAIL records in the table and find the records which match the key of the VIEWING-RESULT row.

The first step is 922, Done looping. When the process is done looping, this means that we have reviewed each of the seconds of viewing activity (in the Viewing Detail Data Structure) corresponding to this second of the Target Ad from the VIEWING-RESULT. When 922 is "yes", the process will do 926 Write viewing results for this Second and then proceed to 908 where it can continue Looping thru Seconds of the Ad. FIG. 27-A-B describes the record format that is being written.

If 922 Done looping is "no", then proceed to 930 Identifiers match. In this step the process is comparing the identifiers in 932 Comparison Fields Market, Service Group, Hub, Headend looking for a match between the values in the VIEWING-RESULT and the VIEWING-DETAIL. When a match is found, proceed to 934. When there is not a match the return to 918 to continue Loop thru Viewing detail.

The next step is 934 Channel Matches where the process is comparing the identifies in 936 Comparison fields Channel Call Sign and Channel Source Id looking for a match between the values in the VIEWING-RESULT and the VIEWING-DETAIL. When a match is found, proceed to 938. When there is not a match the return to 918 to continue Loop thru Viewing detail.

Note: The above steps describe the process by which the Viewing Analytics Engine 142 correlates channel viewing activity and video asset schedule data, according to one embodiment. The same process applies when correlating content viewing activity derived from electronic device usage data with video asset schedule data regarding video assets delivered to an electronic device.

In step 938 Check viewed channel flag, the process checks the channel viewed flag in the Viewing Detail Data Structure. If the channel was viewed and it was marked as a Targeted viewing second, then do 940 Add 1 to viewed this asset count and Add 1 to Agg viewed this asset count. If the channel was viewed and it was marked as a Targeted viewing second or non-targeted second, then do 942 Add 1 to viewed any asset count and Add 1 to Agg viewed any asset count.

After tallying the viewing, proceed to 945 Go to next viewing detail which then passes control to 918 Loop thru Viewing detail.

Summary of this process: For each targeted ad as specified in the VIEWING-RESULT table, we will tally up the actual viewing seconds of 'targeted viewing' and 'all viewing' for each second of the Targeted Ad. The results are written to a file. The purpose is that the system is making a record of how this targeted ad performed on a second-by-second basis with the other programming that was being watched at the same time. If the number of viewers of the Targeted Ad declines during the time that the ad was running, then this shows that the targeted ad is not keeping the viewer's attention.

FIG. 12B illustrates an exemplary code sample for Calculating ad viewing seconds on a second-by-second basis for targeted ads, according to one embodiment. The code follows the pattern of the flowchart in FIG. 12A. See the program source code for more details.

Figure 13:
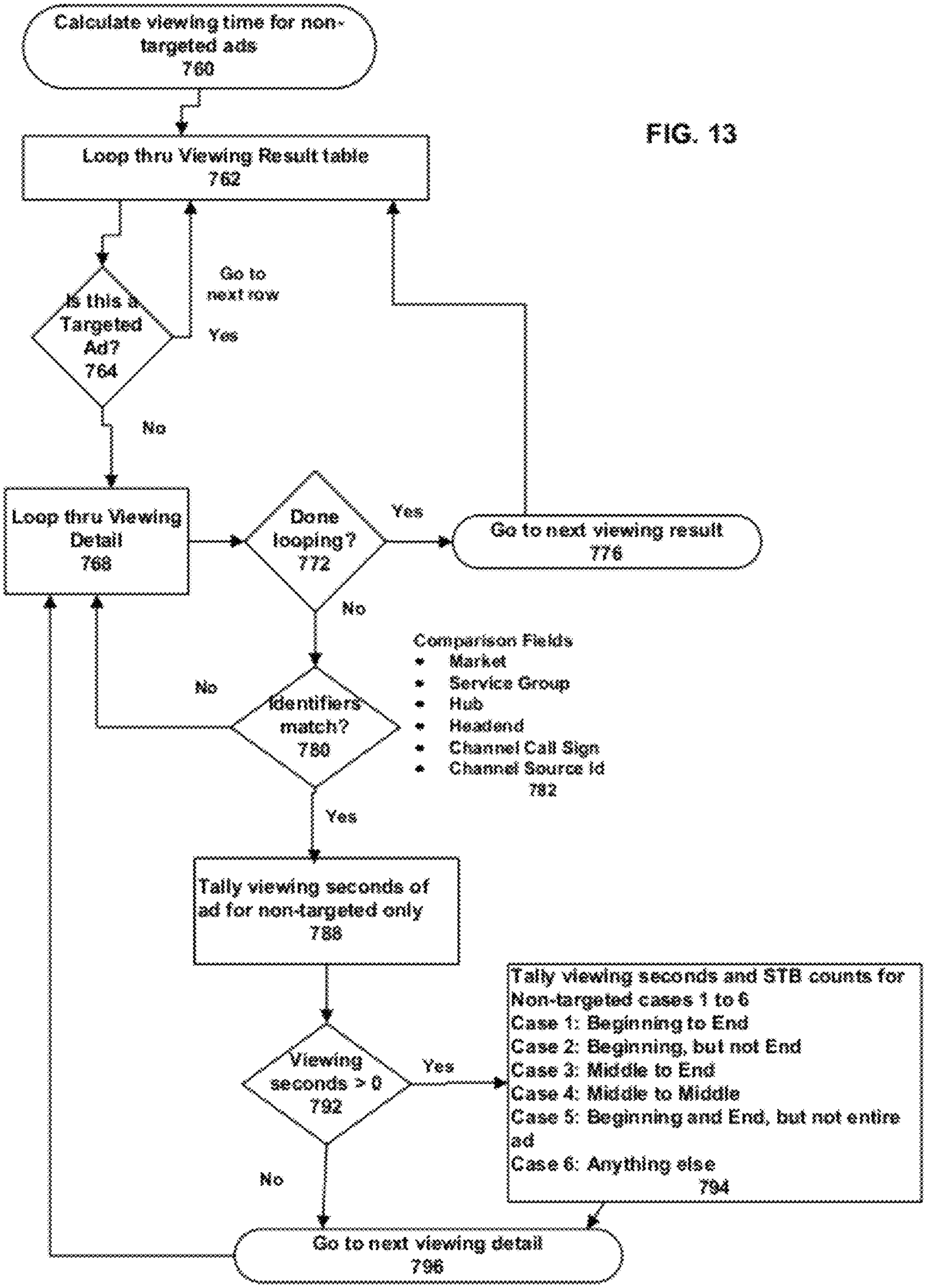
FIG. 13 illustrates an exemplary process for calculating viewing time for each of the non-targeted Ad cases, according to one embodiment with FIG. 13 illustrating a flowchart of the process.

FIG. 13 illustrates an exemplary process for Calculating viewing time for each of the six Non-Targeted Ad cases, according to one embodiment with FIG. 13 illustrating a flowchart of the process.

FIG. 13 is the detail of part 624.

This process is driven from the VIEWING-RESULT Data Structure which is described in detail in FIGS. 23-A-B, according to one embodiment. For each qualifying VIEWING-RESULT row, the process loops through the rows in the VIEWING-DETAIL Data Structure which is described in detail in FIGS. 20-A-B, according to one embodiment.

FIG. 13 illustrates a flowchart of the process which begins with 760 Calculate viewing time for non-targeted ads. The first step is 762 Loop thru Viewing Result table where the process creates a loop to go through each of the rows in the VIEWING-RESULT table. For each row, the process does step 764 Is this a Targeted Ad? If it is a targeted ad, then the process skips that row by returning to the looping process 762.

When the VIEWING-RESULT row is a non-targeted ad, (VR-TARGETED-AD-FLAG is "N"), then the program does 768 Loop thru Viewing Detail. The purpose here is to loop through each of the VIEWING-DETAIL rows so that we can find the ones which match on the key of the VIEWING-RESULT and then tally the viewing information.

The first step is 772, Done looping. When the process is done looping, this means that we have reviewed each of the VIEWING-DETAIL rows for this pass through the table. Then system next does 776 Go to next viewing result.

If 772 Done looping is "no", then proceed to 780 Identifiers match. In this step the process is comparing the identifiers in 782 Comparison Fields Market, Service Group, Hub, Channel Call Sign and Channel Source Id looking for a match between the values in the VIEWING-RESULT and the VIEWING-DETAIL. When a match is found, proceed to 788. When there is not a match then return to 768 to continue Loop thru Viewing detail.

Note: The above steps describe the process by which the Viewing Analytics Engine 142 correlates channel viewing activity and video asset schedule data, according to one embodiment. The same process applies when correlating content viewing activity derived from electronic device usage data with video asset schedule data regarding video assets delivered to an electronic device.

In step 788 Tally viewing seconds of ad for non-targeted only, the process tallies the viewing seconds of the set-top box for the time period from start second to end second of the ad or program as specified in the VIEWING-RESULT row.

After tallying the viewing seconds, then the process proceeds to 792 Viewing seconds >0 to check to see if there were any viewing seconds of this Ad or Program by the Set-top box. If there are no viewing seconds, control passes to 796 Go to next viewing detail where the system continues looping through the viewing detail records. If there are viewing seconds (viewing seconds >0 is 'yes'), control passes to 794 Tally viewing seconds and STB counts for Non-targeted cases 1 to 6 where the system analyzes each of the possible cases and determine which case applies (1-6) and then it adds the viewing seconds to the counts for that case and increments the viewing counter for that case. This is more fully described in DETAILED DESCRIPTION OF THE DRAWINGS for FIGS. 23-A-B.

After completing 794, control passes to 796 Go to next viewing detail where the system continues looping through the viewing detail records.

Summary of this process: For each non-targeted ad as specified in the VIEWING-RESULT table, we will tally up the actual viewing seconds of non-targeted viewing for the entire time span from the start to the end of the ad or program. This could be 30 seconds or 30 minutes of seconds (1800 seconds). If the set-top box was not tuned to the program, then the tally will be zero. If the set-top box was tuned to the channel, then we would expect viewing seconds. Once we have the count of viewing seconds, we apply logic to determine which of the six cases describes what happened; i.e.: was the set-top box tuned from beginning to end, from beginning to middle, from middle to end, etc? Depending on which case is relevant, the system adds the viewing seconds to that bucket and increments the viewing counter for that bucket.

See the program source code for more details.

FIGS. 14-A-B illustrate an exemplary process for Calculating ad viewing by seconds on a second-by-second basis for non-targeted ads, according to one embodiment with FIG. 14-A illustrating a flowchart of the process and FIG. 14-B illustrating an exemplary code sample.

FIGS. 14-A-B is the detail of part 628.

Note: For convenience I have used the term Non-Targeted Ad; any non-targeted content (ad, program, video asset) can be processed by this routine.

This process is driven from the VIEWING-RESULT Data Structure which is described in detail in FIGS. 23-A-B, according to one embodiment. For each qualifying VIEWING-RESULT row, the process loops through the rows in the VIEWING-DETAIL Data Structure which is described in detail in FIGS. 20-A-B, according to one embodiment.

FIG. 14-A illustrates a flowchart of the process which begins with 628 Calculate ad viewing by second for non-targeted ads. The first step is 950 Loop thru Viewing Result table where the process creates a loop to go through each of the rows in the Viewing Result table. For each row, the process does step 954 Is this a Targeted Ad? If it is a targeted ad, then the process skips that row by returning to the looping process 950.

When the VIEWING-RESULT row is a non-targeted ad, (VR-TARGETED-AD-FLAG is "N"), then the program does 958 Loop thru Seconds of the Ad. The purpose here is to loop through each of the seconds time when the non-targeted ad ran and count how many set-top boxes where tuned to the ad for each second of the ad. The process then does the check in step 962 Done looping on ad seconds? When the process has finished looping through all of the seconds of the targeted ad, then it will execute 964 Write Aggregate viewed info to file where the system will write the following fields to the data file: Aggregate viewed this asset, Aggregate viewed any asset, Pct Aggregate viewing this asset. When the system is done writing this information, it goes back to 950 Loop thru Viewing Result table to process the next record.

When 962 Done looping on ad seconds is "No", this means that there are more ad seconds to be processed. For each second the system executes process 968 Loop thru Viewing detail. The purpose here is to loop thru each of the VIEWING-DETAIL rows in the table and find the records which match the key of the VIEWING-RESULT row.

The first step is 972, Done looping. When the process is done looping, this means that we have reviewed each of the seconds of viewing activity corresponding to this second of the Non-Targeted Ad from the VIEWING-RESULT. When 972 is "yes", the process will do 976 Write viewing results for this Second and then proceed to 958 where it can continue Looping thru Seconds of the Ad. FIG. 28-A-B describes the record format that is being written.

If 972 Done looping is "no", then proceed to 980 Identifiers match. In this step the process is comparing the identifiers in 982 Comparison Fields Market, Service Group, Hub, Headend looking for a match between the values in the VIEWING-RESULT and the VIEWING-DETAIL. When a match is found, proceed to 984. When there is not a match the return to 968 to continue Loop thru Viewing detail.

The next step is 984 Channel Matches where the process is comparing the identifies in 986 Comparison fields Channel Call Sign and Channel Source Id looking for a match between the values in the VIEWING-RESULT and the VIEWING-DETAIL. When a match is found, proceed to 988. When there is not a match the return to 968 to continue Loop thru Viewing detail.

Note: The above steps describe the process by which the Viewing Analytics Engine 142 correlates channel viewing activity and video asset schedule data, according to one embodiment. The same process applies when correlating content viewing activity derived from electronic device usage data with video asset schedule data regarding video assets delivered to an electronic device.

In step 988 Check viewed channel flag, the process checks the channel viewed flag. If the channel was viewed and it was marked as a Non-Targeted viewing second, then do 990 Add 1 to viewed this asset count and Add 1 to Agg viewed this asset count. If the channel was viewed and it was marked as a Non-Targeted viewing second or Targeted viewing second, then do 992 Add 1 to viewed any asset count and Add 1 to Agg viewed any asset count.

After tallying the viewing, proceed to 995 Go to next viewing detail which then passes control to 968 Loop thru Viewing detail.

Summary of this process: For each non-targeted ad as specified in the VIEWING-RESULT table, we will tally up the actual viewing seconds of 'non-targeted viewing' and 'all viewing' for each second of the Non-Targeted Ad. The results are written to a file. The purpose is that the system is making a record of how this non-targeted ad performed on a second-by-second basis compared to the other programming that was being watched at the same time. If the number of viewers of the non-targeted Ad declines during the time that the ad was running, then this shows that the non-targeted ad is not keeping the viewer's attention.

FIG. 14B illustrates an exemplary code sample for Calculating ad viewing by second on a second-by-second basis for non-targeted ads cases, according to one embodiment. The code follows the pattern of the flowchart in FIG. 14A. See the program source code for more details.

FIGS. 15A-B illustrate an exemplary process for Writing the Viewing Result file with the various metrics, according to one embodiment with FIG. 15A illustrating a flowchart of the process and FIG. 15B illustrating an exemplary code sample.

FIGS. 15-A-B is the detail of part 632.

This process is driven from the VIEWING-RESULT Data Structure which is described in detail in FIGS. 23-A-B, according to one embodiment. The process loops through the VIEWING-RESULT Data Structure and writes the data in the Data Structure to the output file.

FIG. 15-A illustrates a flowchart of the process which begins with 636 write the Viewing Results. The first step is 680 Loop thru Viewing Result table where the process creates a loop to go through each of the rows in the Viewing Result table. For each row, the process does step 682 Done looping. When 682 Done looping is "Yes", this means that process is Done 688.

When 682 Done looping is "No", proceed to 684 Format viewing results and write record. Then proceed to 686 Go to next viewing result.

FIG. 15-B illustrates an exemplary code sample for writing the viewing result file, according to one embodiment. The code follows the pattern of the flowchart in FIG. 15-A.

FIGS. 16-A-B-C illustrate an exemplary channel tune file format and data according to one embodiment.

FIG. 16-A illustrates the file format in which Switched Digital Video channel tuning data from Vendor 1 may arrive. This corresponds to part 112.

FIG. 16-B illustrates two sample records 1003 and 1005 containing Switched Digital Video channel tuning data 112 from Vendor 1. Note that these records arrive as variable length records in pipe delimited format.

FIG. 16-C illustrates these two sample records 1003 and 1005 formatted into a table for human readability.

Channel tuning file formats for Switched Digital Video channel tuning data are further defined in Applicant's co-pending U.S. application Ser. No. 12/981,301 filed on Dec. 29, 2010 entitled "SYSTEM AND METHOD FOR ANALYZING HUMAN INTERACTION WITH ELECTRONIC DEVICES THAT ACCESS A COMPUTER SYSTEM THROUGH A NETWORK". This application is incorporated in its entirety but is not admitted to be prior art.

FIGS. 17-A-B-C illustrate another exemplary channel tune file format and data according to one embodiment.

FIG. 17-A illustrates the file format in which Switched Digital Video channel tuning data from Vendor 2 may arrive. This corresponds to part 114.

FIG. 17-B illustrates two sample records 1203 and 1205 containing Switched Digital Video channel tuning data 114 from Vendor 2. Note that these records arrive as variable length records in pipe delimited format.

FIG. 17-C illustrates these two sample records 1203 and 1205 formatted into a table for human readability.

Channel tuning file formats for Switched Digital Video channel tuning data are further defined in Applicant's co-pending U.S. application Ser. No. 12/981,301 filed on Dec. 29, 2010 entitled "SYSTEM AND METHOD FOR ANALYZING HUMAN INTERACTION WITH ELECTRONIC DEVICES THAT ACCESS A COMPUTER SYSTEM THROUGH A NETWORK". This application is incorporated in its entirety but is not admitted to be prior art.

FIGS. 18-A-B-C illustrate an exemplary channel tune file format and data from a Set-top box system according to one embodiment.

FIG. 18-A illustrates the file format in which Set-top box channel tuning data from Set-top box application software may arrive. This corresponds to part 116.

FIG. 18-B illustrates two sample records 1403 and 1405 containing Set-top box channel tuning data 116 from a Set-top box system. Note that these records arrive as variable length records in pipe delimited format.

FIG. 18-C illustrates these two sample records 1403 and 1405 formatted into a table for human readability.

Channel tuning file formats for Set-top box channel tuning data are further defined in Applicant's co-pending U.S. application Ser. No. 12/981,301 filed on Dec. 29, 2010 entitled "SYSTEM AND METHOD FOR ANALYZING HUMAN INTERACTION WITH ELECTRONIC DEVICES THAT ACCESS A COMPUTER SYSTEM THROUGH A NETWORK". This application is incorporated in its entirety but is not admitted to be prior art.

When processing data from electronic devices, suitable identifiers will be substituted for geography and channel to identify the system and the medium through which the content is delivered. As a non-limiting example, in a satellite television system, the identifiers for Market, Service Group, Headend, and Hub will be replaced by identifiers suitable to satellite television operations.

FIGS. 19-A-B-C illustrate an exemplary channel tune file formatted for use by the Viewing Analytics Engine 142.

FIG. 19-A illustrates the record layout of both the Unsorted Channel Tune File 130 and the Sorted Channel Tune File in common format 134.

FIG. 19-B illustrates two sample records 1603 and 1605 in these record layouts without program attribute, or demographics values populated.

FIG. 19-C illustrates two sample records 1607 and 1609 in these record layouts with program attribute, and demographics values populated. Process 230 adds the demographic data to the file. Process 240 add the program attribute information to the file.

Channel tuning file formats in common format are further defined in Applicant's co-pending U.S. application Ser. No. 12/981,301 filed on Dec. 29, 2010 entitled "SYSTEM AND METHOD FOR ANALYZING HUMAN INTERACTION WITH ELECTRONIC DEVICES THAT ACCESS A COMPUTER SYSTEM THROUGH A NETWORK". This application is incorporated in its entirety but is not admitted to be prior art.

FIGS. 20-A-B illustrate an exemplary Viewing Detail Data Structure for use by the Viewing Analytics Engine 142 when processing channel tune records to produce viewing metrics where the granularity is second of day, according to one embodiment. FIG. 20-A illustrates the Data Structure, and FIG. 20-B illustrates sample data in this Data Structure, according to one embodiment. FIGS. 9A-B provided additional detail about the loading of the Viewing Detail Data Structure.

FIG. 20-A illustrates the Data Structure, according to one embodiment. Fields 3010-3090 occur multiple times with the number of occurrences large enough to hold all of the combinations of Set-top box and Channel that normally occur within a Service Group in one day. A typical value may be 400 STB's in a Service Group*1.5 tuners per STB*5 channel changes per day which results in 400*1.5*5=3,000 rows. Also note that for each row, the field VIEWED-CHANNEL-FLAG occurs 86400 times, or once for each second of the day.

In order to reduce the size of this Data Structure, the program can limit the period of analysis to a part of the day such as prime time viewing hours. This would allow more combinations of Set-top box and Channel.

FIG. 20-B illustrates sample data in this Data Structure, according to one embodiment. Note that for each second of the day, the program simply sets a 0 or 1 flag to indicate whether or not the STB was tuned to that channel during that second of the day. A 0 means not tuned, a 1 means tuned.

The loading of a Data Structure with channel tuning data is further defined in Applicant's co-pending U.S. application Ser. No. 12/981,301 filed on Dec. 29, 2010 entitled "SYSTEM AND METHOD FOR ANALYZING HUMAN INTERACTION WITH ELECTRONIC DEVICES THAT ACCESS A COMPUTER SYSTEM THROUGH A NETWORK". This application is incorporated in its entirety but is not admitted to be prior art.

When processing data from electronic devices, suitable identifiers will be substituted for geography and channel to identify the system and the medium through which the content is delivered. As a non-limiting example, in a satellite television system, the identifiers for Market, Service Group, Headend, and Hub will be replaced by identifiers suitable to satellite television operations.

FIGS. 21-A-B-C illustrate an exemplary Video Asset Schedule file before formatting for use as input to the Viewing Analytics Engine 142 with FIG. 21-A illustrating the file format, and FIG. 21-B part 2003 illustrating sample data without targeted ad data, and FIG. 21-B, part 2005 illustrating sample data with targeted ad data, both in pipe delimited format, and FIG. 21-C part 2003 illustrating sample data without targeted ad data, and FIG. 21-C, part 2005 illustrating sample data with targeted ad data illustrating sample data with targeted ad data, both formatted for human readability, all according to one embodiment.

The data shown in FIG. 21-B corresponds to the data shown in FIG. 21-C.

When processing data from electronic devices, suitable identifiers will be substituted for geography and channel to identify the system and the medium through which the content is delivered. As a non-limiting example, in a satellite television system, the identifiers for Market, Service Group, Headend, and Hub will be replaced by identifiers suitable to satellite television operations.

Note: Receiving program attribute data along with (in the same record as) video asset schedule data in a record where they share the same keys and then carrying these fields together through the preprocessing function and then into the Viewing Result Data Structure allows the Viewing Analytics Engine 142 to correlate the video asset schedule data and the program attribute data, according to one embodiment.

Note: In the case of targeted content, receiving demographic data about the viewers to whom an ad was targeted along with (in the same record as) video asset schedule data for the targeted content in a record where they share the same keys and then carrying these fields together through the preprocessing function and then into the Viewing Result Data Structure allows the Viewing Analytics Engine 142 to correlate the targeted content delivery data and the demographic data, according to one embodiment.

FIGS. 22-A-B illustrate an exemplary Video Asset Schedule file formatted for use as input to the Viewing Analytics Engine 142 with FIG. 22-A illustrating the file format, and FIG. 22-B illustrating sample data with column 2007 without targeted ad data, and column 2009 with targeted ad data, according to one embodiment.

Note: The sample data shown in FIG. 22-B may not match the sample data shown in FIG. 21-B and FIG. 21-C.

Note: FIGS. 21 and 22 describe receiving demographic data regarding the viewer to whom targeted content was directed and making such data available to the Viewing Analytics Engine 142.

FIGS. 23-A-B illustrate an exemplary Viewing Result Data Structure for use by the Viewing Analytics Engine 142 to record the Video Asset Schedule data and the viewing metrics for each ad or program being analyzed, according to one embodiment. FIG. 23-A illustrates the Data Structure, and FIG. 23-B sample data with column 3205 without targeted ad data, and column 3207 with targeted ad data, according to one embodiment.

FIG. 23-A illustrates the Viewing Result Data Structure, according to one embodiment. Fields 3210-3910 occur multiple times with the number of occurrences large enough to hold all of the various unique assets (ads or programs) that are being tracked within the Service Group for the day. As an example, if the objective was to track a two hour program and there were 40 commercials and 8 program segments, then we would expect 48 rows. If there were additional targeted commercials, then each separate airing of a targeted commercial would add 1 to the count. It would not matter if the targeted commercial was seen by one set-top box or 25 set-top boxes, each airing would add 1 row to the count.

In order to reduce the size of this Data Structure, the program can limit the period of analysis to a part of the day such as prime time viewing hours.

FIG. 23-B illustrates sample data in this Data Structure, according to one embodiment.

The information below shows how the Viewing Analytics Engine 142 populates each field in FIG. 23:

VR-MARKET 3210 is populated from DI-MARKET 2015 in input file 178.

VR-SERVICE-GROUP 3220 is populated from DI-SERVICE-GROUP 2025 in input file 178.

VR-HUB 3230 is populated from DI-HUB 2035 in input file 178.

VR-HEADEND 3240 is populated from DI-HEADEND 2045 in input file 178.

VR-CHANNEL-CALL-SIGN 3250 is populated from DI-CHANNEL-CALL-SIGN D 2055 in input file 178.

VR-CHANNEL-SOURCE-ID 3260 is populated from DI-CHANNEL-SOURCE-ID 2065 in input file 178.

VR-AD-DURATION-IN-SECONDS 3270 is populated from DI-AD-DURATION-IN-SECONDS 2075 in input file 178.

VR-AD-PLAY-DATE 3280 is populated from DI-AD-PLAY-DATE 2085 in input file 178.

VR-AD-PLAY-TIME-BEG 3290 is populated from DI-AD-PLAY-TIME-BEG 2095 in input file 178.

VR-AD-PLAY-BEG-SEC-OF-DAY 3300 is populated from DI-AD-PLAY-BEG-SEC-OF-DAY 2105 in input file 178.

VR-AD-PLAY-TIME-END 3310 is populated from DI-AD-PLAY-TIME-END 2115 in input file 178.

VR-AD-PLAY-END-SEC-OF-DAY 3320 is populated from DI-AD-PLAY-END-SEC-OF-DAY 2125 in input file 178.

VR-TARGETED-AD-FLAG 3330 is populated from DI-TARGETED-AD-FLAG 2135 in input file 178.

VR-TARGETED-SET-TOP-BOX-COUNT 3340 is populated from DI-TARGETED-SET-TOP-BOX-COUNT 2145 in input file 178.

VR-VIDEO-ASSET-ID 3620 is populated from DI-VIDEO-ASSET-ID 2155 in input file 178.

VR-PRODUCT-TYPE 3630 is populated from DI-PRODUCT-TYPE 2165 in input file 178.

VR-VIDEO-ASSET-NAME 3640 is populated from DI-VIDEO-ASSET-NAME 2175 in input file 178.

VR-PRODUCER-NAME 3650 is populated from DI-PRODUCER-NAME 2185 in input file 178.

VR-AGENCY-NAME 3660 is populated from DI-AGENCY-NAME 2195 in input file 178.

VR-SCRIPT-WRITER 3670 is populated from DI-SCRIPT-WRITER 2205 in input file 178.

VR-FEATURED-ACTOR 3680 is populated from DI-FEATURED-ACTOR 2215 in input file 178.

VR-ACTOR-CELEBRITY-STATUS 3690 is populated from DI-ACTOR-CELEBRITY-STATUS 2225 in input file 178.

VR-FEATURED-VOICE 3700 is populated from DI-FEATURED-VOICE 2235 in input file 178.

VR-PRODUCT-CATEGORY 3710 is populated from DI-PRODUCT-CATEGORY 2245 in input file 178.

VR-LANGUAGE 3720 is populated from DI-LANGUAGE 2255 in input file 178.

VR-INFORMATIONAL-CONTENT-CODE 3730 is populated from DI-INFORMATIONAL-CONTENT-CODE 2265 in input file 178.

VR-DELIVERY-FORMAT 3740 is populated from DI-DELIVERY-FORMAT 2275 in input file 178.

VR-AUDIO-TRACK-CODE 3750 is populated from DI-AUDIO-TRACK-CODE 2285 in input file 178.

VR-AUDIENCE-SUITABILITY-RATING 3760 is populated from DI-AUDIENCE-SUITABILITY-RATING 2295 in input file 178.

VR-EPISODE-IDENTIFIER 3770 is populated from DI-EPISODE-IDENTIFIER 2305 in input file 178.

VR-ASSET-DELIVERY-INSTANCE-ID 3780 is populated from DI-ASSET-DELIVERY-INSTANCE-ID 2315 in input file 178.

VR-PROGRAM-ATTRIBUTE-1 3790 is populated from DI-PROGRAM-ATTRIBUTE-1 2325 in input file 178.

VR-PROGRAM-ATTRIBUTE-2 3800 is populated from DI-PROGRAM-ATTRIBUTE-2 2335 in input file 178.

VR-TIME-OF-DAY-CODE 3810 is populated from DI-TIME-OF-DAY-CODE 2345 in input file 178.

VR-DEMOGRAPHIC-GROUP 3820 is populated from DI-DEMOGRAPHIC-GROUP 2355 in input file 178.

VR-INFERRED-RACE 3830 is populated from DI-INFERRED-RACE 2365 in input file 178.

VR-INFERRED-GENDER 3840 is populated from DI-INFERRED-GENDER 2375 in input file 178.

VR-INFERRED-AGE-GROUP 3850 is populated from DI-INFERRED-AGE-GROUP 2385 in input file 178.

VR-INFERRED-INCOME-BRACKET 3860 is populated from DI-INFERRED-INCOME-BRACKET 2395 in input file 178.

VR-INFERRED-MARITAL-STATUS 3870 is populated from DI-INFERRED-MARITAL-STATUS 2405 in input file 178.

VR-SET-TOP-BOX-ZIP-CODE 3880 is populated from DI-SET-TOP-BOX-ZIP-CODE 2415 in input file 178.

VR-SUBSCRIBER-TYPE 3890 is populated from DI-SUBSCRIBER-TYPE 2425 in input file 178.

VR-SUBSCRIBER-PACKAGE-LEVEL 3900 is populated from DI-SUBSCRIBER-PACKAGE-LEVEL 2435 in input file 178.

VR-SMA-CODE 3910 is populated from DI-SMA-CODE 2445 in input file 178.

The following fields require more complex processing to populate.

Note: The details of this process can be found in the accompanying program code. An overview is provided here.

Note: The code samples below use the term 'ad' which shall be understood to include any targeted content.

For all targeted ads, first determine the viewing seconds of the ad using a routine like this:

```
For each ad or program in the Viewing Result table
Loop thru the records in the Viewing Detail table to find
  matching records
For each matching record add up the viewing seconds
  using a routine like this:
  perform varying SECONDS-SUB
    from VR-AD-PLAY-BEG-SEC-OF-DAY (vr-sub)
      3300 by 1
    until SECONDS-SUB>VR-AD-PLAY-END-SEC-
      OF-DAY (vr-sub) 3320 or SECONDS-
      SUB>SECONDS-SUB-COLS
    if VIEWED-CHANNEL-FLAG (STB-VD-SUB,
      SECONDS-SUB)=1
    add VIEWED-CHANNEL-FLAG (STB-VD-SUB,
      SECONDS-SUB) to viewed-seconds
    mark the viewing second as tabulated so that it is
      excluded
    when counting the non-targeted viewing seconds
  end-if
end-perform.
```

After determining the number of viewing seconds by the set-top box and channel combination, proceed to calculate these fields as shown.

Step 1: Process Targeted Ad Begin to End viewing.

VR-TARGT-C1-VIEW-BEG-END-SECS 3350 has this definition:

For each targeted ad, count the number of viewing seconds for all of the set-top boxes which viewed the ad from beginning to end. This is referred to as targeted ad Case 1.

VR-TARGT-C1-VIEW-BEG-END-COUNT 3360 has this definition:

For each targeted ad, count the number of set-top boxes which viewed the ad from beginning to end. This is referred to as targeted ad Case 1.

The Viewing Analytics Engine 142 performs the following algorithm to populate these fields:

If STB was tuned to the Targeted Ad for the entire duration of the Ad
  Add viewed-seconds to VR-TARGT-C1-VIEW-BEG-END-SECS
  Add 1 to VR-TARGT-C1-VIEW-BEG-END-COUNT
End-if Step 2: Process Targeted Ad Begin to Middle viewing.

VR-TARGT-C2-VIEW-BEG-MID-SECS 3370 has this definition:

For each targeted ad, count the number of viewing seconds for all of the set-top boxes which viewed the ad from beginning to some point in the middle. This is referred to as targeted ad Case 2.

VR-TARGT-C2-VIEW-BEG-MID-COUNT 3380 has this definition:

For each targeted ad, count the number of set-top boxes which viewed the ad from the beginning to some point in the middle. This is referred to as targeted ad Case 2.

The Viewing Analytics Engine 142 performs the following algorithm to populate these fields:

If STB was tuned to the Targeted Ad for less than the duration of the Ad
  And STB was tuned at the start of the Ad
  And STB was NOT tuned at the end of the Ad
    Add viewed-seconds to VR-TARGT-C2-VIEW-BEG-MID-SECS
    Add 1 to VR-TARGT-C2-VIEW-BEG-MID-COUNT
  End-if Step 3: Process Targeted Ad Begin and End with gap in the middle viewing.

VR-TARGT-C3-VIEW-BEG-END-SECS 3390 has this definition:

For each targeted ad, count the number of viewing seconds for all of the set-top boxes which viewed the ad on the beginning and ending seconds but missed some part in the middle of the ad (the viewer left and came back while the ad was still playing). This is referred to as targeted ad Case 3.

VR-TARGT-C3-VIEW-BEG-END-COUNT 3400 has this definition:

For each targeted ad, count the number of set-top boxes which viewed the ad on the beginning and ending seconds but missed some part in the middle of the ad (the viewer left and came back while the ad was still playing). This is referred to as targeted ad Case 3.

The Viewing Analytics Engine 142 performs the following algorithm to populate these fields:

If STB was tuned to the Targeted Ad for less than the duration of the Ad
And STB was tuned at the start of the Ad
And STB was tuned at the end of the Ad
  Add viewed-seconds to VR-TARGT-C3-VIEW-BEG-END-SECS
  Add 1 to VR-TARGT-C3-VIEW-BEG-END-COUNT
End-if Step 4: Process Targeted Ad Partial viewing.

VR-TARGT-C4-VIEW-PARTIAL-SECS 3410 has this definition:

For each targeted ad, count the number of viewing seconds for all of the set-top boxes whose viewing does not fit into targeted ad case 1, 2, or 3. This is referred to as targeted ad Case 4.

VR-TARGT-C4-VIEW-PARTIAL-COUNT 3420 has this definition:

For each targeted ad, count the number of set-top boxes whose viewing does not fit into targeted ad case 1, 2, or 3. This is referred to as targeted ad Case 4.

The Viewing Analytics Engine 142 performs the following algorithm to populate these fields:

If STB was tuned to the Targeted Ad for less than the duration of the Ad
And it is not a case identified above
  Add viewed-seconds to VR-TARGT-C4-VIEW-PARTIAL-SECS
  Add 1 to VR-TARGT-C4-VIEW-PARTIAL-COUNT
End-if After tabulating the Targeted Ad viewing information, the Viewing Analytics Engine 142 will proceed to calculate the Non-Targeted viewing activity. This is defined more fully below.

Note: The details of this process can be found in the accompanying program code. An overview is provided here.

For all non-targeted ads, first determine the viewing seconds of the ad using a routine like this:

```
For each non-targeted ad or program in the Viewing Result table
  Loop thru the records in the Viewing Detail table to find matching records
  For each matching record add up the viewing seconds using a routine like this:
  perform varying SECONDS-SUB
    from VR-AD-PLAY-BEG-SEC-OF-DAY (vr-sub) 3300 by 1
    until SECONDS-SUB>VR-AD-PLAY-END-SEC-OF-DAY (vr-sub) 3320
      or SECONDS-SUB>SECONDS-SUB-COLS
    if VIEWED-CHANNEL-FLAG (STB-VD-SUB, SECONDS-SUB)=1
      add VIEWED-CHANNEL-FLAG (STB-VD-SUB, SECONDS-SUB) to viewed-seconds
    end-if
  end-perform.
```

After determining the number of viewing seconds by the set-top box and channel combination, proceed to calculate these fields as shown.

Step 1: Process Non-Targeted Ad Begin to End viewing.

VR-NOTGT-C1-VIEW-BEG-END-SECS 3430 has this definition:

For each non-targeted ad, count the number of viewing seconds for all of the set-top boxes which viewed the ad from beginning to end. This is referred to as non-targeted ad Case 1.

VR-NOTGT-C1-VIEW-BEG-END-COUNT 3440 has this definition:

For each non-targeted ad, count the number of set-top boxes which viewed the ad from beginning to end. This is referred to as non-targeted ad Case 1.

The Viewing Analytics Engine 142 performs the following algorithm to populate these fields:

If STB was tuned to the Non-Targeted Ad for the entire duration of the Ad

And STB was tuned-in at the start of the ad

And STB was tuned-in at the end of the ad

Add viewed-seconds to VR-NOTGT-C1-VIEW-BEG-END-SECS

Add 1 to VR-NOTGT-C1-VIEW-BEG-END-COUNT

End-if

Step 2: Process Non-Targeted Ad Begin to Middle viewing.

VR-NOTGT-C2-VIEW-BEG-MID-SECS 3450 has this definition:

For each non-targeted ad, count the number of viewing seconds for all of the set-top boxes which viewed the ad from beginning to some point in the middle. This is referred to as non-targeted ad Case 2.

VR-NOTGT-C2-VIEW-BEG-MID-COUNT 3460 has this definition:

For each non-targeted ad, count the number of set-top boxes which viewed the ad from the beginning to some point in the middle. This is referred to as non-targeted ad Case 2.

The Viewing Analytics Engine 142 performs the following algorithm to populate these fields:

If STB was tuned to the Non-Targeted Ad for less than the duration of the Ad

And STB was tuned-in at the start of the ad

And STB was NOT tuned-in at the end of the ad

Add viewed-seconds to VR-NOTGT-C2-VIEW-BEG-MID-SECS

Add 1 to VR-NOTGT-C2-VIEW-BEG-MID-COUNT

End-if

Step 3: Process Non-Targeted Ad Middle to End viewing.

VR-NOTGT-C3-VIEW-MID-END-SECS 3470 has this definition:

For each non-targeted ad, count the number of viewing seconds for all of the set-top boxes which viewed the ad from some point in the middle to the end of the ad. This is referred to as non-targeted ad Case 3.

VR-NOTGT-C3-VIEW-MID-END-COUNT 3480 has this definition:

For each non-targeted ad, count the number of set-top boxes which viewed the ad from the some point in the middle to the end of the ad. This is referred to as non-targeted ad Case 3.

The Viewing Analytics Engine 142 performs the following algorithm to populate these fields:

If STB was tuned to the Non-Targeted Ad for less than the duration of the Ad

And STB was NOT tuned-in at the start of the ad

And STB was tuned-in at the end of the ad

Add viewed-seconds to VR-NOTGT-C3-VIEW-MID-END-SECS

Add 1 to VR-NOTGT-C3-VIEW-MID-END-COUNT

End-if

Step 4: Process Non-Targeted Ad Middle to Middle viewing.

VR-NOTGT-C4-VIEW-MID-MID-SECS 3490 has this definition:

For each non-targeted ad, count the number of viewing seconds for all of the set-top boxes which viewed the ad for some time period in the middle but not the beginning or the end. This is referred to as non-targeted ad Case 4.

VR-NOTGT-C4-VIEW-MID-MID-COUNT 3500 has this definition:

For each non-targeted ad, count the number of set-top boxes which viewed the ad for the some time period in the middle but not the beginning or the end. This is referred to as non-targeted ad Case 4.

The Viewing Analytics Engine 142 performs the following algorithm to populate these fields:

If STB was tuned to the Non-Targeted Ad for less than the duration of the Ad

And STB was NOT tuned-in at the start of the ad

And STB was NOT tuned-in at the end of the ad

Add viewed-seconds to VR-NOTGT-C4-VIEW-MID-MID-SECS

Add 1 to VR-NOTGT-C4-VIEW-MID-MID-COUNT

End-if

Step 5: Process Non-Targeted Ad Begin and End with gap in the middle viewing.

VR-NOTGT-C5-VIEW-BEG-END-SECS 3510 has this definition:

For each non-targeted ad, count the number of viewing seconds for all of the set-top boxes which viewed the ad on the beginning and ending seconds but missed some part in the middle of the ad. This is referred to as non-targeted ad Case 5.

VR-NOTGT-C5-VIEW-BEG-END-COUNT 3520 has this definition:

For each non-targeted ad, count the number of set-top boxes which viewed the ad on the beginning and ending seconds but missed some part in the middle of the ad. This is referred to as non-targeted ad Case 5.

The Viewing Analytics Engine 142 performs the following algorithm to populate these fields:

If STB was tuned to the Non-Targeted Ad for less than the duration of the Ad

And STB was tuned-in at the start of the ad

And STB was tuned-in at the end of the ad

Add viewed-seconds to VR-NOTGT-C5-VIEW-BEG-END-SECS

Add 1 to VR-NOTGT-C5-VIEW-BEG-END-COUNT

End-if

Step 6: Process Non-Targeted Ad Partial viewing.

VR-NOTGT-C6-VIEW-PARTIAL-SECS 3530 has this definition:

For each non-targeted ad, count the number of viewing seconds for all of the set-top boxes whose viewing does not fit into non-targeted ad cases 1, 2, 3, 4, or 5. This is referred to as non-targeted ad Case 6.

VR-NOTGT-C6-VIEW-PARTIAL-COUNT 3540 has this definition:

For each non-targeted ad, count the number of set-top boxes whose viewing does not fit into non-targeted ad cases 1, 2, 3, 4, or 5. This is referred to as non-targeted ad Case 6.

The Viewing Analytics Engine 142 performs the following algorithm to populate these fields:

If STB was tuned to the Non-Targeted Ad for less than the duration of the Ad

And there is some condition not identified above

Add viewed-seconds to VR-NOTGT-C6-VIEW-PARTIAL-SECS

Add 1 to VR-NOTGT-C6-VIEW-PARTIAL-COUNT

End-if

After all of the above tabulations are complete, the system will calculate various totals for each ad or program.

Note: The details of this process can be found in the accompanying program code. An overview is provided here.

For each ad or program in the Viewing Result table

Loop thru the records in the Viewing Detail table to make the calculations shown below.

Perform calculation-routine (the routines defined below)

VARYING vr-sub FROM 1 BY 1

Until vr-sub>VR-SUB-ROWS-LOADED

VR-TOTAL-EXPECT-VIEW-SECS 3550 has this definition:

Total Expected Viewing Seconds is a measure of how many viewing seconds we expect the ad to earn. In the case of a targeted ad, we expect that every set-top box that is tuned to the ad at the start of the ad will watch the entire ad. In the case of a non-targeted ad, we also expect that every set-top box that is tuned at the start of the ad will view the entire ad.

Note: For the non-targeted ads, we purposely only include the cases which match the comparable targeted cases.

If VR-TARGETED-AD-FLAG (vr-sub)="Y"

Compute VR-TOTAL-EXPECT-VIEW-SECS=(VR-TARGT-C1-VIEW-BEG-END-COUNT (vr-sub)+VR-TARGT-C2-VIEW-BEG-MID-COUNT (vr-sub)+VR-TARGT-C3-VIEW-BEG-END-COUNT (vr-sub))*VR-AD-DURATION-IN-SECONDS (vr-sub)

Else

Compute VR-TOTAL-EXPECT-VIEW-SECS (vr-sub)=(VR-NOTGT-C1-VIEW-BEG-END-COUNT (vr-sub)+VR-NOTGT-C2-VIEW-BEG-MID-COUNT (vr-sub)+VR-NOTGT-C5-VIEW-BEG-END-COUNT (vr-sub))*VR-AD-DURATION-IN-SECONDS (vr-sub)

VR-TOTAL-ACTUAL-VIEW-SECS 3560 has this definition:

Total Actual Viewing Seconds is a measure of how many viewing seconds the ad actually earned.

Note: For the non-targeted ads, we purposely only include the cases which match the comparable targeted cases.

If VR-TARGETED-AD-FLAG (vr-sub)="Y"

Compute VR-TOTAL-ACTUAL-VIEW-SECS (vr-sub)=VR-TARGT-C1-VIEW-BEG-END-SECS (vr-sub)+VR-TARGT-C2-VIEW-BEG-MID-SECS (vr-sub)+VR-TARGT-C3-VIEW-BEG-END-SECS (vr-sub)+VR-TARGT-C4-VIEW-PARTIAL-SECS (vr-sub)

Else

Compute VR-TOTAL-ACTUAL-VIEW-SECS (vr-sub)=VR-NOTGT-C1-VIEW-BEG-END-SECS (vr-sub)+VR-NOTGT-C2-VIEW-BEG-MID-SECS (vr-sub)+VR-NOTGT-C5-VIEW-BEG-END-SECS (vr-sub)

VR-PCT-OF-EXPECTED-VIEW-SECS 3570 has this definition:

Percent of Expected Viewing Seconds is calculated as actual viewing seconds divided by the expected viewing seconds times 100.

Compute VR-PCT-OF-EXPECTED-VIEW-SECS (vr-sub)=(VR-TOTAL-ACTUAL-VIEW-SECS (vr-sub)/VR-TOTAL-EXPECT-VIEW-SECS (vr-sub))*100

VR-NOTGT-ACCIDENTAL-VIEW-SECS 3580 has this definition:

Non-targeted Accidental Viewing Seconds are those viewing seconds that we did not expect, thus we consider them accidental. This happens when the set-top box tunes to the channel after the ad has already started. By definition, this should happen only for non-targeted ads because in the case of a targeted ad, the set-top box should be tuned to the channel at the start of the ad. We measure this in seconds.

Compute VR-NOTGT-ACCIDENTAL-VIEW-SECS (vr-sub)=VR-NOTGT-C3-VIEW-MID-END-SECS (vr-sub)+VR-NOTGT-C4-VIEW-MID-MID-SECS (vr-sub)+VR-NOTGT-C6-VIEW-PARTIAL-SECS (vr-sub).

VR-NOTGT-ACCID-RETENT-RATE-SEC 3590 has this definition:

Non-targeted Accidental Retention Rate measures the viewing seconds of set-top boxes that tuned in during the ad to find out how many stayed until the end of the ad compared to those that tuned in during the ad and tuned out before the end of the ad. We measure this based on the set-top box viewing seconds.

COMPUTE VR-NOTGT-ACCID-RETENT-RATE-SEC (vr-sub)=(VR-NOTGT-C3-VIEW-MID-END-SECS (vr-sub)/VR-NOTGT-ACCIDENTAL-VIEW-SECS (vr-sub))*100

VR-NOTGT-ACCIDENTAL-VIEW-CNT 3600 has this definition:

Non-targeted Accidental Viewing Count measures the set-top box count that we did not expect, thus we consider them accidental. This happens when the set-top box tunes to the channel after the ad has already started. By definition, this should happen only for non-targeted ads because in the case of a targeted ad, the set-top box should be tuned to the channel at the start of the ad. We measure this as a count.

Compute VR-NOTGT-ACCIDENTAL-VIEW-CNT (vr-sub)=VR-NOTGT-C3-VIEW-MID-END-COUNT (vr-sub)+VR-NOTGT-C4-VIEW-MID-MID-COUNT (vr-sub)+VR-NOTGT-C6-VIEW-PARTIAL-COUNT (vr-sub).

VR-NOTGT-ACCID-RETENT-RATE-CNT 3610 has this definition:

Non-targeted Accidental Retention Rate measures the count of set-top boxes that tuned in during the ad to find out how many stayed until the end of the ad compared to those that tuned in during the ad and tuned out before the end of the ad. We measure this based on the set-top box count.

COMPUTE VR-NOTGT-ACCID-RETENT-RATE-CNT (vr-sub)=(VR-NOTGT-C3-VIEW-MID-END-COUNT (vr-sub)/VR-NOTGT-ACCIDENTAL-VIEW-CNT (vr-sub))*100

This completes the description of the Viewing Result calculations.

In a satellite television system, the identifiers for Market, Service Group, Headend, and Hub will be replaced by identifiers suitable to satellite television operations.

FIGS. 24-A-B-C illustrate an exemplary pipe delimited Targeted Ad Delivery file and data before formatting for use as input to the Viewing Analytics Engine 142, according to one embodiment. This is the detail of part 180.

FIG. 24-A illustrates the file format in which Targeted Ad File 180 from the Targeted Ad Delivery System 110 may arrive.

FIG. 24-B illustrates two sample records part 2603 and part 2605 containing Targeted Ad data 180. Note that these records arrive from the source as variable length records in pipe delimited format.

FIG. 24-C illustrates these two sample records part 2603 and part 2605 formatted into a table for human readability.

Note: Receiving video asset identifier data along with (in the same record as) targeted ad delivery data in a record where they share the same keys and then carrying these fields together through the preprocessing function so that the Viewing Analytics Engine 142 is able to use the video asset identifier data in the targeted ad delivery data as it searches the Viewing Result Data Structure describes the process by which the Viewing Analytics Engine 142 correlates the targeted content delivery data and the video asset schedule data, according to one embodiment.

FIGS. 25-A-B illustrate an exemplary Targeted Ad file formatted for use as input to the Viewing Analytics Engine 142 with FIG. 25-A illustrating the file format, and FIG. 25-B illustrating sample data, according to one embodiment. This relates to parts 184 and 188.

FIG. 25-B illustrates two sample records part 2805 and part 2807 containing Targeted Ad data. Note that these records have been preprocessed so they are now in fixed format.

Note: FIGS. 24 and 25 describe receiving targeted content delivery data from a Targeted Ad Delivery System and preprocessing it for use by the Viewing Analytics Engine 142. This process is applicable to both content targeted to set-top boxes and to content targeted to electronic devices.

FIGS. 26-A-B illustrate an exemplary output record format for the flat file which contains the viewing result metrics calculated by the Viewing Analytics Engine 142, according to one embodiment. FIG. 26-A illustrates the record format, and FIG. 26-B illustrates sample data in this record format, according to one embodiment. This record format can be readily imported into a relational database or into a spreadsheet for further analytical processing. This is the detail of part 192.

FIGS. 27-A-B illustrate an exemplary output record format for the flat file which contains the viewing by second for targeted ad metrics calculated by the Viewing Analytics Engine 142, according to one embodiment. FIG. 27-A illustrates the record format, and FIG. 27-B illustrates sample data in this record format, according to one embodiment. This record format can be readily imported into a relational database or into a spreadsheet for further analytical processing.

This is the detail of part 194.

The BSAV prefix on the field name stands for By Second Asset View.

For additional information on this process, please refer to the attached source code files.

FIGS. 28-A-B illustrate an exemplary output record format for the flat file which contains the viewing by second for non-targeted ad metrics calculated by the Viewing Analytics Engine 142, according to one embodiment. FIG. 28-A illustrates the record format, and FIG. 28-B illustrates sample data in this record format, according to one embodiment. This record format can be readily imported into a relational database or into a spreadsheet for further analytical processing.

This is the detail of part 196.

The BSAV prefix on the field name stands for By Second Asset View.

Figure 29:
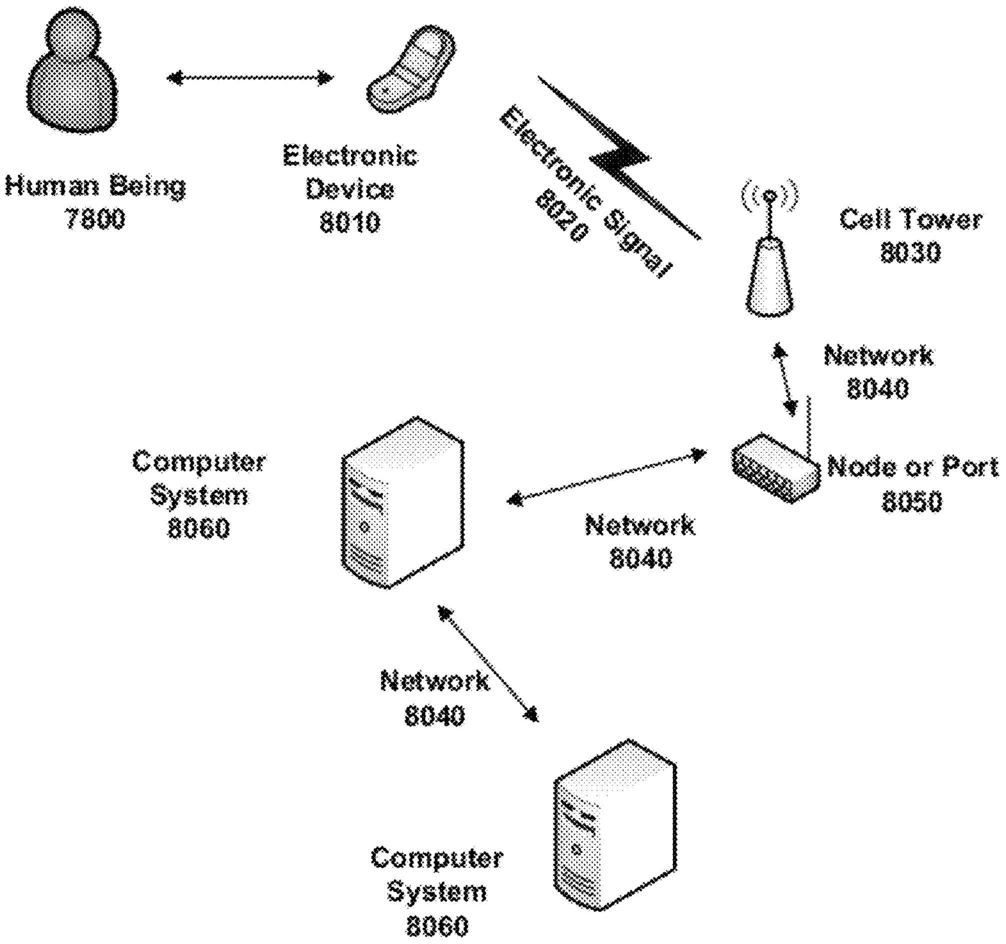
FIG. 29 illustrates a human being interacting with an electronic device which is interacting with a computer system accessed through a network, according to one embodiment.

FIG. 29 illustrates a human being 7800 interacting with an electronic device 8010 which is interacting with a computer system 8050 accessed through a network 8040, according to one embodiment.

In this nonlimiting example, the purpose is not to describe in detail the operations of a cellular network, but to simply show that the human being 7800 is interacting with an electronic device 8010 which is interacting with a computer system 8050 accessed through a network 8040.

The electronic device in this example may be a hand-held device which allows the human being to view video content.

To follow the chain of interactions in this nonlimiting example, the human being 7800 is using an electronic device 8010 such as a cell phone or a personal communication device or a personal video player or any similar electronic device. The electronic device 8010 uses a radio wave or electronic signal 8020 to communicate with a cell tower 8030 which then communicates via a network 8040 to reach a computer system such as a node or port 8050 which then communicates via a another network segment 8040 to access a computer system 8060 which uses another network segment 8040 to communicate with another computer system 8060 which may feed streaming video to the electronic device 8010.

Figure 30:
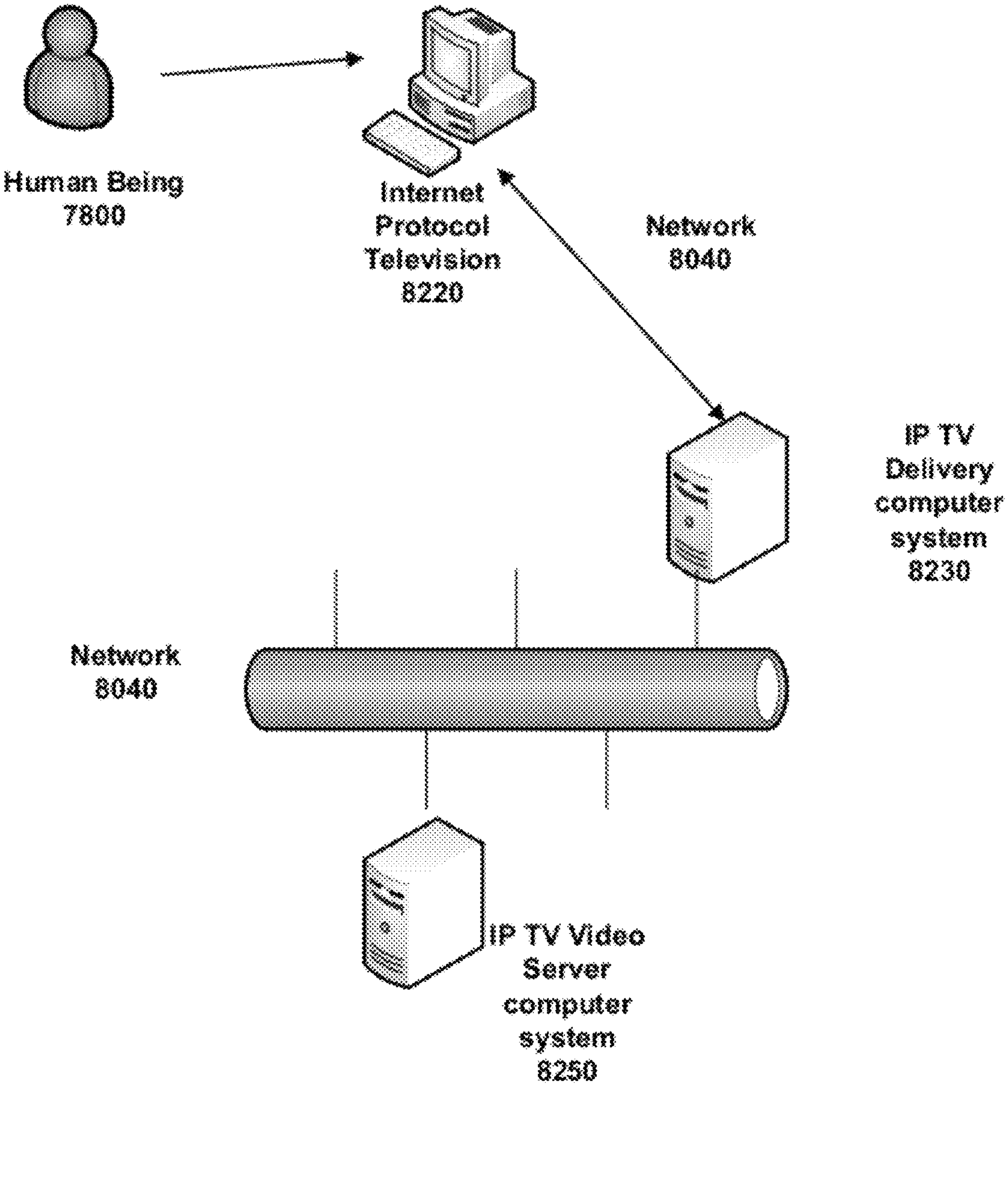
FIG. 30 illustrates an alternative version of a human being interacting with an electronic device which is interacting with a computer system accessed through a network, according to one embodiment.

FIG. 30 illustrates an alternative version of a human being 7800 interacting with an electronic device 8220 which is interacting with a computer system 8230 accessed through a network 8040, according to one embodiment.

In this nonlimiting example, the purpose is not to describe in detail the operations of an internet protocol network, but to simply show that the human being 7800 is interacting with an electronic device 8220 which is interacting with a computer system 8230 accessed through a network 8040.

To follow the chain of interactions in this nonlimiting example, the human being 7800 is using an electronic device 8220 such as an internet protocol television or any similar electronic device. The electronic device 8220 uses a network 8040 to communicate with an IP TV Delivery computer system 8230 which provides video the IP TV. IP TV Delivery computer system 8230 itself also uses a network 8040 to communicate with an IP TV Video Server computer system 8250.

FIG. 31 illustrates three different human beings 7800, 7802, 7804 interacting with three different set-top boxes 7810, 7812, 7814 which are each interacting with a computer system 102, 104, 7870 accessed through a network 7830 or 7832 or 7834, according to one embodiment.

In these nonlimiting examples, the purpose is not to describe in detail the operations of a cable television network or a switched digital video system, but to simply show that the human being 7800 or 7802 or 7804 is interacting with a set-top box 7810 or 7812 or 7814 which is interacting with a computer system 102 or 104 or 7870 accessed through a network 7830 or 7832 or 7834 and that the overall network includes various components such as SDV systems, Cable Video systems, STB systems, Service Groups, Hubs, and Headends which are all part of a Market in a cable television system.

To follow the chain of interactions in this nonlimiting example, in the first Switched Digital Video part of this Figure, the human being 7800 is using a set-top box 7810 or any similar electronic device attached to a television 7820. The signal produced by the set-top box 7810 is viewed on a television 7820. The set-top box 7810 uses a HFC network segment 7830 to communicate with Switched Digital Video system from Vendor 1 102 which is accessed via a Service Group 7840 and a Hub 7850. The Hub 7850 is linked to a Headend 7890 via a transport ring 7900. Switched Digital Video system from Vendor 1 102 produces the file Vendor 1 SDV Channel Tune File 112 which can then be made available for preprocessing in preparation for processing by the Viewing Analytics Engine 142 as explained in other Figures.

To continue following the chain of interactions in this nonlimiting example, in the second Switched Digital Video part of this Figure, the human being 7802 is using a set-top box 7812 or any similar electronic device attached to a television 7822. The signal produced by the set-top box 7812 is viewed on a television 7822. The set-top box 7812 uses a HFC network segment 7832 to communicate with Switched Digital Video system from Vendor 2 104 which is accessed via a Service Group 7840 and a Hub 7850. The Hub 7850 is linked to a Headend 7890 via a transport ring 7900. Switched Digital Video system from Vendor 2 104 produces the file Vendor 2 SDV Channel Tune File 114 which can then be made available for preprocessing in preparation for processing by the Viewing Analytics Engine 142 as explained in other Figures.

To further continue following the chain of interactions in this nonlimiting example, in the non-Switched Digital Video part of this Figure, a different human being 7804 is using a different set-top box 7814 or any similar electronic device attached to a television. The signal produced by the set-top box 7814 is viewed on a different television 7824. The set-top box 7814 uses a different HFC network segment 7834 to communicate with a Cable Video Computer System 7870 which is accessed via a Service Group 7840 and a Hub 7850. The Hub 7850 is linked to a Headend 7890 via a transport ring 7900. Set-top box 7814 is running Set-top box application software from STB software vendor 106 and the software is collecting channel tuning data which is used to produce Set-top box Vendor Channel Tune File 116.

The following details are not shown: The Set-top box Vendor Channel Tune File 116 from a plurality of set-top boxes is routed back through the HFC Network 7834 where the files are aggregated and can then be made available for preprocessing in preparation for processing by the Viewing Analytics Engine 142 as explained in other Figures.

To summarize these nonlimiting examples shown in FIG. 31, in two cases the respective human being is using his set-top box to interact with an SDV Computer system across the network while in another part of the cable company network a third human being may be using his set-top box to interact with a traditional or non-SDV system. In the SDV cases, the system produces SDV channel change logs; in the non-SDV case, the system produces Set-top box tuning files. In all cases Headend Equipment 7880 at the Headend 7890 receives incoming signals, prepares them, and then transmits video streams downstream to other parts of the network. In all cases the tuning files can be used to produce data analytics as shown in other Figures.

Figure 32:
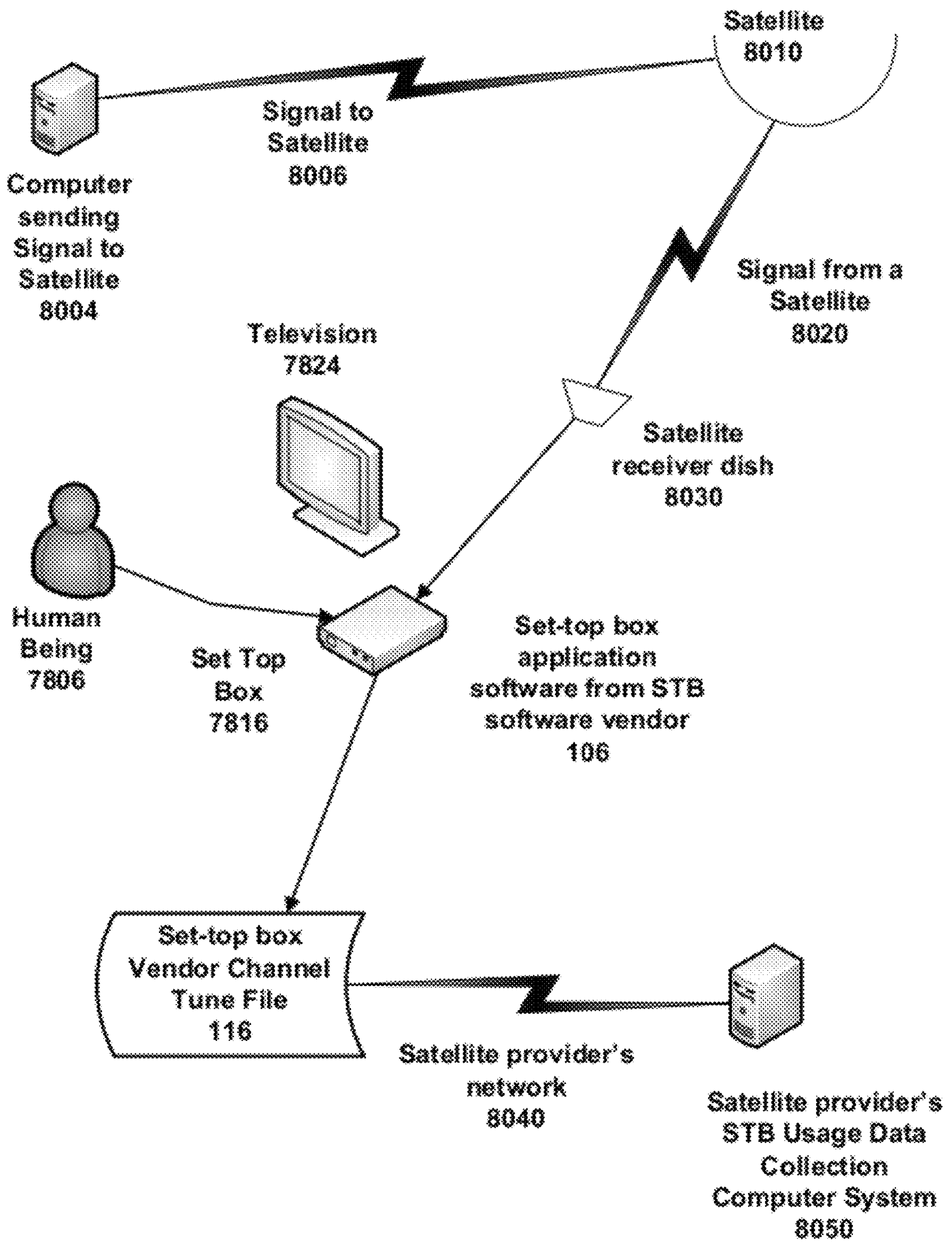
FIG. 32 illustrates a human being interacting with a television system which is part of a satellite television network, according to one embodiment.

FIG. 32 illustrates a human being 7806 interacting with a set-top box 7816 which is interacting with computer systems 8004 and 8050 accessed through networks 8006 and 8040, according to one embodiment.

In these nonlimiting examples, the purpose is not to describe in detail the operations of a satellite television network, but to simply show that the human being 7806 is interacting with a set-top box 7816 which is interacting with computer systems 8004 and 8050 accessed through networks 8006 and 8040 and that the overall network includes various components such as a Computer that sends signals to a satellite and a computer that receives set-top box activity, both being part of a satellite television system.

To follow the chain of interactions in this nonlimiting example, the video or audio signal is sent by the Computer sending Signal to Satellite 8004 as a Signal to Satellite 8006. The Satellite 8010 receives the signal and beams it as a Signal from a Satellite 8020 to the Satellite receiver dish 8030 where it is then passed on to the Set-top box 7816. The Human Being 7806 controls the Set-top box 7816 by interacting with it. The set-top box 7816 displays video on the Television 7824. The Set-top box application software from STB software vendor 106 captures the interactions of the Human Being 7806 and packages them into a file Set-top box Vendor Channel Tune File 116 or other message which is then send to the Satellite providers STB Usage Data Collection Computer System 8050 using or across the Satellite providers network 8040. The file of set-top box activity can then be made available for preprocessing in preparation for processing by the Viewing Analytics Engine 142 as explained in other Figures.

The Satellite provider's STB Usage Data Collection Computer System 8050 may aggregate Set-top box Vendor Channel Tune File 116 from many individual set-top boxes into one large STB Channel Tuning File. This detail is not shown.

Alternative Embodiments

Although the description above contains much specificity, these should not be construed as limiting the scope of the embodiments but as merely providing illustrations of some of several embodiments. As a nonlimiting example, viewing analytics can be done for the day or for any part of the day, such as prime time television viewing. Additional calculations can be done once the data is loaded to the Viewing Detail Data Structure or the Viewing Result Data Structure.

Tracking Multiple Concurrent Activities

As a second nonlimiting example, viewing activity or device usage data can reflect multiple concurrent activities such as a set-top box using multiple tuners simultaneously as in multiple pictures on a television screen or one picture on the television screen and one video stream being recorded by a digital video recorder. One can readily envision set-top box applications or personal computer applications or advanced television applications which show multiple windows such as a television program, a TV menu, a sports channel, a weather channel, a traffic cam, a Twitter©2010 Twitter, Twitter, Inc.) session, an instant message session, a You Tube©2010 YouTube, LLC, www.youtube.com) video, an email session, a web browsing session, a Facebook (Facebook©2010, www.facebook.com) session, etc. Usage data could be collected for each of these activities with perhaps weightings assigned to the activities based on business rules. In this case, one could tally the ad or program viewing time taking into account multiple activities occurring simultaneously and perhaps assigning partial values to those seconds. For example, add a value of 0.5 instead of 1.0 when the viewer has two activities on the screen at once. Another example may be to assign values based on how much of the available screen space is used by the activity; in this case the session that consumes 75% of the screen space may earn a value of 0.75 added to the tally while the other session earns a value of 0.25.

As another nonlimiting example, set-top box viewing activity or electronic device usage data can reflect use of trick plays such as fast forwarding through recorded content such as using the DVR to fast forwarding through commercials. In this case one could reduce the amount of viewing earned per second depending on how fast the DVR is moving with perhaps quad-speed earning less viewing credit than half-speed because the viewer will have reduced exposure to the content.

Methods for Receiving Data

I presently contemplate Channel Tuning data data being provided in flat files, but another embodiment may provide this data in any computer readable format including but not limited to data base tables, XML messages, or other messaging constructs.

I presently contemplate Video Asset Schedule data data being provided in flat files, but another embodiment may provide this data in any computer readable format including but not limited to data base tables, XML messages, or other messaging constructs.

I presently contemplate Targeted Ad data data being provided in flat files, but another embodiment may provide this data in any computer readable format including but not limited to data base tables, XML messages, or other messaging constructs.

Identifiers for Data

I presently contemplate using mnemonics for the various identifiers such as market, headend, hub, service group, channel call sign, program attribute data, demographic category, and other similar fields, but another embodiment could use numeric values as identifiers with links to reference tables for the descriptions of the numeric identifiers.

I presently contemplate using mnemonics for the various program attributes such as advertising agency, copywriter, actor(s) or actress(es), celebrity status or non-celebrity status, language, informational content, and the other similar fields through genre, but another embodiment could use numeric values as identifiers with links to reference tables for the descriptions of the numeric identifiers.

I presently contemplate using identifiers such as market, headend, hub, and service group, but another embodiment could use fewer identifiers or different identifiers or no identifiers.

Run Size

I presently contemplate processing the data within the context of a Market, Service Group, Hub, Headend combination, but another embodiment could process the data within a Market, or within a Headend, or within any suitable combination of identifiers.

I presently contemplate processing the data for multiple Video Assets during one run of the program, but another embodiment may process only one Video Asset per run.

I presently contemplate executing the algorithms described herein separately in some sequence, but another embodiment could combine multiple simple algorithms into fewer complex algorithms.

I presently contemplate processing one day's data at a time, but another embodiment may accept individual channel tuning events in near real time and then process them as they are received. Along with this, such an embodiment could also receive video asset schedule data or targeted content data in like manner so that the channel tuning events could be matched to such data.

I presently contemplate processing one day's data at a time, but another embodiment may process more than one day of data or a part of a day.

Data Sorting

I presently contemplate sorting the Channel Tuning data as a separate step, but another embodiment could use an "order by" clause in a data base query to sort the result set.

I presently contemplate sorting the Channel Tuning data before loading it to the Data Structure, but another embodiment may load unsorted data to the Data Structure as long as the search algorithms were configured to find matching key values in the Data Structure as the data is being loaded.

Receiving Date and Time Information

I presently contemplate that the tune-in date and time and the tune-out date and time will be presented in YYYY-MM-DD HH:MM:SS AM/PM format. Another embodiment could provide these values in seconds from some historic date such as Epoch time (Jan. 1, 1970) and then subtract the proper number of seconds from the value so as to bring the value into the seconds of the current date. For example, Aug. 1, 2010 at 12:00:00 AM is Epoch time 1280646000. Subtracting this value from any tune-in date and time or tune-out date and time from Aug. 1, 2010, will result in the second of the day that can be used in populating the Viewing Detail Data Structure. A tune-in at Aug. 1, 2010 at 12:30:00 AM has Epoch time of 1280647800. Thus we see that 1280647800−1280646000=1800 seconds which would be 30 minutes after midnight. Either embodiment can be used as input to create the metrics.

I presently contemplate that the Channel Tune data Preprocessing function will be provided with the tune-in date and time and the tune-out date and time presented in YYYY-MM-DD HH:MM:SS AM/PM format. Another embodiment could provide the tune-in date and time in this format and then provide the duration of the tuning activity in seconds instead of providing the tune-out date and time presented in YYYY-MM-DD HH:MM:SS AM/PM format.

In this situation the Channel Tune data Preprocessing function would add the tuning duration in seconds to the tune-in time in seconds to arrive at the tune-out time.

I presently contemplate that the Channel Tune data Preprocessing function will be provided with the tune-in date and time and the tune-out date and time presented in YYYY-MM-DD HH:MM:SS AM/PM format. Another embodiment could provide the tune-out date and time in this format and then provide the duration of the tuning activity in seconds instead of providing the tune-in date and time presented in YYYY-MM-DD HH:MM:SS AM/PM format. In this situation the Channel Tune data Preprocessing function would subtract the tuning duration in seconds from the tune-out time in seconds to arrive at the tune-in time.

I presently contemplate that the Video Asset Scheduling System 108 will provide the Video Asset begin date and time and the Video Asset end date and time in YYYY-MM-DD HH:MM:SS AM/PM format. Another embodiment could provide these values in seconds from some historic date such as Epoch time (Jan. 1, 1970) and then the Video Asset preprocessing program could subtract the proper number of seconds from the value so as to bring the value into the seconds of the current date. For example, Aug. 1, 2010 at 12:00:00 AM is Epoch time 1280646000. Subtracting this value from any Video Asset begin date and time or Video Asset end date and time from Aug. 1, 2010, will result in the second of the day that can be used in populating the Viewing Result Data Structure. A Video Asset begin at Aug. 1, 2010 at 12:30:00 AM has Epoch time of 1280647800. Thus we see that 1280647800-1280646000=1800 seconds which would be 30 minutes after midnight. Either embodiment can be used as input to define Video Asset begin and end times.

I presently contemplate that the Video Asset Scheduling System 108 will provide the Video Asset begin date and time and the Video Asset end date and time in YYYY-MM-DD HH:MM:SS AM/PM format. Another embodiment could provide the Video Asset begin date and time in this format and then provide the duration of the Video Asset in seconds instead of providing the Video Asset end date and time presented in YYYY-MM-DD HH:MM:SS AM/PM format. In this situation the Video Asset preprocessing program would add the Video Asset duration in seconds to the Video Asset begin time in seconds to arrive at the Video Asset end date time.

I presently contemplate that the Video Asset Scheduling System 108 will provide the Video Asset begin date and time and the Video Asset end date and time in YYYY-MM-DD HH:MM:SS AM/PM format. Another embodiment could provide the Video Asset end date and time in this format and then provide the duration of the Video Asset in seconds instead of providing the Video Asset begin date and time presented in YYYY-MM-DD HH:MM:SS AM/PM format. In this situation the Video Asset preprocessing program would subtract the Video Asset duration in seconds from the Video Asset end time in seconds to arrive at the Video Asset begin date time.

I presently contemplate using both an Asset Identifier and an Asset Delivery Instance Identifier to uniquely identify a particular ad playing at a particular time, but another embodiment may define one field that uniquely identifies both the video asset and its airing.

I presently contemplate that the Targeted Ad Delivery System 110 will provide the ad play date in YYYY-MM-DD format, and the ad play time begin and ad play time end in HH:MM:SS AM/PM format. Another embodiment could provide these values in seconds from some historic date such as Epoch time (Jan. 1, 1970) and then the targeted ad preprocessing program could subtract the proper number of seconds from the value so as to bring the value into the seconds of the current date. For example, Aug. 1, 2010 at 12:00:00 AM is Epoch time 1280646000. Subtracting this value from any the Ad play begin date and time or Ad play end date and time from Aug. 1, 2010, will result in the second of the day that can be used by the Viewing Analytics Engine 142. An ad beginning at Aug. 1, 2010 at 12:30:00 AM has Epoch time of 1280647800. Thus we see that 1280647800-1280646000=1800 seconds which would be 30 minutes after midnight. Either embodiment can be used as input to define targeted ad play begin and end times.

I presently contemplate that the Targeted Ad Delivery System 110 will provide the ad play date in YYYY-MM-DD format, and the ad play time begin and ad play time end in HH:MM:SS AM/PM format. Another embodiment could provide the ad begin date and time in this format and then provide the duration of the ad in seconds instead of providing the ad end time presented in HH:MM:SS AM/PM format. In this situation the Targeted Ad preprocessing program would add the ad duration in seconds to the ad begin time in seconds to arrive at the ad end date time.

I presently contemplate that the Targeted Ad Delivery System 110 will provide the ad play date in YYYY-MM-DD format, and the ad play time begin and ad play time end in HH:MM:SS AM/PM format. Another embodiment could provide the ad end date and time in this format and then provide the duration of the ad in seconds instead of providing the ad begin time presented in HH:MM:SS AM/PM format. In this situation the Targeted Ad preprocessing program would subtract the ad duration in seconds from the ad end time in seconds to arrive at the ad begin date time.

In all of the above examples where Epoch time is referred to, a similar result could be achieved by using a recent date such as January 1 of the current year or even the actual data date as a 'modified' Epoch time instead of Jan. 1, 1970; the process would need to be adjusted to account for this to allow reporting of the results on the correct date.

I presently contemplate receiving all of the date and time values in local time, but another embodiment may provide these in Coordinated Universal Time (UTC time).

Data Correlations

I presently contemplate receiving program attribute data along with (in the same record as) video asset schedule data and carrying the data forward together as described herein, but another embodiment may provide these as two separate files which are linked by a common key. Yet another embodiment may provide this data in data base tables where a SQL query links the values together using a common key. Yet another embodiment may use multiple data base tables to store this information in a highly normalized format and link the various tables together using keys. Yet another embodiment may use an indexed search or a binary search to facilitate the data correlation.

I presently contemplate receiving program attribute data along with (in the same record as) video asset schedule data and loading those to a data structure in memory similar to the viewing result data structure, but another embodiment may store this information in a data base table and use SQL to retrieve and update the table as needed.

I presently contemplate correlating video asset schedule data with targeted content delivery data as described herein, but another embodiment may achieve a similar result using a data base structure where various tables are joined using common keys and range searches.

I presently contemplate correlating channel viewing activity with targeted content delivery data as described herein, but another embodiment may achieve a similar result using a data base structure where targeted content delivery data is queried using values that allow linking to the channel viewing activity.

In the case of targeted content, I presently contemplate receiving demographic data about the viewer(s) to whom the content was targeted along with (in the same record as) the video asset schedule data for the targeted content as described herein, but another embodiment may provide these as two separate files which are linked by a common key. Yet another embodiment may provide this information in one or more data base tables where a SQL query links the values together as needed using common keys.

Thus we see that data correlations can be accomplished in various ways within the spirit and scope of this embodiment.

General Information

I presently contemplate using variables having the data types and field sizes shown, but another embodiment may use variables with different data types and field sizes to accomplish a similar result.

I presently contemplate tracking viewing activity at the granularity of one second, but another embodiment may track viewing activity at a finer granularity, perhaps half-second, or tenth-second, or millisecond. Yet another embodiment may receive data at a granularity finer than one second and round to the nearest second for use by the Viewing Analytics Engine 142.

I presently contemplate using Viewing Detail Data Structure(s) similar to that defined herein, but another embodiment may use a different Viewing Detail Data Structure or Data Structures to accomplish a similar result.

I presently contemplate using Viewing Result Data Structure(s) similar to that defined herein, but another embodiment may use a different Viewing Result Data Structure or Data Structures to accomplish a similar result. As a nonlimiting example, the Viewing Result Data Structure(s) could be stored in a relational data base table or similar structure and still accomplish a similar result.

I presently contemplate using one byte per second to mark each second in the Viewed Channel Flag in the Viewing Detail Data Structure with a value of 1 or 0 to indicate viewing or not viewing. Another embodiment could use one bit instead of one byte, thus using memory more efficiently, as long as all the other aspects of the process were adjusted accordingly.

I presently contemplate tracking the Program Attributes listed in this specification, but another embodiment may track additional or different program attributes. As nonlimiting examples, one could track production cost, or professional vs. amateur producer to determine whether there is a correlation between viewing time and production cost, or between viewing time and professional vs. amateur producer.

Implementation Information

I presently contemplate using the WINDOWS® XP operating system from MICROSOFT® Corporation, but another embodiment may use a different operating system.

I presently contemplate using FUJITSU® NetCOBOL® for WINDOWS® version 10.1 developed by FUJITSU® and distributed by Alchemy Solutions Inc, but another embodiment may use a different programming language or a different version of COBOL.

General Remarks

It will be apparent to those of ordinary skill in the art that various changes and modifications may be made which clearly fall within the scope of the embodiments revealed herein. In describing an embodiment illustrated in the drawings, specific terminology has been used for the sake of clarity. However, the embodiments are not intended to be limited to the specific terms so selected, and it is to be understood that each specific term includes all technical equivalents which operate in a similar manner to accomplish a similar purpose.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present embodiment. For example, the embodiments described hereinabove may be implemented in computer software using any suitable computer software language type such as, for example, C, C#, or C++ using, for example, conventional or object-oriented techniques. Such software may be stored on any type of suitable computer-readable medium or media such as, for example, a magnetic or optical storage medium. Thus, the operation and behavior of the embodiments are described in COBOL style pseudocode purely as a matter of convenience. It is clearly understood that artisans of ordinary skill would be able to design software and control hardware to implement the embodiments presented in the language of their choice based on the description herein with only a reasonable effort and without undue experimentation.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable medium.

It can also be appreciated that certain process aspects disclosed herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

In various embodiments disclosed herein, a single component or algorithm may be replaced by multiple components or algorithms, and multiple components or algorithms may be replaced by a single component or algorithm, to perform a given function or functions. Except where such substitution would not be operative to implement the embodiments disclosed herein, such substitution is within the scope presented herein. Thus any element expressed herein as a means or a method for performing a specified function is intended to encompass any way of performing that function including, for example, a combination of elements that performs that function. Therefore, any means or method that can provide such functionalities may be considered equivalents to the means or methods shown herein.

While I have developed this embodiment on a personal computer, it can be appreciated that the "data analysis computer system" may be, for example, a wireless or wire line variety of a microcomputer, minicomputer, server, mainframe, laptop, personal data assistant (PDA), wireless e-mail device (e.g., "BlackBerry" trade-designated devices), phone, smart phone, cellular phone, cable box, pager, processor, fax machine, scanner, or any programmable device configured to transmit and receive data over a network. Computer devices disclosed herein may include memory for storing certain software applications used in obtaining, processing and communicating data. It can be appreciated that such memory may be internal or external to the disclosed embodiments. The memory may also include any means or method for storing software, including a hard disk, an optical disk, floppy disk, ROM (read only memory), RAM (random access memory), PROM (programmable ROM), EEPROM (electrically erasable PROM), and other computer-readable media.

While various embodiments have been described herein, it should be apparent, however, that various modifications, alterations and adaptations to those embodiments may occur to persons skilled in the art with the attainment of some or all of the advantages described herein. The disclosed embodiments are therefore intended to include all such modifications, alterations and adaptations without departing from the scope and spirit of the embodiments presented herein as set forth in the appended claims.

Accordingly, the scope should be determined not by the embodiments illustrated, but by the appended claims and their legal equivalents.

CONCLUSIONS, RAMIFICATIONS, AND SCOPE

From the description above, a number of advantages of some embodiments of my Viewing Analytics Engine 142 and its supporting processes become evident:

By having the Viewing Analytics Engine 142 correlate (a) channel viewing activity where the activity is tracked on a second-by-second basis with (b) video asset schedule data; this produces the result that the Viewing Analytics Engine 142 can produce metrics that were not previously possible.

By having the Viewing Analytics Engine 142 correlate (a) channel viewing activity where the activity is tracked on a second-by-second basis, (b) video asset schedule data, and (c) targeted content delivery data, this produces the result that the Viewing Analytics Engine 142 can produce metrics that were not previously possible.

By having the Viewing Analytics Engine 142 correlate (a) channel viewing activity where the activity is tracked on a second-by-second basis, (b) video asset schedule data, (c) targeted content delivery data, and (d) demographic data, this produces the result that the Viewing Analytics Engine 142 can produce metrics that were not previously possible.

This method of tracking viewing activity on a second-by-second basis is contrary to the teaching of those who work with start time and duration (seconds viewed) in a relational data base model. Thus I am able to solve problems previously found insolvable when limited to using the existing techniques. I am able to provide metrics that could not be produced using existing techniques.

In regard to television viewing, I have provided numerous metrics showing a level of detailed analytics not previously possible. For example, the Viewing Analytics Engine 142 allows me to measure viewing of ads and/or programs down to a granularity of one-second for both lightly viewed channels and more heavily viewed channels; traditional survey methods do not allow this. The Viewing Analytics Engine 142 allows me to provide deeper insight into viewership of highly viewed channels. The Viewing Analytics Engine 142 is able to provide the detailed information that industry researchers urgently need. There are many other examples contained herein.

In regard to other electronic devices, including but not limited to internet protocol television, mobile devices, personal video players, etc., the same Analytic Engine 142 can be applied to provide numerous similar metrics. Internet protocol television has or can provide the necessary data for my Viewing Analytics Engine 142: tuning data, video asset schedule data, and targeted content delivery data. Using these data sets, the Viewing Analytics Engine 142 can produce the same detailed analysis as for traditional set-top box data.

I will now provide an in-depth discussion of the various advantages.

Targeted Content Viewership Analysis

The Viewing Analytics Engine 142 has the advantage of allowing me to produce detailed metrics on the actual viewing of targeted content. Targeted content is any content such as an Advertisement or Program that is directed to one or more set-top boxes that are chosen to receive that content based on a rules engine. These metrics can provide insight into the effectiveness of the targeting rules or algorithms by capturing information regarding whether the targeted content earns more viewing time than non-targeted content or whether the targeted content earns 100% of the expected viewing time. These metrics can also provide insight into viewing patterns and human behavior.

These metrics are applicable to each individual airing of a video asset as described in the Video Asset Schedule. Thus if a video asset airs multiple times in one day, such as a commercial often does, the Viewing Analytics Engine 142 produces metrics for each airing.

The Viewing Analytics Engine 142 produces the following metrics for each unique airing of each targeted video asset (i.e. the targeted content):

- Beginning to End Viewing seconds which measures the aggregate number of viewing seconds for those set-top boxes that were tuned to the targeted content from beginning to end. From an advertiser's perspective, this is the best scenario because it indicates that the viewer viewed the entire ad.
- Beginning to End Viewing count which measures the number of set-top boxes that were tuned to the targeted content from beginning to end. From an advertiser's perspective, this provides the count of the number of viewers who viewed the entire ad.
- Beginning to Middle Viewing seconds which measures the aggregate number of viewing seconds for those set-top boxes that were tuned to the targeted content at the beginning but changed channels at some point during the middle and did not return by the end of the ad. From an advertiser's perspective, this is informative because it identifies targeted content that is not holding the viewer's attention. One possible reason is faulty targeting where the targeting algorithm is not targeting to a viewer who has any interest in the product. A second possible reason is that the content was targeted to a subject who would normally have been interested in such content, but the ad was not interesting. In either case, the advertiser has received valuable feedback that can be put to use.
- Beginning to Middle Viewing count which measures the number of set-top boxes that were tuned to the targeted content at the beginning but changed channels at some point during the middle and did not return by the end of the ad. From an advertiser's perspective, this provides the count of the number of viewers who were lost, who went away while the ad was playing.
- Beginning and End Viewing seconds which measures the aggregate number of viewing seconds for those set-top boxes that were tuned to the targeted content at the beginning but missed some part of the middle (changed channels at some point during the middle) only to return by the end of the ad so that they were tuned in at the last second of the ad. From an advertiser's perspective, this is informative because it identifies targeted content that is not holding the viewer's attention even though the viewer did return to the program where the ad was playing. One possible reason is faulty targeting where the targeting algorithm is not targeting to a viewer who has any interest in the product. A second possible reason is that the content was targeted to a subject who would normally have been interested in such content, but the ad was not interesting. In either case, the advertiser has received valuable feedback that can be put to use. The extra detail that the viewer came back to the channel tells the advertiser that the viewer was avoiding the targeted content.
- Beginning and End Viewing count which measures the number of set-top boxes that were tuned to the targeted content at the beginning but missed some part of the middle (changed channels at some point during the middle) only to return by the end of the ad so that they were tuned in at the last second of the ad. From an advertiser's perspective, this is informative because it identifies targeted content that is not holding the viewer's attention even though the viewer did return to the program where the ad was playing. The extra detail that the viewer came back to the channel tells the advertiser that the viewer was avoiding the targeted content.

The following three fields typically work in conjunction to provide a useful advantage.

- Total Expected Viewing seconds which measures the number of set-top boxes tuned in at the start of the ad multiplied by the duration of the ad in seconds. In the case of a targeted ad, the advertiser expects that every set-top box that was tuned in at the start of the ad should view the entire ad.
- Total Actual Viewing seconds which counts the number of actual viewing seconds of the ad for all those set-top boxes that were tuned in at the start of the ad.
- Percent of expected viewing seconds is calculated as Total Actual Viewing Seconds/Total Expected Viewing Seconds*100. When this number is high, it indicates that the targeting and the ad were very effective. When this number is low, it indicates either faulty targeting or unappealing advertising. In either case, the advertiser has received valuable feedback.

For ad Targeting:

To develop more effective targeting, the system could learn from the viewer behavior. As a non-limiting example, the demographics of the viewer suggest that a sport car commercial would be effective. As we measure viewership of this commercial, we see that it has low viewing counts. Thus we could build in a feedback mechanism that would recognize this and target the viewer with a different ad.

Non-Targeted Content Viewership Analysis

The Viewing Analytics Engine 142 has the advantage of allowing us to produce detailed metrics on the actual viewing of non-targeted content. Non-targeted content is any content such as an Advertisement or Program that is generally available to every set-top box that tunes to the specified channel. Viewing metrics for non-targeted content are very valuable on their own, and by comparing them with similar metrics for targeted content, they can identify whether the targeted or the non-targeted content is better at earning viewing seconds. These metrics can also provide insight into viewing patterns and human behavior.

These metrics are applicable to each individual airing of a video asset as described in the Video Asset Schedule. Thus if a video asset airs multiple times in one day, such as a commercial often does, the Viewing Analytics Engine 142 produces metrics for each airing. The ability to measure viewing of each advertisement on a second-by-second level provides detailed viewing information that current methods such as C3 Ratings do not provide. Generally, under C3 ratings, the viewing impression count for each ad in a program is based on averaging both weakly viewed ads and strongly viewed ads. Thus the low viewing counts of a weak ad may be masked by the high viewing counts of a strong ad. Instead of averaging the weak with the strong, I teach how to measure each ad individually.

The Viewing Analytics Engine 142 produces the following metrics for each unique airing of each non-targeted video asset (i.e. the non-targeted content):

- Beginning to End Viewing seconds which measures the aggregate number of viewing seconds for those set-top boxes that were tuned to the non-targeted content from beginning to end. From an advertiser's perspective, this is the best scenario because it indicates that the viewer viewed the entire ad. This is valuable information to the advertiser because it indicates that the ad is well-matched to the interests of the people who typically view that program.
- Beginning to End Viewing count which measures the number of set-top boxes that were tuned to the non-targeted content from beginning to end. From an advertiser's perspective, this provides the count of the number of viewers who viewed the entire ad.
- Beginning to Middle Viewing seconds which measures the aggregate number of viewing seconds for those set-top boxes that were tuned to the non-targeted content at the beginning but changed channels at some point during the middle. From an advertiser's perspective, this is informative because it identifies non-targeted content that is not holding the viewer's attention. One possible reason is that the content was not interesting or relevant to the viewer. In either case, the advertiser has received feedback that can be put to use. As an example, the advertiser may learn that the ad they chose to play on a certain program is of low interest to the people who typically view that program.
- Beginning to Middle Viewing count which measures the number of set-top boxes that were tuned to the non-targeted content at the beginning but changed channels at some point during the middle. From an advertiser's perspective, this provides the count of the number of viewers who were lost, who went away while the ad was playing.
- Middle to End Viewing seconds which measures the aggregate number of viewing seconds for those set-top boxes that tuned to the non-targeted content at some point during the middle of the ad or program and stayed until the end. From an advertiser's perspective, this is informative because it identifies non-targeted content that the viewer continued to view even though they missed the beginning of the ad. Thus it indicates that the ad is holding the viewer's attention. The advertiser has received feedback that can be put to use. As an example, the advertiser may learn that the ad they chose to play on a certain program is of high interest to the people who typically view that program. From a program producer's perspective, this is informative because it indicates that the program caught the viewer's attention even though the viewer missed the beginning.
- Middle to End Viewing count which measures the number of set-top boxes that tuned to the non-targeted content at some point during the middle of the ad or program and stayed until the end. From an advertiser's perspective, this provides the count of the number of viewers who decided to watch from the middle to the end of the ad even though they missed the beginning. From a program producer's perspective, this is informative because it provides a count of the number of viewers who viewed the remainder program even though they missed the beginning.
- Middle to Middle Viewing seconds which measures the aggregate number of viewing seconds for those set-top boxes that tuned to the non-targeted content at some point during the middle but changed channels before the end. From an advertiser's perspective, this is informative because it identifies non-targeted content that is not holding the viewer's attention. One possible reason is that the content was not interesting or relevant to the viewer. The advertiser has received feedback that can be put to use. As an example, the advertiser may learn that the ad they chose to play on a certain program is of low interest to the people who typically view that program. This could also indicate that the viewer was simply channel surfing.
- Middle to Middle Viewing count which measures the number of set-top boxes that tuned to the non-targeted content at some point during the middle but changed channels before the end. From an advertiser's perspective, this is informative because it identifies non-targeted content that is not holding the viewer's attention.
- Beginning and End Viewing seconds which measures the aggregate number of viewing seconds for those set-top boxes that were tuned to the non-targeted content at the beginning but missed some part of the middle (changed channels at some point during the middle) only to return by the end of the ad so that they were tuned in at the last second of the ad. From an advertiser's perspective, this is informative because it identifies non-targeted content that is not holding the viewer's attention even though the viewer did return to the program. One possible reason is faulty ad choice where the ad is not of interest to the people who typically watch that program. An example might be advertising diapers during a boxing match. A second possible reason is that the ad was run on the correct program, but the ad was not interesting, for example, a poorly done ad for sports cars during a football game. In either case, the advertiser has received feedback that can be put to use. The extra detail that the viewer came back to the channel tells the advertiser that the viewer was avoiding the non-targeted content.
- Beginning and End Viewing count which measures the number of set-top boxes that were tuned to the non-targeted content at the beginning but missed some part of the middle (changed channels at some point during the middle) only to return by the end of the ad so that they were tuned in at the last second of the ad. From an advertiser's perspective, this is informative because it identifies non-targeted content that is not holding the viewer's attention even though the viewer did return to the program. The extra detail that the viewer came back to the channel tells the advertiser that the viewer was avoiding the non-targeted content.

The following three fields typically work in conjunction to provide a useful advantage.

Total Expected Viewing seconds which measures the number of set-top boxes tuned in at the start of the ad multiplied by the duration of the ad. In the case of a non-targeted ad, the advertiser hopes that every set-top box that was tuned in at the start of the ad watches the entire ad.

Total Actual Viewing seconds which is a count of the number of actual viewing seconds of the ad for all those set-top boxes that were tuned in at the start of the ad.

Percent of expected viewing seconds is calculated as Total Actual Viewing Seconds/Total Expected Viewing Seconds*100. In the context of non-targeted content, when this number is high, it indicates that the advertiser has produced an ad that is interesting to the people who watch the program where the ad played; the ad was very effective. When this number is low, it indicates either that the ad is not airing on a suitable program or that the ad is on the right program but it is an unappealing ad. In either case, the advertiser has received valuable feedback.

Non-targeted Accidental Viewing seconds which measures the number of viewing seconds earned by a non-targeted ad but including only set-top boxes that tuned to the ad after it started. These are 'accidental' in that they are surprises, or accidents, or things that were not expected to happen, specifically, that the viewer tuned to the channel that was playing the ad after the ad had already started. Some of these accidental viewers stay tuned until the end of the ad and some tune away before the end of the ad. This information is valuable to the advertiser.

Non-targeted Accidental Retention rate based on seconds which compares the number of viewing seconds of those set-top boxes that tuned in during the middle and stayed to the end with the number of viewing seconds of those set-top boxes that tuned in during the middle and left before the end. When this rate is higher it tells the advertiser that even though the viewer began viewing during the middle of the ad, they chose to stay for the entire ad. This information is valuable to the advertiser.

Non-targeted Accidental Viewing count which measures the number of set-top boxes that tuned to the ad after it started. These are 'accidental' in that they are surprises, or accidents, or things that were not expected to happen, specifically, that the viewer tuned to the channel that was playing the ad after the ad had already started. Some of these accidental viewers stay tuned until the end of the ad and some tune away before the end of the ad. This information is valuable to the advertiser.

Non-targeted Accidental Retention rate based on count which compares the number of set-top boxes that tuned in during the middle and stayed to the end with the number of set-top boxes that tuned in during the middle and left before the end. When this rate is higher it tells the advertiser that even though the viewer began viewing during the middle of the ad, they chose to stay for the entire ad. This information is valuable to the advertiser.

Targeted Vs. Non-Targeted Advertising Comparison Metrics

The Viewing Analytics Engine 142 has the advantage of allowing us to produce detailed metrics that allow us to compare the effectiveness of targeted advertising with non-targeted advertising. This is very valuable to advertisers in that it allows them to measure whether or not their targeted advertising is yielding more viewing seconds when compared to non-targeted advertising.

By comparing 'Percent of expected viewing seconds for targeted content' with 'Percent of expected viewing seconds for non-targeted content' an advertiser can determine whether the targeting yields better results or worse results than non-targeting. Such information can help advertisers to develop better targeting algorithms, a very significant advantage.

Video Asset Information Based Metrics

The Viewing Analytics Engine 142 has the advantage of allowing us to merge video asset information with the actual viewing metrics listed previously in the Viewership Analysis sections above to provide an additional level of insight into the actual viewing results. This is done by capturing one or more of the following Program Attributes for each video asset:

a. advertising agency that produced the video asset,
b. copywriter that wrote the script used in the video asset,
c. actor(s) or actress(es) featured in the video asset,
d. celebrity status or non-celebrity status of persons in the video asset,
e. language featured in the video asset,
f. informational content provided in the video asset,
g. topic being addressed in the video asset,
h. product category shown in the video asset,
i. video format in which the video asset was delivered,
j. content rating of the video asset,
k. type of program in which the video asset was aired,
l. rating of the program in which the video asset was aired,
m. type of audio featured in the video asset,
n. male or female voice featured in the video asset,
o. time of day when the video asset was aired,
p. day of week when the video asset was aired,
q. day of year when the video asset was aired,
r. geographic area in which the video asset was aired,
s. duration of the video asset,
t. episode of the video asset,
u. original release date of the video asset,
v. studio that produced the video asset,
w. director that directed production of the video asset,
x. channel on which the video asset was aired,
y. genre of the video asset, Capturing this program attribute information with the viewing metrics opens up vast new areas of downstream analytics.

As a nonlimiting example, this data allows an analyst to create viewing groups for purposes of analytics. By operating against groups of set-top boxes, the analyst is able to preserve viewer anonymity. The viewing groups can be similar except for control variables. For each of the Program Attributes listed above, the analyst can now make statistical comparisons of various advertisements and/or programs across viewing groups. Nonlimiting examples include:

a. Compare viewing behavior of the advertisement based on which advertising agency produced the ad. Example: Do advertisements produced by advertising agency A typically enjoy longer viewing duration than those produced by advertising agency B?
b. Compare viewing behavior of the advertisement based on advertising agency copy writer. Example: Do advertisements written by copy writer Smith typically enjoy longer viewing duration than those written by copy writer Jones?
c. Compare viewing behavior of the advertisement based on featured actor(s) or actress(es). Example: Do advertisements featuring certain actor(s) or actress(es) typically enjoy longer viewing duration than those featuring perhaps lesser known people?

d. Compare viewing behavior of the advertisement based on celebrity status or non-celebrity status of persons in the ad. Example: Do advertisements featuring celebrity actor(s) or actress(es) typically enjoy longer viewing duration than those not featuring celebrity actor(s) or actress(es)? Is there an economic benefit to hiring celebrities to appear in advertisements?

e. Compare viewing behavior of the advertisement based on featured language (English or Spanish). Example: Do advertisements featuring English typically enjoy longer viewing duration than those featuring Spanish?

f. Compare viewing behavior of the advertisement based on informational content (low or high informational content). Example: Do advertisements providing greater informational content typically enjoy longer viewing duration than those providing less informational content?

g. Compare viewing behavior of the advertisement based on need or topic being addressed (financial security, physical safety, comfort, entertainment). Example: Do advertisements addressing security felt needs typically enjoy longer viewing duration than those addressing entertainment felt needs?

h. Compare viewing behavior of the advertisement based on product or category (food, medical, automobile, personal care, household cleaners, etc.). Example: Do advertisements featuring food products typically enjoy longer viewing duration than those featuring household cleaners?

i. Compare viewing behavior of the advertisement based on video format (high definition, standard definition, etc.) Example: Do advertisements delivered in high definition format typically enjoy longer viewing duration than those delivered in standard definition format?

j. Compare viewing behavior of the advertisement based on content rating (all audiences, racy, etc.) Example: Do advertisements featuring racy subject matter typically enjoy longer viewing duration than those featuring non-racy subject matter?

k. Compare viewing behavior of the advertisement based on the type of the program in which the advertisement is played (cartoon, sports, news, etc.). Example: Do advertisements appearing on news programs typically enjoy longer viewing duration than those appearing on sports programs?

l. Compare viewing behavior of the advertisement based on the rating of the program in which the advertisement is played (G, PG, R, etc.). Example: Do advertisements appearing on general viewing programs typically enjoy longer viewing duration than those appearing on more mature content programs?

m. Compare viewing behavior of the advertisement based on audio track (dramatic, soothing, classical). Example: Do advertisements featuring dramatic audio tracks typically enjoy longer viewing duration than those featuring soothing audio tracks?

n. Compare viewing behavior of the advertisement based on male or female voice. Example: Do advertisements featuring male voices typically enjoy longer viewing duration than those featuring female voices?

o. Compare viewing behavior of the advertisement based on time of day when ad played. Example: Do advertisements aired during a certain time slot typically enjoy longer viewing duration than those aired during another time slot?

p. Compare viewing behavior of the advertisement based on day of week when ad played. Example: Do advertisements aired during the Sunday news typically enjoy longer viewing duration than those aired during the Monday news?

q. Compare viewing behavior of the advertisement based on day of year when ad played. Example: Do tax return preparation advertisements aired on April 1 earn more viewers than those that air on March 1?

r. Compare viewing behavior of the advertisement based on geographic area where the ad played. Example: Do truck advertisements aired in zip code 80222 typically enjoy longer viewing duration than those aired in zip code 85201?

s. Compare viewing behavior based on the duration of the ad. Example: Do 30 second advertisements typically enjoy a higher percentage of viewing than 60 seconds advertisements?

t. Compare viewing behavior based on episode of the ad played. Example: An advertisement may air as a series of mini-episodes during the course of a one hour program, perhaps where each episode explores a use for a product. The question as to whether the later episodes earn more viewing than the earlier episodes can be determined.

u. Compare viewing behavior based on the original release date of the advertisement or program. This is perhaps more applicable to television reruns where one might expect more loyal viewers simply because they are going back to a program that they prefer. Example: Does a program that was originally released 10 years ago and is playing as a rerun earn more viewing time than a program that was just released?

v. Compare viewing behavior of the advertisement based on the studio that produced the video asset. Example: Do advertisements or programs produced by Studio A typically enjoy longer viewing duration than those produced by Studio B?

w. Compare viewing behavior of the advertisement based on the director that directed production of the video asset. Example: Do advertisements or programs directed by Director A typically enjoy longer viewing duration than those directed by Director B?

x. Compare viewing behavior of the advertisement based on the channel on which the video asset was aired. Example: Do advertisements or programs aired on heavily viewed channels typically enjoy longer viewing duration than those aired on lightly viewed channels?

y. Compare viewing behavior of the advertisement based on genre of the video asset. Example: Do movies typically retain viewership better than news programs?

As further nonlimiting examples, the Viewing Analytics Engine 142 provides an analyst with factual data that allows the analyst to:

1. Compare viewing behavior of truck commercials aired during one program genre with the same commercial aired during another program genre. Example: Do truck advertisements aired during sports events typically enjoy longer viewing duration than truck commercials aired during action movies?
2. Compare viewing behavior of the truck commercials aired during one program type compared to another program type. Example: Do truck advertisements aired during baseball games typically enjoy longer viewing duration than truck commercials aired during football games?

3. Compare viewing behavior of the truck commercials based on the time of day when the ad played. Example: Do truck advertisements aired during afternoon football games games typically enjoy longer viewing duration than truck commercials aired during evening football games?
4. Determine, for those viewers who change channels during an ad, the average number of seconds from when the ad begins airing to when the user changes the channel.

A person skilled in the art could develop any number of scenarios for further analysis. All of these are supported by detailed data produced by the Viewing Analytics Engine 142.

Advertising Placement

The Viewing Analytics Engine 142 has the advantage of allowing advertisers to identify optimal times during which to place various ads. As a nonlimiting example, in general, once we are able to determine how much of the advertisement was viewed by each set-top box within the viewing group to which the advertisement was presented, advertisers can determine where to place ads. More specifically, the Viewing Analytics Engine 142 allows us to measure actual viewing seconds of the ad when it plays. This data can be used as input to actual ad placement. As nonlimiting examples, an advertiser could:

1. Identify whether a particular ad earns more viewing seconds when played during the morning news or the evening news. Such information would also be useful in negotiating advertising rates. Example: Does the same car commercial earn more viewing seconds during the morning news or the evening news?
2. Identify whether a particular ad earns more viewing seconds when played during a movie or a football game. Such information would be useful in choosing the program type in which to advertise. Example: Does the same toothpaste commercial earn more viewing seconds during a movie or a football game?
3. Identify what type of product is likely to earn the most viewing seconds during a particular type of program. Example: Does the car commercial or the toothpaste commercial earn more viewing seconds during the movie?

Such metrics would be very helpful to advertisers in identifying the most suitable programs in which to run various ads.

Advertising Cost Based on Viewership of Ad

The Viewing Analytics Engine 142 has the advantage of allowing us to support charging for advertising based on actual viewership metrics. As a nonlimiting example, in general, once we are able to determine how much of the advertisement was viewed by each set-top box within the viewing group to which the advertisement was presented, we can develop algorithms to price the ad based on actual viewing seconds. More specifically, the Viewing Analytics Engine 142 allows us to measure actual viewing seconds of the ad when it plays. This data can be used as input to actual ad pricing. As nonlimiting examples, a cable television company could:

1. Charge the advertiser based on actual viewing seconds earned by the ad. Example: The base rate to run the advertisement on channel x during the 5:00 pm hour on Monday is amount $y; if more than 500 set-top boxes view the advertisement from beginning to end, the advertiser is billed a premium of z cents per additional set-top box.
2. Credit the advertiser based on actual viewing seconds earned by the ad. Example: The base rate to run the advertisement on channel x during the 5:00 pm hour on Monday is amount $y; if less than 200 set-top boxes view the advertisement from beginning to end, the advertiser is given a credit of z cents for each set-top box below 200 set-top boxes.

Such metrics would be very helpful to advertisers in knowing how to allocate their advertising dollars.

Advertising Agency Grading

The Viewing Analytics Engine 142 has the advantage of allowing us to produce metrics needed to grade or measure the effectiveness of the advertising agency. As a nonlimiting example, in general, once we are able to determine how much of the advertisement, measured in viewing seconds, was viewed by each set-top box within the viewing group to which the advertisement was presented, then by analyzing the viewing patterns of various advertisements, we can then reward or penalize the advertising agency based on the ability of their ad to retain viewers. More specifically, the Viewing Analytics Engine 142 allows us to measure actual viewing seconds of the ad when it plays along with measuring tune outs during the ad. This data can be used as input to valuing the services of the advertising agency. As nonlimiting examples, a company whose product is being advertised could:

1. Reward the advertising agency based on the number of set-top boxes that remain tuned for the entire duration of the ad. Example: If at the point in time when the advertisement begins to play there are x (150) set-top boxes viewing the ad, and the number of set-top boxes that continue to view the ad until the end of the ad is y (120), then for each percentage point of set-top boxes above base threshold a % (75%) that view the ad to the end, reward the advertising agency a bonus of $z ($1.05) per set-top box that views the ad to the end. In this case, 75% of 150 is 112.5; since 120 were viewing at the end of the ad, the reward is [(120−112)*$1.05=$8.40).
2. Penalize the advertising agency based on the number of set-top boxes that tune away from the ad. Example: If at the point in time when the advertisement begins to play there are x (150) set-top boxes viewing the ad and the drop off rate by the end of the advertisement is more than y % (30%), then for each percentage of drop off below base threshold of y % (30%) penalize the advertising agency a fee of $z ($0.90) per set-top box that drops off above the 30% threshold. In this case, 150*(1−0.30) =105 is the minimum STB's tuned in at the end to avoid penalty; assume there were 88 set-top boxes at the end of the ad, the penalty would be 105−88=17*$0.90=$15.30.

Demographics Analysis

For Targeted Content, the Viewing Analytics Engine 142 is able to merge demographic data with detailed viewing patterns. Thus when an ad is targeted to a group of set-top boxes, the Viewing Analytics Engine 142 is able to capture the viewing statistics relevant to that targeted ad and the demographic attributes of the people to whom the ad was targeted. This allows much deeper levels of analysis. A nonlimiting list of demographic attributes that can be captured regarding the targeted group include:

a. inferred or presumed race such as white or Hispanic
b. inferred or presumed gender such as male or female
c. inferred or presumed age group such as child, teen, adult, senior citizen
d. inferred or presumed income bracket such as lower, middle, upper income
e. inferred or presumed marital status such as single, married, divorced
f. zip code where the set-top box is located
g. subscriber type according to the cable company classification h. subscriber package level according to the cable company records i. marketing area designation Note: I have identified certain values as inferred or presumed because they are inferred by the Targeted Ad Delivery System based on rules. Other values can be definitively known such as the zip code or the subscriber type.

By combining the viewing data with demographic data, additional information can be determined.

Nonlimiting examples include:

a. Compare viewing behavior related to a certain advertisement that was targeted to groups of white viewers and groups of Hispanic viewers to identify the group from which the ad earned more viewing seconds. Example: Did the clothing ad earn more viewing seconds with the white viewers or the Hispanic viewers?

b. Compare viewing behavior related to a certain advertisement that was targeted to groups of male viewers and groups of female viewers to identify the group from which the ad earned more viewing seconds. Example: Did the jewelry ad earn more viewing seconds with the male viewers or the female viewers?

c. Compare viewing behavior related to a certain advertisement that was targeted to groups of teen viewers and groups of adult viewers to identify the group from which the ad earned more viewing seconds. Example: Did the fast food ad earn more viewing seconds with the teen viewers or the adult viewers?

d. Compare viewing behavior related to a certain advertisement that was targeted to groups of low income viewers and groups of middle income viewers to identify the group from which the ad earned more viewing seconds. Example: Did the fast food ad earn more viewing seconds with the low income viewers or the middle income viewers?

e. Compare viewing behavior related to a certain advertisement that was targeted to groups of single viewers and groups of married viewers to identify the group from which the ad earned more viewing seconds. Example: Did the car rental ad earn more viewing seconds with the single viewers or the married viewers?

f. Compare viewing behavior related to a certain advertisement that was targeted to groups of zip code 802xx viewers and groups of zip code 850xx viewers to identify the group from which the ad earned more viewing seconds. Example: Did the car repair ad earn more viewing seconds with the zip code 802xx viewers or the zip code 850xx viewers?

g. Compare viewing behavior related to a certain advertisement that was targeted to groups of residential viewers and groups of small business viewers (i.e.: subscription type) to identify the group from which the ad earned more viewing seconds. Example: Did the financial services ad earn more viewing seconds with the residential viewers or the small business viewers?

h. Compare viewing behavior related to a certain advertisement that was targeted to groups of basic package viewers and groups of premium package viewers (i.e.: subscription package level) to identify the group from which the ad earned more viewing seconds. Example: Did the financial services ad earn more viewing seconds with the basic package viewers or the premium package viewers?

i. Compare viewing behavior related to a certain advertisement that was targeted to groups of marketing area ABC viewers and groups of marketing area XYZ viewers to identify the group from which the ad earned more viewing seconds. Example: Did the golf ad earn more viewing seconds with the marketing area ABC viewers or the marketing area XYZ viewers?

Combination Demographics Analysis

Besides these examples, numerous additional examples can be readily imagined simply by combining various attributes. As nonlimiting examples, one could combine:

a. Race and gender to determine whether an advertisement earns more viewing seconds with white males or Hispanic males.

b. Gender and zip code to determine whether an advertisement earns more viewing seconds with men in zip code 90222 or zip code 95002.

Benefits for Content Providers

While much of the prior discussion of benefits focused on advertising, the same data fields that identify viewing results for non-targeted content can be used to identify viewing results for any other video asset such as a news cast, a movie, a pilot program, a sports event, or a regularly scheduled program.

As nonlimiting examples, consider:

1. The content provider has been asked to carry a new program and it desires to get accurate audience measurements. The metrics identified above will allow the content provider to get second-by-second metrics on viewership to determine exact viewer counts and whether or not the program holds its audience.
2. The content provider needs exact viewership metrics to assist in negotiating rates to charge a studio (producer) for carrying a program. This may happen in the case of a low viewership program.
3. The content provider needs exact viewership metrics to assist in negotiating rates which will be paid by the content provider to the studio (producer) to carry a program. This may happen in the case of a high viewership program.
4. The content provider needs to know whether a certain video asset earns more viewing minutes during the day or the evening.
5. The content provider needs to understand the demographics of the viewing audience.
6. The content provider needs accurate audience measurements to assist in negotiating advertising rates for the ads that play during a specific program.
7. The content provider needs to know whether a certain video asset earns any viewing minutes. This is instrumental in developing programming schedules. This is very important in managing lightly viewed channels.
8. The content provider needs to know what percentage of the set-top boxes that are tuned to any program are tuned to program x.
9. The content provider needs to provide detailed audience measurements for the morning news compared to the evening news.
10. The content provider needs to provide detailed audience measurements for the local evening news compared to the national evening news.
11. In the case of video on demand or pay per view, the content provider needs to measure what percentage of viewers who watch the preview of a movie proceed to purchase the movie.
12. In the case of video on demand or pay per view, the content provider needs to measure what percentage of viewers who purchase a movie watch the movie to the end.

In each of the cases, the Viewing Analytics Engine 142 produces the metrics needed to answer the question.

Second-by-Second Viewing Analysis

For both targeted content and non-targeted content, the Viewing Analytics Engine 142 has the advantage of being able to produce second-by-second viewing analytics for each second during which an ad or program is playing. In this discussion, recall that an ad or program is synonymous with a video asset. The Viewing Analytics Engine 142 produces the following second-by-second metrics for each second of play:

- Count of set-top boxes viewing this asset during specified second identifies how many set-top boxes were viewing this ad during each second from the first to the last second of the ad or program. From an advertiser's perspective, this tells very specifically whether or not the ad is holding its audience. If the advertiser sees that the ad is holding the audience he will be pleased. If the advertiser sees that the ad is losing audience he is able to identify a problem. In either case, the advertiser has received valuable feedback that can be put to use.
- Count of set-top boxes viewing any asset during specified second identifies how many set-top boxes were viewing this ad and all the other programming combined during each second from the first to the last second of the ad. From an advertiser's perspective, this tells how much competition there is for viewing audience during this second.
- Percent of set-top boxes viewing this asset during specified second identifies the percentage of set-top boxes that were viewing this ad during each second from the first to the last second of the ad. This is calculated as 'Count of set-top boxes viewing this asset during specified second' divided by 'Count of set-top boxes viewing any asset during specified second'*100.

This metric provides the advertiser with the percentage of the viewing audience his ad has earned for each second that it plays. If the advertiser sees that the ad is earning a relatively high percentage of viewing audience he will be pleased. If the ad earns a small percentage of the viewing audience or none of the viewing audience, the advertiser has information that he can use in negotiating advertising rates. In either case, the advertiser has received valuable feedback that can be put to use. From a content provider's perspective, this provides a very exact measure of viewing audience share for the program.

As noted, the Viewing Analytics Engine 142 produces all three of these metrics for both targeted ads and non-targeted ads.

Recall as mentioned previously, when a targeted ad runs, it is being substituted for a non-targeted ad that is playing on that same program at the same time. By comparing the second-by-second viewing data for a targeted ad that is run directly against a non-targeted ad, the advertiser has yet another tool to determine whether or not the targeted ad is yielding a better result. This provides the advertiser with valuable feedback that can be put to use in evaluating the effectiveness of the targeted advertising.

Benefits Beyond Television Viewing

In this section I will include several additional uses of this technology.

For Measuring Realtor Home Videos:

With current technology a realtor is able to create a video highlighting interior and exterior features of a home she is listing for sale. A prospective buyer is then able to use an electronic device interacting with a network to visit a web site to view this video to learn more about the home. In this situation, the web site could readily capture information about how much of the video was viewed by the electronic device along with other information such as price of the property, location of the property, and other features of the property. Using the Viewing Analytics Engine 142 one could, as a non-limiting example, conduct analysis on the viewing duration of the video to gather useful information to develop comparisons such as: (a) how much viewing time does this video earn compared to videos of similarly situated properties, (b) do properties with videos that earn more viewing time receive purchase offers sooner than those properties with videos that earn little viewing time.

For Measuring Product Interest:

With current technology a retailer or manufacturer is able to create a training or product demonstration video highlighting various features of a product or how to use a product. For example, an electric saw manufacturer could create a video highlighting the various features of each of several saws in an electric saw product line. When a human being (a prospective buyer) then uses an electronic device interacting with a network to visit a web site to view the video to learn more about the various electric saws, the web site could readily capture electronic device usage data which could then be passed to the Viewing Analytics Engine 142. The Viewing Analytics Engine 142 could, as a non-limiting example, conduct analysis on the viewing duration of the video to determine how much of the video the person viewed. It could then immediately pass this information along to the web site which could have a rules engine. One rule might be that for people who viewed at least x % of the video, offer a coupon for $25 off if the user elects to purchase the product immediately. Additionally, Viewing Analytics Engine 142 could collect viewing statistics which would (a) help the retailer or manufacturer to determine how much of the video is viewed on average, (b) determine whether this video earn more viewing time than other similar product videos, and (c) help to determine the correlation between percent of viewing and product purchase.

For Measuring Viewer Interest in Video Content:

A fast food merchant such as a pizza delivery service may provide online ordering. To provide the customer with entertainment while waiting for the food to be delivered, the merchant may make video content such as film clips available to the consumer. In this case, a customer is using an electronic device interacting with a network to visit a web site to view video content. The Viewing Analytics Engine 142 could, as a non-limiting example, conduct analysis on the viewing pattern to determine whether and how much of the video the consumer has viewed. Such statistics can be gathered and returned to a central data base which could in aggregate be used to determine whether the video content is interesting to the consumer; such a system may help to identify when it is time to offer new video content. Additionally, a system could be put in place to offer the consumer the opportunity to purchase the video when the consumer has viewed a significant part of the video content, thus allowing the consumer to continue viewing it.

Subsequent Usage of the Metrics

As I have noted, there are several levels of data correlation that I have identified:

a. First, the Viewing Analytics Engine 142 correlates (a) channel viewing activity where the activity is tracked on a second-by-second basis with (b) video asset schedule data.
b. Second, the Viewing Analytics Engine 142 correlates (a) channel viewing activity where the activity is tracked on a second-by-second basis, (b) video asset schedule data, and (c) targeted content delivery data.
c. Third, the Viewing Analytics Engine 142 correlates (a) channel viewing activity where the activity is tracked on a second-by-second basis, (b) video asset schedule data, (c) targeted content delivery data, and (d) demographic data.

We can see that when the Viewing Analytics Engine 142 makes these correlations and then produces the various metrics described herein, the foundation has been laid for developing a comprehensive data warehouse including the analytics taught herein along with others that readily fit within the spirit and scope of this embodiment.

The metrics readily lend themselves to dimensional analysis using contemporary data warehouse methods. A Fact table in such an application may contain viewing data for an ad or a program. Multiple Dimension tables can readily be envisioned by those skilled in the art. As non-limiting examples, all of the program values identified above (advertising agency, copywriter, actors, etc.) could be Dimensions.

The metrics produced by the Viewing Analytics Engine 142 can be loaded to a data warehouse to support longitudinal analysis. Thus we can readily envision a myriad of uses for the metrics produced by the Viewing Analytics Engine 142.

Several nonlimiting examples will be reviewed:

By analyzing viewer counts of a weekly program from week to week, a program producer can get an early indication of whether a program's viewership is trending up or down and then adjust accordingly.

By analyzing commercial viewing trends an advertiser can determine whether an ad has reached a saturation point and people tune away from the ad when they see it, this would suggest the need to run a different ad.

To further expand upon the second example, recognize that advertisers need to know both the audience reach and the viewing frequency of the ads they pay to air. In regard to audience reach, the advertisers want to know how many unique households or set-top boxes have been exposed to an ad. In regard to viewing frequency, the advertisers want to know how many times the household or set-top box has been exposed to the ad.

For audience reach, the Viewing Analytics Engine 142 can identify at a set-top box level how many unique set-top boxes have been exposed to an ad and the aggregate viewing seconds from those set-top boxes. As this information is tracked over a period of time, the advertiser gains valuable insight into the exposure of the ad and whether interest in the ad is diminishing.

For viewing frequency, the Viewing Analytics Engine 142 can identify at a set-top box level each time that a set-top box views a particular ad or video asset along with the viewing time in seconds. This information could easily be written to a file and then loaded into a data warehouse in order to support queries showing how many times each set-top box viewed an ad. Along with the viewing counts such a system could also track viewing seconds to determine whether viewing seconds are declining as ad exposure increases.

All of this could be done using anonymous and/or encrypted set-top box identifiers to protect viewer privacy.

Numerous additional metrics can readily be identified by those skilled in the art. Additionally, numerous additional uses for the metrics identified herein will be readily evident to those skilled in the art.

Other Ramifications

In today's world where the number of media viewing choices is vast, it is often difficult for the viewer to locate the content that he or she might be most interested in receiving. To assist in solving this problem, a content provider could develop viewing profiles that could then be used to suggest content to a viewer. Such profiles can be developed by tracking the viewing history of various groups of viewers. As an example, the Viewing Analytics Engine 142 can produce metrics which identify the viewing behavior of various groups of people. Perhaps classic movies earn very high viewing rates with one group while mystery movies earn very high viewing rates with another group. Then a system could be setup to suggest candidate movies based on the viewer's viewing group so that a viewer in the first viewing group may be presented with a list of classic movie titles while a viewer in the second group would be presented with a list of mystery movies. The viewer is thus assisted in choosing content.

One can envision an embodiment of the Viewing Analytics Engine 142 which runs on the set top box, with the viewer's permission, to perform second-by-second analysis of the viewing activity during a program. At the end of a program the Viewing Analytics Engine 142 could analyze the viewer's activity related to that program. Based on that analysis, an interactive application could ask any number of questions to the viewer such as:

For Identifying Future Programs of Interest:

We noticed that you viewed the entire program. Would you like us to recommend similar programs in the future? Perhaps additional questions could be asked to identify what the viewer liked (the actor/actress, the genre, the setting, etc.) to assist in making viewing recommendations in the future.

For Product Information Requests:

We noticed that you are interested in outdoor programs. Would you like to have a product brochure for the (tent, cook stove, hiking boots, etc.) that were used by (actor name/actress name) sent to your home or email address?

We noticed that you are interested in gourmet cooking. Would you like to have a product brochure for the (brand name) cookware that (actor name/actress name) used on the program?

Actress (actress name) was wearing clothes from (clothing provider). Would you like to receive a coupon for 25% off on the line of clothing that (actress name) was wearing?

Actress (actress name) uses hair care products from (hair care product company). Would you like to receive a coupon for 25% off hair care products from (hair care product company)?

For Product Purchases:

We noticed that you are interested in outdoor programs. Would you like to purchase the (tent, cook stove, knife, etc.) that were used by (actor name/actress name)?

We noticed that you are interested in gourmet cooking. Would you like to purchase a set of the (brand name) cookware that (actor name/actress name) used on the program?

The soundtrack featured in this movie was an original creation. Would you like to purchase this soundtrack for only $1.95 on (music download service)?

In each of the above examples, by having a more complete understanding of what programs the viewer viewed, one could pose relevant marketing questions to the viewer. A set-top box marketing application could be structured around the increased understanding of what the viewer likes to watch.

Satellite Television Comparison

I have shown in numerous places in this specification that cable television set-top box tuning data could be replaced by satellite television set-top box tuning data in order to apply the teachings presented herein to that environment. A person with ordinary skill in the art will have no difficulty applying the teachings presented herein to the satellite television environment. Thus we see that cable television set-top box activity and satellite television set-top box activity can be processed using the same Viewing Analytics Engine 142.

Electronic Device Comparison

A person with ordinary skill in the art will readily see the similarities between cable television set-top box viewing and electronic device television viewing. The teachings revealed herein can be readily applied to any kind of electronic device used for television viewing. The parallels are as follows:

a. The definition of an Electronic Device includes a set-top box as well as many other kinds of electronic devices.

b. Electronic device identifier is similar to a set-top box identifier.

c. Electronic device Viewer interactions are similar to set-top box Channel tuning events.

d. Electronic device usage data is similar to set-top box Channel tuning data.

e. Electronic device content viewing activity is similar to set-top box Channel viewing activity.

Thus we see that these two data sets can be processed using the same Viewing Analytics Engine 142. A person with ordinary skill in the art will have no difficulty applying the teachings presented herein to any Electronic Device that captures viewer interactions.

I claim:

1. A computer-implemented method, executed on a data analysis computer system including at least one data analysis computer of known type, of analyzing a plurality of channel tuning events caused by a plurality of viewers interacting with a plurality of set-top boxes, each interacting directly or indirectly with a cable television system, said computer-implemented method comprising the steps of:

a. providing on said data analysis computer system a data analysis program;

b. receiving in computer readable format channel tuning data resulting from said channel tuning events and making said channel tuning data available to said data analysis program run on said data analysis computer system;

c. creating a viewing detail data structure in said data analysis program run on said data analysis computer system containing identifying fields for things of interest for analysis;

d. creating in said viewing detail data structure buckets representing individual seconds of time during a window of time of interest for analysis wherein said buckets are correlated with said identifying fields;

e. receiving in computer readable format values for populating said identifying fields for things of interest for analysis and then using said values to populate said identifying fields;

f. using said channel tuning data to determine the tune-in date and time and the tune-out date and time of each said channel tuning event and making said tune-in date and time and said tune-out date and time available to said data analysis program run on said data analysis computer system;

g. loading values that identify second-by-second channel viewing activity to selected buckets in said viewing detail data structure based on said tune-in date and time and said tune-out date and time of each said channel tuning event, where said buckets loaded correspond with said identifying fields in said viewing detail data structure, and where each said bucket represents a second of time during which said data analysis program is tracking said channel viewing activity against at least one said thing of interest for analysis;

h. creating a viewing result data structure containing fields for video asset schedule data, program attribute data, and viewing metrics;

i. receiving in computer readable format video asset schedule data regarding video assets delivered to said set-top box and making said video asset schedule data available to said data analysis program run on said data analysis computer system;

j. receiving in computer readable format program attribute data describing said video assets where said program attribute data includes at least one member selected from the group consisting of: advertising agency that produced the video asset, copywriter that wrote the script used in the video asset, actor or actress featured in the video asset, celebrity status or non-celebrity status of persons in the video asset, language featured in the video asset, informational content provided in the video asset, topic being addressed in the video asset, product category shown in the video asset, video format in which the video asset was delivered, content rating of the video asset, type of program in which the video asset was aired, rating of the program in which the video asset was aired, type of audio featured in the video asset, male or female voice featured in the video asset, time of day when the video asset was aired, day of week when the video asset was aired, day of year when the video asset was aired, geographic area in which the video asset was aired, duration of the video asset, episode of the video asset, original release date of the video asset, studio that produced the video asset, director that directed production of the video asset, channel on which the video asset was aired, genre of the video asset and making said program attribute data available to said data analysis program run on said data analysis computer system;

k. correlating said video asset schedule data with said program attribute data using at least one member selected from the group consisting of: cable television system equipment identifier, geographic area, channel call sign, channel source id, date, time, video asset identifier;

l. populating said viewing result data structure with said video asset schedule data;

m. populating said viewing result data structure with said correlated program attribute data;

n. correlating said channel viewing activity with said video asset schedule data using at least one member selected from the group consisting of: cable television system equipment identifier, geographic area, channel call sign, channel source id, date, time;

o. executing algorithms in said data analysis program running on said data analysis computer system which use said correlated channel viewing activity, said correlated video asset schedule data, and said correlated program attribute data to produce metrics regarding the viewer's response to said video asset which is playing as described in said video asset schedule;

p. outputting said analytics in a useful format;

whereby said analytics (i) provide insight into the viewing habits of said viewers interacting with said set-top box interacting with said cable television system, (ii) provide insight into the set-top box usage pattern of said viewers, and (iii) provide insight into the behavior of said viewers.

2. The computer-implemented method of claim 1 wherein said data analysis program performs analytics to produce metrics on said viewer response to said video asset which was delivered to said set-top box as described in said video asset schedule, and where said video asset is described by said program attribute, and where said metrics include at least one member selected from the group consisting of:

(a) comparison of viewing metrics by advertising agency that produced the video asset;

(b) comparison of viewing metrics by copy writer that wrote the video asset;

(c) comparison of viewing metrics by actor or actress featured in the video asset;

(d) comparison of viewing metrics by celebrity status or non-celebrity status of persons in the video asset;

(e) comparison of viewing metrics based on the language featured in the video asset;

(f) comparison of viewing metrics based on informational content provided in the video asset;

(g) comparison of viewing metrics based on topic being addressed in the video asset;

(h) comparison of viewing metrics based on product category shown in the video asset;

(i) comparison of viewing metrics based on video format in which the video asset was delivered;

(j) comparison of viewing metrics based on content rating of the video asset;

(k) comparison of viewing metrics based on type of program in which the video asset was aired;

(l) comparison of viewing metrics based on the rating of the program in which the video asset was aired;

(m) comparison of viewing metrics based on the type of audio featured in the video asset;

(n) comparison of viewing metrics based on male or female voice featured in the video asset;

(o) comparison of viewing metrics based on time of day when the video asset was aired;

(p) comparison of viewing metrics based on day of week when the video asset was aired;

(q) comparison of viewing metrics based on day of year when the video asset was aired;

(r) comparison of viewing metrics based on geographic area in which the video asset was aired;

(s) comparison of viewing metrics based on duration of the video asset;

(t) comparison of viewing metrics based on episode of the video asset;

(u) comparison of viewing metrics based on original release date of the video asset;

(v) comparison of viewing metrics based on studio that produced the video asset;

(w) comparison of viewing metrics based on director that directed production of the video asset;

(x) comparison of viewing metrics based on the channel on which the video asset was aired;

(y) comparison of viewing metrics based on the genre of the video asset;

(z) comparison of viewing metrics based on combinations of two or more of the criteria listed above.

3. The computer-implemented method of claim 1 wherein said data analysis program performs analytics to produce metrics on a second-by-second basis showing the number of said viewers that viewed said video asset, which was delivered as described in said video asset schedule, during said second compared to the number of said viewers that viewed any video asset playing during the same said second.

4. A computer-implemented method, executed on a data analysis computer system including at least one data analysis computer of known type, of analyzing a plurality of channel tuning events caused by a plurality of viewers interacting with a plurality of set-top boxes, each interacting directly or indirectly with a cable television system, said computer-implemented method comprising the steps of:

a. providing on said data analysis computer system a data analysis program;

b. receiving in computer readable format channel tuning data resulting from said channel tuning events and making said channel tuning data available to said data analysis program run on said data analysis computer system;

c. creating a viewing detail data structure in said data analysis program run on said data analysis computer system containing identifying fields for things of interest for analysis;

d. creating in said viewing detail data structure buckets representing individual seconds of time during a window of time of interest for analysis wherein said buckets are correlated with said identifying fields;

e. receiving in computer readable format values for populating said identifying fields for things of interest for analysis and then using said values to populate said identifying fields;

f. using said channel tuning data to determine the tune-in date and time and the tune-out date and time of each said channel tuning event and making said tune-in date and time and said tune-out date and time available to said data analysis program run on said data analysis computer system;

g. loading values that identify second-by-second channel viewing activity to selected buckets in said viewing detail data structure based on said tune-in date and time and said tune-out date and time of each said channel tuning event, where said buckets loaded correspond with said identifying fields in said viewing detail data structure, and where each said bucket represents a second of time during which said data analysis program is tracking said channel viewing activity against at least one said thing of interest for analysis;

h. creating a viewing result data structure containing fields for video asset schedule data, program attribute data, and viewing metrics;

i. receiving in computer readable format video asset schedule data regarding video assets delivered to said set-top box and making said video asset schedule data available to said data analysis program run on said data analysis computer system;

j. receiving in computer readable format program attribute data describing said video assets where said program attribute data includes at least one member selected from the group consisting of: advertising agency that produced the video asset, copywriter that wrote the script used in the video asset, actor or actress featured in the video asset, celebrity status or non-celebrity status of persons in the video asset, language featured in the video asset, informational content provided in the video asset, topic being addressed in the video asset, product category shown in the video asset, video format in which the video asset was delivered, content rating of the video asset, type of program in which the video asset was aired, rating of the program in which the video asset was aired, type of audio featured in the video asset, male or female voice featured in the video asset, time of day when the video asset was aired, day of week when the video asset was aired, day of year when the video asset was aired, geographic area in which the video asset was aired, duration of the video asset, episode of the video asset, original release date of the video asset, studio that produced the video asset, director that directed production of the video asset, channel on which the video asset was aired, genre of the video asset and making said program attribute data available to said data analysis program run on said data analysis computer system;

k. correlating said video asset schedule data with said program attribute data using at least one member selected from the group consisting of: cable television system equipment identifier, geographic area, channel call sign, channel source id, date, time, video asset identifier;

l. populating said viewing result data structure with said video asset schedule data;

m. populating said viewing result data structure with said correlated program attribute data;

n. receiving in computer readable format targeted content delivery data regarding the video assets being delivered to targeted set-top boxes and making said targeted content delivery data available to said data analysis program run on said data analysis computer system;

o. correlating said channel viewing activity with said video asset schedule data using at least one member selected from the group consisting of: cable television system equipment identifier, geographic area, channel call sign, channel source id, date, time;

p. correlating said channel viewing activity with said targeted content delivery data using at least one member selected from the group consisting of: cable television system equipment identifier, geographic area, channel call sign, channel source id, set-top box identifier, date, time;

q. correlating said video asset schedule data with said targeted content delivery data using at least one member selected from the group consisting of: cable television system equipment identifier, geographic area, channel call sign, channel source id, date, time, video asset identifier;

r. executing algorithms in said data analysis program running on said data analysis computer system which use said correlated channel viewing activity, said correlated video asset schedule data, said correlated program attribute data, and said correlated targeted content delivery data to produce metrics regarding the viewer response to said targeted content;

s. outputting said analytics in a useful format;

whereby said analytics (i) provide insight into the viewing habits of said viewers interacting with said set-top box interacting with said cable television system, (ii) provide insight into the set-top box usage pattern of said viewers, (iii) provide insight into the behavior of said viewers, and (iv) provide insight into said viewer response to said targeted content.

5. The computer-implemented method of claim 4 wherein said data analysis program performs analytics to produce metrics on said viewer response to said targeted content where said metrics include at least one member selected from the group consisting of:

(a) metrics comparing the response of said viewers to said targeted content with the response of said viewers to non-targeted content;

(b) metrics comparing the viewing time by said viewers of said targeted content with the viewing time by said viewers of non-targeted content;

(c) metrics comparing the response of said viewers to said targeted content which is identified by one or more said program attributes with the response of said viewers to non-targeted content which is identified by the same said program attributes;

(d) metrics comparing the viewing time by said viewers of said targeted content which is identified by one or more said program attributes with the viewing time by said viewers of non-targeted content which is identified by the same said program attributes;

(e) metrics comparing the response of said viewers to said targeted content which is identified by one or more said program attributes with the response of said viewers to targeted content which is identified by one or more different said program attributes;

(f) metrics comparing the viewing time by said viewers of said targeted content which is identified by one or more said program attributes with the viewing time by said viewers of targeted content which is identified by one or more different said program attributes;

(g) metrics comparing the expected viewing time by said viewers of said targeted content with the actual viewing time by said viewers of said targeted content;

(h) metrics comparing the expected and actual viewing time by said viewers of said targeted content with the expected and actual viewing time by said viewers of said non-targeted content;

(i) metrics comparing the expected viewing time by said viewers of said targeted content which is identified by one or more said program attributes with the actual viewing time by said viewers of said targeted content which is identified by one or more different said program attributes.

6. The computer-implemented method of claim 4 wherein said data analysis program performs analytics to produce metrics on a second-by-second basis showing the number of said viewers that viewed said video asset, which was delivered as described in said video asset schedule, during said second and identified by a plurality of said program attributes compared to the number of said viewers that viewed any video asset playing during the same said second and identified by a plurality of the same or different said program attributes.

7. A computer-implemented method, executed on a data analysis computer system including at least one data analysis computer of known type, of analyzing a plurality of channel tuning events caused by a plurality of viewers interacting with a plurality of set-top boxes, each interacting directly or indirectly with a cable television system, said computer-implemented method comprising the steps of:

a. providing on said data analysis computer system a data analysis program;

b. receiving in computer readable format channel tuning data resulting from said channel tuning events and making said channel tuning data available to said data analysis program run on said data analysis computer system;

c. creating a viewing detail data structure in said data analysis program run on said data analysis computer system containing identifying fields for things of interest for analysis;

d. creating in said viewing detail data structure buckets representing individual seconds of time during a window of time of interest for analysis wherein said buckets are correlated with said identifying fields;

e. receiving in computer readable format values for populating said identifying fields for things of interest for analysis and then using said values to populate said identifying fields;

f. using said channel tuning data to determine the tune-in date and time and the tune-out date and time of each said channel tuning event and making said tune-in date and time and said tune-out date and time available to said data analysis program run on said data analysis computer system;

g. loading values that identify second-by-second channel viewing activity to selected buckets in said viewing detail data structure based on said tune-in date and time and said tune-out date and time of each said channel tuning event, where said buckets loaded correspond with said identifying fields in said viewing detail data structure, and where each said bucket represents a second of time during which said data analysis program is tracking said channel viewing activity against at least one said thing of interest for analysis;

h. creating a viewing result data structure containing fields for video asset schedule data, program attribute data, and viewing metrics;

i. receiving in computer readable format video asset schedule data regarding video assets delivered to said set-top box and making said video asset schedule data available to said data analysis program run on said data analysis computer system;

j. receiving in computer readable format program attribute data describing said video assets where said program attribute data includes at least one member selected from the group consisting of: advertising agency that produced the video asset, copywriter that wrote the script used in the video asset, actor or actress featured in the video asset, celebrity status or non-celebrity status of persons in the video asset, language featured in the video asset, informational content provided in the video asset, topic being addressed in the video asset, product category shown in the video asset, video format in which the video asset was delivered, content rating of the video asset, type of program in which the video asset was aired, rating of the program in which the video asset was aired, type of audio featured in the video asset, male or female voice featured in the video asset, time of day when the video asset was aired, day of week when the video asset was aired, day of year when the video asset was aired, geographic area in which the video asset was aired, duration of the video asset, episode of the video asset, original release date of the video asset, studio that produced the video asset, director that directed production of the video asset, channel on which the video asset was aired, genre of the video asset and making said program attribute data available to said data analysis program run on said data analysis computer system;

k. correlating said video asset schedule data with said program attribute data using at least one member selected from the group consisting of: cable television system equipment identifier, geographic area, channel call sign, channel source id, date, time, video asset identifier;

l. populating said viewing result data structure with said video asset schedule data;

m. populating said viewing result data structure with said correlated program attribute data;

n. receiving in computer readable format targeted content delivery data regarding the video assets being delivered to targeted set-top boxes and making said targeted content delivery data available to said data analysis program run on said data analysis computer system;

o. receiving in computer readable format demographic data regarding said viewer to whom said targeted content was directed and making said demographic data available to said data analysis program run on said data analysis computer system;

p. correlating said channel viewing activity with said video asset schedule data using at least one member selected from the group consisting of: cable television system equipment identifier, geographic area, channel call sign, channel source id, date, time;

q. correlating said channel viewing activity with said targeted content delivery data using at least one member selected from the group consisting of: cable television system equipment identifier, geographic area, channel call sign, channel source id, set-top box identifier, date, time;

r. correlating said video asset schedule data with said targeted content delivery data using at least one member selected from the group consisting of: cable television system equipment identifier, geographic area, channel call sign, channel source id, date, time, video asset identifier;

s. correlating said targeted content delivery data and said demographic data using at least one member selected from the group consisting of: cable television system equipment identifier, geographic area, channel call sign, channel source id, date, time, video asset identifier;

t. executing algorithms in said data analysis program running on said data analysis computer system which use said correlated channel viewing activity, said correlated video asset schedule data, said correlated program attribute data, said correlated targeted content delivery data, and said demographic data to produce metrics regarding the viewer response to said targeted content;

u. outputting said analytics in a useful format;

whereby said analytics (i) provide insight into the viewing habits of said viewers interacting with said set-top box interacting with said cable television system, (ii) provide insight into the set-top box usage pattern of said viewers, (iii) provide insight into the behavior of said viewers, and (iv) provide insight into said viewer response to said targeted content.

8. The computer-implemented method of claim 7 wherein said data analysis program performs analytics to produce metrics on said viewer response to said targeted content where said metrics include at least one member selected from the group consisting of:

(a) metrics comparing the response of said viewers to said targeted content with the response of said viewers to non-targeted content;

(b) metrics comparing the viewing time of said targeted content with the viewing time of non-targeted content;

(c) metrics comparing the response of said viewers identified by said demographic data to said targeted content to the response of said viewers identified by different said demographic data to said targeted content;

(d) metrics comparing the viewing time of said viewers identified by said demographic data to said targeted content to the viewing time of said viewers identified by different said demographic data to said targeted content.

9. The computer-implemented method of claim 7 wherein said data analysis program performs analytics to produce metrics on a second-by-second basis showing the number of said viewers that viewed said video asset, which was delivered as described in said video asset schedule, during said second and identified by said program attribute compared to the number of said viewers that viewed any video asset playing during the same said second and identified by the same said program attribute.

10. The computer-implemented method of claim 7 wherein said data analysis program performs analytics to produce metrics on a second-by-second basis showing the number of said viewers that viewed said video asset, which was delivered as described in said video asset schedule, during said second and identified by said program attribute compared to the number of said viewers that viewed any video asset playing during the same said second and identified by a different program attribute.

11. The computer-implemented method described in claim 7 wherein said demographic data about said viewer operating said set-top box includes at least one member selected from the group consisting of: income, ethnicity, gender, age, marital status, location, geographic area, postal code, census data, occupation, social grouping, family status, any proprietary demographic grouping, segmentation, credit score, dwelling type, homeownership status, property ownership status, rental status, vehicle ownership, tax rolls, credit card usage, religious affiliation, sports interest, political party affiliation, cable television subscriber type, cable television subscriber package level, and cell phone service level.

12. A computer-implemented method, executed on a data analysis computer system including at least one data analysis computer of known type, of analyzing a plurality of viewer interactions by a plurality of viewers interacting with a plurality of electronic devices, each interacting directly or indirectly with a computer system accessed through a network, said computer-implemented method comprising the steps of:

a. providing on said data analysis computer system a data analysis program;

b. receiving in computer readable format electronic device usage data resulting from said viewer interaction and making said electronic device usage data available to said data analysis program run on said data analysis computer system;

c. creating a viewing detail data structure in said data analysis program run on said data analysis computer system containing identifying fields for things of interest for analysis;

d. creating in said viewing detail data structure buckets representing individual seconds of time during a window of time of interest for analysis wherein said buckets are correlated with said identifying fields;

e. receiving in computer readable format values for populating said identifying fields for things of interest for analysis and then using said values to populate said identifying fields;

f. using said electronic device usage data to determine the beginning date and time and the ending date and time of each said viewer interaction and making said beginning date and time and said ending date and time available to said data analysis program run on said data analysis computer system;

g. loading values that identify second-by-second content viewing activity to selected buckets in said viewing detail data structure based on said beginning date and time and said ending date and time of each said viewer interaction, where said buckets loaded correspond with said identifying fields in said viewing detail data structure, and where each said bucket represents a second of time during which said data analysis program is tracking said content viewing activity against at least one said thing of interest for analysis;

h. creating a viewing result data structure containing fields for video asset schedule data, program attribute data, and viewing metrics;

i. receiving in computer readable format video asset schedule data regarding video assets delivered to said electronic device and making said video asset schedule data available to said data analysis program run on said data analysis computer system;

j. receiving in computer readable format program attribute data describing said video assets where said program attribute data includes at least one member selected from the group consisting of: advertising agency that produced the video asset, copywriter that wrote the script used in the video asset, actor or actress featured in the video asset, celebrity status or non-celebrity status of persons in the video asset, language featured in the video asset, informational content provided in the video asset, topic being addressed in the video asset, product category shown in the video asset, video format in which the video asset was delivered, content rating of the video asset, type of program in which the video asset was aired, rating of the program in which the video asset was aired, type of audio featured in the video asset, male or female voice featured in the video asset, time of day when the video asset was aired, day of week when the video asset was aired, day of year when the video asset was aired, geographic area in which the video asset was aired, duration of the video asset, episode of the video asset, original release date of the video asset, studio that produced the video asset, director that directed production of the video asset, channel on which the video asset was aired, genre of the video asset and making said program attribute data available to said data analysis program run on said data analysis computer system;

k. correlating said video asset schedule data with said program attribute data using at least one member selected from the group consisting of: computer system accessed through a network equipment identifier, geographic area, web address, internet protocol address, channel call sign, channel source id, date, time, video asset identifier;

l. populating said viewing result data structure with said video asset schedule data;

m. populating said viewing result data structure with said correlated program attribute data;

n. correlating said content viewing activity with said video asset schedule data using at least one member selected from the group consisting of: computer system accessed through a network equipment identifier, geographic area, web address, internet protocol address, channel call sign, channel source id, date, time, video asset identifier;

o. executing algorithms in said data analysis program running on said data analysis computer system which use said correlated content viewing activity, said correlated video asset schedule data, and said correlated program attribute data to produce metrics regarding the viewer's response to said video asset which is playing as described in said video asset schedule;

p. outputting said analytics in a useful format;

whereby said analytics (i) provide insight into the viewing habits of said viewers interacting with said electronic device interacting with said computer system accessed through said network, (ii) provide insight into the electronic device usage pattern of said viewers, and (iii) provide insight into the behavior of said viewers.

13. The computer-implemented method of claim 12 wherein said data analysis program performs analytics to produce metrics on said viewer response to said video asset which was delivered to said electronic device as described in said video asset schedule, and where said video asset is described by said program attribute, and where said metrics include at least one member selected from the group consisting of:

(a) comparison of viewing metrics by advertising agency that produced the video asset;
(b) comparison of viewing metrics by copy writer that wrote the video asset;
(c) comparison of viewing metrics by actor or actress featured in the video asset;
(d) comparison of viewing metrics by celebrity status or non-celebrity status of persons in the video asset;
(e) comparison of viewing metrics based on the language featured in the video asset;
(f) comparison of viewing metrics based on informational content provided in the video asset;
(g) comparison of viewing metrics based on topic being addressed in the video asset;
(h) comparison of viewing metrics based on product category shown in the video asset;
(i) comparison of viewing metrics based on video format in which the video asset was delivered;
(j) comparison of viewing metrics based on content rating of the video asset;
(k) comparison of viewing metrics based on type of program in which the video asset was aired;
(l) comparison of viewing metrics based on the rating of the program in which the video asset was aired;
(m) comparison of viewing metrics based on the type of audio featured in the video asset;
(n) comparison of viewing metrics based on male or female voice featured in the video asset;
(o) comparison of viewing metrics based on time of day when the video asset was aired;
(p) comparison of viewing metrics based on day of week when the video asset was aired;
(q) comparison of viewing metrics based on day of year when the video asset was aired;
(r) comparison of viewing metrics based on geographic area in which the video asset was aired;
(s) comparison of viewing metrics based on duration of the video asset;
(t) comparison of viewing metrics based on episode of the video asset;
(u) comparison of viewing metrics based on original release date of the video asset;
(v) comparison of viewing metrics based on studio that produced the video asset;
(w) comparison of viewing metrics based on director that directed production of the video asset;
(x) comparison of viewing metrics based on the channel on which the video asset was aired;
(y) comparison of viewing metrics based on the genre of the video asset;
(z) comparison of viewing metrics based on combinations of two or more of the criteria listed above.

14. The computer-implemented method of claim 12 wherein said data analysis program performs analytics to produce metrics on a second-by-second basis showing the number of said viewers that viewed said video asset, which is playing as described in said video asset schedule, during said second compared to the number of said viewers that viewed any video asset playing during the same said second.

15. A computer-implemented method, executed on a data analysis computer system including at least one data analysis computer of known type, of analyzing a plurality of viewer interactions by a plurality of viewers interacting with a plurality of electronic devices, each interacting directly or indirectly with a computer system accessed through a network, said computer-implemented method comprising the steps of:

a. providing on said data analysis computer system a data analysis program;
b. receiving in computer readable format electronic device usage data resulting from said viewer interaction and making said electronic device usage data available to said data analysis program run on said data analysis computer system;
c. creating a viewing detail data structure in said data analysis program run on said data analysis computer system containing identifying fields for things of interest for analysis;
d. creating in said viewing detail data structure buckets representing individual seconds of time during a window of time of interest for analysis wherein said buckets are correlated with said identifying fields;
e. receiving in computer readable format values for populating said identifying fields for things of interest for analysis and then using said values to populate said identifying fields;
f. using said electronic device usage data to determine the beginning date and time and the ending date and time of each said viewer interaction between said electronic device and said computer system accessed through said network and making said beginning date and time and said ending date and time available to said data analysis program run on said data analysis computer system;
g. loading values that identify second-by-second content viewing activity to selected buckets in said viewing detail data structure based on said beginning date and time and said ending date and time of each said viewer interaction, where said buckets loaded correspond with said identifying fields in said viewing detail data structure, and where each said bucket represents a second of time during which said data analysis program is tracking said content viewing activity against at least one said thing of interest for analysis;
h. creating a viewing result data structure containing fields for video asset schedule data, program attribute data, and viewing metrics;
i. receiving in computer readable format video asset schedule data regarding video assets delivered to said electronic device and making said video asset schedule data available to said data analysis program run on said data analysis computer system;
j. receiving in computer readable format program attribute data describing said video assets where said program attribute data includes at least one member selected from the group consisting of: advertising agency that produced the video asset, copywriter that wrote the script used in the video asset, actor or actress featured in the video asset, celebrity status or non-celebrity status of persons in the video asset, language featured in the video asset, informational content provided in the video asset, topic being addressed in the video asset, product category shown in the video asset, video format in which the video asset was delivered, content rating of the video asset, type of program in which the video asset was aired, rating of the program in which the video asset was aired, type of audio featured in the video asset, male or female voice featured in the video asset, time of day when the video asset was aired, day of week when the video asset was aired, day of year when the video asset was aired, geographic area in which the video asset was aired, duration of the video asset, episode of the video asset, original release date of the video asset, studio that produced the video asset, director that directed production of the video asset, channel on which the video asset was aired, genre of the video asset and making said program attribute data available to said data analysis program run on said data analysis computer system;

k. correlating said video asset schedule data with said program attribute data using at least one member selected from the group consisting of: computer system accessed through a network equipment identifier, geographic area, web address, internet protocol address, channel call sign, channel source id, date, time, video asset identifier;

l. populating said viewing result data structure with said video asset schedule data;

m. populating said viewing result data structure with said correlated program attribute data;

n. receiving in computer readable format targeted content delivery data regarding the video assets being delivered to targeted electronic devices and making said targeted content delivery data available to said data analysis program run on said data analysis computer system;

o. correlating said content viewing activity with said video asset schedule data using at least one member selected from the group consisting of: computer system accessed through a network equipment identifier, geographic area, web address, internet protocol address, channel call sign, channel source id, date, time;

p. correlating said content viewing activity with said targeted content delivery data using at least one member selected from the group consisting of: computer system accessed through a network equipment identifier, geographic area, web address, internet protocol address, channel call sign, channel source id, set-top box identifier, date, time;

q. correlating said video asset schedule data and said targeted content delivery data using at least one member selected from the group consisting of: computer system accessed through a network equipment identifier, geographic area, web address, internet protocol address, channel call sign, channel source id, date, time, video asset identifier;

r. executing algorithms in said data analysis program running on said data analysis computer system which use said correlated content viewing activity, said correlated video asset schedule data, said correlated program attribute data, and said correlated targeted content delivery data to produce metrics regarding the viewer's response to said targeted content;

s. outputting said analytics in a useful format;

whereby said analytics (i) provide insight into the viewing habits of said viewers interacting with said electronic device interacting with said computer system accessed through said network, (ii) provide insight into the electronic device usage pattern of said viewers, (iii) provide insight into the behavior of said viewers, and (iv) provide insight into the viewer response to said targeted content.

16. The computer-implemented method of claim 15 wherein said data analysis program performs analytics to produce metrics on said viewer response to said targeted content where said metrics include at least one member selected from the group consisting of:

(a) metrics comparing the response of said viewers to said targeted content with the response of said viewers to non-targeted content;

(b) metrics comparing the viewing time by said viewers of said targeted content with the viewing time by said viewers of non-targeted content;

(c) metrics comparing the response of said viewers to said targeted content which is identified by one or more said program attributes with the response of said viewers to non-targeted content which is identified by the same said program attributes;

(d) metrics comparing the viewing time by said viewers of said targeted content which is identified by one or more said program attributes with the viewing time by said viewers of non-targeted content which is identified by the same said program attributes;

(e) metrics comparing the response of said viewers to said targeted content which is identified by one or more said program attributes with the response of said viewers to targeted content which is identified by one or more different said program attributes;

(f) metrics comparing the viewing time by said viewers of said targeted content which is identified by one or more said program attributes with the viewing time by said viewers of targeted content which is identified by one or more different said program attributes;

(g) metrics comparing the expected viewing time by said viewers of said targeted content with the actual viewing time by said viewers of said targeted content;

(h) metrics comparing the expected and actual viewing time by said viewers of said targeted content with the expected and actual viewing time by said viewers of said non-targeted content;

(i) metrics comparing the expected viewing time by said viewers of said targeted content which is identified by one or more said program attributes with the actual viewing time by said viewers of said targeted content which is identified by one or more different said program attributes.

* * * * *